US008535829B2

(12) United States Patent
Shizuka et al.

(10) Patent No.: US 8,535,829 B2
(45) Date of Patent: Sep. 17, 2013

(54) LITHIUM TRANSITION METAL-BASED COMPOUND POWDER FOR POSITIVE ELECTRODE MATERIAL IN LITHIUM RECHARGEABLE BATTERY, METHOD FOR MANUFACTURING THE POWDER, SPRAY DRIED PRODUCT OF THE POWDER, FIRING PRECURSOR OF THE POWDER, AND POSITIVE ELECTRODE FOR LITHIUM RECHARGEABLE BATTERY AND LITHIUM RECHARGEABLE BATTERY USING THE POWDER

(75) Inventors: Kenji Shizuka, Ibaraki (JP); Kenji Okahara, Ibaraki (JP); Hiroyuki Imura, Kanagawa (JP); Kaoru Terada, Ibaraki (JP)

(73) Assignee: Mitsubishi Chemical Corporation, Tokyo (JP)

( * ) Notice: Subject to any disclaimer, the term of this patent is extended or adjusted under 35 U.S.C. 154(b) by 1375 days.

(21) Appl. No.: 12/296,212

(22) PCT Filed: Apr. 6, 2007

(86) PCT No.: PCT/JP2007/057772
§ 371 (c)(1),
(2), (4) Date: Oct. 6, 2008

(87) PCT Pub. No.: WO2007/116971
PCT Pub. Date: Oct. 18, 2007

(65) Prior Publication Data
US 2009/0104530 A1 Apr. 23, 2009

(30) Foreign Application Priority Data

| Apr. 7, 2006 | (JP) | 2006-106288 |
| Sep. 22, 2006 | (JP) | 2006-257260 |
| Sep. 29, 2006 | (JP) | 2006-266580 |
| Nov. 10, 2006 | (JP) | 2006-305015 |

(51) Int. Cl.
*H01M 4/00* (2006.01)
*H01M 4/13* (2010.01)

(52) U.S. Cl.
USPC .......................................... 429/223; 429/224

(58) Field of Classification Search
None
See application file for complete search history.

(56) References Cited

U.S. PATENT DOCUMENTS 7,241,532 B2  7/2007  Kikuchi et al.
7,309,543 B2  12/2007  Shizuka (Continued)

FOREIGN PATENT DOCUMENTS

| CN | 1744352 | | 3/2006 |
| EP | 1630891 | * | 3/2006 |

(Continued)

OTHER PUBLICATIONS

English translation of JP 2005-196992 (2005).*

(Continued)

*Primary Examiner* — Patrick Ryan
*Assistant Examiner* — Yoshitoshi Takeuchi
(74) *Attorney, Agent, or Firm* — Oblon, Spivak, McClelland, Maier & Neustadt, L.L.P.

(57) ABSTRACT

There is provided a powder of a lithium transition-metal compound for a positive-electrode material in a lithium secondary battery, in which the use of the powder as that of a positive-electrode material in a lithium secondary battery achieves a good balance among improvement in battery performance, cost reduction, resistance to a higher voltage, and a higher level of safety. The powder of the lithium transition-metal compound for a positive-electrode material in a lithium secondary battery is characterized in that in a mercury intrusion curve obtained by mercury intrusion porosimetry, the amount of mercury intruded is in the range of 0.8 $cm^3/g$ to 3 $cm^3/g$ when the pressure is increased from 3.86 kPa to 413 MPa.

14 Claims, 74 Drawing Sheets

(56) References Cited

U.S. PATENT DOCUMENTS

| | | |
|---|---|---|
| 2006/0134521 A1 | 6/2006 | Shima |
| 2007/0202405 A1 | 8/2007 | Shizuka et al. |
| 2007/0231695 A1 | 10/2007 | Kikuchi et al. |
| 2008/0182169 A1 | 7/2008 | Shizuka |

FOREIGN PATENT DOCUMENTS

| | | |
|---|---|---|
| JP | 10-324521 | 12/1998 |
| JP | 11-219706 | 8/1999 |
| JP | 11 307094 | 11/1999 |
| JP | 2000 133262 | 5/2000 |
| JP | 3088716 | 7/2000 |
| JP | 3110728 | 9/2000 |
| JP | 2000 294242 | 10/2000 |
| JP | 2000-323143 | 11/2000 |
| JP | 2001 35492 | 2/2001 |
| JP | 2002 145623 | 5/2002 |
| JP | 2002 151071 | 5/2002 |
| JP | 3362025 | 10/2002 |
| JP | 2003 31219 | 1/2003 |
| JP | 2003 51308 | 2/2003 |
| JP | 2003 68298 | 3/2003 |
| JP | 2003 81639 | 3/2003 |
| JP | 2003 178756 | 6/2003 |
| JP | 2003 203633 | 7/2003 |
| JP | 2003 221236 | 8/2003 |
| JP | 2003 238165 | 8/2003 |
| JP | 2003 297354 | 10/2003 |
| JP | 2004 6267 | 1/2004 |
| JP | 2004 31091 | 1/2004 |
| JP | 2004 139853 | 5/2004 |
| JP | 3571671 | 7/2004 |
| JP | 2004 235166 | 8/2004 |
| JP | 2004 253305 | 9/2004 |
| JP | 2004 265849 | 9/2004 |
| JP | 2004 528691 | 9/2004 |
| JP | 2004 281253 | 10/2004 |
| JP | 2004-303496 | 10/2004 |
| JP | 2004 303673 | 10/2004 |
| JP | 2004 311427 | 11/2004 |
| JP | 2005 53764 | 3/2005 |
| JP | 2005 56602 | 3/2005 |
| JP | 2005 123179 | 5/2005 |
| JP | 2005 150057 | 6/2005 |
| JP | 2005 150093 | 6/2005 |
| JP | 2005 150102 | 6/2005 |
| JP | 2005 187282 | 7/2005 |
| JP | 2005-196992 | * 7/2005 |
| JP | 2005 235628 | 9/2005 |
| JP | 2005 251716 | 9/2005 |
| JP | 2005 310421 | 11/2005 |
| JP | 2005 347134 | 12/2005 |
| JP | 2006 164934 | 6/2006 |
| WO | 02 40404 | 5/2002 |
| WO | 02 073718 | 9/2002 |
| WO | 02 086993 | 10/2002 |
| WO | 03 044881 | 5/2003 |
| WO | 03 044882 | 5/2003 |

OTHER PUBLICATIONS

Ariyoshi et al, Structural change of LiNi1/2Mn1/2O2 during charge and discharge, 1238-41 J. Phys and Chem. 69 (Available online Nov. 7, 2007).*

U.S. Appl. No. 12/517,813, filed Jun. 5, 2009, Shizuka, et al.

Lu, Z. et al., "Layered Cathode Materials Li[NixLi(1/3-2x/3)Mn(2/3-x/3)]O2 for Lithium-Ion Batteries", Electrochemical and Solid-State Letters, vol. 4, No. 11, pp. A191-A194, 2001.

Kim, J.-H, et al., "Electrochemical performance of Li [LixNi(1-3x)/2 Mn(1+x)/2]O2 cathode materials synthesized by a sol-gel method." Journal of Power Sources 119-121, pp. 166-170, 2003.

Park, Y. J., et al., "Structural investigation and electrochemical behaviour of Li [NixLi(1/3-2x/3)Mn(2/3-x/3)] O2 compounds by a simple combustion method." Journal of Power Sources, vol. 129, pp. 288-295, 2004.

Yoon, W-S., et al., "Local Structure and Cation Ordering in O3 Lithium Nickel Manganese Oxides with Stoichiometry." Electrochemical and Solid-States Letters, vol. 7, No. 7, pp. A167-A171, 2004.

Park, S. H., et al. "Synthesis and electrochemical properties of layered Li [Li0.15Ni(0.275-x/2)A1xMn(0.575-x/2)]O2 materials prepared by sol-gel method." Journal of Power Sources 119-121, pp. 161-165, 2003.

Kim, J.-H., et al., "Synthesis and electrochemical behavior of Li [Li0.1Ni0.35-x/2CoxMn0.55-x/2]O2 cathode materials." Solid State Ionics, vol. 164, pp. 43-49, 2003.

Lu, Z., et al., "Understanding the Anomalous Capacity of Li/Li[NixLi(1/3-2x/3)Mn(2/3-x/3)]O2 Cells Using In Situ X-Ray Diffraction and Electrochemical Studies." Journal of the Electrochemical Society, vol. 149, No. 7, pp. A815-A822, 2002.

Johnson, C.S., et al., "The significance of the Li2MnO3 component in 'composite' xLi2MnO3, (1-x)LiMn0.5Ni0.5O2 electrodes." Electrochemistry Communications, vol. 6, pp. 1085-1091, 2004.

Hong, Y-S., et al., "Synthesis and electrochemical properties of nanocrystalline Li[NixLi(1-2x)/3Mn(2-x)/3]O2 prepared by a simple combustion method." Journal of Materials Chemistry, vol. 14, pp. 1424-1429, 2004.

Kim, J-S., et al., "Electrochemical and Structural Properties of xLi2M'O3.(1-x)LiMn0.5O2 Electrodes for Lithium Batteries (M'=Ti, Mn, Zr; $0 \leq x \leq 0.3$)" Chem. Mater., vol. 16, No. 10, pp. 1996-2006, 2004.

Hong, Y-S., et al., "Charge/discharge behavior of Li [Ni0.20Li0.20Mn0.60]O2 and Li [Co0.20Li0.27Mn0.53]O2 cathode materials in lithium secondary batteries" Solid State Ionics, vol. 176, pp. 1035-1042, 2005.

Grey C.P., et al., "Electrochemical Activity of Li in the Transition-Metal Sites of O3 Li[Li(1-2x)/3Mn(2-x)/3Nix]O2." Electrochemical an Solid-State Letters, vol. 7, No. 9, pp. A290-293, 2004.

Robertson, A.D., et al., "Overcapacity of Li[NixLi1/3-2x/3Mn2/3-x/3]O2 Electrodes." Electrochemical and Solid-State Letters, vol. 7, No. 9, pp. A294-A298, 2004.

Lu, Z., et al., "Synthesis, Structure, and Electrochemical Behavior of Li[NixLi1/3-2x/3Mn2/3-x/3] O2." Journal of the Electrochemical Society, vol. 149, No. 6, pp. A778-A791, 2002.

Zhang, L., et al., "Synthesis of (1-2x)LiNi1/2 Mn1/2O2.xLi[Li 1/3 Mn2/3] O2.xLiCoO2 ($0 \leq x \leq 0.5$) electrode materials and comparative study on cooling rate." Journal of Power Sources, vol. 146, pp. 598-601, 2005.

Shin, S.-S., et al., "Synthesis and electrochemical properties of Li[Li(1-2x)/3NixMn(2-x)/3] O2 as cathode materials for lithium secondary batteries." Journal of Power Sources, vol. 112, pp. 634-638, 2002.

MAcNEIL, D. D., et al., "Structure and Electrochemistry of Li[NixCo1-2xMnx]O2 ($0 \leq x \leq 1/2$)." Journal of the Electrochemical Society, vol. 149, No. 10, pp. A1332-A1336, 2002.

Kang, S.-H., et al., "Layered Li (Ni0.5-xMn0.5-xM'2x)O2 (M'=Co, Al, Ti; x=0, 0.025) cathode materials for Li-ion rechargeable batteries." Journal of Power Sources, vol. 112, pp. 41-48, 2002.

Kang, S.-H., et al., "Comparative study of Li (Ni0.5-xMn0.5-xM2x')O2 (M'=Mg, Al, Co, Ni, Ti; x=0, 0.025) cathode materials for rechargeable lithium batteries." Journal of Power Sources 119-121, pp. 150-155, 2003.

Barkhouse, D. A. R., et al., "A Novel Fabrication Technique for Producing Dense Li[NixLi(1/3-2x/3)Mn(2/3-x/3)]O2, $0 \leq x \leq 1/2$." Journal of the Electrochemical Society, vol. 152, No. 4, pp. A746-A751, 2005.

Sun, Y., et al., "Effect of Co Content on Rate Performance of LiMn0.5-xCo2xNi0.5-xO2 Cathode Materials for Lithium-Ion Batteries." Journal of the Electrochemical Society, vol. 151, No. 4, pp. A504-A508, 2004.

Ueda, A., et al., "Characteristic Features of Layered Li [MxNi(1-x)/2Mn(1-x)/2] O2 (M=Co and Ni) Positive Electrode Materials and Their Li-ion Batteries." Electrochemistry, vol. 71, No. 12, pp. 1214-1221, 2003.

Jiang, J., et al., "Reactivity of Liy[NixCo1-2xMnx]O2 (x = 0.1, 0.2, 0.35, 0.45, and 0.5; y=0.3, 0.5) with Nonaqueous Solvents and Electrolytes Studied by ARC." Journal of the Electrochemical Society, vol. 152, No. 3, pp. A566-A569. 2005.

Jouanneau, S., et al., "Morphology and Safety of Li[NixCo1-2xMnx]O2 (0≦x≦1/2)." Journal of the Electrochemical Society, vol. 150, No. 10, A1299-A1304, 2003.

MAcNEIL, D. D., et al., "Structure and Electrochemistry of Li[NixCo1-2xMnx]O2 (0≦x≦1/2)." Journal of the Electrochemical Society, vol. 149, No. 10, A1332-A1336, 2002.

Li, De-C., et al., "Electrochemical characteristics of LiNi0.5-xMn0.5-xCo2x02 (0<x≦0.1) prepared by spray dry method." Electrochimica Acta, vol. 50, pp. 427-430, 2004.

Chen, C-H., et al., "Electrochemical performance of layered Li[NixCo1-2xMnx]O2 cathode materials synthesized by a sol-gel method." Journal of Power Sources, vol. 146, pp. 626-629, 2005.

Shin, H.-S., et al., "Synthesis of Li[Ni0.475Co0.05Mn0.475]O2 cathode materials via a carbonate process." Solid State Ionics, vol. 176, pp. 2577-2581, 2005.

Ohzuku, T., et al., "Layered Lithium Insertion Material of LiNi1/2Mn1/2O2: A Possible Alternative to LiCoO2 for Advanced Lithium-Ion Batteries." Chemistry Letters, pp. 744-745, 2001.

Reed, J., et al., "Charge, Potential, and Phase Stability of Layered Li(Ni0.5Mn0.5)O2." Electrochemical and Solidstate Letters, vol. 5, No. 7, pp. A145-A148, 2002.

Yoon, W-S., et al., "Investigation of the Local Structure of the LiNi0.5Mn0.5O2 Cathode Material During Electrochemical Cycling by X-Ray Absorption and NMR Spectroscopy." Electrochemical and Solid-State Letters, vol. 5, No. 11, pp. A263-A266, 2002.

Makimura, Y., et al., "Lithium insertion material of LiNi1/2Mn1/2O2 for advanced lithium-ion batteries." Journal of Power Sources 119-121, pp. 156-160, 2003.

Mizuno, F., et al., "All-solid-state lithium secondary batteries using a layer-structured LiNi0.5Mn0.5O2 cathode material." Journal of Power Sources, vol. 124, pp. 170-173, 2003.

Shaju, K.M., et al., "X-ray photoelectron spectroscopy and electrochemical behaviour of 4 V cathode, Li(Ni1/2Mn1/2)O2." Electrochimica Acta, vol. 48, pp. 1505-1514, 2003.

Sun, Y.-K., et al., "Electrochemical properties and structural characterization of layered Li[Ni0.5Mn0.5]O2 cathode materials." Electrochimica Acta, vol. 48, pp. 2589-2592, 2003.

Gopukumar, S., et al., "Novel synthesis of layered LiNi1/2Mn1/2O2 as cathode material for lithium rechargeable cells." Electrochimica Acta, vol. 49, pp. 803-810, 2004.

Meng, Y.S., et at "Understanding the Crystal Structure of Layered LiNi0.5Mn0.5O2 by Electron Diffraction and Powder Diffraction Simulation." Electrochemical and Solid-State Letters, vol. 7, No. 6, pp. A155-A158, 2004.

Shaju, K.M., et al., "Li-ion kinetics and polarization effect on the electrochemical performance of Li(Ni1/2Mn1/2)O2." Electrochimica Acta, vol. 49, pp. 1565-1576, 2004.

Li, D., et al., "Electrochemical characteristics of LiNi0.5Mn0.5-xTixO2 prepared by solid state method." Journal of Power Sources, vol. 135, pp. 262-266, 2004.

Na, S-H., et al., "A new synthetic route of LiNi0.5Mn0.5O2 as the cathode material of secondary lithium batteries." Electrochimica Acta, vol. 50, pp. 449-452, 2004.

Yoon, W-S., et al., "Soft X-Ray Absorption Spectroscopic Study of a LiNi0.5Mn0.5O2 Cathode during Charge." Journal of the Electrochemical Society, vol. 151, No. 2, pp. A246-A251, 2004.

Kang, S.-H., et al., "Effect of fluorine on the electrochemical properties of layered Li(Ni0.5Mn0.5)O2 cathode materials." Journal of Power Sources, vol. 146, pp. 650-653, 2005.

Jeong, K. H., et al., "Zr-doped Li[Ni0.5-xMn0.5-xZr2x]O2 (x=0, 0.025) as cathode material for lithium ion batteries." Electrochimica Acta, vol. 50, pp. 5349-5353, 2005.

Myung, S-T., et al., "Improvement of structural integrity and battery performance of LiNi0.5Mn0.5O2 by Al and Ti doping." Journal of Power Sources, vol. 146, pp. 645-649, 2005.

Sun, Y., et al., "Effects of Cr Contents on the Physical and Electrochemical Properties of LiNi0.5-xCr2xMn0.5-xO2 Cathode Materials for Lithium-Ion Batteries." Electrochemical and Solid-State Letters, vol. 8, No. 12, pp. A637-A640, 2005.

Myung, S-T., et al., "Synthesis of Li[(Ni0.5Mn0.5)1-xLix]O2 by Emulsion Drying Method and Impact of Excess Li on Structural and Electrochemical Properties." Chem. Mater., vol. 18, No. 6, pp. 1658-1666, 2006.

Stoyanova, R., et al., "Changes in local Ni/Mn environment in layered LiMgxNi0.5-xMn0.5O2 (0≦x≦0.10) after electrochemical extraction and reinsertion of lithium." Journal of Materials Chemistry, vol. 16, pp. 359-369, 2006.

Deb, A., et al., "Local structure of LiNi0,5Mn0.5O2 cathode material probed by in situ x-ray absorption spectroscopy." Journal of Applied Physics, vol. 99, pp. 063701-1-063701-10, 2006.

Caurant, D., et al., "Preparation by a "chimie douce" route and characterization of LiNizMn1-zO2 (0.5≦z≦1) cathode materials." Journal of Material Chemistry, vol. 6, No. 7, pp. 1149-1155, 1996.

Lu, Z., et al., "Layered Li[NixCo1-2xMnx]O2 Cathode Materials for Lithium-Ion Batteries." Electrochemical and Solid-State Letters, vol. 4, No. 12, pp. A200-A203, 2001.

Johnson, C. S., et al., "Structural and electrochemical evaluation of (1-x) Li2TiO3.(x)LiMn0.5Ni0.5O2 electrodes for lithium batteries." Journal of Power Sources 119-121, pp. 139-144, 2003.

Kang, S.-H., et al., "Synthesis and electrochemical properties of layer-structured 0.5Li (Ni0.5Mn0.5)O2-0.5Li (Li1/3Mn2/3)O2 solid mixture." Journal of Power Sources, vol. 124, pp. 533-537, 2003.

Lee, C. W., et al., "A novel layered Li [Li0.12NizMg0.32-zMn0.56]O2 cathode material for lithium-ion batteries." Electrochimica Acta, vol. 49, pp. 4425-4432, 2004.

Park D. H., et al., "Low-Temperature Synthesis of LixMn0.67Ni0.33O2 (0.2<x<0.33) Nanowires with a Hexagonal Layered Structure." Advanced Materials, vol. 17, pp. 2834-2837, 2005.

Myung, S-T., et al., "Role of Alumina Coating on Li-Ni-Co-Mn-O Particles as Positive Electrode Material for Lithium-Ion Batteries." Chem. Mater., vol. 17, No. 14, pp. 3695-3704, 2005.

Jiang, J., et al., "Electrochemical and thermal studies of Li [NixLi(1/3-2x/3)Mn(2/3-x/3)]O2 (x =1/12, 1/4, 5/12, and 1/2)." Electrochimica Acta, vol. 50, pp. 4778-4783, 2005.

Jiang, J., et al., "Structure, Electrochemical Properties, and Thermal Stability Studies of Cathode Materials in the xLi [Mn1/2Ni1/2]O2.yLiCoO2.zLi[Li1/3Mn2/3]O2 Pseudoternary System (x+y+z=1)." Journal of the Electrochemical Society, vol. 152, No. 9, pp. A1879-A1889, 2005.

Thackeray, M. M., et al., "Advances in manganese-oxide 'composite' electrodes for lithium-ion batteries." Journal of Materials Chemistry, vol. 15, pp. 2257-2267, 2005.

Whitfield, P.S., et al., "Effects of synthesis on electrochemical, structural and physical properties of solution phases of Li2MnO3-LiNi1-xCoxO2." Journal of Power Sources, vol. 146, pp. 617-621, 2005.

Jin, S.J., et al., "Structural and electrochemical characterization of Li[ (CoNi1/2Mn1/2)x(Li1/3Mn2/3)(1-2x)]O2 solid solutions with layered lithium manganese oxides." Journal of Power Sources, vol. 146, pp. 630-635, 2005.

Kang, S.-H., et al., "Layered Li(Li0.2Ni0.15+0.5zCo0.10Mn0.55-0.5z)O2-zFz cathode materials for Li-ion secondary batteries." Journal of Power Sources, vol. 146, pp. 654-657, 2005.

Hwang, B.-J., et al., "Electrochemical properties of Li[NixLi(1-2x)/3Mn(2-x)/3)]O2 (0≦x≦0.5) cathode materials prepared by a sol-gel process." Journal of Power Sources, vol. 146, pp. 658-663, 2005.

Li, D., et al., "Structure, morphology and electrochemical properties of LiNi0.5Mn0.5-xCoxO2 prepared by solid state reaction." Journal of Power Sources, vol. 148, pp. 85-89, 2005.

Son, J. T., et al., "Preparation and Characterization of Li1.05[Ni0.35Co025Mn0.4]O2 as a Cathode Material for Rechargeable Lithium Cells." Electrochemical and Solid-State Letters, vol. 9, No. 1, pp. A27-A30, 2006.

Jiang, J., et al., "Insignificant impact of designated oxygen release from high capacity Li[(Ni1/2Mn1/2)xCoy(Li1/3Mn2/3)1/3] O2 (x+y=2/3) positive electrodes during the cycling of Li-ion cells." Electrochemica Acta, vol. 51, pp. 3413-3416, 2006.

Armstrong, A. R., et al., "Demonstrating Oxygen Loss and Associated Structural Reorganization in the Lithium Battery Cathode Li[Ni0.2Li0.2Mn0.6]O2." J. Am. Chem. Soc., vol. 128, pp. 8694-8698, 2006.

Tran, N., et al., "Layered Li1+x(Ni0.425Mn0.425Co0.15)1-xO2 Positive Electrode Materials for Lithium-Ion Batteries." Journal of the Electrochemical Society, vol. 153, No. 2, pp. A261-A269, 2006.

Song, C-H., et al., "Influence of Solvents on the Structural and Electrochemical Properties of Li[Li0.2Ni0.1Co0.2Mn0.5]O2 Prepared by a Solvothermal Reaction Method." Journal of the Electrochemical Society, vol. 153, No. 2, pp. A390-A395, 2006.

Li, J., et al., "Stannum doping of layered $LiNi_{3/8}Co_{2/8}Mn_{3/8}O_2$ cathode materials with high rate capability for Li-ion batteries." Journal of Power Sources 158, pp. 524-528, 2006.

U.S. Appl. No. 12/676,467, filed Mar. 4, 2010, Shizuka, et al.

U.S. Appl. No. 11/815,319, filed Aug. 2, 2007, Shizuka, et al.

Office Action issued Feb. 22, 2012, in Chinese Patent Application No. 201010565963.8 with English translation.

Office Action issued Feb. 22, 2012, in Chinese Patent Application No. 201010565957.2 with English translation.

Office Action issued Jan. 11, 2012, in Chinese Patent Application No. 200780004424.3.

Office Action issued Oct. 30, 2012, in Japanese patent application No. 2010-169275.

Office Action issued Oct. 23, 2012, in Japanese patent application No. 2010-192120.

Chinese Office Action Issued Aug. 24, 2012 in Patent Application No. 200780004424.3.

Office Action issued Aug. 13, 2012, in Chinese patent application No. 201010565957.2 (w/English translation).

Third Office Action issued Nov. 14, 2012, in Chinese patent application No. 201010565957.2 (w/ English translation).

* cited by examiner

LITHIUM TRANSITION METAL-BASED COMPOUND POWDER FOR POSITIVE ELECTRODE MATERIAL IN LITHIUM RECHARGEABLE BATTERY, METHOD FOR MANUFACTURING THE POWDER, SPRAY DRIED PRODUCT OF THE POWDER, FIRING PRECURSOR OF THE POWDER, AND POSITIVE ELECTRODE FOR LITHIUM RECHARGEABLE BATTERY AND LITHIUM RECHARGEABLE BATTERY USING THE POWDER

FIELD OF THE INVENTION

The present invention relates to a powder of a lithium transition-metal compound for a positive-electrode material in a lithium secondary battery, a method for producing the powder. The present invention also relates to a spray-dried product, a firing precursor, a positive electrode including the powder of the lithium transition-metal compound, the positive electrode being used for a lithium secondary battery, and a lithium secondary battery including the positive electrode for a lithium secondary battery.

BACKGROUND OF THE INVENTION

Lithium secondary batteries have excellent energy density, power density, etc. and contribute to a reduction in size and weight of a device. Thus, demands for lithium secondary batteries as power supplies for portable devices, such as notebook personal computers, portable phones, and hand-held video cameras, have been rapidly increasing. Lithium secondary batteries have been receiving attention as power supplies for electric vehicles, electric-load leveling, etc. In recent years, demands for lithium secondary batteries as power supplies for hybrid electric vehicles have been rapidly increasing. In particular, lithium secondary batteries for electric vehicles need to be inexpensive, very safe, and have excellent load characteristics and lifetime (in particular, at higher temperatures). Thus, the improvement of materials for use in lithium secondary batteries is required.

Usable examples of positive-electrode active materials among materials constituting lithium secondary batteries include materials capable of intercalating and deintercalating lithium ions. There are various positive-electrode active materials that have various characteristics. To improve performance, improvement of load characteristics is a common issue. Improvement of materials for use in lithium secondary batteries has been strongly required.

Furthermore, it is desirable to provide materials having a good performance balance, i.e., materials that are inexpensive, very safe, and having excellent load characteristics and lifetime (in particular, at higher temperatures).

Currently, Examples of positive-electrode active materials, practically used, for lithium secondary batteries include lithium-manganese composite oxides having a spinel structure, layered lithium-nickel composite oxides, and layered lithium-cobalt composite oxides. Lithium secondary batteries including these lithium-containing composite oxides have advantages and disadvantages in properties. That is, lithium-manganese composite oxides having a spinel structure are inexpensive and relatively easy to synthesize and afford batteries that are very safe, whereas they have low capacities and poor high-temperature characteristics (cycle and storage). Layered lithium-nickel composite oxides have high capacities and excellent high-temperature characteristics, whereas they disadvantageously have difficulty in synthesis, afford batteries that are not insufficiently safe, and need to be carefully stored. Layered lithium-cobalt composite oxides are easily synthesized and afford batteries having good performance balance and thus are widely used as power supplies for portable devices. However, layered lithium-cobalt composite oxides have serious disadvantages in that they afford batteries that are insufficiently safe and have high costs.

Under these circumstances, a lithium-nickel-manganese-cobalt composite oxide having a layered structure has been developed as a potential active material that eliminates or minimizes the disadvantages of those positive-electrode active materials and affords a battery having an excellent performance balance. The lithium-nickel-manganese-cobalt composite oxide is a potential positive-electrode active material that can satisfy demands for cost reduction, a higher voltage, and a higher level of safety nowadays.

The reduction in cost, the increase in voltage, and the level of safety varies depending on the composition. Thus, to satisfy demands for further cost reduction, a further higher upper limit of voltage, and further higher level of safety, it is necessary to use a lithium-nickel-manganese-cobalt composite oxide having a composition in a limited range, for example, an atomic ratio of manganese to nickel of 1 or more or a reduction in cobalt content. However, a lithium secondary battery including a layered lithium-nickel-manganese-cobalt composite oxide, having a composition in such a range, as a positive-electrode material has reduced load characteristics, such as rate and output characteristics. Thus, the layered lithium-nickel-manganese-cobalt composite oxide needs to be further improved for practical use.

Patent Documents 1 to 3 and Non-Patent Documents 1 to 24 disclose lithium-nickel-manganese-cobalt composite oxides each having a composition in which an atomic ratio of manganese to nickel is 1 or more and a cobalt content is equal to or less than a value specified by the present invention.

However, none of Patent Documents 1 to 3 and Non-Patent Documents 1 to 24 describe the porosity control of active-material particles specified by the present invention. The documents do not satisfy requirements in the present invention for improving battery performance. Thus, it is extremely difficult to achieve improvement in battery performance described in the present invention by simply employing techniques described in above documents.

Patent Document 4 discloses that porous particles composed of a lithium composite oxide mainly containing lithium and at least one element selected from the group consisting of Co, Ni, and Mn are used as a positive-electrode active material for a nonaqueous secondary battery, the porous particles having an average pore size of 0.1 to 1 μm determined by pore-size distribution measurement using mercury intrusion porosimetry, and the total volume of the pores having pore sizes of 0.01 to 1 μm being 0.01 $cm^3$/g or more. The document also discloses that the use of the particles enhances load characteristics of a battery including the particles without impairing filling performance of the positive-electrode active material into a positive electrode.

Although the lithium composite oxide particles described in Patent Document 4 have improved coatability, disadvantageously, load characteristics remain insufficient.

Patent Document 5 discloses lithium composite oxide particles that satisfy requirements described below and that can be used as a suitable positive-electrode material of a lithium secondary battery because the use of the particles as those of a positive electrode material of a lithium secondary battery results in the lithium secondary battery having improved low-temperature load characteristics and because the particles have excellent coatability during positive electrode production, in which in the measurement of the particles by mercury intrusion porosimetry, a mercury intrusion volume under a specific high-pressure load is a predetermined upper limit or less and either the mercury intrusion volume is a predetermined lower limit or more or the average pore radius is within a predetermined range and the pore-size-distribution curve has a sub-peak with a peak top that is present in a specific pore-radius range in addition to a main peak.

Although the lithium composite oxide particles disclosed in Patent Document 5 serve to improve the characteristics for a composition in which the cobalt content is relatively high, disadvantageously, load characteristics remain insufficient in a composition range specified by the present invention.

Patent Documents 6 to 30 and Non-Patent Documents 25 to 57 disclose lithium-nickel-manganese-cobalt composite oxides each having a composition in which the atomic ratio of manganese to nickel is about 1 and the cobalt content is equal to or less than a value specified by the present invention.

Patent Document 6 discloses a single-phase cathodic material represented by the formula $Li[Li_xCo_yA_{1-x-y}]O_2$ (wherein A represents $[Mn_zNi_{1-z}]$; x represents a numerical value ranging from 0.00 to 0.16; y represents a numerical value ranging from 0.1 to 0.30; z represents a numerical value ranging from 0.40 to 0.65; and $Li_x$ is included in transition metal layers of the structure). It is described that a doped cobalt content exceeding about 10% of the total amount of the transition metals results in a cathodic material having excellent electrochemical properties. Disadvantageously, a cathodic material having a doped cobalt content of less than the specified proportion does not have excellent electrochemical properties. With respect to details for the composition range specified by Patent Document 1, the lower limit of the molar proportion (y) of cobalt is 0.1 regardless of the amount (x) of lithium in the transition metal layers. In the case of a composition range specified by the present invention (compositional formula (1)), when the amount (z/(2+z)) of lithium in the transition metal layers exceeds 0, the molar proportion of cobalt is less than 10%. By definition, the single-phase cathodic material does not satisfy the composition range of the present invention.

None of Patent Documents 7 to 30 and Non-Patent Documents 25 to 57 describe a specific half-width of an active material crystal in a composition range specified by the present invention. Also, none of the documents describe the presence or absence of a peak from a heterophase, the peak being observed on the higher-angle side of the peak top of a specific diffraction peak. Furthermore, none of the documents describe the porosity control of particles, which is a preferred requirement. That is, the documents do not satisfy requirements in the present invention for improving battery performance. Thus, it is extremely difficult to achieve the improvement in battery performance described in the present invention by simply employing techniques described in above documents.

Patent Document 31 discloses that a positive-electrode active material containing a composite oxide represented by the composite formula $Li_aMn_{0.5-x}Ni_{0.5-y}M_{x+y}O_2$ (wherein $0<a<1.3$; $-0.1 \leq x-y \leq 0.1$; and M is an element except Li, Mn, and Ni) has a total pore volume of 0.001 mL/g to 0.006 mL/g; and in a diffraction pattern of the material obtained by powder X-ray diffraction using CuKα radiation, the ratio of the relative intensity of the diffraction peak at a 2θ of 18.6±1° to the relative intensity of the diffraction peak at a 2θ of 44.1±1° is in the range of 0.65 to 1.05, the diffraction peak at a 2θ of 18.6±1° has a half-width of 0.05° to 0.20°, and the diffraction peak at a 2θ of 44.1±1° has a half-width of 0.10° to 0.20°, whereby a high energy density and excellent charge-discharge cycle performance are achieved. That is, Patent Document 31 describes a specific half-width of an active material crystal in a composition range specified by the present invention. Patent Document 31 also describes the porosity control of particles, which is a preferred requirement.

Neither Patent Documents 32 nor 33 describes a specific half-width of an active material crystal in a composition range specified by the present invention or the presence or absence of a peak from a heterophase, the peak being observed on the higher-angle side of the peak top of a specific diffraction peak. The above documents, however, describe the porosity control of particles, which is a preferred requirement. Patent Document 27 discloses that a positive-electrode active material for a lithium secondary battery contains a Li—Mn—Ni composite oxide constituted by at least lithium, manganese, and nickel, in which the Li—Mn—Ni composite oxide has a total pore volume of 0.0015 mL/g or more, whereby a high discharge capacity and excellent cycle performance are achieved.

Patent Document 31 does not describe the half-width of the (110) diffraction peak that is useful to determine whether or not a Li—Mn—Ni composite oxide with a Ni/Mn atomic ratio of 1/1 has higher performance. Furthermore, the total pore volume is significantly smaller than a value specified by the present invention; hence, disadvantageously, load characteristics remain insufficient. The Li—Mn—Ni composite oxide described in Patent Document 27 has a pore volume larger than that in Patent Document 31. In any example, the total pore volume is significantly smaller than the value specified by the present invention; hence, disadvantageously, load characteristics remain insufficient.

Patent Document 33 discloses lithium composite oxide particles that satisfy requirements described below and that can be used as a suitable positive-electrode material of a lithium secondary battery because the use of the particles as those of a positive electrode material of a lithium secondary battery results in the lithium secondary battery having improved low-temperature load characteristics and because the particles have excellent coatability during positive electrode production, in which in the measurement of the particles by mercury intrusion porosimetry, a mercury intrusion volume under a specific high-pressure load is a predetermined upper limit or less and either the mercury intrusion volume is a predetermined lower limit or more or the average pore radius is within a predetermined range and the pore-size-distribution curve has a sub-peak with a peak top that is present in a specific pore-radius range in addition to a main peak.

Although the lithium composite oxide particles disclosed in Patent Document 33 serve to improve the characteristics at a composition in which the cobalt content is relatively high, disadvantageously, load characteristics remain insufficient in a composition range specified by the present invention.

Patent Documents 34 to 65 and Non-Patent Documents 58 to 130 disclose lithium-nickel-manganese-cobalt composite oxides each having a composition in which the Mn/Ni atomic ratio and the cobalt content correspond to values specified by the present invention.

None of Patent Documents 34 to 65 and Non-Patent Documents 58 to 130 describe an additive that inhibits growth and sintering of active material grains during firing in a composition range specified by the present invention. That is, the documents do not satisfy requirements in the present invention for improving battery performance. Thus, it is extremely difficult to achieve improvement in battery performance described in the present invention by simply employing techniques described in the above documents.

No document describes "the inhibition of growth and sintering of active material grains during firing" described in the present invention. Patent Documents 66 to 74 and Non-Patent Document 131, which are known documents, each disclose that a lithium-nickel-manganese-cobalt composite oxide is mixed or replaced with, for example, a compound containing W, Mo, Nb, Ta, and/or Re in order to improve the positive-electrode active material.

Patent Documents 66 and 67 each disclose a layered lithium-nickel composite oxide containing W, Mo, Ta, and/or Nb as a substituent element that occupies the transition metal site to improve thermal stability in a charged state. However, the composite oxides disclosed in the documents mainly contain Li and Ni. Thus, an active material having well-balanced battery characteristics cannot be provided.

Patent Document 68 discloses that a lithium-nickel-manganese-cobalt-niobium composite oxide is used. However, the molar proportion of Mn in the transition metal sites is as low as 0.1 or less. Thus, disadvantageously, an active material having well-balanced battery characteristics cannot be provided.

Patent Document 69 discloses that lithium-nickel-manganese-cobalt composite oxide containing W and/or Mo is used, whereby a battery including the oxide is inexpensive and has a high capacity and excellent thermal stability in a charged state compared with those of a battery including $LiCoO_2$. However, the crystals do not sufficiently develop because the Mn/Ni molar ratio is as low as 0.6 and the firing temperature is as low as 920° C. to 950° C. in examples. Furthermore, an excessive amount of the addition metal element (W and/or Mo) is contained. Thus, disadvantageously, an active material having well-balanced battery characteristics cannot be provided.

Patent Document 70 discloses a layered lithium-nickel-manganese-cobalt composite oxide containing Ta and/or Nb as a substituent element that occupies the transition metal site. The document describes that the use of the oxide affords a battery that can operate in a wide voltage range, has satisfactory charge/discharge cycle durability and a high capacity, and is very safe. However, the crystals do not sufficiently develop because the firing temperature is as low as 900° C. in examples. Thus, disadvantageously, an active material having well-balanced battery characteristics cannot be provided.

Patent Document 71 discloses a lithium-nickel-manganese-cobalt composite oxide containing W as a substituent that occupies the transition metal site. However, in the transition metal sites, the molar proportion of Mn is 0.01, which is significantly low, and the molar proportion of Ni is 0.8, which is significantly high. Thus, disadvantageously, an active material having well-balanced battery characteristics cannot be provided.

Patent Document 72 discloses that a lithium-manganese-nickel composite oxide having a monoclinic structure and containing Nb, Mo, and/or W as a substituent that occupies the transition metal site is used as a positive-electrode active material. The document describes that the use of the oxide affords a lithium secondary battery having a high energy density and high reliability at a high voltage.

However, the crystals do not sufficiently develop because the firing temperature is as low as 950° C. in examples. Furthermore, the molar proportion of the element(s) is 5 mol %, which is excessively high. Thus, disadvantageously, an active material having well-balanced battery characteristics cannot be provided.

Patent Document 73 discloses that layered lithium-transition metal oxide particles include a compound containing molybdenum and/or tungsten on at least a surface of each of the particles. The document describes that the use of the particles results in excellent battery characteristics even in a more severe environment. However, the crystals do not sufficiently develop because the Co/(Ni+Co+Mn) molar ratio is 0.33 which is excessively high and the firing temperature is as low as 900° C. in examples. Thus, disadvantageously, an active material having well-balanced battery characteristics cannot be provided.

Patent Document 74 discloses that a layered lithium-nickel-manganese-cobalt-molybdenum composite oxide is used. However, the Co/(Ni+Mn+Co) molar ratio is 0.34 which means there is a high Co proportion. Thus, disadvantageously, an active material having well-balanced battery characteristics cannot be provided.

Non-Patent Document 131 discloses a layered $LiNi_{1/3}Mn_{1/3}Mo_{1/3}O_2$ composite oxide. Disadvantageously, an active material having well-balanced battery characteristics cannot be provided because of an excessively high Mo content.

[Patent Document 1] Japanese Unexamined Patent Application Publication No. 2004-6267
[Patent Document 2] U.S. Pat. No. 6,680,143 B2
[Patent Document 3] Japanese Patent No. 3571671
[Patent Document 4] Japanese Patent No. 3110728
[Patent Document 5] Japanese Unexamined Patent Application Publication No. 2005-123179
[Patent Document 6] Japanese Patent No. 3571671
[Patent Document 7] Japanese Unexamined Patent Application Publication No. 11-307094
[Patent Document 8] Japanese Unexamined Patent Application Publication No. 2000-133262
[Patent Document 9] WO 2002-040404
[Patent Document 10] WO 2002-073718
[Patent Document 11] Japanese Unexamined Patent Application Publication No. 2002-145623
[Patent Document 12] WO 2003-044881
[Patent Document 13] WO 2003-044882
[Patent Document 14] Japanese Unexamined Patent Application Publication No. 2003-031219
[Patent Document 15] Japanese Unexamined Patent Application Publication No. 2003-081639
[Patent Document 16] Japanese Unexamined Patent Application Publication No. 2003-178756
[Patent Document 17] Japanese Unexamined Patent Application Publication No. 2003-203633
[Patent Document 18] Japanese Unexamined Patent Application Publication No. 2003-221236
[Patent Document 19] Japanese Unexamined Patent Application Publication No. 2003-238165
[Patent Document 20] Japanese Unexamined Patent Application Publication No. 2003-297354
[Patent Document 21] Japanese Unexamined Patent Application Publication No. 2004-031091
[Patent Document 22] Japanese Unexamined Patent Application Publication No. 2004-139853
[Patent Document 23] Japanese Unexamined Patent Application Publication No. 2004-265849
[Patent Document 24] Japanese Unexamined Patent Application Publication No. 2004-281253
[Patent Document 25] Japanese Unexamined Patent Application Publication No. 2004-311427
[Patent Document 26] PCT Japanese Translation Patent Publication No. 2004-528691
[Patent Document 27] Japanese Unexamined Patent Application Publication No. 2005-150057
[Patent Document 28] Japanese Unexamined Patent Application Publication No. 2005-150093

[Patent Document 29] Japanese Unexamined Patent Application Publication No. 2005-150102
[Patent Document 30] Japanese Unexamined Patent Application Publication No. 2005-187282
[Patent Document 31] WO 2002-086993
[Patent Document 32] Japanese Unexamined Patent Application Publication No. 2003-051308
[Patent Document 33] Japanese Unexamined Patent Application Publication No. 2005-123179
[Patent Document 34] Japanese Patent No. 3110728
[Patent Document 35] Japanese Patent No. 3571671
[Patent Document 36] U.S. Pat. No. 6,680,143
[Patent Document 37] Japanese Unexamined Patent Application Publication No. 11-307094
[Patent Document 38] Japanese Unexamined Patent Application Publication No. 2000-294242
[Patent Document 39] Japanese Unexamined Patent Application Publication No. 2000-133262
[Patent Document 40] WO 2002-040404
[Patent Document 41] WO 2002-073718
[Patent Document 42] WO 2002-086993
[Patent Document 43] Japanese Unexamined Patent Application Publication No. 2002-145623
[Patent Document 44] WO 2003-044881
[Patent Document 45] WO 2003-044882
[Patent Document 46] Japanese Unexamined Patent Application Publication No. 2003-031219
[Patent Document 47] Japanese Unexamined Patent Application Publication No. 2003-081639
[Patent Document 48] Japanese Unexamined Patent Application Publication No. 2003-178756
[Patent Document 49] Japanese Unexamined Patent Application Publication No. 2003-203633
[Patent Document 50] Japanese Unexamined Patent Application Publication No. 2003-221236
[Patent Document 51] Japanese Unexamined Patent Application Publication No. 2003-238165
[Patent Document 52] Japanese Unexamined Patent Application Publication No. 2003-297354
[Patent Document 53] Japanese Unexamined Patent Application Publication No. 2004-031091
[Patent Document 54] Japanese Unexamined Patent Application Publication No. 2004-006267
[Patent Document 55] Japanese Unexamined Patent Application Publication No. 2004-139853
[Patent Document 56] Japanese Unexamined Patent Application Publication No. 2004-265849
[Patent Document 57] Japanese Unexamined Patent Application Publication No. 2004-281253
[Patent Document 58] Japanese Unexamined Patent Application Publication No. 2004-311427
[Patent Document 59] PCT Japanese Translation Patent Publication No. 2004-528691
[Patent Document 60] Japanese Unexamined Patent Application Publication No. 2005-150057
[Patent Document 61] Japanese Unexamined Patent Application Publication No. 2005-150093
[Patent Document 62] Japanese Unexamined Patent Application Publication No. 2005-150102
[Patent Document 63] Japanese Unexamined Patent Application Publication No. 2005-187282
[Patent Document 64] Japanese Unexamined Patent Application Publication No. 2003-051308
[Patent Document 65] Japanese Unexamined Patent Application Publication No. 2005-123179
[Patent Document 66] Japanese Patent No. 3088716
[Patent Document 67] Japanese Patent No. 3362025
[Patent Document 68] Japanese Unexamined Patent Application Publication No. 2002-151071
[Patent Document 69] WO 2002-041419
[Patent Document 70] Japanese Unexamined Patent Application Publication No. 2003-68298
[Patent Document 71] Japanese Unexamined Patent Application Publication No. 2004-303673
[Patent Document 72] Japanese Unexamined Patent Application Publication No. 2005-235628
[Patent Document 73] Japanese Unexamined Patent Application Publication No. 2005-251716
[Patent Document 74] Japanese Unexamined Patent Application Publication No. 2006-164934
[Non-Patent Document 1] Electrochem. Solid-State Lett., 4(2001)A191-A194
[Non-Patent Document 2] J. Power sources, 119-121 (2003)166
[Non-Patent Document 3] J. Power sources, 129(2004)288
[Non-Patent Document 4] Electrochem. Solid-State Lett., 7(2004)A167
[Non-Patent Document 5] J. Power sources, 119-121 (2003)161
[Non-Patent Document 6] Solid State Ionics, 164(2003)43
[Non-Patent Document 7] J. Electrochem. Soc., 149(2002) A815
[Non-Patent Document 8] Electrochem. Com. 6(2004)1085
[Non-Patent Document 9] J. Mater. Chem., 14(2004)1424
[Non-Patent Document 10] Chem. Mater. 16(2004)1996
[Non-Patent Document 11] Solid State Ionics, 176(2005) 1035
[Non-Patent Document 12] Electrochem. Solid-State Lett., 7(2004)A290
[Non-Patent Document 13] Electrochem. Solid-State Lett., 7(2004)A294
[Non-Patent Document 14] J. Electrochem. Soc., 149(2002)A778
[Non-Patent Document 15] J. Power sources, 146(2005) 598
[Non-Patent Document 16] J. Power sources, 112(2002) 634
[Non-Patent Document 17] J. Electrochem. Soc., 149 (2002)A1332
[Non-Patent Document 18] J. Power sources, 112(2002)41
[Non-Patent Document 19] J. Power sources, 119-121 (2003)150
[Non-Patent Document 20] J. Electrochem. Soc., 152(2005)A746
[Non-Patent Document 21] J. Electrochem. Soc., 151(2004)A504
[Non-Patent Document 22] Electrochemistry, 71(2003)1214
[Non-Patent Document 23] J. Electrochem. Soc., 152(2005)A566
[Non-Patent Document 24] J. Elecirochem. Soc., 150 (2003)A1299
[Non-Patent Document 25] J. Electrochem. Soc., 149 (2002)A1332.
[Non-Patent Document 26] J. Electrochem. Soc., 150 (2003)A1299.
[Non-Patent Document 27] J. Power sources, 112(2002) 41.
[Non-Patent Document 28] J. Power sources, 119-121 (2003)150.
[Non-Patent Document 29] J. Electrochem. Soc., 152(2005)A746.

[Non-Patent Document 30] J. Electrochem. Soc., 151(2004)A504.
[Non-Patent Document 31] Electrochemistry, 71(2003)1214.
[Non-Patent Document 32] Electrochim. Acta, 50(2004) 427.
[Non-Patent Document 33] J. Electrochem. Soc., 152(2005)A566.
[Non-Patent Document 34] Trans. Nonferrous Met. Soc. China, 15(2005)1185.
[Non-Patent Document 35] J. Power sources, 146(2005) 626.
[Non-Patent Document 36] Solid State Ionics, 176(2005) 2577.
[Non-Patent Document 37] Chem. Lett., (2001)744.
[Non-Patent Document 38] Electrochem. Solid-State Lett., 5(2002)A145.
[Non-Patent Document 39] Electrochem. Solid-State Lett., 5(2002)A263.
[Non-Patent Document 40] J. Power sources, 119-121 (2003)156.
[Non-Patent Document 41] J. Power sources, 124(2003) 170.
[Non-Patent Document 42] Electrochim. Acta, 48(2003) 1505.
[Non-Patent Document 43] Electrochim. Acta, 48(2003) 2589.
[Non-Patent Document 44] Electrochim. Acta, 49(2004) 803.
[Non-Patent Document 45] Electrochem. Solid-State Lett., 7(2004)A155.
[Non-Patent Document 46] Electrochim. Acta, 49(2004) 1565.
[Non-Patent Document 47] J. Power sources, 135(2004) 262.
[Non-Patent Document 48] Electrochim. Acta, 50(2004) 449.
[Non-Patent Document 49] J. Electrochem. Soc., 151(2004)A246.
[Non-Patent Document 50] J. Power sources, 146(2005) 650.
[Non-Patent Document 51] Electrochim. Acta, 50(2005) 5349.
[Non-Patent Document 52] J. Power sources, 146(2005) 645.
[Non-Patent Document 53] Electrochem. Solid-State Lett., 8(2005)A637.
[Non-Patent Document 54] Mater. Lett., 59(2005)2693.
[Non-Patent Document 55] Chem. Mater., 18(2006)1658.
[Non-Patent Document 56] J. Mater. Chem., 16(2006)359.
[Non-Patent Document 57] J. Appl. Phys., 99(2006)06371.
[Non-Patent Document 58] J. Mater. Chem., 6(1996)1149.
[Non-Patent Document 59] Chem. Lett., (2001)744.
[Non-Patent Document 60] Electrochem. Solid-State Lett., 4(2001)A191.
[Non-Patent Document 61] Electrochem. Solid-State Lett., 4(2001)A200.
[Non-Patent Document 62] Electrochem. Solid-State Lett., 5(2002)A145.
[Non-Patent Document 63] Electrochem. Solid-State Lett., 5(2002)A263.
[Non-Patent Document 64] J. Electrochem. Soc., 149(2002)A778.
[Non-Patent Document 65] J. Electrochem. Soc., 149(2002)A815.
[Non-Patent Document 66] J. Electrochem. Soc., 149 (2002)A1332.
[Non-Patent Document 67] J. Power sources, 112(2002) 41.
[Non-Patent Document 68] J. Power sources, 112(2002) 634.
[Non-Patent Document 69] Electrochemistry, 71(2003)1214.
[Non-Patent Document 70] Electrochim. Acta, 48(2003) 1505.
[Non-Patent Document 71] Electrochim. Acta, 48(2003) 2589.
[Non-Patent Document 72] J. Electrochem. Soc., 150 (2003)A1299.
[Non-Patent Document 73] J. Power sources, 119-121 (2003)139.
[Non-Patent Document 74] J. Power sources, 119-121 (2003)150.
[Non-Patent Document 75] J. Power sources, 119-121 (2003)156.
[Non-Patent Document 76] J. Power sources, 119-121 (2003)161.
[Non-Patent Document 77] J. Power sources, 119-121 (2003)166.
[Non-Patent Document 78] J. Power sources, 124(2003) 170.
[Non-Patent Document 79] J. Power sources, 124(2003) 533.
[Non-Patent Document 80] Solid State Ionics, 164(2003) 43.
[Non-Patent Document 81] Chem. Mater., 16(2004)1996.
[Non-Patent Document 82] Electrochem. Com., 6(2004) 1085.
[Non-Patent Document 83] Electrochem. Solid-State Lett., 7(2004)A155.
[Non-Patent Document 84] Electrochem. Solid-State Lett., 7(2004)A167.
[Non-Patent Document 85] Electrochem. Solid-State Lett., 7(2004)A290.
[Non-Patent Document 86] Electrochem. Solid-State Lett., 7(2004)A294.
[Non-Patent Document 87] Electrochim. Acta, 49(2004) 803.
[Non-Patent Document 88] Electrochim. Acta, 49(2004) 1565.
[Non-Patent Document 89] Electrochim. Acta, 49(2004) 4425.
[Non-Patent Document 90] Electrochim. Acta, 50(2004) 427.
[Non-Patent Document 91] Electrochim. Acta, 50(2004) 449.
[Non-Patent Document 92] J. Electrochem. Soc., 151(2004)A246.
[Non-Patent Document 93] J. Electrochem. Soc., 151(2004)A504.
[Non-Patent Document 94] J. Electrochem. Soc., 151 (2004)A1789.
[Non-Patent Document 95] J. Mater. Chem., 14(2004)1424.
[Non-Patent Document 96] J. Power sources, 129(2004) 288.
[Non-Patent Document 97] J. Power sources, 135(2004) 262.
[Non-Patent Document 98] Adv. Mater., 17(2005)2834.
[Non-Patent Document 99] Chem. Mater., 17(2005)3695.
[Non-Patent Document 100] Electrochem. Solid-State Lett., 8(2005)A637.
[Non-Patent Document 101] Electrochim. Acta, 50(2005) 4778.

[Non-Patent Document 102] Electrochim. Acta, 50(2005)5349.

[Non-Patent Document 103] J. Electrochem. Soc., 152(2005)A566.

[Non-Patent Document 104] J. Electrochem. Soc., 152(2005)A746.

[Non-Patent Document 105] J. Electrochem. Soc., 152(2005)A1879.

[Non-Patent Document 106] J. Mater. Chem., 15(2005)2257.

[Non-Patent Document 107] J. Power sources, 146(2005)598.

[Non-Patent Document 108] J. Power sources, 146(2005)617.

[Non-Patent Document 109] J. Power sources, 146(2005)626.

[Non-Patent Document 110] J. Power sources, 146(2005)630.

[Non-Patent Document 111] J. Power sources, 146(2005)645.

[Non-Patent Document 112] J. Power sources, 146(2005)650.

[Non-Patent Document 113] J. Power sources, 146(2005)654.

[Non-Patent Document 114] J. Power sources, 146(2005)658.

[Non-Patent Document 115] J. Power sources, 148(2005)85.)

[Non-Patent Document 116] Mater. Lett., 59(2005)2693.

[Non-Patent Document 117] Mater. Res. Soc. Symp. Proc., 835(2005)K10.8.1.

[Non-Patent Document 118] Mater. Res. Soc. Symp. Proc., 835(2005)K11.3.1.

[Non-Patent Document 119] Solid State Ionics, 176(2005)1035.

[Non-Patent Document 120] Solid State Ionics, 176(2005)2577.

[Non-Patent Document 121] Trans. Nonferrous Met. Soc. China, 15(2005)1185.

[Non-Patent Document 122] Chem. Mater., 18(2006)1658.

[Non-Patent Document 123] Electrochem. Solid-State Lett., 9(2006)A27.

[Non-Patent Document 124] Electrochim. Acta, 51(2006)3413.

[Non-Patent Document 125] J. Am. Chem. Soc., 128(2006)8694.

[Non-Patent Document 126] J. Appl. Phys., 99(2006)06371.

[Non-Patent Document 127] J. Electrochem. Soc., 153(2006)A261.

[Non-Patent Document 128] J. Electrochem. Soc., 153(2006)A390.

[Non-Patent Document 129] J. Mater. Chem., 16(2006)359.

[Non-Patent Document 130] J. Power sources, 158(2006)524.

[Non-Patent Document 131] Microelectronics Journal, 36(2005)491.

SUMMARY OF THE INVENTION

It is an object of the present invention to provide a powder of a lithium transition-metal compound for a positive-electrode material in a lithium secondary battery, in which the use of the powder as that of a positive-electrode material for a lithium secondary battery results in improvement of load characteristics, such as rate and output characteristics, and preferably also results in a reduction in cost, resistance to a higher voltage, and a higher level of safety, and to provide a method for producing the powder. It is another object of the present invention to provide a positive electrode including the powder of a lithium transition-metal compound for a lithium secondary battery, and a lithium secondary battery including the positive electrode for a lithium secondary battery.

To overcome the foregoing problems, the inventors have conducted intensive studies and have found that a powder of a lithium transition-metal compound is controlled in such a manner that the amount of mercury intruded is in the range described above at an increased pressure and in such a manner that peaks of the resulting pore-size distribution curve have a feature described above when the powder is subjected to mercury intrusion, thereby providing the powder of the lithium transition-metal compound for a positive-electrode material in a lithium secondary battery, the powder being capable of achieving a good balance among reduced cost, resistance to a higher voltage, a higher level of safety, and improved load characteristics such as rate and output characteristics. These findings have led to the completion of the present invention. Furthermore, the inventors have conducted intensive studies in order to overcome the foregoing problems and have found that the use of a powder of a lithium-nickel-manganese-cobalt composite oxide, as that of a positive-electrode material in a lithium secondary battery, having a controlled half-width of a specific diffraction peak measured by powder X-ray diffraction and having a composition controlled within a specific range results in a good balance among reduced cost, resistance to a higher voltage, a higher level of safety, and improved load characteristics such as rate and output characteristics. These findings have led to the completion of the present invention.

To improve the load characteristics such as rate and output characteristics, the inventors have considered it important that a fine powder having a sufficiently high degree of crystallinity is obtained in a step of firing an active material while grain growth and sintering are inhibited. The inventors have conducted intensive studies and have found that firing of a powder of a lithium transition-metal compound, in particular, a layered lithium-nickel-manganese-cobalt composite oxide, after a compound that inhibits grain growth during firing is added to a main component, results in the powder of the lithium transition-metal compound that is capable of achieving a good balance among reduced cost, resistance to a higher voltage, a higher level of safety, and improved load characteristics such as rate and output characteristics. These findings have led to the completion of the present invention.

The scope of the present invention is described below.

1. A powder of a lithium transition-metal compound for a positive-electrode material in a lithium secondary battery is characterized in that, in a mercury intrusion curve obtained by mercury intrusion porosimetry, the amount of mercury intruded is in the range of 0.8 cm$^3$/g to 3 cm$^3$/g when the pressure is increased from 3.86 kPa to 413 MPa.

2. The powder of the lithium transition-metal compound describe in item 1 is characterized in that a pore-size distribution curve obtained by mercury intrusion porosimetry has a main peak with a peak top that is present at a pore radius of 300 nm to 1,000 nm and does not have a sub-peak with a peak top that is present at a pore radius greater than or equal to 80 nm and less than 300 nm.

3. The powder of the lithium transition-metal compound described in item 1 or 2 is characterized in that, in a pore-size distribution curve obtained by mercury intrusion porosimetry, a main peak with a peak top that is present at a pore radius of 300 nm to 1,000 nm has a pore volume of 0.5 cm$^3$/g to 1.5 cm$^3$/g.

4. The powder of the lithium transition-metal compound described in any one of items 1 to 3 is characterized in that the median diameter is in the range of 0.6 μm to 5 μm and is determined from volume-based particle diameters measured with a laser diffraction/scattering particle size distribution analyzer using the refractive index set at 1.24, and the measurement is made after a five-minute ultrasonic dispersion (power: 30 W, frequency: 22.5 kHz).

5. The powder of the lithium transition-metal compound described in any one of items 1 to 4 is characterized in that the powder is composed of a lithium-nickel-manganese-cobalt composite oxide of the composition formula (I)

$$\text{Li}[\text{Li}_{z/(2+z)}\{(\text{Li}_x\text{Ni}_{(1-3x)/2}\text{Mn}_{(1+x)/2})_{1-y}\text{Co}_y\}_{2/(2+z)}]\text{O}_2 \quad \text{composition formula (I)}$$

wherein $0 \leq x \leq 0.33$, $0 \leq y \leq 0.2$, and $-0.02 \leq z \leq 0.2(1-y)(1-3x)$.

6. The powder of the lithium transition-metal compound described in any one of items 1 to 5 is characterized in that the bulk density is in the range of 0.5 to 1.5 g/cm$^3$.

7. The powder of the lithium transition-metal compound described in any one of items 1 to 6 is characterized in that the BET specific surface area is in the range of 1.5 to 5 m$^2$/g.

8. The powder of the lithium transition-metal compound described in any one of items 1 to 7 is characterized in that the carbon content C (% by weight) is in the range of 0.005% by weight to 0.2% by weight.

9. A method for producing the powder of the lithium transition-metal compound described in any one of items 1 to 8 includes pulverizing a lithium compound and at least one transition-metal compound in a liquid medium to form a slurry, spray-drying the slurry containing these compounds uniformly dispersed to form a spray-dried product, and firing the spray-dried product in an oxygen-containing gas atmosphere.

10. The method described in item 9 is characterized in that the spray-dried product is mixed with at least one compound that forms pores in secondary particles of the spray-dried product to form a firing precursor.

11. The method described in item 10 is characterized in that the at least one compound that forms the pores is a compound that generates one or more decomposition gases or sublimes during firing to form pores in the secondary particles.

12. The method described in item 11 is characterized in that one of the decomposition gases is carbon dioxide gas (CO$_2$).

13. The method described in items 9 to 12 is characterized in that the lithium compound is lithium carbonate.

14. A spray-dried product includes a lithium transition-metal compound, the spray-dried product being prepared by pulverizing a lithium compound and at least one transition-metal compound in a liquid medium to form a slurry and spray-drying the slurry containing these compounds uniformly dispersed, in which the median diameter of the spray-dried product is in the range of 0.01 μm to 4 μm and is determined from volume-based particle diameters measured with a laser diffraction/scattering particle size distribution analyzer using the refractive index set at 1.24, and the measurement is made after a five-minute ultrasonic dispersion (power: 30 W, frequency: 22.5 kHz).

15. The spray-dried product described in item 14 is characterized in that the BET specific surface area is in the range of 10 to 70 m$^2$/g.

16. A firing precursor includes the spray-dried product described in item 14 or 15 and at least one compound that forms pores in secondary particles.

17. A positive electrode for a lithium secondary battery includes a positive-electrode active-material layer on a current collector, the layer including the powder of the lithium transition-metal compound described in any one of items 1 to 8 and a binder.

18. A lithium secondary battery includes a negative electrode capable of intercalating and deintercalating lithium, a non-aqueous electrolyte containing a lithium salt, and a positive electrode capable of intercalating and deintercalating lithium, in which the positive electrode is the positive electrode for a lithium secondary battery described in item 17.

19. In a powder of a lithium-nickel-manganese-cobalt composite oxide for a positive-electrode material in a lithium secondary battery, the composite oxide is represented by the composition formula (I'):

$$\text{Li}[\text{Li}_{z'/(2+z')}\{(\text{Ni}_{(1+y')/2}\text{Mn}_{(1-y')/2})_{1-x'}\text{Co}_{x'}\}_{2/(2+z')}]\text{O}_2 \quad (\text{I}')$$

where $0 \leq x' \leq 0.1$, $-0.1 \leq y' \leq 0.1$, and $(1-x')(0.05-0.98y') \leq z' \leq (1-x')(0.15-0.88y')$, in which the composite oxide has a crystal structure assigned to a layered structure, and wherein in powder X-ray diffraction measurement using CuKα radiation, $0.01 \leq \text{FWHM}(110) \leq 0.2$, where FWHM (110) represents the half-width of the (110) diffraction peak observed at a diffraction angle 2θ of about 64.5°.

20. The powder of the lithium-nickel-manganese-cobalt composite oxide for a positive-electrode material in a lithium secondary battery described in item 19 is characterized in that in the composition formula (I'), $0.04 \leq x' \leq 0.099$, $-0.03 \leq y' \leq 0.03$, and $(1-x')(0.08-0.98y') \leq z' \leq (1-x')(0.13-0.88y')$.

21. The powder of the lithium-nickel-manganese-cobalt composite oxide for a positive-electrode material in a lithium secondary battery described in item 19 or 20 is characterized in that in powder X-ray diffraction measurement using CuKα radiation, no diffraction peak from a heterophase is observed on the higher-angle side of the peak top of each of the (018) diffraction peak at a diffraction angle 2θ of about 64°, the (110) diffraction peak at a diffraction angle 2θ of about 64.5°, and the (113) diffraction peak at a diffraction angle 2θ of about 68°, or in the case where a diffraction peak from a heterophase is observed, the ratio of the integrated intensity of the diffraction peak from the heterophase to the integrated intensity of a corresponding one of the diffraction peaks from a target crystal phase is within ranges described below:

$$0 \leq I_{018*}/I_{018} \leq 0.20,$$

$$0 \leq I_{110*}/I_{110} \leq 0.25, \text{ and}$$

$$0 \leq I_{113*}/I_{113} \leq 0.30,$$

where $I_{018}$ represents the integrated intensity of the (018) diffraction peak, $I_{110}$ represents the integrated intensity of the (110) diffraction peak, $I_{113}$ represents the integrated intensity of the (113) diffraction peak, $I_{018*}$ represents the integrated intensity of the diffraction peak from the heterophase observed on the higher-angle side of the peak top of the (018) diffraction peak, $I_{110*}$ represents the integrated intensity of the diffraction peak from the heterophase observed on the higher-angle side of the peak top of the (110) diffraction peak, and $I_{113*}$ represents the integrated intensity of the diffraction peak from the heterophase observed on the higher-angle side of the peak top of the (113) diffraction peak.

22. The powder of the lithium-nickel-manganese-cobalt composite oxide for a positive-electrode material in a lithium secondary battery described in any one of items 19 to 21 is characterized in that in a mercury intrusion curve obtained by mercury intrusion porosimetry, the amount of mercury intruded is in the range of 0.7 cm$^3$/g to 1.5 cm$^3$/g when the pressure is increased from 3.86 kPa to 413 MPa.

23. The powder of the lithium-nickel-manganese-cobalt composite oxide for a positive-electrode material in a lithium secondary battery described in any one of items 19 to 22 is characterized in that a pore-size distribution curve obtained by mercury intrusion porosimetry has a main peak with a peak top that is present at a pore radius of 300 nm to 1,000 nm and does not have a sub-peak with a peak top that is present at a pore radius greater than or equal to 80 nm and less than 300 nm.

24. The powder of the lithium-nickel-manganese-cobalt composite oxide for a positive-electrode material in a lithium secondary battery described in any one of items 19 to 23 is characterized in that in a pore-size distribution curve obtained by mercury intrusion porosimetry, a main peak with a peak top that is present at a pore radius of 300 nm to 1,000 nm has a pore volume of 0.3 cm$^3$/g to 1.0 cm$^3$/g.

25. The powder of the lithium-nickel-manganese-cobalt composite oxide for a positive-electrode material in a lithium secondary battery described in any one of items 19 to 24 is characterized in that the median diameter is in the range of 1 μm to 5 μm and that the median diameter is determined from volume-based particle diameters measured with a laser diffraction/scattering particle size distribution analyzer using the refractive index set at 1.24, and the measurement is made after a five-minute ultrasonic dispersion (power: 30 W, frequency: 22.5 kHz).

26. The powder of the lithium-nickel-manganese-cobalt composite oxide for a positive-electrode material in a lithium secondary battery described in any one of items 19 to 25 is characterized in that the bulk density is in the range of 0.5 to 1.7 g/cm$^3$.

27. The powder of the lithium-nickel-manganese-cobalt composite oxide for a positive-electrode material in a lithium secondary battery described in any one of items 19 to 26 is characterized in that the BET specific surface area is in the range of 1.4 to 3 m$^2$/g.

28. The powder of the lithium-nickel-manganese-cobalt composite oxide for a positive-electrode material in a lithium secondary battery described in any one of items 19 to 27 is characterized in that the carbon content C (% by weight) is in the range of 0.005% by weight to 0.05% by weight.

29. The powder of the lithium-nickel-manganese-cobalt composite oxide for a positive-electrode material in a lithium secondary battery described in any one of items 19 to 28 is characterized in that the volume resistivity of the powder that is compacted at a pressure of 40 MPa is in the range of $1\times10^3$ Ω·cm to $1\times10^6$ Ω·cm.

30. A method for producing the powder of the lithium-nickel-manganese-cobalt composite oxide for a positive-electrode material in a lithium secondary battery described in any one of items 19 to 29 includes a slurry preparation step of pulverizing a lithium compound, a nickel compound, a manganese compound, and a cobalt compound in a liquid medium to form a slurry containing these compounds uniformly dispersed, a spray-drying step of spray-drying the resulting slurry to form a spray-dried product, and a firing step of firing the spray-dried product in an oxygen-containing gas atmosphere at a temperature T (° C.) of 940° C.≦T≦1,200° C.

31. The method described in item 30 for producing the powder of the lithium-nickel-manganese-cobalt composite oxide for a positive-electrode material in a lithium secondary battery is characterized in that the lithium compound is lithium carbonate.

32. The method described in item 30 or 31 for producing the powder of the lithium-nickel-manganese-cobalt composite oxide for a positive-electrode material in a lithium secondary battery is characterized in that in the slurry preparation step, the lithium compound, the nickel compound, the manganese compound, and the cobalt compound are pulverized in the liquid medium in such a manner that the median diameter is in the range of 0.3 μm or less and is determined from volume-based particle diameters measured with a laser diffraction/scattering particle size distribution analyzer using the refractive index set at 1.24, and the measurement is made after a five-minute ultrasonic dispersion (power: 30 W, frequency: 22.5 kHz), and in which in the spray-drying step, spray drying is performed under the conditions of 50 cp≦V≦4,000 cp and 1,500≦G/S≦5,000, where V represents the viscosity (cp) of the slurry during the spray drying, (L/min) represents the amount of slurry fed, and G represents the amount of gas fed (L/min).

33. A spray-dried powder of a lithium-nickel-manganese-cobalt composite oxide prepared by pulverizing a lithium compound, a nickel compound, a manganese compound, and a cobalt compound in a liquid medium to form a slurry containing these compounds uniformly dispersed and spray-drying the resulting slurry, and the spray-dried powder serving as a precursor for a powder of a lithium-nickel-manganese-cobalt composite oxide for a positive-electrode material in a lithium secondary battery is characterized in that the median diameter of the spray-dried powder is in the range of 0.01 μm to 4 μm and is determined from volume-based particle diameters measured with a laser diffraction/scattering particle size distribution analyzer using the refractive index set at 1.24, and the measurement is made after a five-minute ultrasonic dispersion (power: 30 W, frequency: 22.5 kHz).

34. The spray-dried powder described in item 33 is characterized in that the BET specific surface area is in the range of 10 to 100 m$^2$/g.

35. A positive electrode for a lithium secondary battery includes a positive-electrode active-material layer on a current collector, the layer including the powder of the lithium-nickel-manganese-cobalt composite oxide for a positive-electrode material in a lithium secondary battery described in any one of items 19 to 29 and a binder.

36. A lithium secondary battery includes a negative electrode capable of intercalating and deintercalating lithium, a non-aqueous electrolyte containing a lithium salt, and a positive electrode capable of intercalating and deintercalating lithium, in which the positive electrode is the positive electrode for a lithium secondary battery according to item 35.

37. The lithium secondary battery described in item 36 is characterized in that the battery is designed in such a manner that the charging potential of the positive electrode is 4.35 V or more (vs. Li/Li+) in a fully charged state.

38. A powder of a lithium transition-metal compound for a positive-electrode material in a lithium secondary battery, includes a lithium transition-metal compound, as a main component, capable of intercalating and deintercalating lithium ions, in which the powder is prepared by incorporating at least one additive that inhibits grain growth and sintering during firing in the main component in an amount greater than or equal to 0.01 mol % and less than 2 mol % with respect to the total molar amount of the transition-metal elements in the main component and then performing firing.

39. The powder of the lithium transition-metal compound for a positive-electrode material in a lithium secondary battery described in item 38 is characterized in that the additive is an oxide that contains at least one element (hereinafter, referred to as an "additive element") selected from Mo, W, Nb, Ta, and Re.

40. The powder of the lithium transition-metal compound for a positive-electrode material in a lithium secondary battery described in item 38 or 39 is characterized in that the atomic ratio of the total amount of the additive element to the total amount of metal elements except Li and the additive element on surfaces of primary particles is five or more times the atomic ratio of the total amount of the additive element to the total amount of the metal elements except Li and the additive element in the entire particles.

41. The powder of the lithium transition-metal compound for a positive-electrode material in a lithium secondary battery described in any one of items 38 to 40 is characterized in that the median diameter is in the range from 0.1 μm to 3 μm and is determined from volume-based particle diameters measured with a laser diffraction/scattering particle size distribution analyzer using the refractive index set at 1.24, and the measurement is made after a five-minute ultrasonic dispersion (power: 30 W, frequency: 22.5 kHz).

42. The powder of the lithium transition-metal compound for a positive-electrode material in a lithium secondary battery described in any one of items 38 to 41 is characterized in that the primary particles have an average diameter of 0.1 μm to 0.9 μm.

43. The powder of the lithium transition-metal compound for a positive-electrode material in a lithium secondary battery described in any one of items 38 to 42 is characterized in that the BET specific surface area is in the range of 1.5 m$^2$/g to 5 m$^2$/g.

44. The powder of the lithium transition-metal compound for a positive-electrode material in a lithium secondary battery described in any one of items 38 to 43 is characterized in that in a mercury intrusion curve obtained by mercury intrusion porosimetry, the amount of mercury intruded is in the range of 0.7 cm$^3$/g to 1.5 cm$^3$/g when the pressure is increased from 3.86 kPa to 413 MPa.

45. The powder of the lithium transition-metal compound for a positive-electrode material in a lithium secondary battery described in any one of items 38 to 44 is characterized in that a pore-size distribution curve obtained by mercury intrusion porosimetry has at least one main peak with a peak top that is present at a pore radius of 300 nm to 1,000 nm and does not have a sub-peak with a peak top that is present at a pore radius greater than or equal to 80 nm and less than 300 nm.

46. The powder of the lithium transition-metal compound for a positive-electrode material in a lithium secondary battery described in any one of items 38 to 45 is characterized in that in a pore-size distribution curve obtained by mercury intrusion porosimetry, a peak with a peak top that is present at a pore radius of 300 nm to 1,000 nm has a pore volume of 0.4 cm$^3$/g to 1 cm$^3$/g.

47. The powder of the lithium transition-metal compound for a positive-electrode material in a lithium secondary battery according to any one of items 38 to 46 is characterized in that the bulk density is in the range of 0.5 g/cm$^3$ to 1.7 g/cm$^3$.

48. The powder of the lithium transition-metal compound for a positive-electrode material in a lithium secondary battery described in any one of items 38 to 47 is characterized in that the volume resistivity of the powder that is compacted at a pressure of 40 MPa is in the range of $1 \times 10^3$ Ω·cm to $1 \times 10^6$ Ω·cm.

49. The powder of the lithium transition-metal compound for a positive-electrode material in a lithium secondary battery described in any one of items 38 to 48 is characterized in that the powder mainly comprises a lithium-nickel-manganese-cobalt composite oxide having a crystal structure assigned to a layered structure.

50. In the powder of the lithium transition-metal compound for a positive-electrode material in a lithium secondary battery according to item 49, the compound is represented by the composition formula (I"):

$$LiMO_2 \qquad (I'')$$

where M represents Li, Ni, and Mn, or M represents Li, Ni, Mn, and Co, the Mn/Ni molar ratio is in the range of 0.8 to 5, the Co/(Mn+Ni+Co) molar ratio is in the range of 0 to 0.30, and the ratio of Li to M is in the range of 0.001 to 0.2.

51. The powder of the lithium transition-metal compound for a positive-electrode material in a lithium secondary battery described in item 49 or 50 is characterized in that the powder is prepared by firing at 970° C. or higher in an oxygen-containing gas atmosphere.

52. The powder of the lithium transition-metal compound for a positive-electrode material in a lithium secondary battery described in any one of items 49 to 51 is characterized in that the carbon content C (% by weight) is in the range of 0.005% by weight to 0.05% by weight.

53. The powder of the lithium transition-metal compound for a positive-electrode material in a lithium secondary battery described in any one of items 50 to 52 is characterized in that M in the composition formula (I") is represented by the formula (II'):

$$M=Li_{z''/(2+z'')}\{(Ni_{(1+y'')/2}Mn_{(1-y'')/2})_{1-x''}Co_{x''}\}_{2/(2+z'')} \qquad (II'')$$

where $0 \leq x'' \leq 0.1$, $-0.1 \leq y'' \leq 0.1$, and $(1-x'')(0.05-0.98y'') \leq z'' \leq (1-x'')(0.20-0.88y'')$.

55. The powder of the lithium transition-metal compound for a positive-electrode material in a lithium secondary battery described in item 53 is characterized in that in powder X-ray diffraction measurement using CuKα radiation, $0.01 \leq FWHM(110) \leq 0.2$, where FWHM (110) represents the half-width of the (110) diffraction peak observed at a diffraction angle 2θ of about 64.5°.

55. The powder of the lithium transition-metal compound for a positive-electrode material in a lithium secondary battery described in item or 54 is characterized in that in powder X-ray diffraction measurement using CuKα radiation, no diffraction peak from a heterophase is observed on the higher-angle side of the peak top of each of the (018) diffraction peak at a diffraction angle 2θ of about 64°, the (110) diffraction peak at a diffraction angle 2θ of about 64.5°, and the (113) diffraction peak at a diffraction angle 2θ of about 68°, or in the case where a diffraction peak from a heterophase is observed, the ratio of the integrated intensity of the diffraction peak from the heterophase to the integrated intensity of a corresponding one of the diffraction peaks from a target crystal phase is within ranges described below:

$$0 \leq I_{018*}/I_{018} \leq 0.20,$$

$$0 \leq I_{110*}/I_{110} \leq 0.25, \text{ and}$$

$$0 \leq I_{113*}/I_{113} \leq 0.30,$$

where $I_{018}$ represents the integrated intensity of the (018) diffraction peak, $I_{110}$ represents the integrated intensity of the (110) diffraction peak, $I_{113}$ represents the integrated intensity of the (113) diffraction peak, $I_{018*}$ represents the integrated intensity of the diffraction peak from the heterophase observed on the higher-angle side of the peak top of the (018) diffraction peak, $I_{110*}$ represents the integrated intensity of the diffraction peak from the heterophase observed on the higher-angle side of the peak top of the (110) diffraction peak, and $I_{113*}$ represents the integrated intensity of the diffraction peak from the heterophase observed on the higher-angle side of the peak top of the (113) diffraction peak.

56. A method for producing the powder of the lithium transition-metal compound for a positive-electrode material in a lithium secondary battery described in any one of items 38 to 55 includes a slurry preparation step of pulverizing a lithium compound, a compound of at least one transition metal selected from V, Cr, Mn, Fe, Co, Ni, and Cu, and an additive that inhibits grain growth and sintering during firing in an liquid medium to form a slurry containing these compounds uniformly dispersed, a spray-drying step of spray-drying the resulting slurry to form a spray-dried powder, and a firing step of firing the spray-dried powder.

57. The method for producing the powder of the lithium transition-metal compound for a positive-electrode material in a lithium secondary battery described in item 56 is characterized in that in the slurry preparation step, the lithium compound, the transition-metal compound, and the additive are pulverized in the liquid medium in such a manner that the median diameter is in the range of 0.4 μm or less and is determined from volume-based particle diameters measured with a laser diffraction/scattering particle size distribution analyzer using the refractive index set at 1.24, and the measurement is made after a five-minute ultrasonic dispersion (power: 30 W, frequency: 22.5 kHz), and in which in the spray-drying step, spray drying is performed under the conditions of $50 \, cp \leq V \leq 4{,}000 \, cp$ and $1{,}500 \leq G/S \leq 5{,}000$, where V represents the viscosity (cp) of the slurry during the spray drying, S represents the amount of slurry fed (L/min), and G represents the amount of gas fed (L/min).

58. The method for producing the powder of the lithium transition-metal compound for a positive-electrode material in a lithium secondary battery described in item 56 or 57 is characterized in that the spray-dried powder contains at least a nickel compound, a manganese compound, and a cobalt compound as the transition-metal compound and is fired at a temperature of 970° C. or higher in an oxygen-containing gas atmosphere in the firing step.

59. The method for producing the powder of the lithium transition-metal compound for a positive-electrode material in a lithium secondary battery described in any one of items 56 to 58 is characterized in that the lithium compound is lithium carbonate.

60. A spray-dried product prepared by pulverizing a lithium compound, a compound of at least one transition metal selected from V, Cr, Mn, Fe, Co, Ni, and Cu, and an additive that inhibits grain growth and sintering during firing in an liquid medium to form a slurry containing these compounds uniformly dispersed and spray-drying the resulting slurry, and the spray-dried product serving as a precursor for a powder of a lithium transition-metal compound for a positive-electrode material in a lithium secondary battery is characterized in that the median diameter of the spray-dried product is in the range of 0.01 μm to 4 μm and is determined from volume-based particle diameters measured with a laser diffraction/scattering particle size distribution analyzer using the refractive index set at 1.24, and the measurement is made after a five-minute ultrasonic dispersion (power: 30 W, frequency: 22.5 kHz).

61. The spray-dried product described in item 60 is characterized in that the BET specific surface area is in the range of 10 m²/g to 100 m²/g.

62. A positive electrode for a lithium secondary battery includes a positive-electrode active-material layer on a current collector, the layer including the powder of the lithium transition-metal compound for a positive-electrode material in a lithium secondary battery described in any one of items 38 to 55 and a binder.

63. A lithium secondary battery includes a negative electrode capable of intercalating and deintercalating lithium, a non-aqueous electrolyte containing a lithium salt, and a positive electrode capable of intercalating and deintercalating lithium, in which the positive electrode is the positive electrode for a lithium secondary battery described in item 62.

When a lithium transition-metal compound for a positive-electrode material in a lithium secondary battery is used as a positive-electrode material in a lithium secondary battery, a good balance among a reduction in cost, a higher level of safety, and improvement of load characteristics is achieved. Thus, the present invention provides a lithium secondary battery that is inexpensive and very safe and has excellent performance even when a high charging voltage is used.

DETAILED DESCRIPTION OF THE INVENTION

Figure 1:
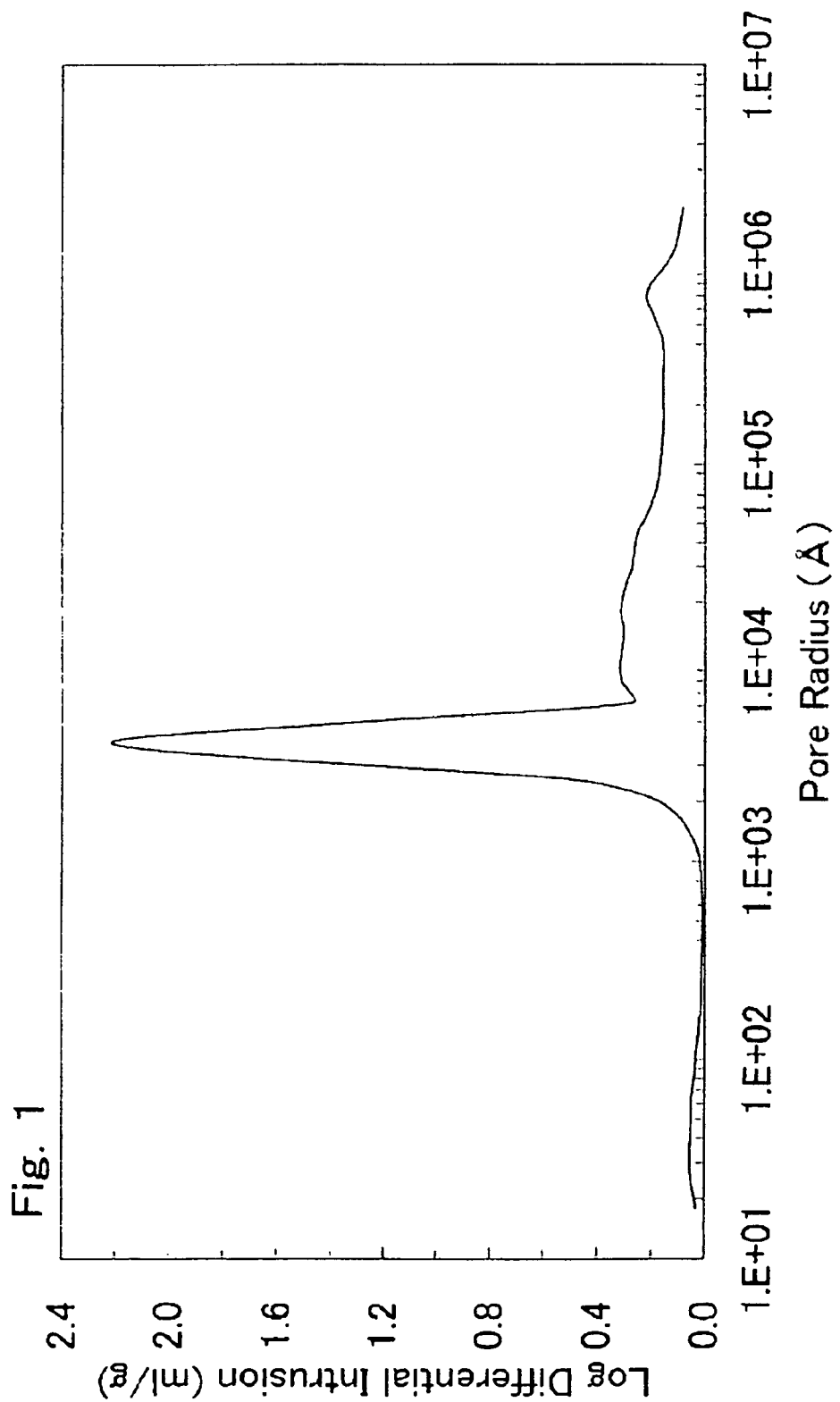
FIG. 1 is a graph showing a pore-size distribution curve of a lithium-nickel-manganese composite-oxide powder prepared in EXAMPLE 1.
Figure 2:
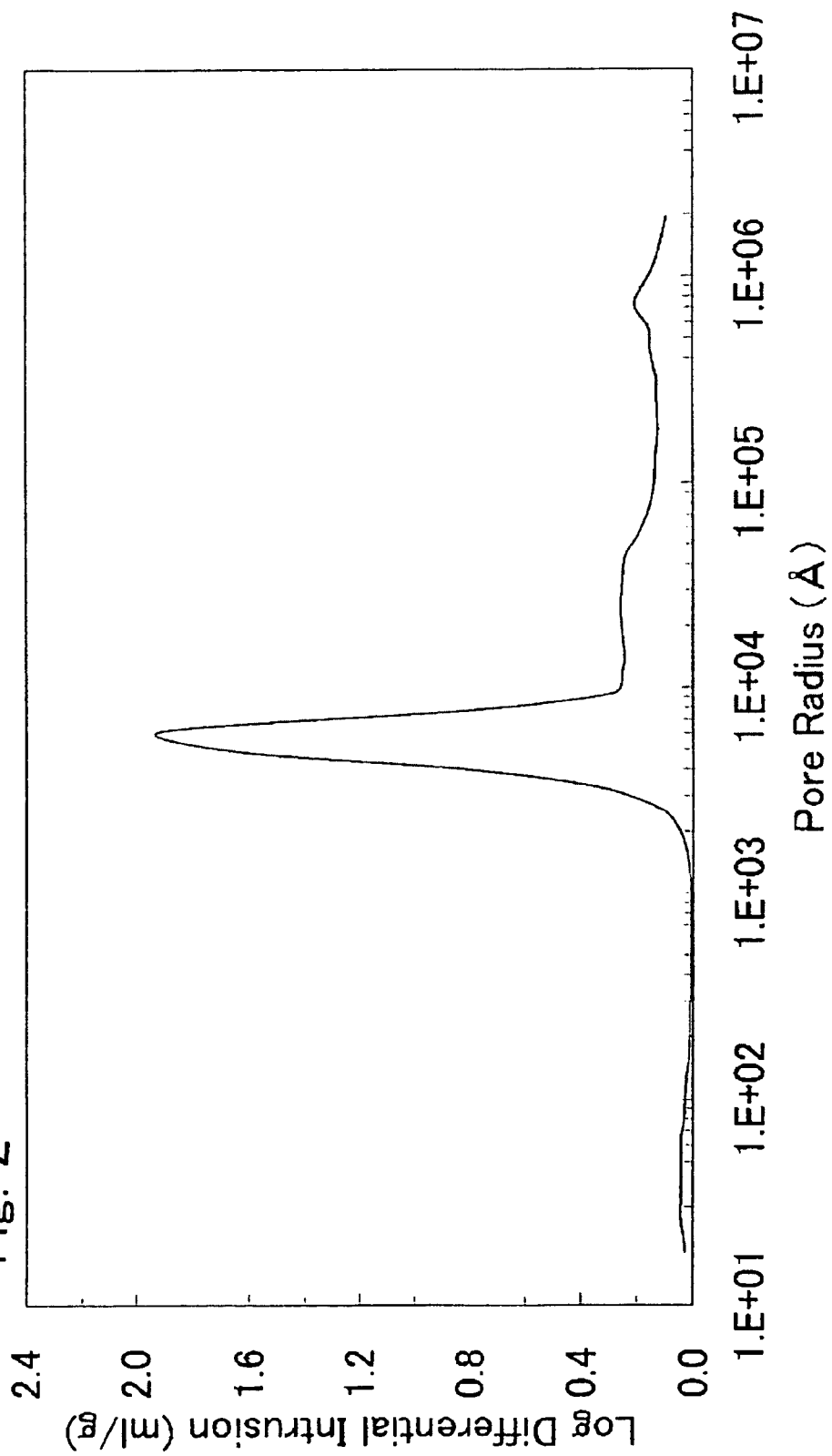
FIG. 2 is a graph showing a pore-size distribution curve of a lithium-nickel-manganese composite-oxide powder prepared in EXAMPLE 2.
Figure 3:
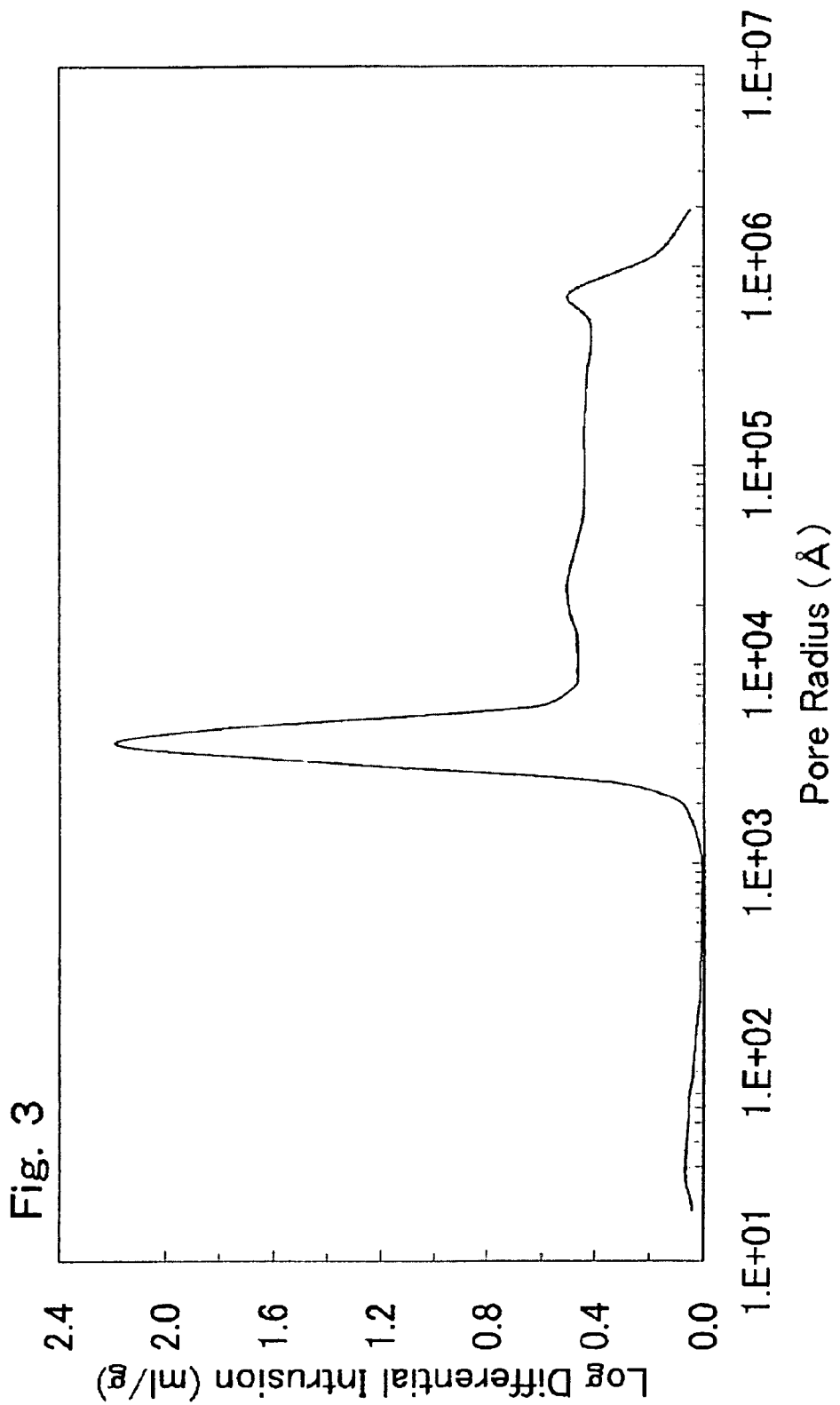
FIG. 3 is a graph showing a pore-size distribution curve of a lithium-nickel-manganese composite-oxide powder prepared in EXAMPLE 3.
Figure 4:
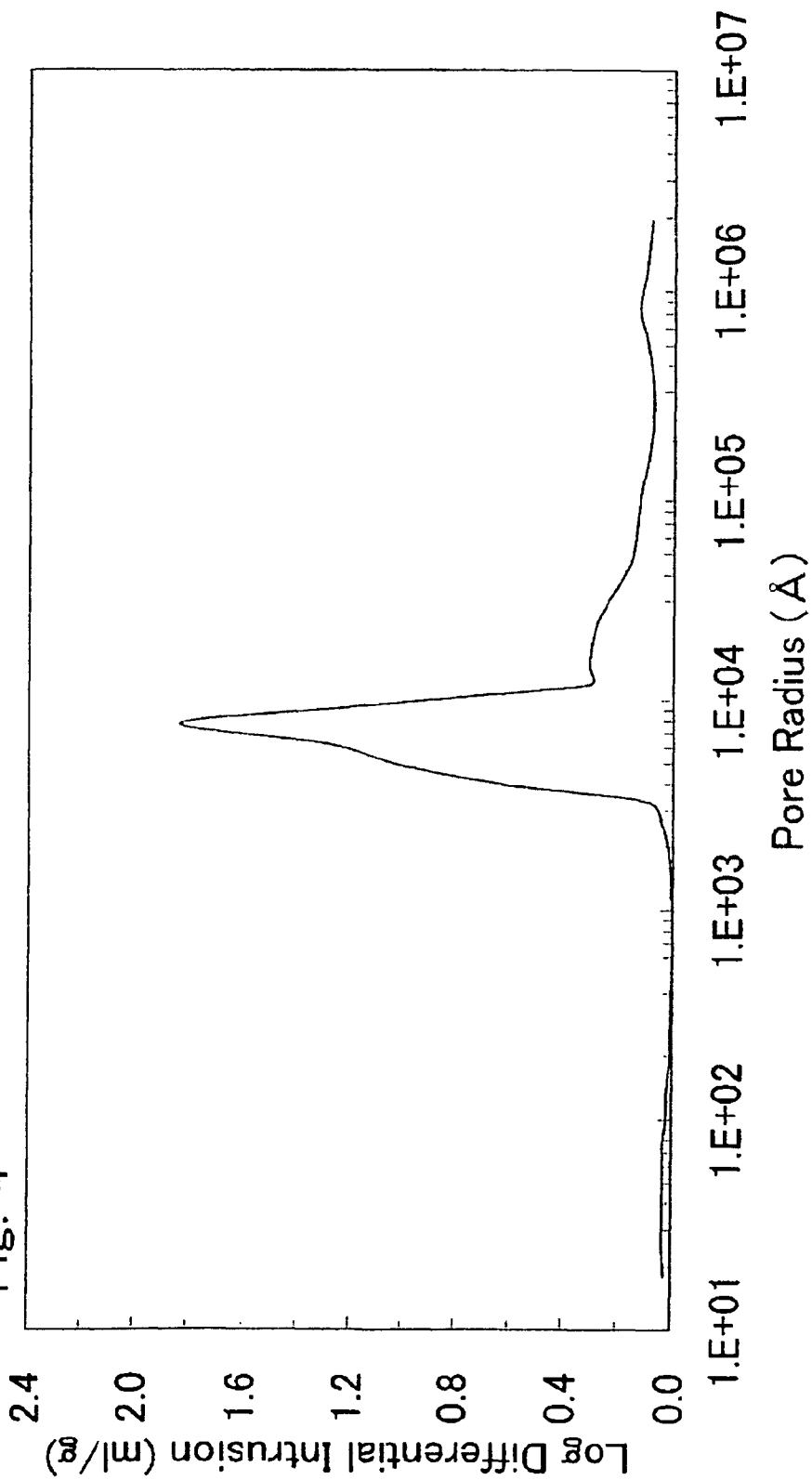
FIG. 4 is a graph showing a pore-size distribution curve of a lithium-nickel-manganese composite-oxide powder prepared in EXAMPLE 4.
Figure 5:
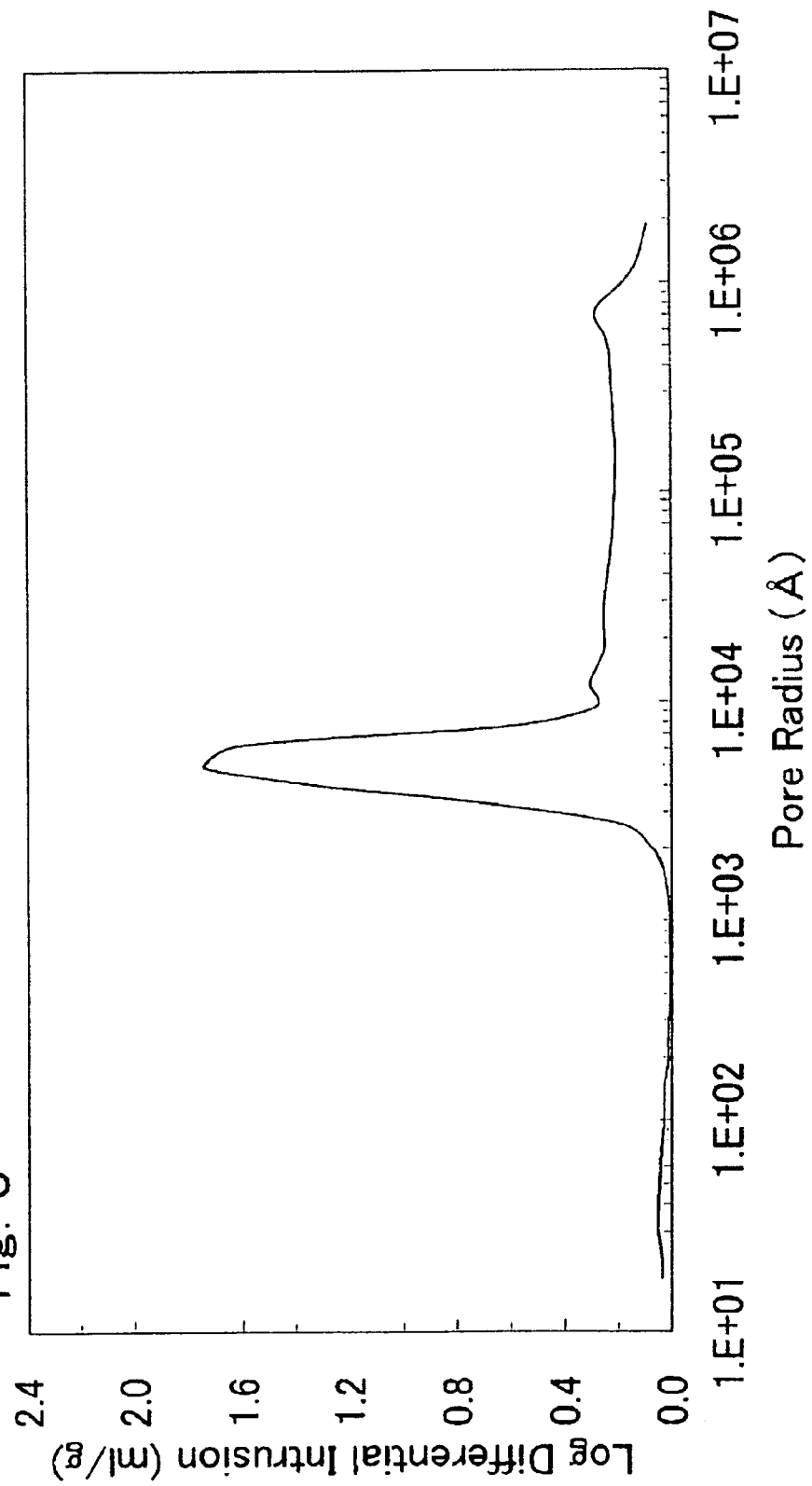
FIG. 5 is a graph showing a pore-size distribution curve of a lithium-nickel-manganese-cobalt composite-oxide powder prepared in EXAMPLE 5.
Figure 6:
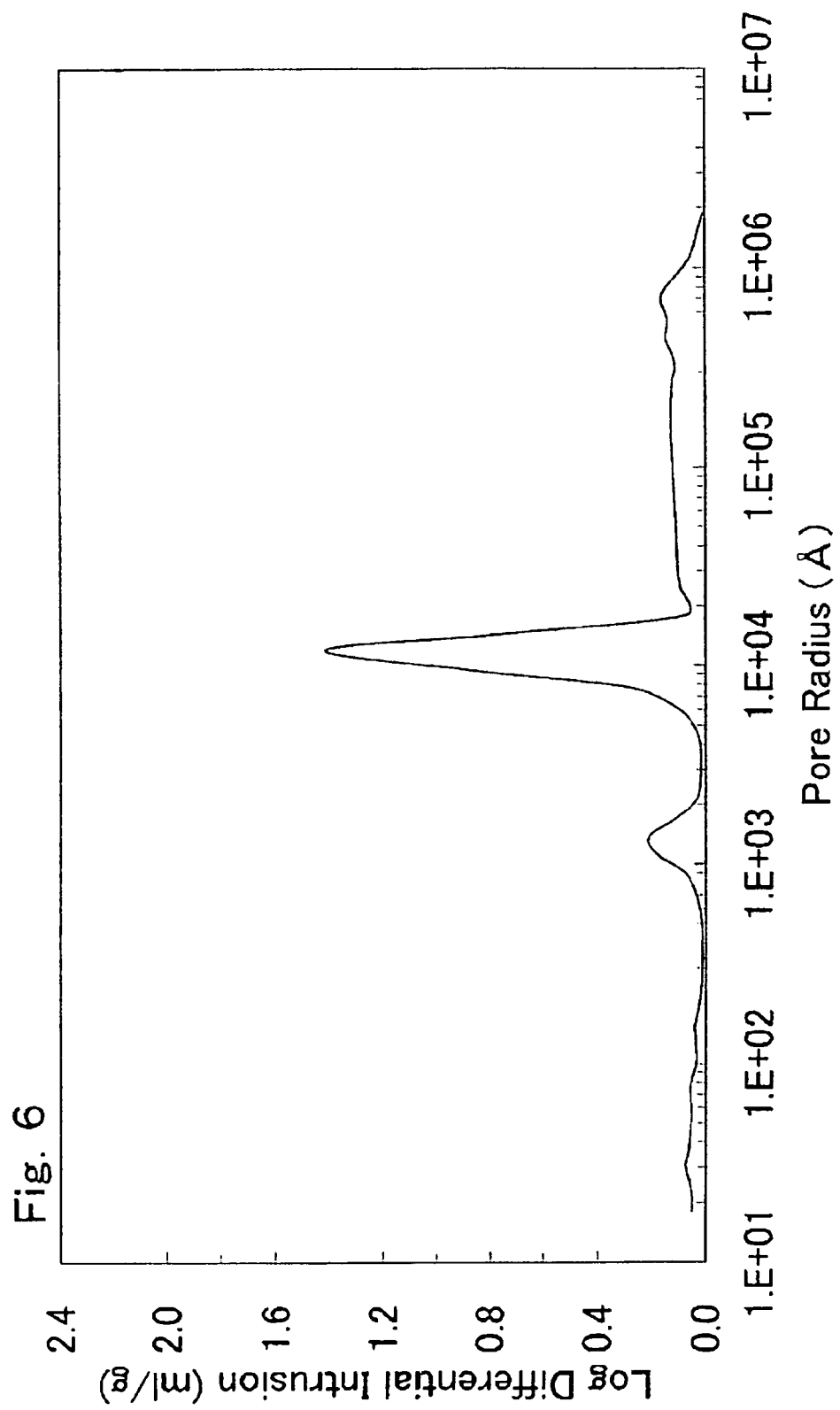
FIG. 6 is a graph showing a pore-size distribution curve of a lithium-nickel-manganese composite-oxide powder prepared in COMPARATIVE EXAMPLE 1.
Figure 7:
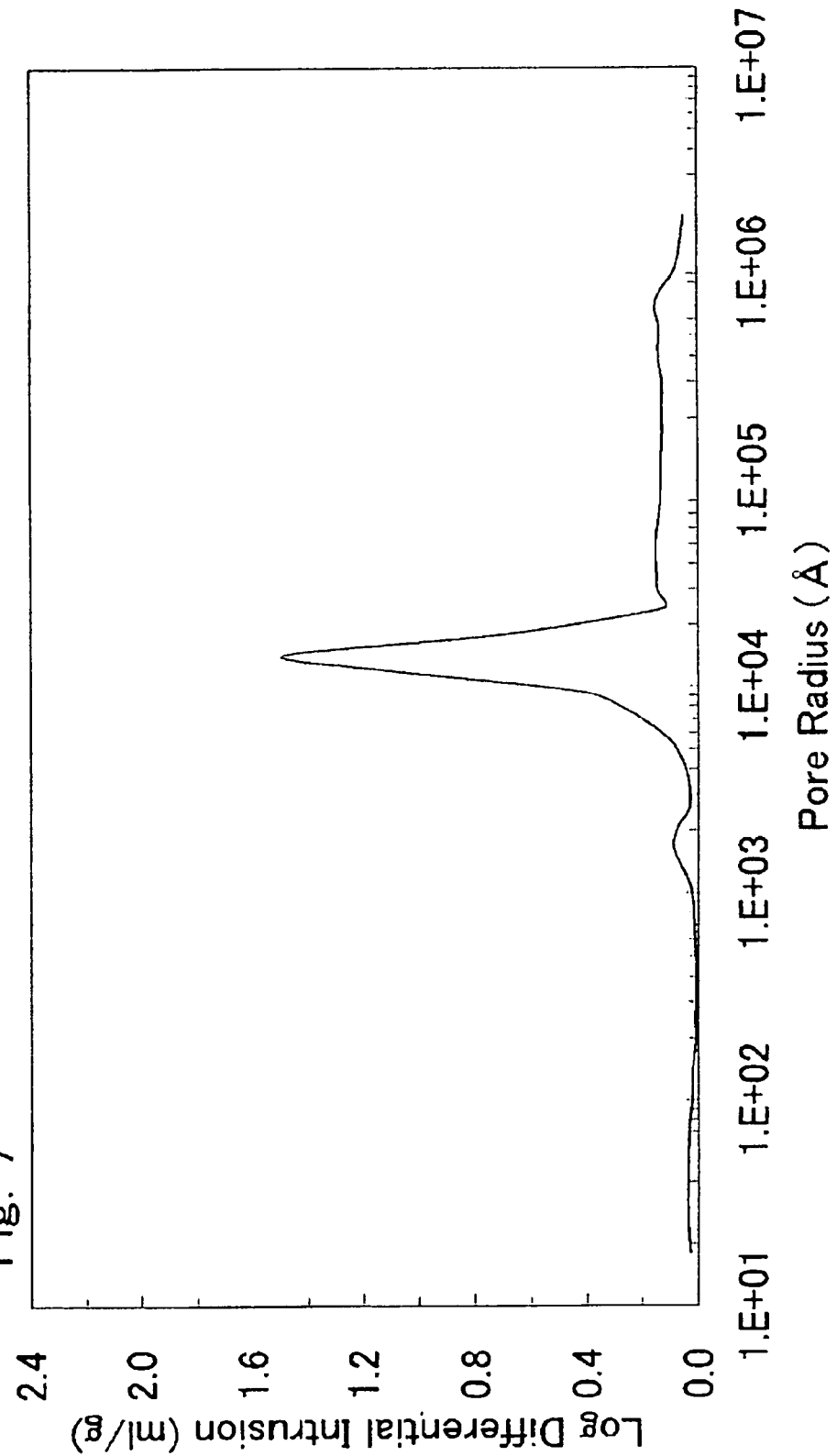
FIG. 7 is a graph showing a pore-size distribution curve of a lithium-nickel-manganese composite-oxide powder prepared in COMPARATIVE EXAMPLE 2.
Figure 8:
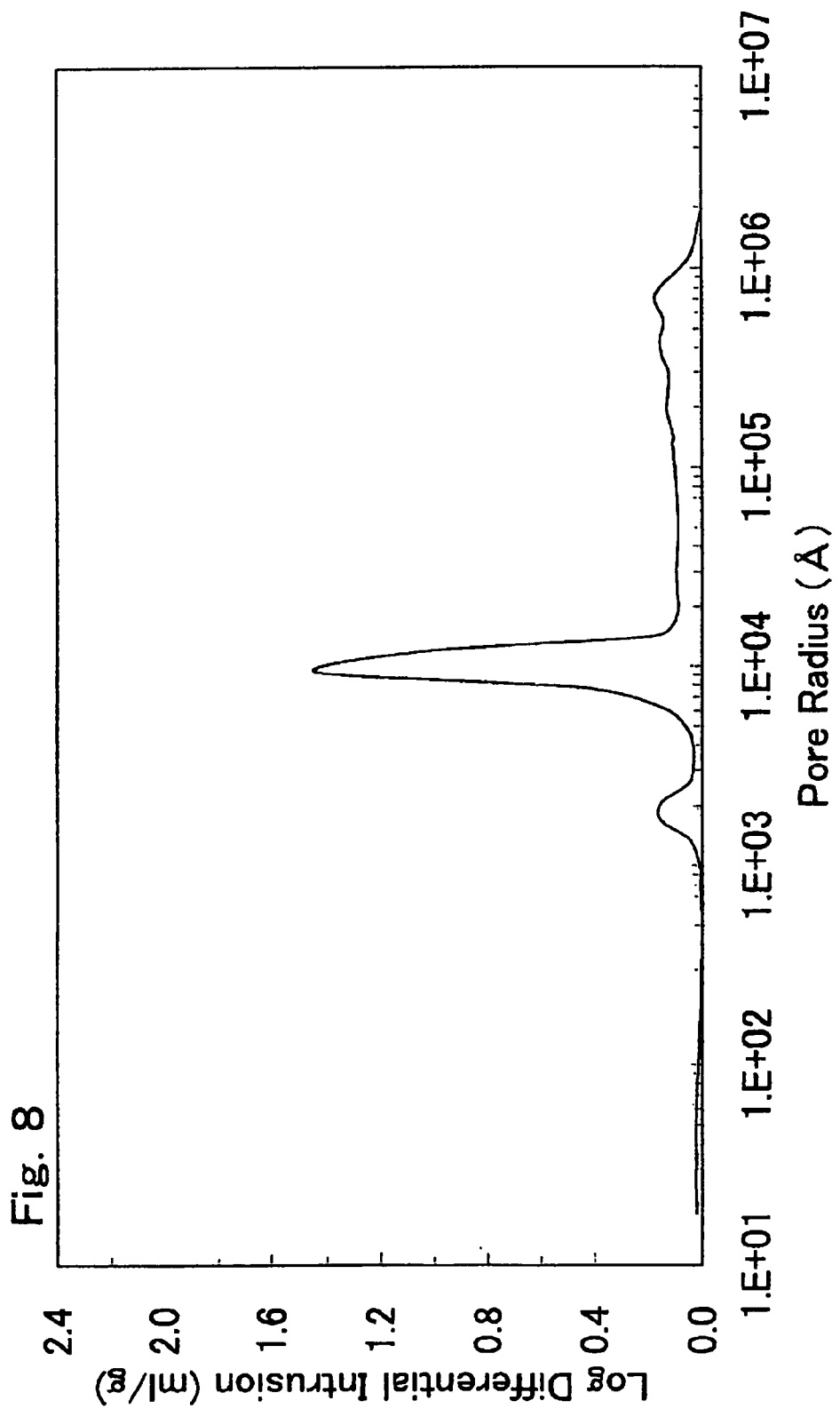
FIG. 8 is a graph showing a pore-size distribution curve of a lithium-nickel-manganese composite-oxide powder prepared in COMPARATIVE EXAMPLE 3.
Figure 9:
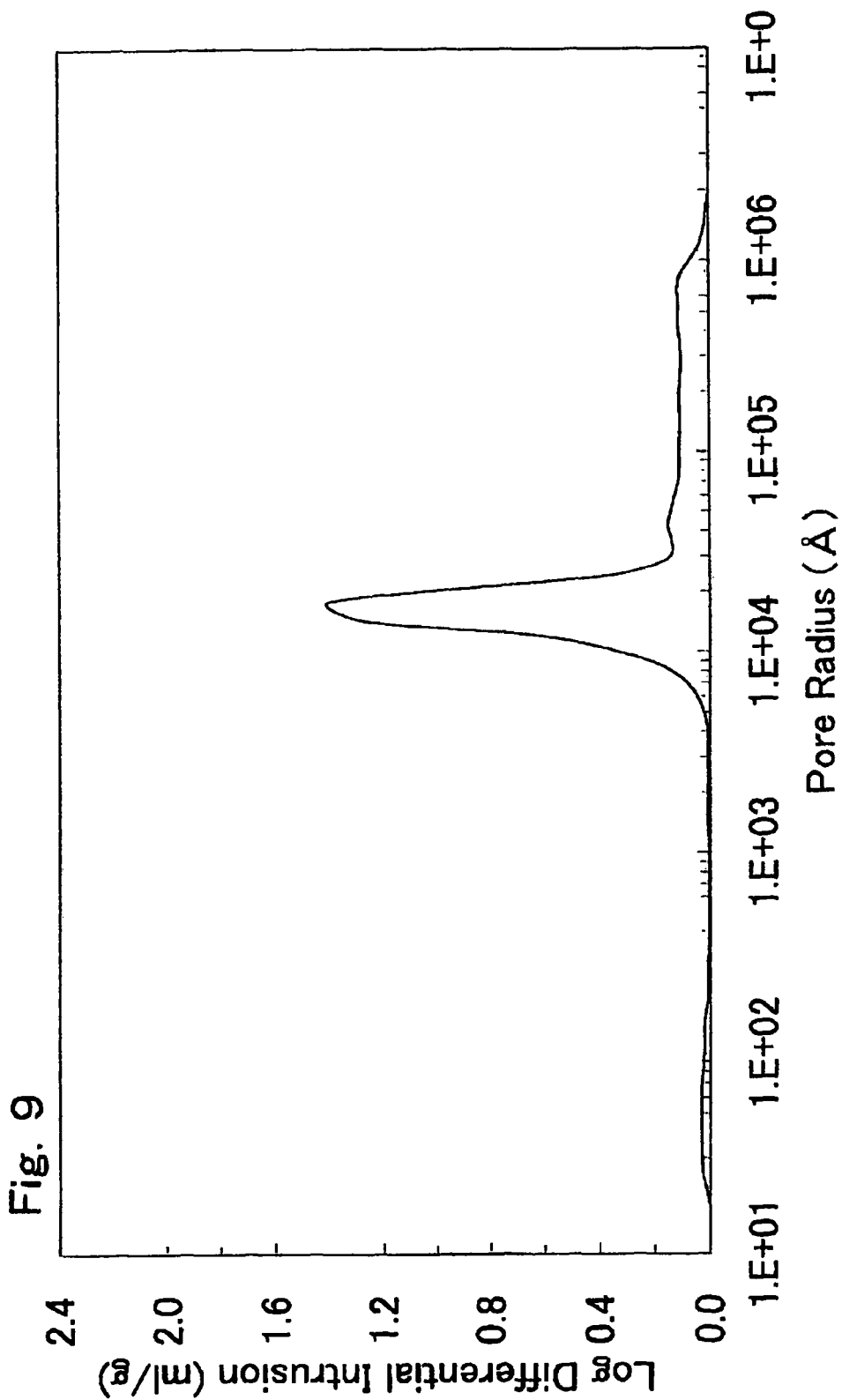
FIG. 9 is a graph showing a pore-size distribution curve of a lithium-nickel-manganese composite-oxide powder prepared in COMPARATIVE EXAMPLE 4.
Figure 10:
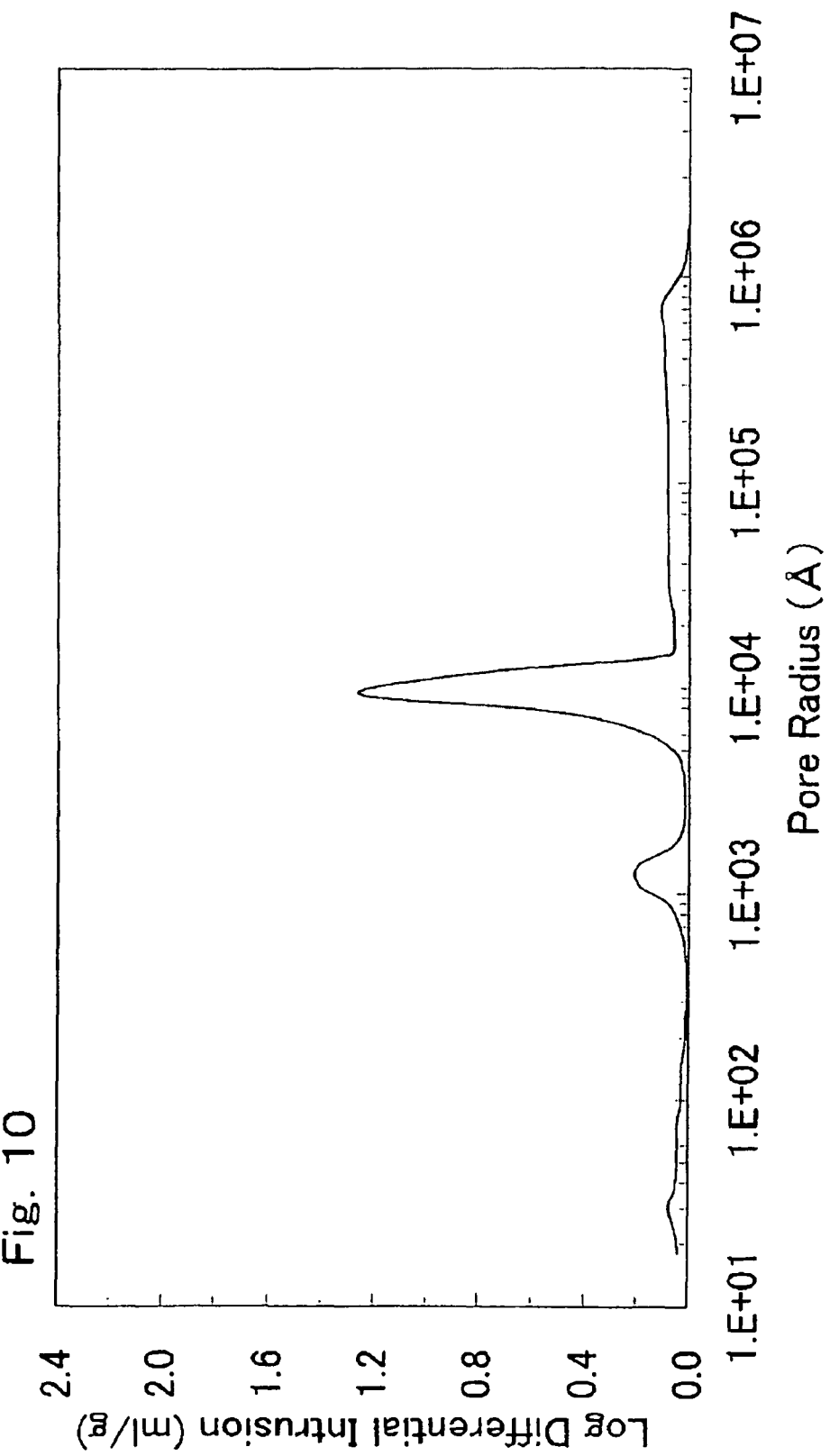
FIG. 10 is a graph showing a pore-size distribution curve of a lithium-nickel-manganese-cobalt composite-oxide powder prepared in COMPARATIVE EXAMPLE 5.
Figure 11:
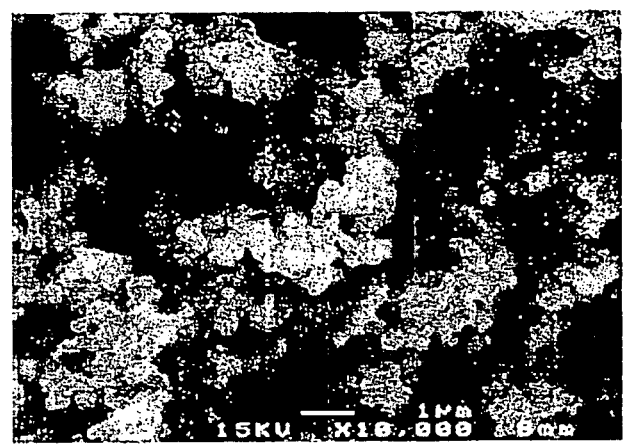
FIG. 11 is a SEM image (photograph) (×10,000) of a lithium-nickel-manganese composite oxide prepared in EXAMPLE 1.
Figure 12:
FIG. 12 is a SEM image (photograph) (×10,000) of a lithium-nickel-manganese composite oxide prepared in EXAMPLE 2.
Figure 13:
FIG. 13 is a SEM image (photograph) (×10,000) of a lithium-nickel-manganese composite oxide prepared in EXAMPLE 3.
Figure 14:
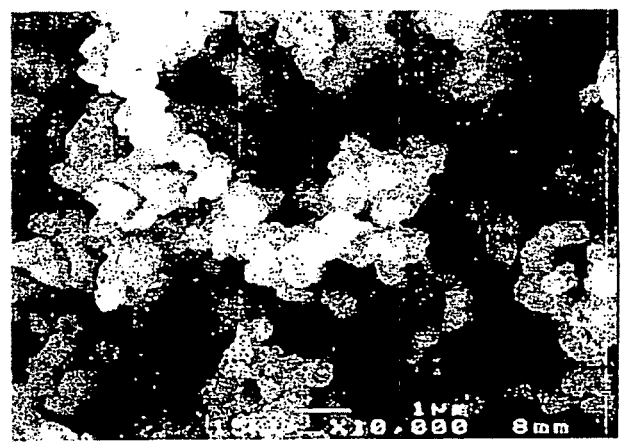
FIG. 14 is a SEM image (photograph) (×10,000) of a lithium-nickel-manganese composite oxide prepared in EXAMPLE 4.
Figure 15:
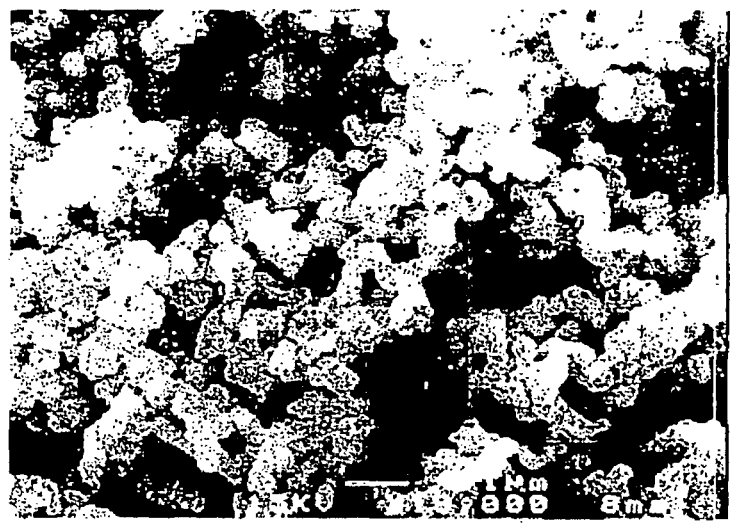
FIG. 15 is a SEM image (photograph) (×10,000) of a lithium-nickel-manganese-cobalt composite oxide prepared in EXAMPLE 5.
Figure 16:
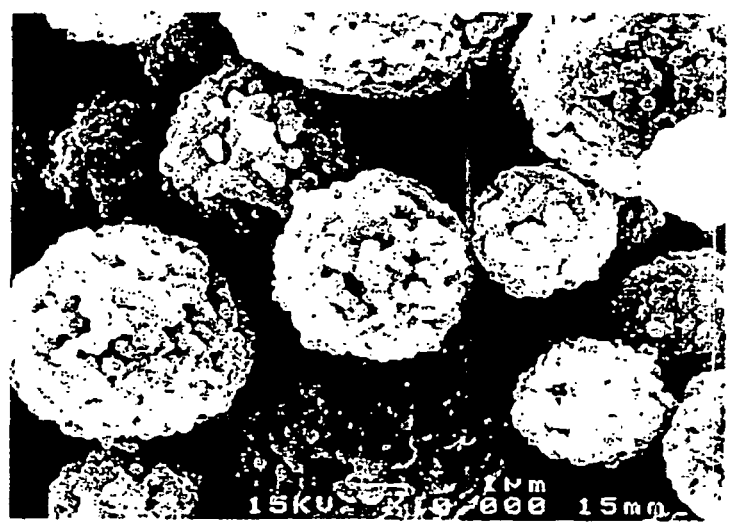
FIG. 16 is a SEM image (photograph) (×10,000) of a lithium-nickel-manganese composite oxide prepared in COMPARATIVE EXAMPLE 1.
Figure 17:
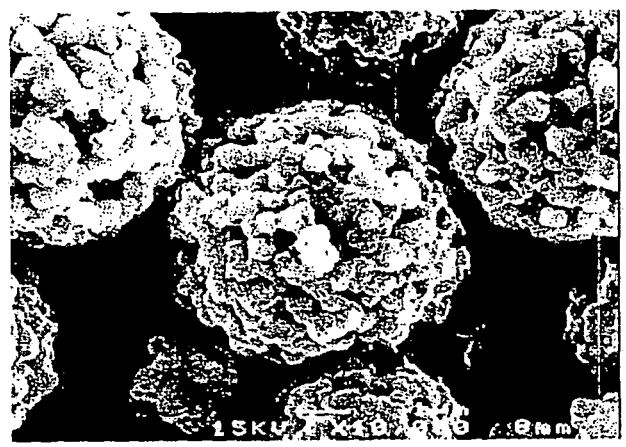
FIG. 17 is a SEM image (photograph) (×10,000) of a lithium-nickel-manganese composite oxide prepared in COMPARATIVE EXAMPLE 2.
Figure 18:
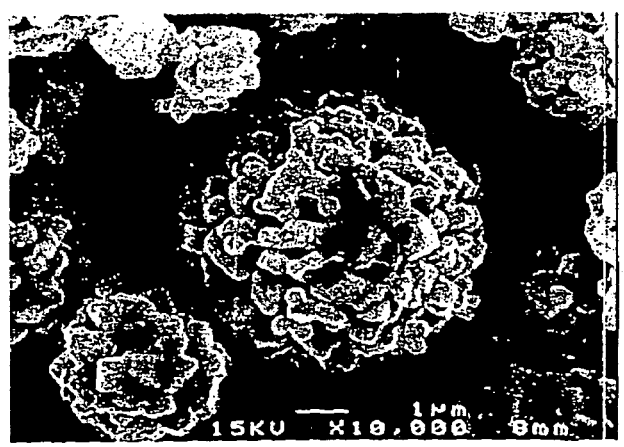
FIG. 18 is a SEM image (photograph) (×10,000) of a lithium-nickel-manganese composite oxide prepared in COMPARATIVE EXAMPLE 3.
Figure 19:
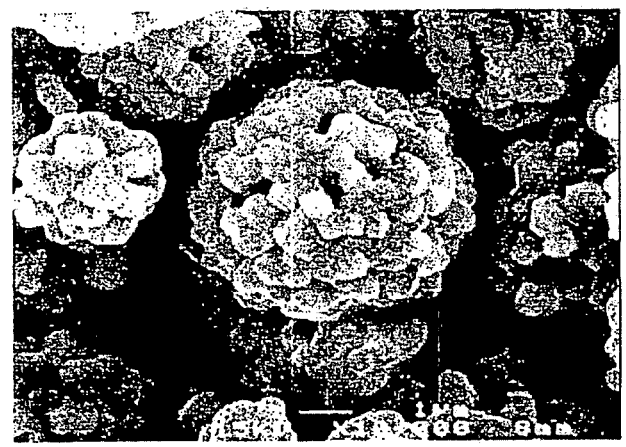
FIG. 19 is a SEM image (photograph) (×10,000) of a lithium-nickel-manganese composite oxide prepared in COMPARATIVE EXAMPLE 4.
Figure 20:
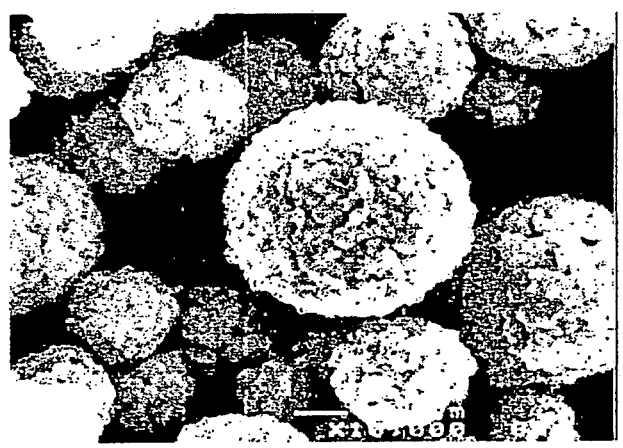
FIG. 20 is a SEM image (photograph) (×10,000) of a lithium-nickel-manganese-cobalt composite oxide prepared in COMPARATIVE EXAMPLE 5.
Figure 21:
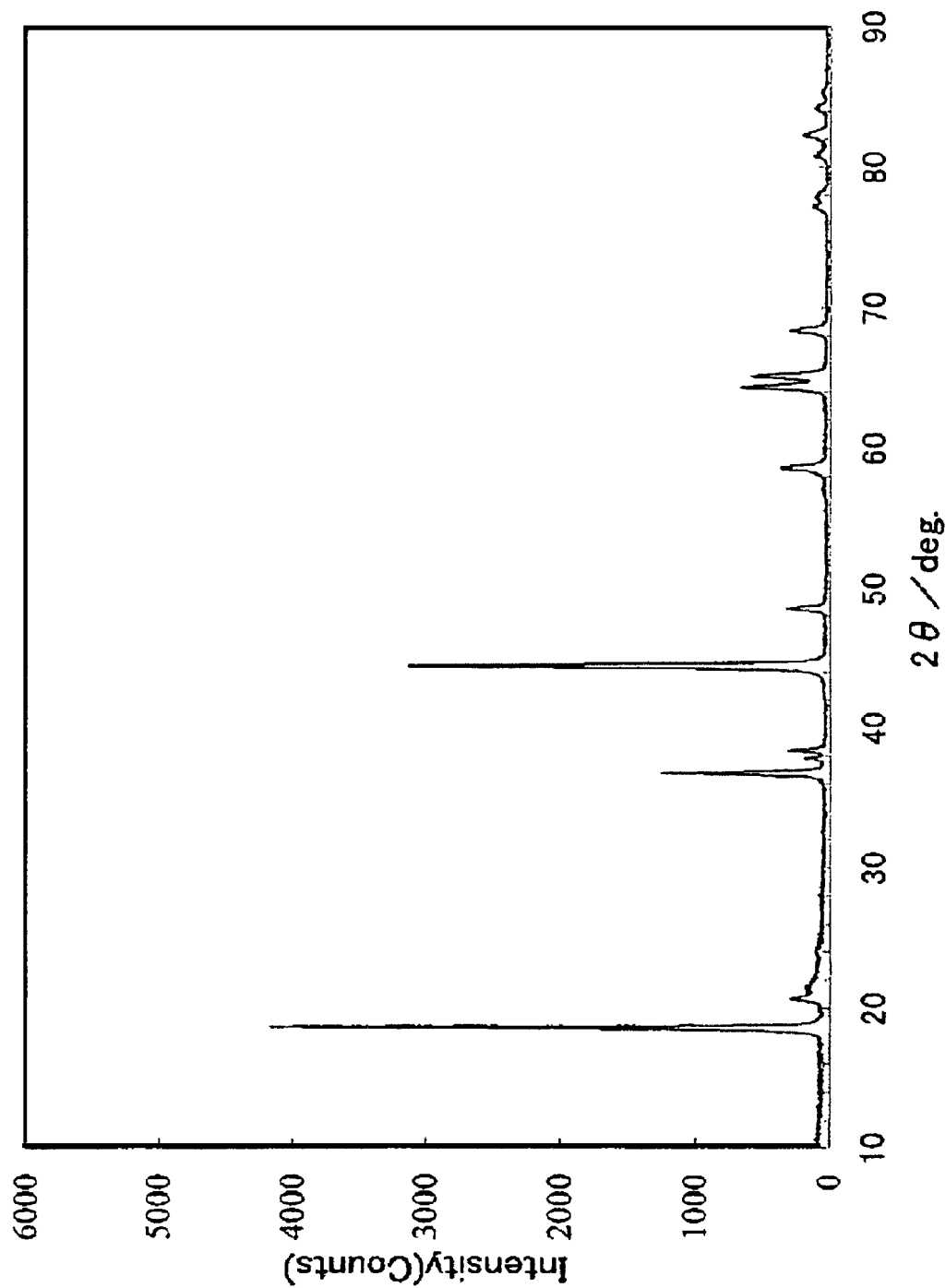
FIG. 21 is an XRD pattern of a lithium-nickel-manganese composite oxide prepared in EXAMPLE 1.
Figure 22:
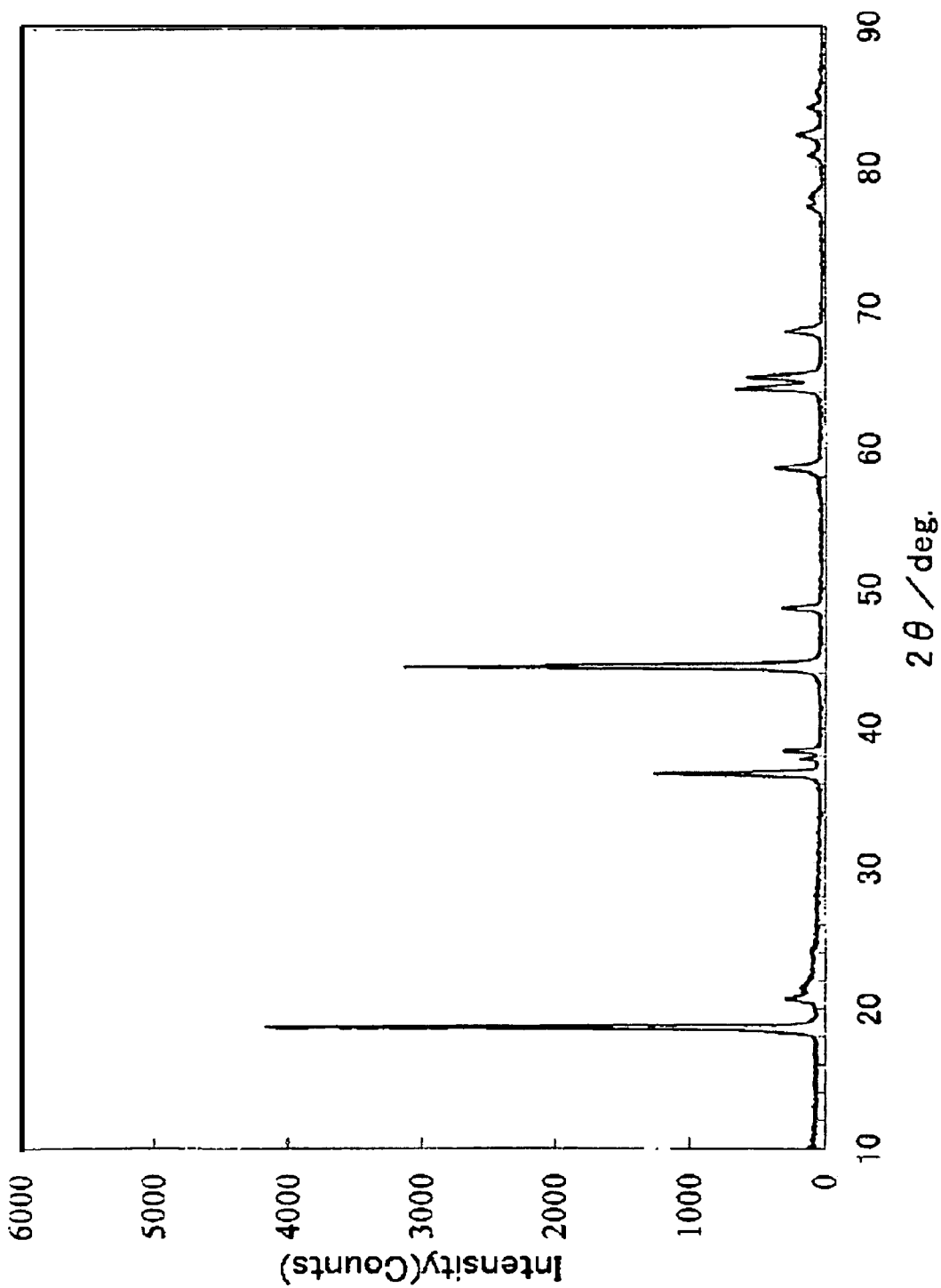
FIG. 22 is an XRD pattern of a lithium-nickel-manganese composite oxide prepared in EXAMPLE 2.
Figure 23:
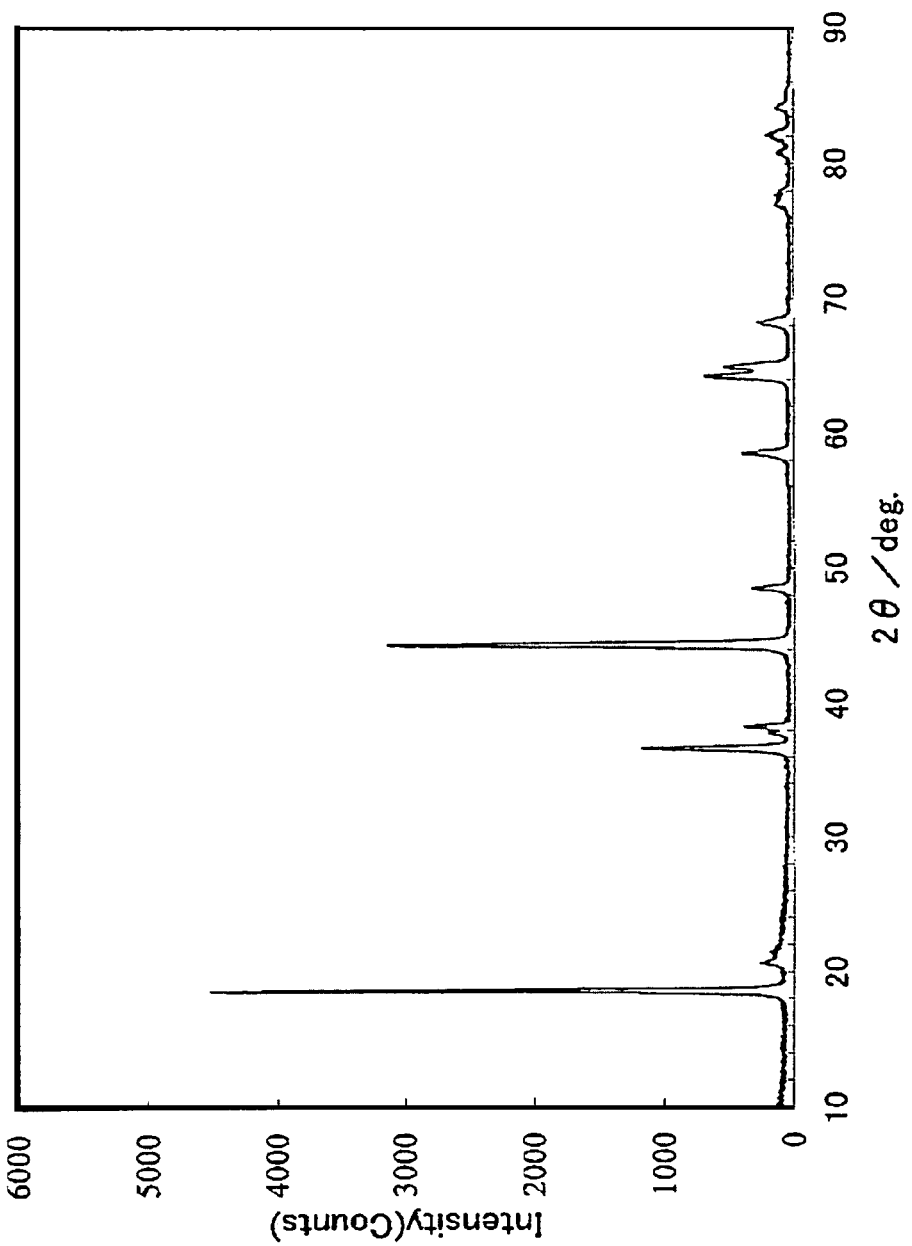
FIG. 23 is an XRD pattern of a lithium-nickel-manganese composite oxide prepared in EXAMPLE 3.
Figure 24:
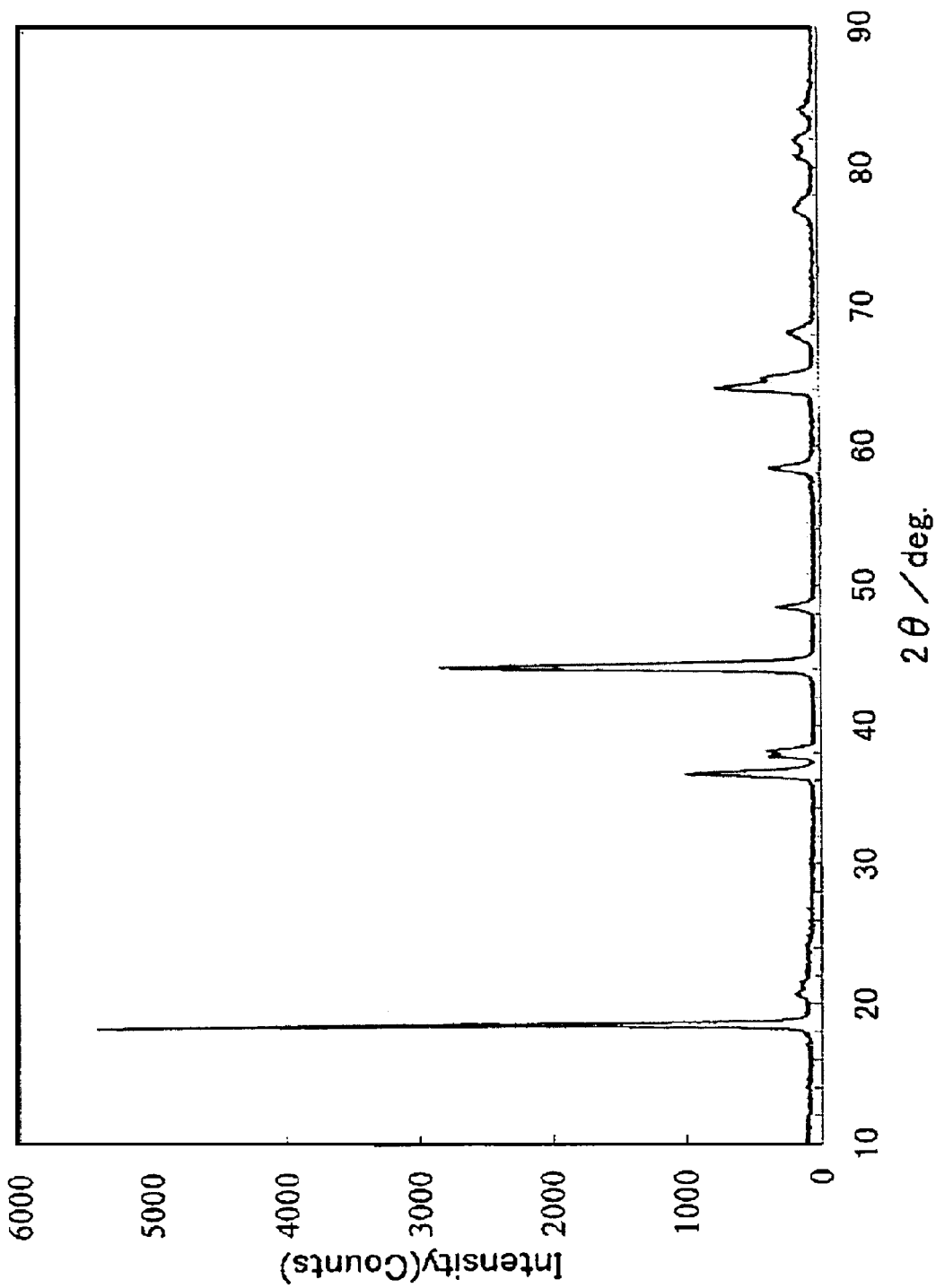
FIG. 24 is an XRD pattern of a lithium-nickel-manganese composite oxide prepared in EXAMPLE 4.
Figure 25:
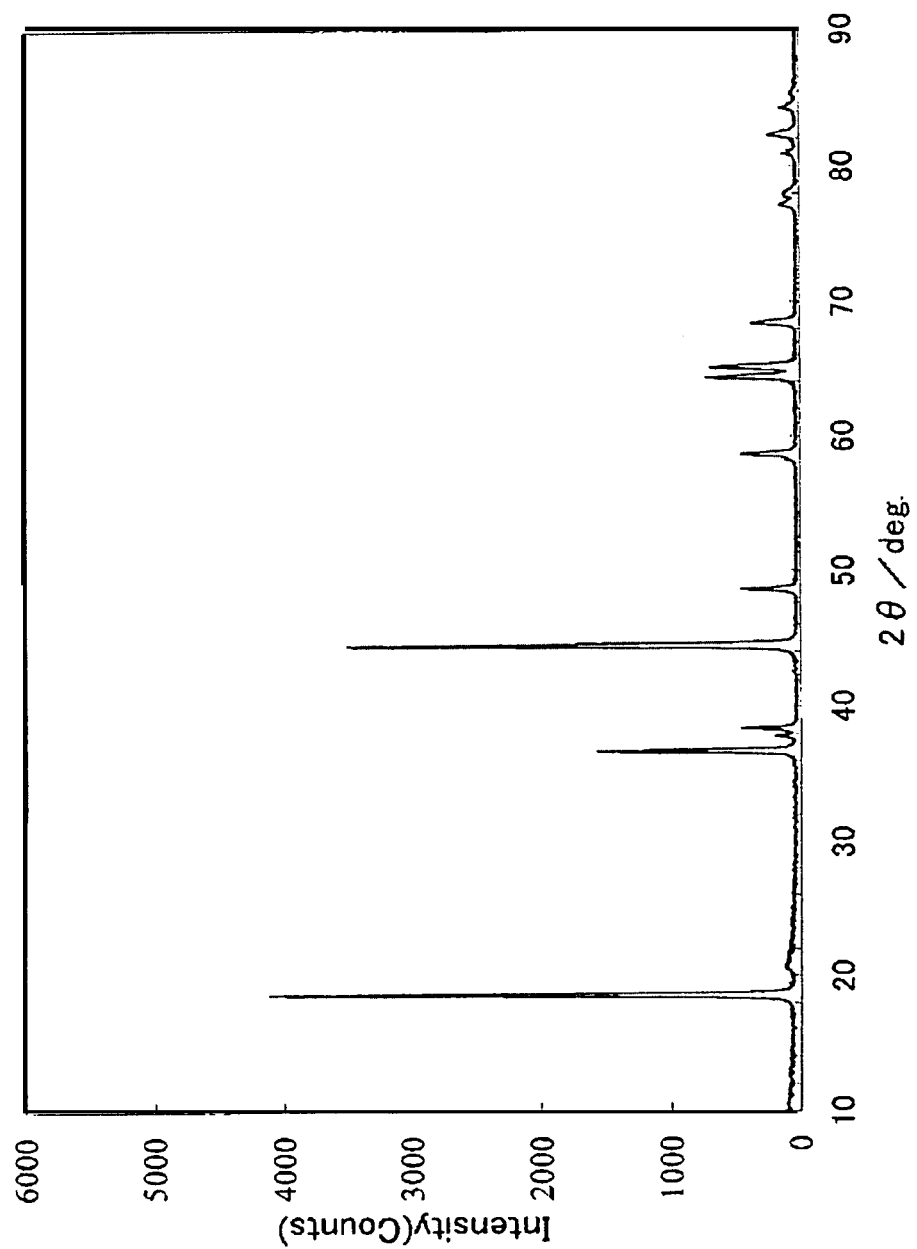
FIG. 25 is an XRD pattern of a lithium-nickel-manganese-cobalt composite oxide prepared in EXAMPLE 5.
Figure 26:
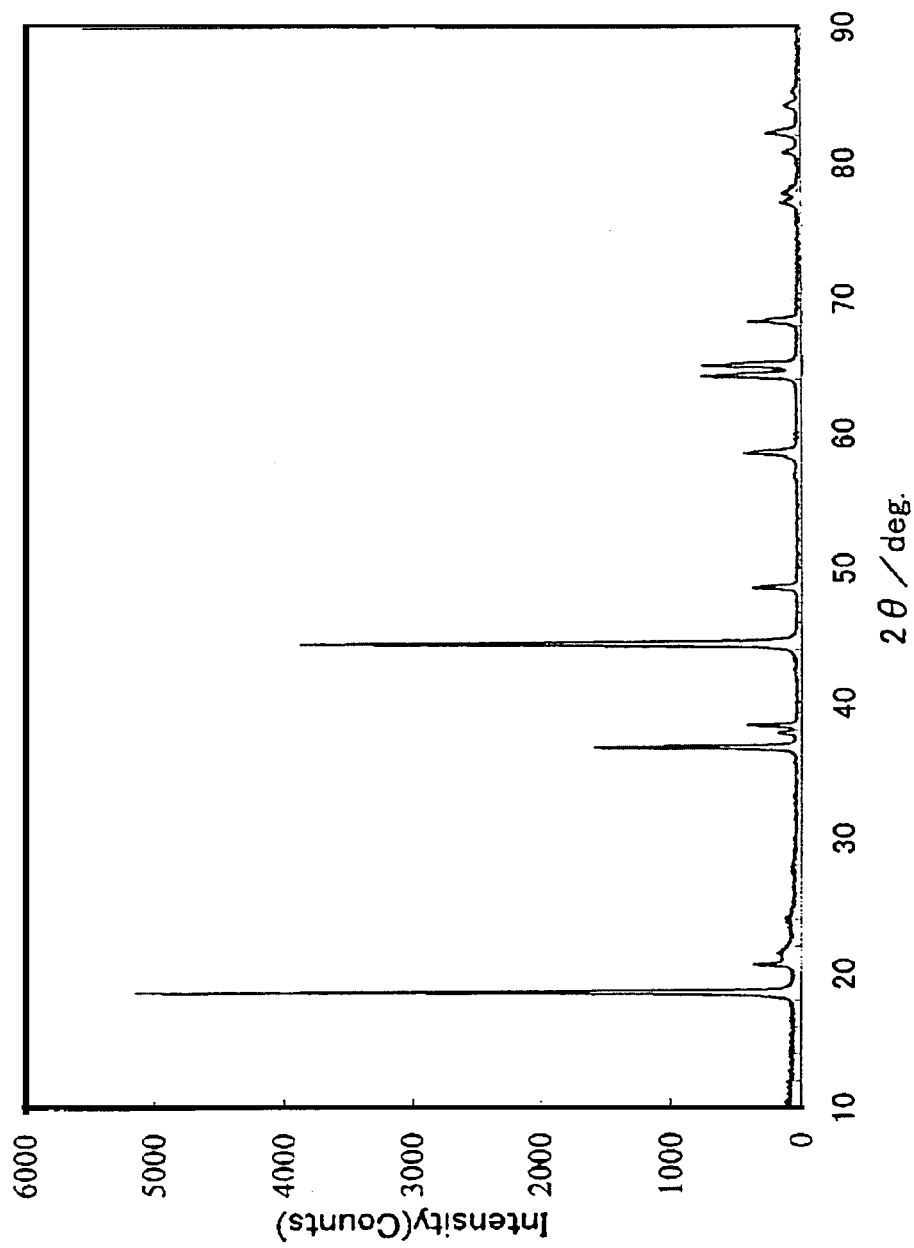
FIG. 26 is an XRD pattern of a lithium-nickel-manganese composite oxide prepared in COMPARATIVE EXAMPLE 1.
Figure 27:
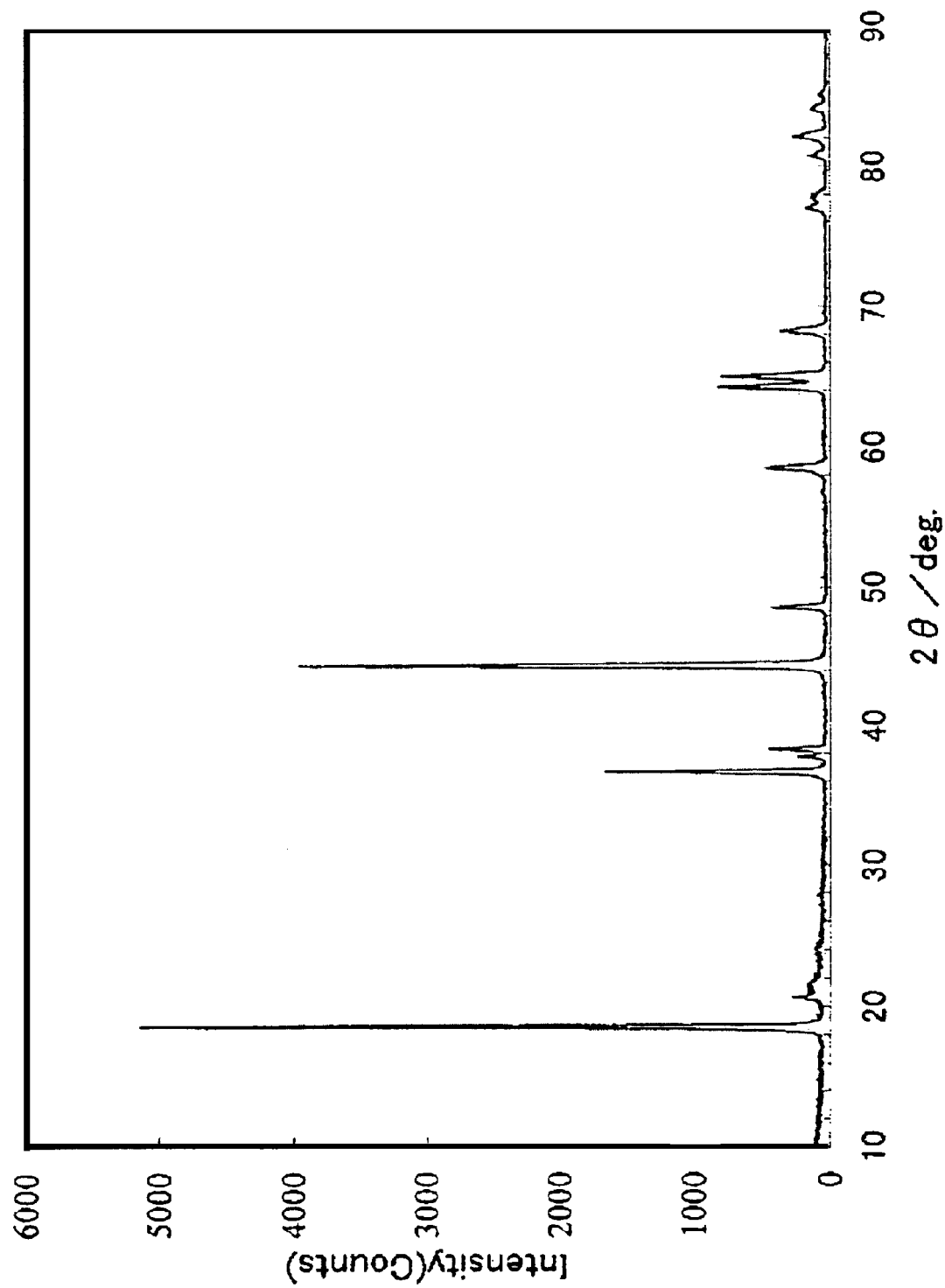
FIG. 27 is an XRD pattern of a lithium-nickel-manganese composite oxide prepared in COMPARATIVE EXAMPLE 2.
Figure 28:
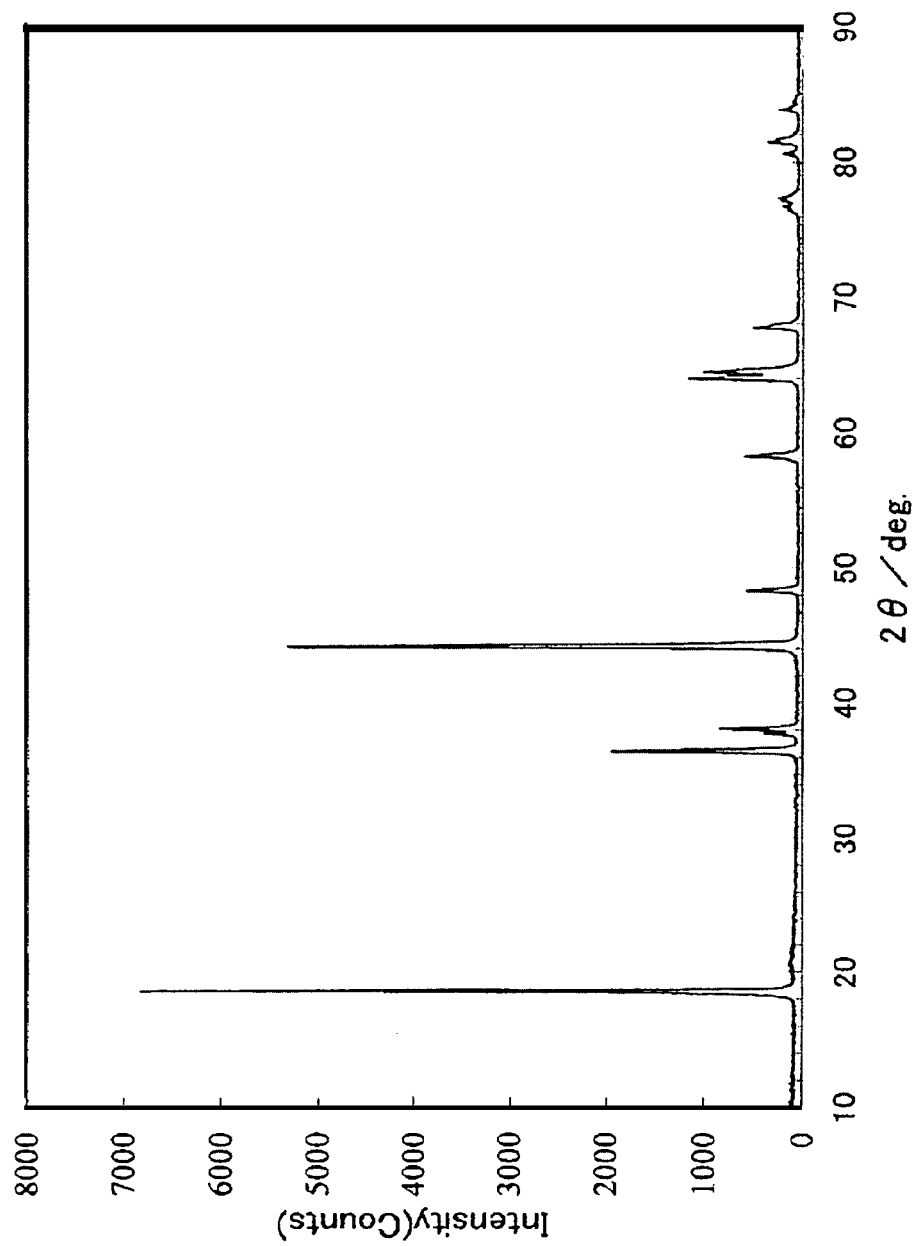
FIG. 28 is an XRD pattern of a lithium-nickel-manganese composite oxide prepared in COMPARATIVE EXAMPLE 3.
Figure 29:
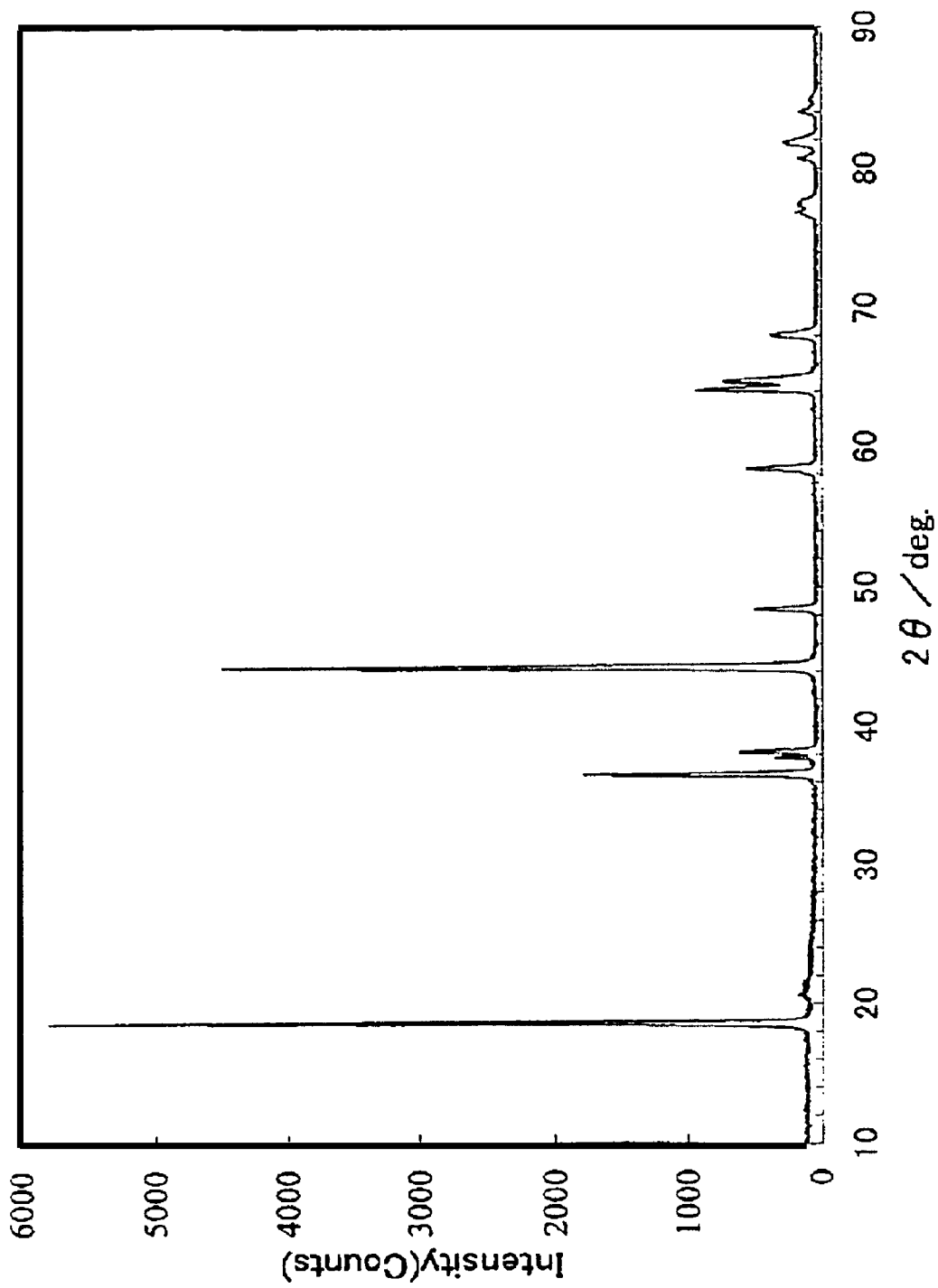
FIG. 29 is an XRD pattern of a lithium-nickel-manganese composite oxide prepared in COMPARATIVE EXAMPLE 4.
Figure 30:
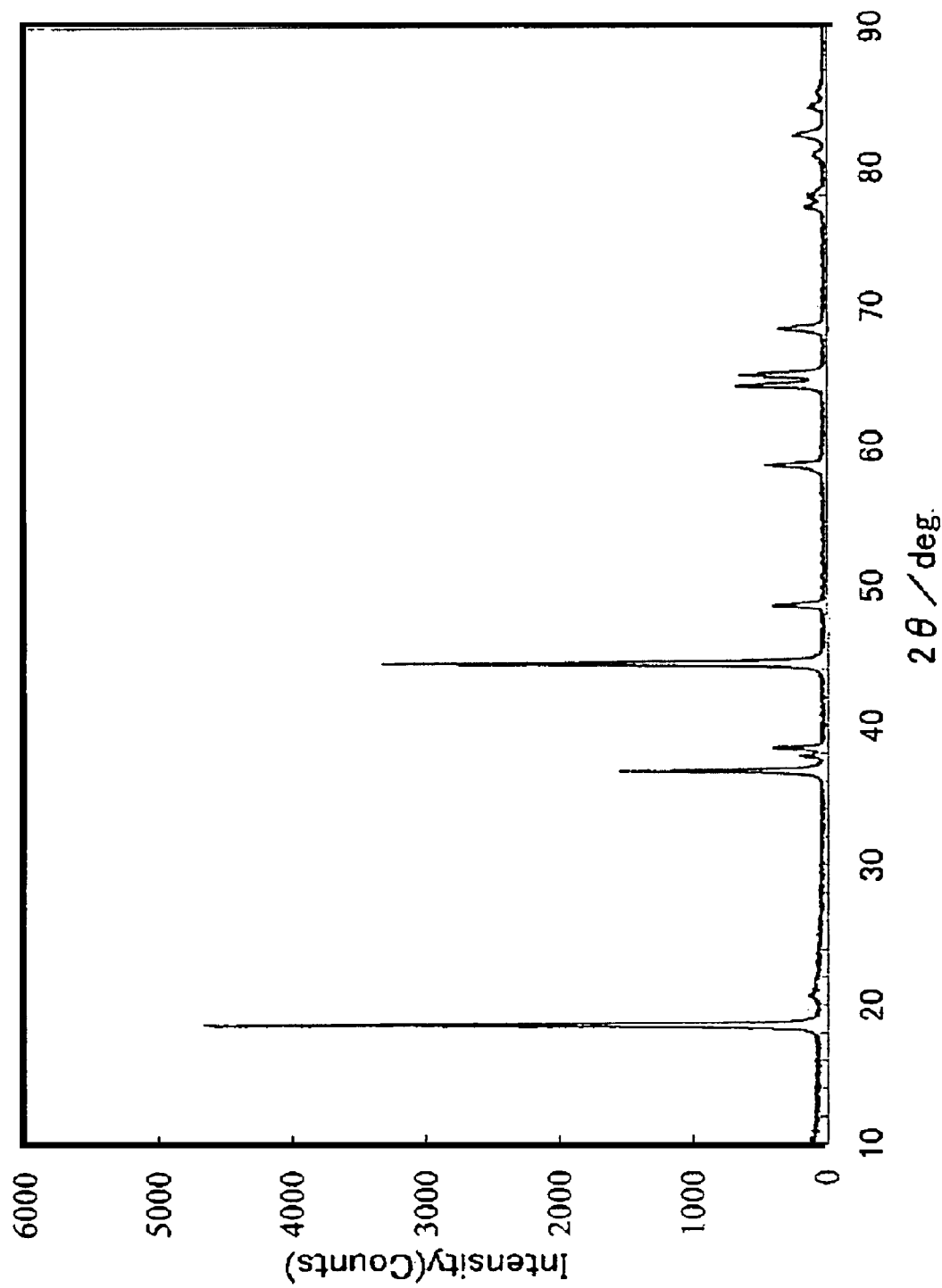
FIG. 30 is an XRD pattern of a lithium-nickel-manganese-cobalt composite oxide prepared in COMPARATIVE EXAMPLE 5.
Figure 31:
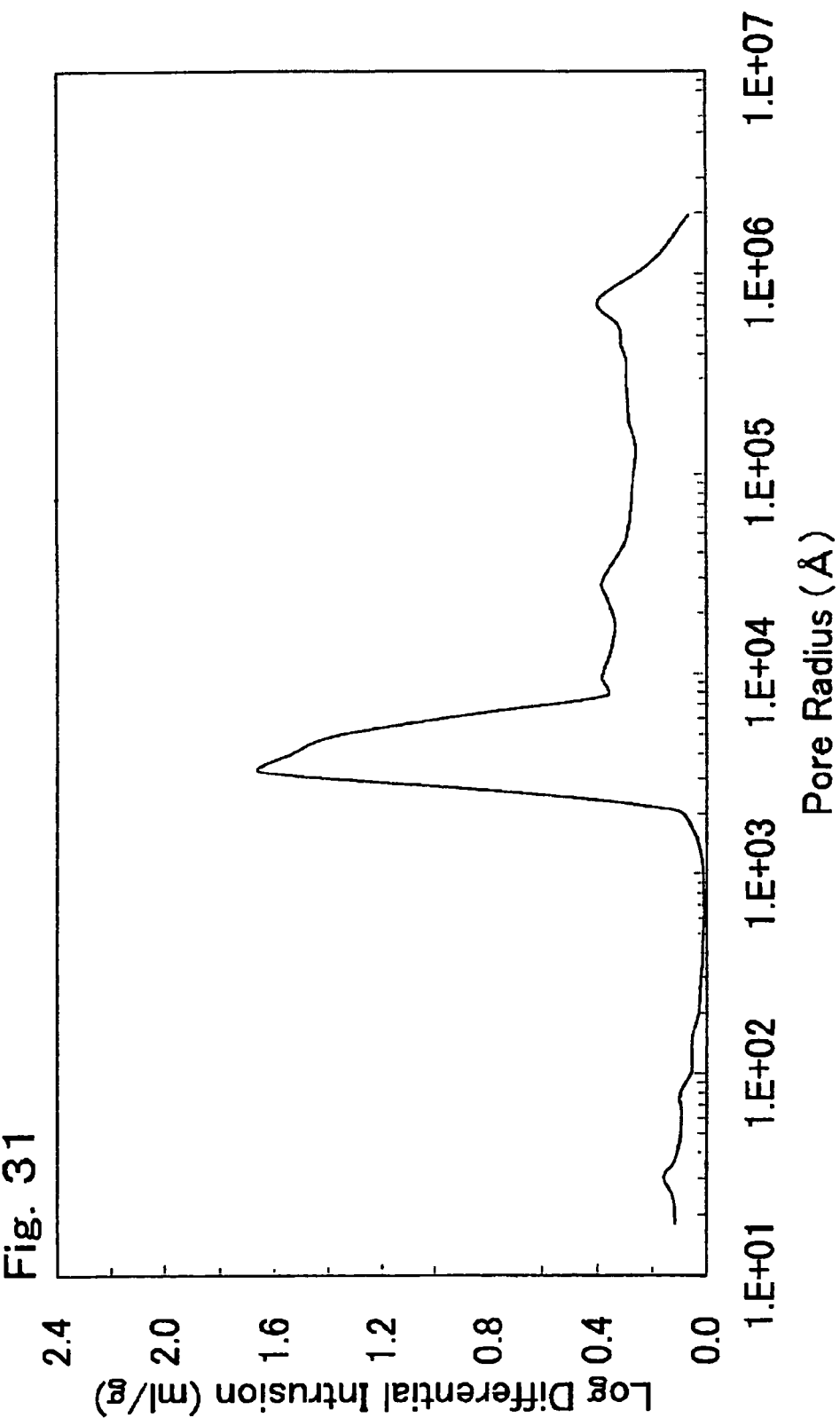
FIG. 31 is a graph showing a pore-size distribution curve of a lithium-nickel-manganese-cobalt composite oxide prepared in EXAMPLE 6.
Figure 32:
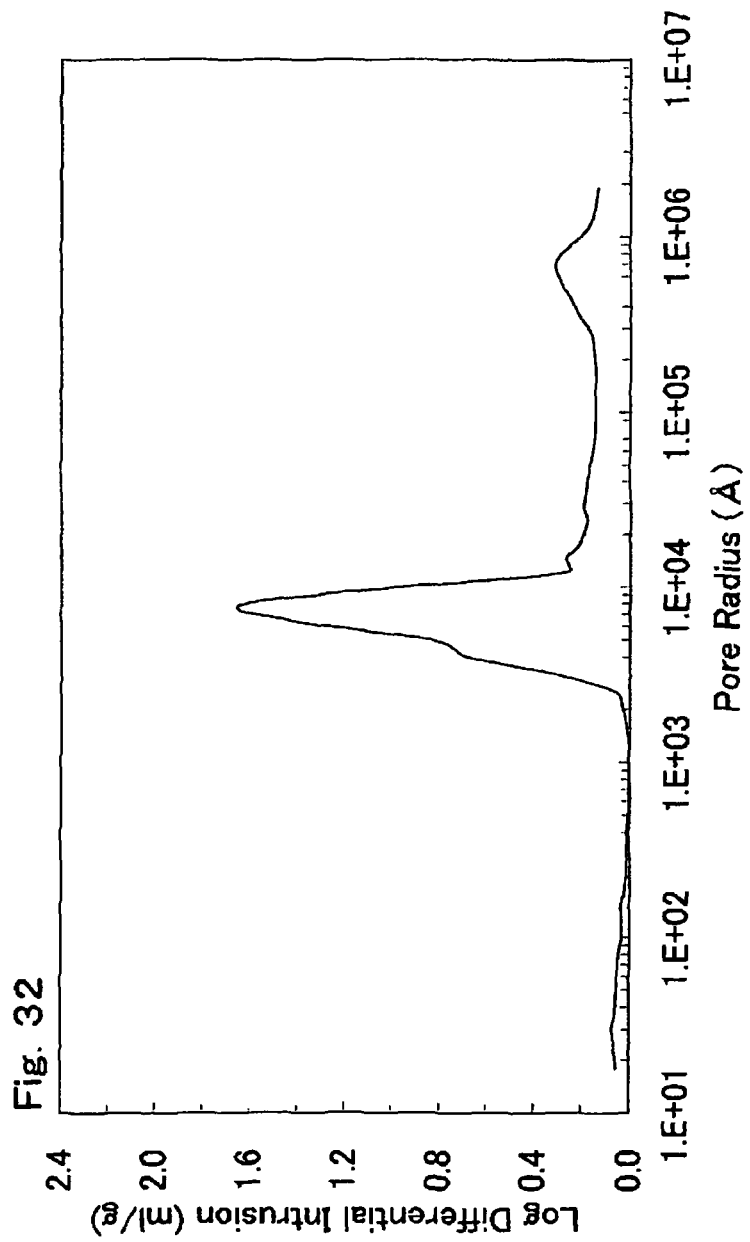
FIG. 32 is a graph showing a pore-size distribution curve of a lithium-nickel-manganese composite oxide prepared in EXAMPLE 7.
Figure 33:
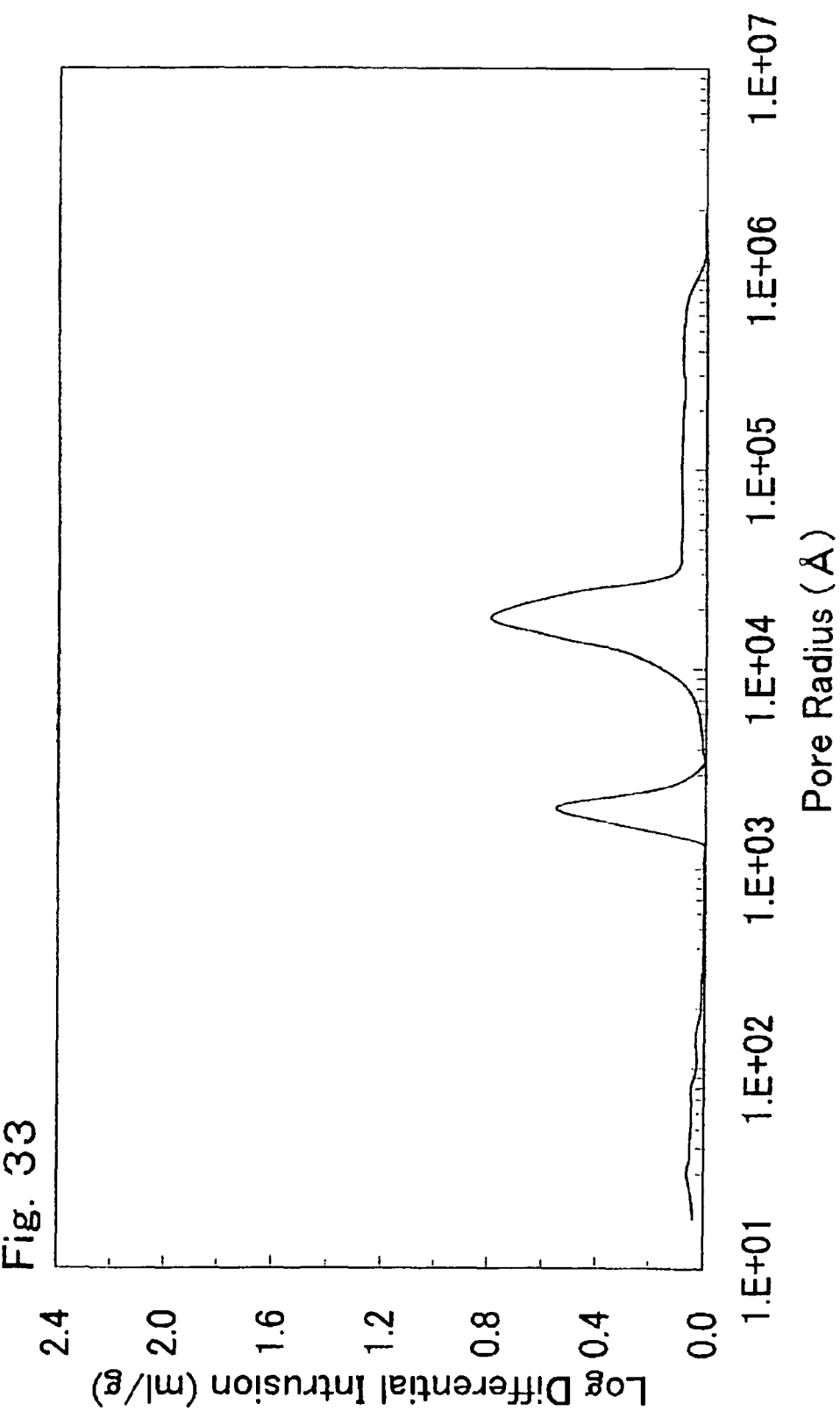
FIG. 33 is a graph showing a pore-size distribution curve of a lithium-nickel-manganese-cobalt composite oxide prepared in COMPARATIVE EXAMPLE 6.
Figure 34:
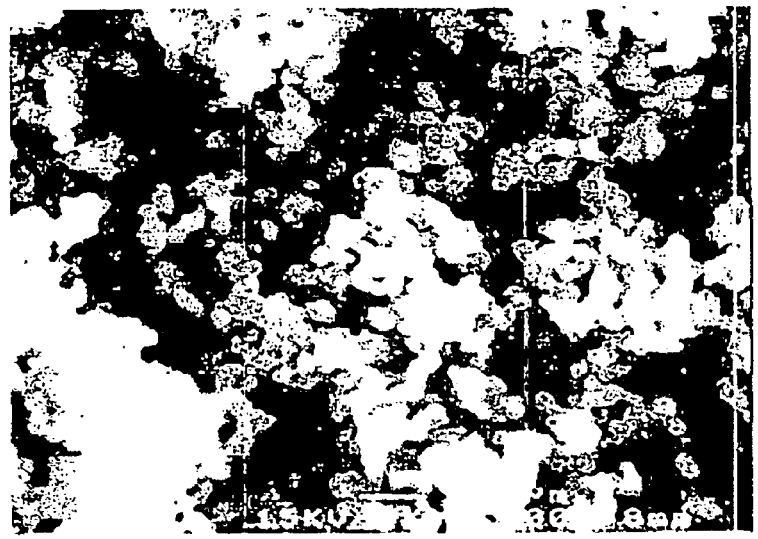
FIG. 34 is a SEM image (photograph) (×10,000) of a lithium-nickel-manganese-cobalt composite oxide prepared in EXAMPLE 6.
Figure 35:
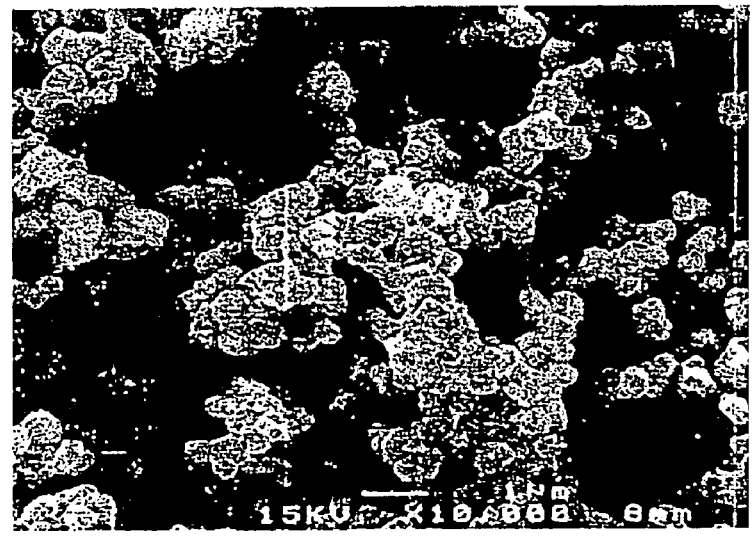
FIG. 35 is a SEM image (photograph) (×10,000) of a lithium-nickel-manganese composite oxide prepared in EXAMPLE 7.
Figure 36:
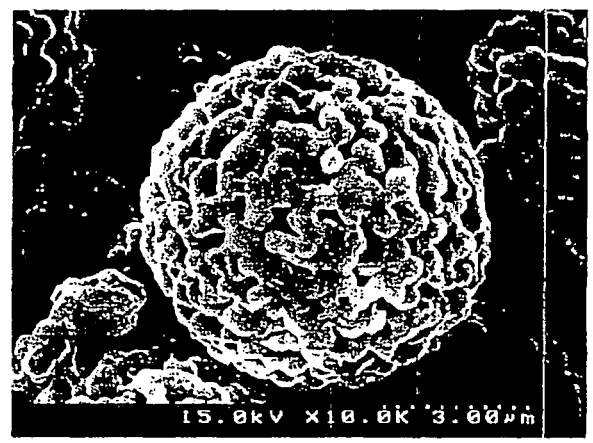
FIG. 36 is a SEM image (photograph) (×10,000) of a lithium-nickel-manganese-cobalt composite oxide prepared in COMPARATIVE EXAMPLE 6.
Figure 37:
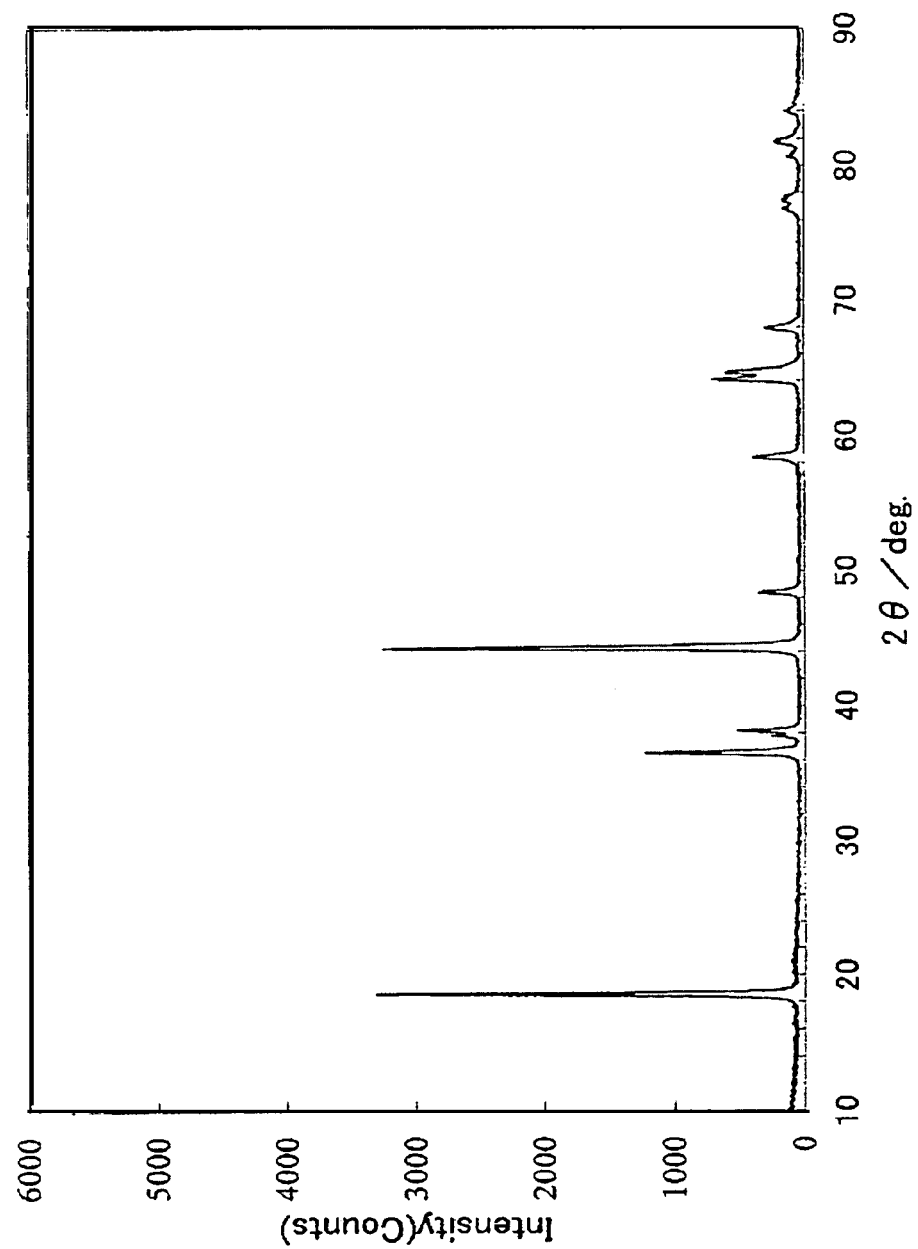
FIG. 37 is an XRD pattern of a lithium-nickel-manganese-cobalt composite oxide prepared in EXAMPLE 6.
Figure 38:
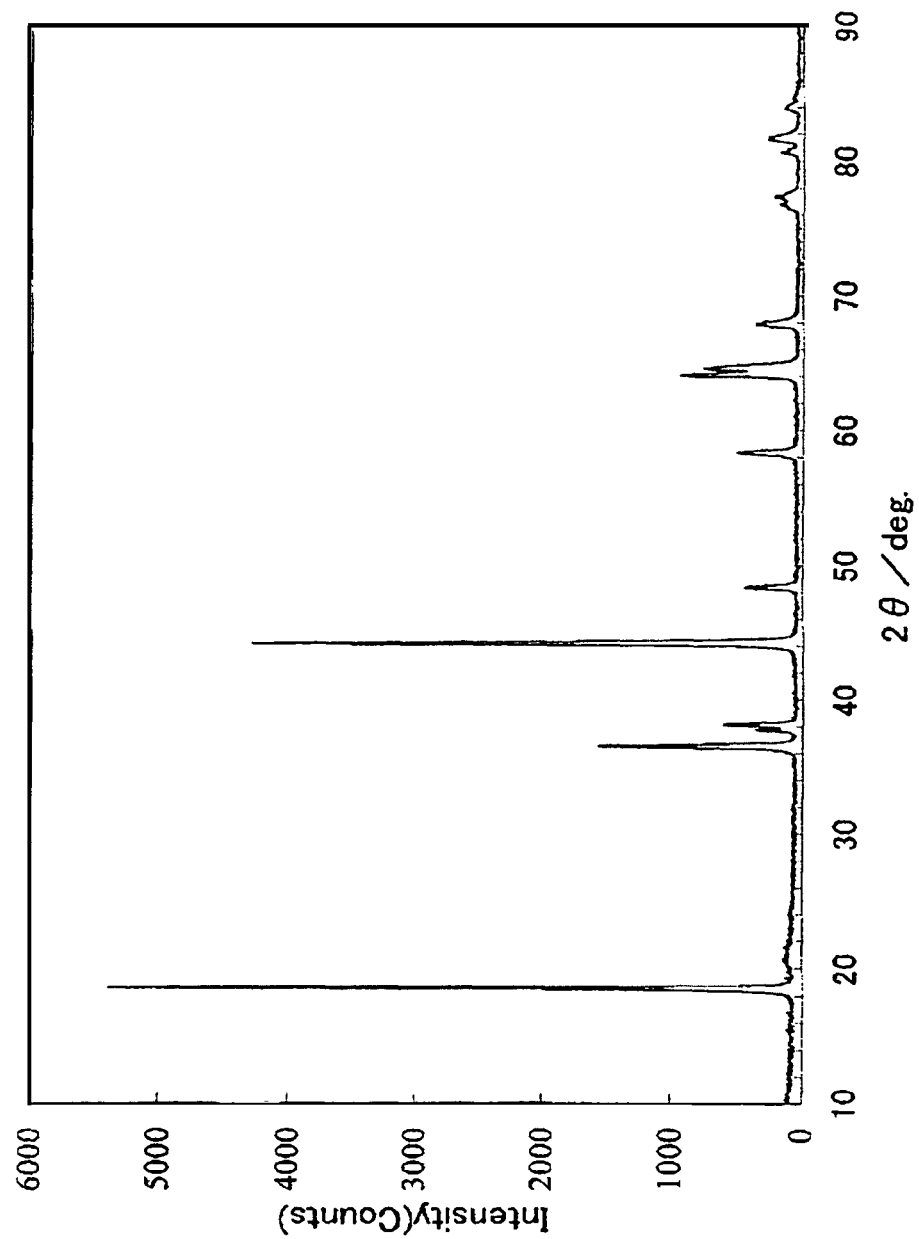
FIG. 38 is an XRD pattern of a lithium-nickel-manganese composite oxide prepared in EXAMPLE 7.
Figure 39:
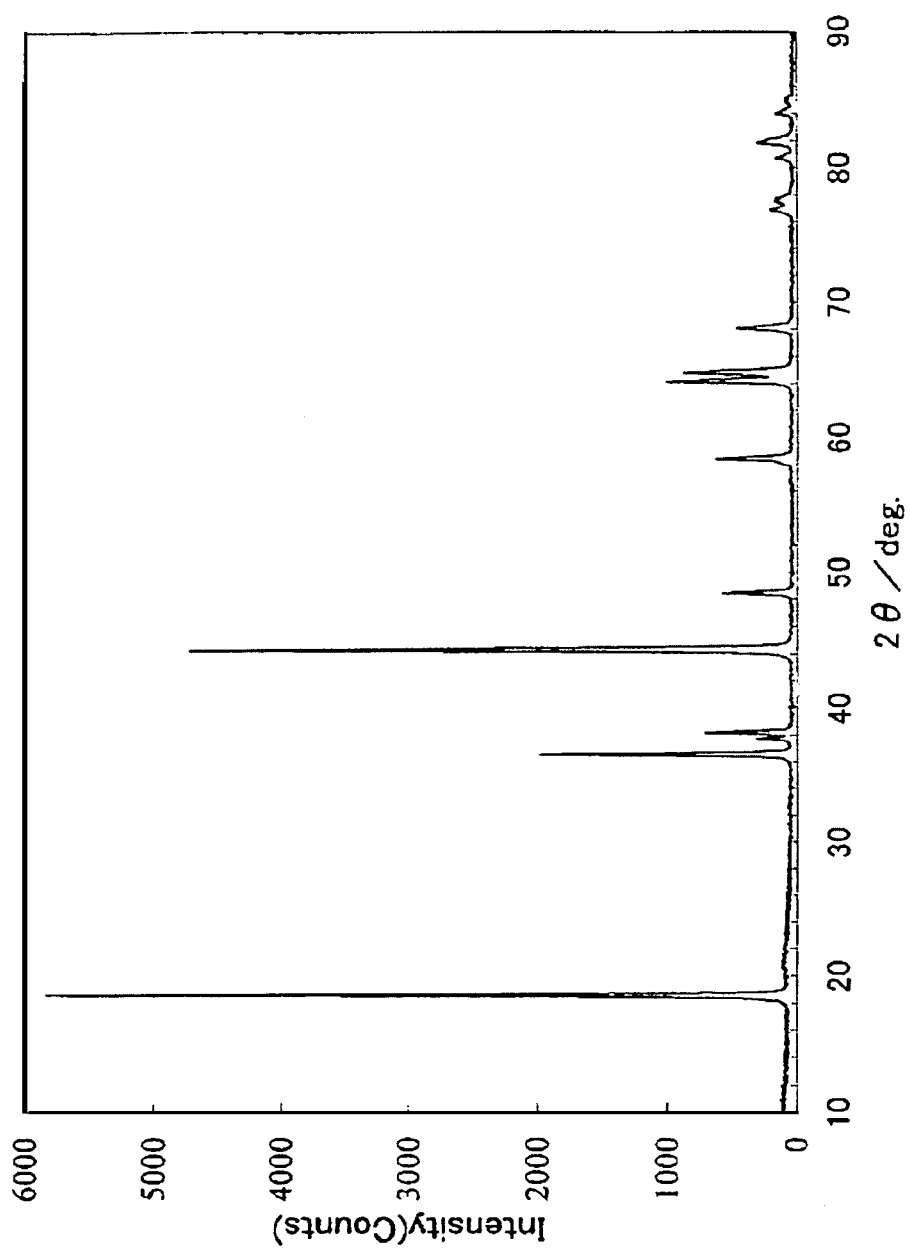
FIG. 39 is an XRD pattern of a lithium-nickel-manganese-cobalt composite oxide prepared in COMPARATIVE EXAMPLE 6.

While embodiments of the present invention will be described in detail below, descriptions of configuration requirements below are examples of embodiments (typical embodiments) of the present invention. The present invention is not limited to these descriptions.

A powder of a lithium transition-metal compound according to the present invention for a positive-electrode material in a lithium secondary battery will be described in detail below, in which in a mercury intrusion curve obtained by mercury intrusion porosimetry, the amount of mercury intruded is in the range of 0.8 cm$^3$/g to 3 cm$^3$/g when the pressure is increased from 3.86 kPa to 413 MPa.

[Powder of Lithium Transition-Metal Compound]

A powder of a lithium transition-metal compound according to the present invention for a positive-electrode material in a lithium secondary battery is characterized in that in a mercury intrusion curve obtained by mercury intrusion porosimetry, the amount of mercury intruded is in the range of 0.8 cm$^3$/g to 3 cm$^3$/g when the pressure is increased from 3.86 kPa to 413 MPa.

<Mercury Intrusion Porosimetry>

A powder of a lithium transition-metal compound according to the present invention for a positive-electrode material in a lithium secondary battery is characterized by satisfying a specific requirement when the powder is subjected to mercury intrusion. Mercury intrusion porosimetry is briefly described before particles according to the present invention are described.

Mercury intrusion porosimetry is a technique for obtaining information about a specific surface area, pore-size distribution, and the like from the relationship between the pressure and the amount of mercury intruded, the relationship being determined by intruding mercury into pores in a sample such as porous particles under pressure.

Specifically, a vessel containing a sample is evacuated and filled with mercury. Mercury has a high surface tension and thus does not intrude into pores on the surface of the sample at atmospheric pressure. A gradual increase in pressure applied to mercury allows mercury to gradually intrude into pores in descending order of size. A change in the level of mercury (i.e., the amount of mercury intruded into pores) is measured while the pressure is continuously increased, thereby obtaining a mercury intrusion curve showing the relationship between the pressure applied to mercury and the amount of mercury intruded.

Assuming that each of the pores has a cylindrical shape, let the radius of each pore, the surface tension of mercury, and a contact angle be r, δ, and θ, respectively, a force in the direction of extrusion of mercury is expressed as $-2\pi r \delta(\cos\theta)$ (if θ>90°, the resulting value is positive). A force in the direction of intrusion of mercury under pressure P is expressed as $\pi r^2 P$. Expression (1) and Expression (2) described below are obtained from the balance between the forces.

$$-2\pi r\delta(\cos\theta)=\pi r^2 P \qquad (1)$$

$$Pr=-2\delta(\cos\theta) \qquad (2)$$

In the case of mercury, values of a surface tension δ of about 480 dyn/cm and a contact angle θ of about 140° are commonly used. When these values are used, the radius of a pore into which mercury is intruded under pressure P is expressed as Expression (3) described below.

$$r(nm) = 7.5 \times 10^8 / P(Pa) \quad (3)$$

That is, the pressure P applied to mercury correlates with the radius r of a pore into which mercury is intruded. Thus, a pore-size distribution curve showing the relationship between the radius and volume of the pore in the sample can be obtained on the basis of the resulting mercury intrusion curve. For example, in the case where the pressure P is changed from 0.1 MPa to 100 MPa, pores having radii of about 7500 nm to about 7.5 nm can be measured.

In mercury intrusion porosimetry, the upper measurement limit of the pore radius is about 2 mm or more, and the lower measurement limit is about 200 µm or less. That is, mercury intrusion porosimetry is more suitable for analysis of the distribution of pores having relatively large radii than a nitrogen adsorption method.

Measurement by mercury intrusion porosimetry can be performed with an apparatus such as a mercury porosimeter.

Examples of the mercury porosimeter include AutoPore manufactured by Micromeritics and PoreMaster manufactured by Quantachrome.

Particles according to the present invention are characterized in that in a mercury intrusion curve obtained by mercury intrusion porosimetry, the amount of mercury intruded is in the range of 0.8 cm$^3$/g to 3 cm$^3$/g as the pressure is increased from 3.86 kPa to 413 MPa. The amount of mercury intruded is usually 0.8 cm$^3$/g or more, preferably 0.85 cm$^3$/g or more, more preferably 0.9 cm$^3$/g or more, and most preferably 1.0 cm$^3$/g or more, and usually 3 cm$^3$/g or less, preferably 2.5 cm$^3$/g or less, more preferably 2 cm$^3$/g or less, and most preferably 1.8 cm$^3$/g or less. In the case where the amount of mercury intruded exceeds the upper limit of the above range, pores are excessively large. In this case, the use of such particles of the present invention as those of a positive-electrode material reduces the filling rate of a positive-electrode active material into a positive-electrode plate, thus disadvantageously limiting battery capacity. In the case where the amount of mercury intruded is less than the lower limit of the above range, pores among particles are excessively small. When a battery including such particles of the present invention as those of a positive-electrode material is produced, lithium diffusion among particles is inhibited, thereby degrading load characteristics.

In the particles according to the present invention, when a pore-size distribution curve is measured by mercury intrusion porosimetry described below, a specific main peak described below is usually observed.

In this specification, the "pore-size distribution curve" depicts the radii of pores plotted on the horizontal axis and values obtained by differentiating the total volume of pores per unit weight (usually 1 g), each of the pores having a radius equal to or larger than a corresponding one of the radii, with respect to the logarithm of the pore radius, the values being plotted on the vertical axis. The pore-size distribution curve is usually shown in the form of a graph connecting the plotted points. In particular, the pore-size distribution curve obtained by measuring the particles of the present invention by mercury intrusion porosimetry is appropriately referred to as a "pore-size distribution curve according to the present invention".

In this specification, the "main peak" represents the highest peak among peaks in the pore-size distribution curve. A "sub-peak" represents a peak except the main peak in the pore-size distribution curve.

In this specification, "peak top" represents the point with the maximum vertical coordinate of each peak in a pore-size distribution curve.

<Main Peak>

The peak top of the main peak in the pore-size distribution curve according to the present invention is observed at a pore radius of usually 300 nm or more, preferably 310 nm or more, and most preferably 325 nm or more, and usually 1,000 nm or less, preferably 950 nm or less, more preferably 900 nm or less, still more preferably 850 nm or less, and most preferably 800 nm or less. In the case where the peak top is observed at a pore radius exceeding the upper limit of the above range, when a battery including such porous particles of the present invention as those of a positive-electrode material is produced, load characteristics may be degraded because of inhibition of lithium diffusion in the positive electrode or the lack of conductive paths.

In the case where the peak top is observed at a pore radius of less than the lower limit in the above range, when a battery including such porous particles of the present invention as those of a positive-electrode material is produced, the filling rate of the active material into a positive-electrode plate (current collector of the positive electrode) may be limited because of an increase in the amounts of conductive material and binder required, thereby limiting battery capacity. Furthermore, such particles have smaller diameters. Thus, a coating layer including the particles is hard or brittle and is likely to detach from the positive electrode during a winding step in the battery production process.

The pore volume of the main peak in the pore-size distribution curve according to the present invention is usually 0.5 cm$^3$/g or more, preferably 0.52 cm$^3$/g or more, more preferably 0.55 cm$^3$/g or more, and most preferably 0.57 cm$^3$/g or more, and usually 1.5 cm$^3$/g or less, preferably 1 cm$^3$/g or less, more preferably 0.8 cm$^3$/g or less, and most preferably 0.7 cm$^3$/g or less. In the case where the pore volume exceeds the upper limit of the above range, pores are excessively large. In this case, the use of such particles of the present invention as those of a positive-electrode material may reduce the filling rate of a positive-electrode active material into a positive-electrode plate, thus disadvantageously limiting battery capacity. In the case where the pore volume is less than the lower limit of the above range, pores among particles are excessively small. When a battery including such particles of the present invention as those of a positive-electrode material is produced, lithium diffusion among secondary particles may be inhibited, thereby reducing load characteristics.

<Sub-Peak>

The pore-size distribution curve according to the present invention may have a plurality of sub-peaks in addition to the main peak. In this case, the pore-size distribution curve is characterized in that the sub-peaks are not observed in the pore-radius range of 80 nm to 300 nm.

<Composition>

The lithium transition-metal compound of the present invention represents a compound having a structure capable of intercalating and deintercalating lithium ions. Examples thereof include sulfides, phosphate compounds, and lithium transition-metal composite oxides. Examples of sulfides include two-dimensional layered compounds, such as $TiS_2$ and $MoS_2$, and Chevrel compounds represented by the general formula $MexMo_6S_8$ (wherein Me represents a transition metal, e.g., Pb, Ag, or Cu) and each having a strong three-dimensional framework structure. Examples of phosphate compounds include compounds each having an olivine structure. The compounds are generally expressed as $LiMePO_4$ (wherein Me represents at least one transition metal). Specific examples thereof include $LiFePO_4$, $LiCoPO_4$, $LiNiPO_4$, and $LiMnPO_4$. Examples of lithium transition-metal composite oxides include oxides each having a spinel structure that allows lithium ions to diffuse three-dimensionally and oxides each having a layered structure that allows lithium ions to diffuse two-dimensionally. The oxides each having a spinel structure are usually expressed as $LiMe_2O_4$ (wherein Me represents at least one transition metal). Specific examples thereof include $LiMn_2O_4$, $LiCoMnO_4$, $LiNi_{0.5}Mn_{1.5}O_4$, and $CoLiVO_4$. The oxides each having a layered structure are generally expressed as $LiMeO_2$ (wherein Me represents at least one transition metal). Specific examples thereof include $LiCoO_2$, $LiNiO_2$, $LiNi_{1-x}Co_xO_2$, $LiNi_{1-x-y}Co_xMn_yO_2$, $LiNi_{0.5}Mn_{0.5}O_2$, $Li_{1.2}Cr_{0.4}Mn_{0.4}O_2$, $Li_{0.2}Cr_{0.4}Ti_{0.4}O_2$, and $LiMnO_2$.

The lithium transition-metal compound of the present invention preferably has a crystal structure assigned to an olivine structure, a spinel structure, or a layered structure from the viewpoint of the diffusion of lithium ions. In particular, the compound having a crystal structure assigned to a layered structure is particularly preferred.

The layered structure will be described in detail below. A typical crystal system of the layered compounds such as $LiCoO_2$ and $LiNiO_2$ having the $\alpha$-$NaFeO_2$ type structure is a hexagonal system that is assigned to the space group:

$$R\bar{3}m \qquad [Ex. 1]$$

(hereinafter, also referred to as an "R(-3)m layered structure") on the basis of symmetry thereof.

The structure of the layered $LiMeO_2$ is not limited to the R(-3)m layered structure. That is, $LiMnO_2$, which is also referred to as layered Mn, belongs to an orthorhombic system and the space group Pm2m. $Li_2MnO_3$, which is also referred to as the 213 phase, can also be expressed as $Li[Li_{1/3}Mn_{2/3}]O_2$, belongs to a monoclinic system and the space group C2/m, and is a layered compound having a Li layer, a $[Li_{1/3}Mn_{2/3}]$ layer, and an oxygen layer stacked.

Chemical implications of the Li composition (z and x) in the lithium transition-metal compound of the present invention will be described in detail below.

As described above, the layered structure is not necessarily limited to the R(-3)m structure but is preferably a structure that can be assigned to the R(-3)m structure from the viewpoint of achieving good electrochemical performance. To provide a detailed description, the following description is made under the assumption that the layered structure is the R(-3)m structure.

In the present invention, among the layered lithium transition metals, a compound having a basic structure of a layered lithium transition-metal composite oxide solid solution of the formula:

$$[Li]^{(3a)}[Li_xNi_{(1-3x)/2}Mn_{(1+x)/2)(1-y)}Co_y]^{(3b)}O_2 \qquad (II)$$

is preferred, the solid solution being assumed to be prepared from
$Li[Ni_{1/2}Mn_{1/2}]O_2$ incorporated in a proportion of $(1-3x)(1-y)$,
$Li[Li_{1/3}Mn_{2/3}]O_2$ incorporated in a proportion of $3x(1-y)$, and
$LiCoO_2$ incorporated in a proportion of y,
wherein (3a) and (3b) represent different metal sites in the R(-3)m layered structure.

In the present invention, a z-mol excess of Li is added to the composition of the formula (II) to form a lithium transition metal solid solution of the formula:

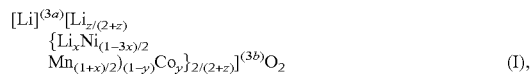

which is preferred,
wherein $0 \leq x \leq 0.33$, $0 \leq y \leq 0.2$, and $-0.02 \leq z \leq 0.2(1-y)(1-3x)$, and (3a) and (3b) represent different metal sites in the R(-3)m layered structure.

This expression is similar to the following:
$[Li]^{(3a)}[Li_{z/(2+z)}Me_{2/(2+z)}]^{(3b)}O_2$ shows that the transition-metal sites (3b sites) in a layered lithium transition-metal composite oxide expressed as $LiMeO_2$ (wherein Me represents a transition metal) are replaced with a z-mol excess of Li.

To determine x, y, and z in the composition formula of the lithium transition-metal compound, the transition metals and Li are analyzed with an inductively coupled plasma-atomic emission spectrometer (ICP-AES) to determine the ratio of Li/Ni/Mn/Co. That is, x and y can be determined from the Ni/Mn ratio and the Co/Ni ratio, and z can be determined from the Li/Ni molar ratio:

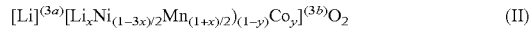

From the viewpoint of the structure, Li according to z and Li according to x are believed to occupy the same transition-metal sites. The difference between Li according to z and Li according to x is whether the Ni valence exceeds two or not (in other words, whether trivalent Ni is formed or not). That is, x is a value linked to the Mn/Ni ratio (the degree of abundance of Mn); hence, the Ni valence does not vary depending on only the x value and remains two. On the other hand, Li according to z serves to increase the Ni valence, and z serves as an index of the Ni valence (the proportion of Ni(III)).

From the composition formula described above, the Ni valence (m) when z changes is determined to be $m=2z/\{(1-y)(1-3x)\}+2$, provided that Co has a valence of three and Mn has a valence of four. This shows that the Ni valence is not determined only by z but is a function of x and y. When z=0, the Ni valence remains two regardless of x and y values. When z represents a negative value, the amount of Li in an active material is less than the stoichiometric amount. Possibly, a compound having an excessively large negative value does not produce the effect of the present invention. Furthermore, the equation shows that even when z remains constant, a higher Mn content (increase in x) and/or a higher Co content (increase in y) of the composition results in a higher Ni valence. Use of such a compound in a battery improves rate and output characteristics but is liable to cause a reduction in capacity. Thus, as described above, the upper limit of the z value is preferably defined as a function of x and y.

When $0 \leq y \leq 0.2$, i.e., when the Co content is low, the costs are reduced. Furthermore, the use of the compound in a lithium secondary battery that is designed to be charged at a high charging potential improves cycle characteristics and the level of safety.

As described above, a known battery including the powder of the lithium transition-metal compound having the above composition as that of a positive-electrode active material disadvantageously has poor rate and output characteristics. In contrast, the lithium-nickel-cobalt composite oxide of the present invention exhibits a large amount of mercury intruded under pressure in a mercury intrusion curve and has large pore volumes between crystal particles. Thus, the use of the oxide of the present invention for a battery increases the contact area between the surface of the positive-electrode active material and an electrolytic solution, thereby improving load characteristics required for a positive-electrode active material.

<Lithium-Nickel-Manganese-Cobalt Composite Oxide>

The lithium transition-metal compound of the present invention for a positive-electrode material in a lithium secondary battery is preferably a lithium-nickel-manganese-cobalt composite oxide and more preferably a compound which has a crystal structure assigned to a layered structure and is represented by the composition formula (I):

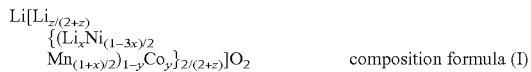   composition formula (I)

wherein $0 \leq x \leq 0.33$, $0 \leq y \leq 0.2$, and $-0.02 \leq z \leq 0.2(1-y)(1-3x)$.

In the composition formula (I), z represents −0.02 or more, preferably −0.01 or more, more preferably 0 or more, still more preferably $0.01(1-y)(1-3x)$ or more, and most preferably $0.02(1-y)(1-3x)$ or more, and $0.2(1-y)(1-3x)$ or less, preferably $0.19(1-y)(1-3x)$ or less, more preferably $0.18(1-y)(1-3x)$ or less, and most preferably $0.17(1-y)(1-3x)$ or less. A z value of less than the lower limit reduces conductivity. A z value exceeding the upper limit results in an excessively large amount of Li with which the transition-metal sites are replaced, thereby possibly degrading the performance of a lithium secondary battery including the compound, e.g., a reduction in battery capacity.

An excessively large z enhances the carbon-dioxide absorbency of the active-material powder. As a result, the powder easily absorbs carbon dioxide in the atmosphere. It is thus speculated that the carbon content is increased.

An excessively small z results in an insufficient amount of Li required for the formation of a structure mainly having layers. It is thus speculated that a heterophase such as a spinel phase is formed.

The x value is 0 or more and 0.33 or less, preferably 0.30 or less, more preferably 0.25 or less, and most preferably 0.20 or less. An x value of less than the lower limit reduces stability at high voltages and is liable to cause a reduction in safety. An x value exceeding the upper limit may be liable to lead to the formation of a heterophase and a reduction in battery performance.

The y value is 0 or more and preferably 0.01 or more, and 0.2 or less, preferably 0.18 or less, more preferably 0.15 or less, and most preferably 0.1 or less.

In the composition range of the formula (I) described above, the rate and output characteristics when a battery including the compound is produced tend to deteriorate as the z value approaches the lower limit, which is stoichiometric. In contrast, as the z value approaches the upper limit, the rate and output characteristics when a battery including the compound is produced tend to be improved, whereas the capacity tends to decrease. As the x value approaches the lower limit, in other words, as the manganese/nickel atomic ratio approaches one, the capacity can be ensured at a low charging voltage, whereas the cycle characteristics and safety of a battery that can be charged at a high charging voltage tend to deteriorate. In contrast, as the x value approaches the upper limit, the cycle characteristics and safety of a battery that can be charged at a high charging voltage are improved, whereas the discharge capacity, the rate characteristics, and the output characteristics tend to deteriorate. As the y value approaches the lower limit, the load characteristics such as the rate and output characteristics tend to deteriorate. In contrast, as the y value approaches the upper limit, the rate and output characteristics when a battery including the compound is produced tend to be improved, whereas the cycle characteristics and safety of a battery that can be charged at a high charging voltage tend to deteriorate, thereby increasing material costs. The present invention has been accomplished by conducting intensive studies in order to particularly overcome these tradeoffs. It is important to set the above-described compositional parameters x, y, and z within specified ranges.

In the composition of the formula (I) described above, the atomic proportion of oxygen is described as two for convenience but may be slightly nonstoichiometric. For example, the atomic proportion of oxygen may be in the range of $2\pm0.1$.

In the case where the lithium transition-metal compound of the present invention is a powder of a lithium-nickel-manganese-cobalt composite oxide, the oxide may contain a substituent element therein. The substituent element is at least one element selected from Al, Fe, Ti, Mg, Cr, Ga, Cu, Zn, Nb, Zr, Mo, W, and Sn. Each of the Ni, Mn, and Co elements is appropriately replaced with a corresponding one of these substituent elements in an amount of 20 atomic % or less.

<Reason that Particles of the Invention have Effect Described Above>

The particles of the lithium composite oxide of the present invention have a suitably large pore volume. Thus, the use of the particles in a battery increases the contact area between the surface of the positive-electrode active material and an electrolytic solution. It is therefore speculated that the load characteristics required for the positive-electrode active material are improved.

<Other Preferred Embodiments>

Other characteristics of the particles according to the present invention will be described in detail below. The following descriptions are merely of preferred embodiments.

Other characteristics of the particles according to the present invention are not particularly limited as long as the particles have the characteristics described above.

<Median Diameter and 90% Cumulative Diameter ($D_{90}$)>

The median diameter of the powder of the lithium transition-metal compound of the present invention is usually 0.6 μm or more, preferably 0.8 μm or more, more preferably 1 μm or more, and most preferably 1.1 μm or more, and usually 5 μm or less, preferably 4.5 μm or less, more preferably 4 μm or less, still more preferably 3.5 μm or less, and most preferably 3 μm or less. A median diameter of less than the lower limit may cause a problem of coatability in forming a positive-electrode-material layer. A median diameter exceeding the upper limit may degrade battery performance.

The 90% cumulative diameter ($D_{90}$) of secondary particles of the powder of the lithium transition-metal compound of the present invention is usually 10 μm or less, preferably 9 μm or less, more preferably 8 μm or less, and most preferably 7 μm or less, and usually 1 μm or more, preferably 2 μm or more, more preferably 3 μm or more, and most preferably 3.5 μm or more. A 90% cumulative diameter exceeding the upper limit may degrade battery performance. A 90% cumulative diameter of less than the lower limit may cause a problem of coatability in forming a positive-electrode-material layer.

In the present invention, the median diameter as an average particle diameter and the 90% cumulative diameter ($D_{90}$) are determined from volume-based particle diameters measured with a known laser diffraction/scattering particle size distribution analyzer using the refractive index set at 1.24. In the invention, a 0.1% by weight aqueous solution of sodium hexametaphosphate was used as a dispersion medium in the measurement, and the measurement is made after a five-minute ultrasonic dispersion (power: 30 W, frequency: 22.5 kHz).

<Bulk Density>

The bulk density of the powder of the lithium transition-metal compound according to the present invention for a positive-electrode material in a lithium secondary battery is usually 0.5 g/cc or more, preferably 0.6 g/cc or more, more preferably 0.7 g/cc or more, and most preferably 0.8 g/cc or more. A bulk density of less than the lower limit may adversely affect powder packing and electrode preparation.

The bulk density of the positive electrode including the powder as an active material is usually 1.5 g/cc or less, preferably 1.4 g/cc or less, more preferably 1.3 g/cc or less, and most preferably 1.2 g/cc or less. A bulk density exceeding the upper limit is preferred in order to improve powder packing and the density of the electrode but may result in an excessively small specific surface area to degrade battery performance.

In the present invention, the bulk density is determined by placing 5 to 10 g of the powder of the lithium-nickel-manganese-cobalt composite oxide as the lithium transition-metal compound in a 10-mL glass graduated cylinder, tapping this cylinder 200 times with a stroke of about 20 mm, and then measuring the density of the powder thus packed (tap density) g/cc.

<BET Specific Surface Area>

The BET specific surface area of the powder of the lithium-nickel-manganese composite oxide of the present invention is usually 1.5 $m^2/g$ or more, preferably 1.7 $m^2/g$ or more, more preferably 2 $m^2/g$ or more, and most preferably 2.5 $m^2/g$ or more, and usually 5 $m^2/g$ or less, preferably 4.5 $m^2/g$ or less, more preferably 4 $m^2/g$ or less, and most preferably 3.5 $m^2/g$ or less. A BET specific surface area of less than the above range is liable to cause the deterioration of battery performance. A BET specific surface area exceeding the above range may prevent an increase in bulk density and is thus liable to cause a problem of coatability in forming a positive-electrode active material.

The BET specific surface area is measured with a known apparatus for measuring BET specific surface areas of powders. In the present invention, the BET specific surface area is measured with a fully automatic powder specific surface area analyzer (Model: AMS8000, manufactured by Ohkura Riken Co., Ltd). Nitrogen is used as an adsorption gas. Helium is used as a carrier gas. A specific surface area is measured by a single-point BET method using a continuous flow technique. Specifically, a powder sample is degassed by heating at 150° C. with a mixed gas and cooled to the liquid-nitrogen temperature to adsorb the nitrogen/helium mixed gas. The sample is heated to room temperature with water to desorb the nitrogen gas adsorbed. The amount of the nitrogen gas thus desorbed is determined with a thermal conductivity detector. The specific surface area of the sample is calculated from the amount of nitrogen gas determined.

<Carbon Content C>

The C value of the powder of the lithium transition-metal compound of the present invention is usually 0.005% by weight or more, preferably 0.01% by weight or more, more preferably 0.015% by weight or more, and most preferably 0.02% by weight or more, and usually 0.2% by weight or less, preferably 0.15% by weight or less, more preferably 0.12% by weight or less, and most preferably 0.1% by weight or less. A C value of less than the lower limit may degrade battery performance. A C value exceeding the upper limit may increase the expansion of a battery including such a powder due to gas generation and degrade battery performance.

In the present invention, the carbon content C of the powder of the lithium transition-metal compound is determined by infrared spectroscopy after combustion in an oxygen stream (high-frequency heating oven) as described in EXAMPLES.

The carbon content of the powder of the lithium transition-metal compound is determined by carbon analysis described below. Assuming that the carbon is completely derived from carbonate ions, the carbonate ion concentration is determined. Carbon in the powder of the lithium transition-metal compound is analyzed by ion chromatography and may be mostly present as a carbonate. Consequently, the C value is regarded as an indicator of information about the amount of lithium carbonate attached.

In the case where a compound, such as lithium iron phosphate compounds (general formula: $LiFePO_4$), having significantly low electron conductivity is combined with carbon in order to achieve good conductivity and where a lithium transition-metal compound having a relatively high electron conductivity is combined with conductive carbon in order to further enhance electron conductivity, a C content outside the specified range described above may be detected. The C value of the powder of the lithium transition-metal compound subjected to such treatment is not limited to the specified range described above. In the powder of the lithium transition-metal compound according to the present invention, lithium that is in the form of a carbonate is present in a very small amount and thus does not have an effect on the specified lithium composition (x and z) of the composite-oxide powder.

<Average Primary-Particle Diameter>

The average primary-particle diameter of the lithium transition-metal compound of the present invention is preferably in the range of 0.05 μm to 1 μm. The lower limit is more preferably 0.1 μm or more, more preferably 0.15 μm or more, and most preferably 0.2 μm or more. The upper limit is more preferably 0.8 μm or less, more preferably 0.7 μm or less, and most preferably 0.6 μm or less. An average primary-particle diameter exceeding the upper limit exerts an adverse influence upon powder packing and reduces the specific surface area, thereby increasing the possibility that battery performance such as rate and output characteristics are degraded. An average primary-particle diameter of less than the lower limit may disadvantageously result in poor charge/discharge reversibility due to insufficient crystal growth.

In the present invention, the average primary-particle diameter is an average diameter determined by observation with a scanning electron microscope (SEM). Specifically, the average primary-particle diameter can be determined as the average value of particle diameters of about 10 to 30 primary particles observed in a 30,000×SEM image.

<Volume Resistivity>

The lower limit of the volume resistivity of the lithium transition-metal compound of the present invention, the compound being compacted at a pressure of 40 MPa, is preferably $1 \times 10^3$ Ω·cm or more, more preferably $5 \times 10^3$ Ω·cm or more, and still more preferably $1 \times 10^4$ Ω·cm or more. The upper limit of the volume resistivity is preferably $5 \times 10^7$ Ω·cm or less, more preferably $1 \times 10^7$ Ω·cm or less, and still more preferably $5 \times 10^6$ Ω·cm or less. A volume resistivity exceeding the upper limit may degrade load characteristics of a battery including the compound. A volume resistivity of less than the lower limit may degrade the safety etc. of a battery including the compound.

In the present invention, the volume resistivity of the powder of the lithium transition-metal compound is determined by measuring the volume resistivity of the powder of the lithium transition-metal compound that is compacted at a pressure of 40 MPa with a ring-type electrode and a four-pin probe having an inter-pin distance of 5.0 mm and an pin radius of 1.0 mm at a sample radius of 12.5 mm and an applied-voltage limit of 90 V. The volume resistivity of a powder compacted at a predetermined pressure can be measured with, for example, a powder resistivity measurement apparatus (e.g., Loresta GP Powder Resistivity Measurement System, manufactured by Dia Instruments Co., Ltd) using a probe unit for powders.

33

<Powder X-Ray Diffraction Peak>

Preferably, the powder of the lithium transition-metal compound of the present invention does not exhibit a diffraction peak at 2θ=31±1° in a pattern obtained by powder X-ray diffraction using CuKα radiation. That "the powder does not exhibit the diffraction peak" includes the case where the powder exhibits a diffraction peak in the range in which the diffraction peak does not cause adversely effect on the performance of a battery of the present invention. That is, this diffraction peak is derived from a spinel phase. The inclusion of the spinel phase impairs the capacity, rate characteristics, high-temperature storage characteristics, and high-temperature cycling characteristics of a battery including such a powder. Thus, although the diffraction peak may be included in the range in which the diffraction peak does not cause adversely effect on the performance of a battery of the present invention, the proportion of the area of the diffraction peak at 2θ=31±1° is preferably 0.5% or less and more preferably 0.2% or less with reference to the area of the (003) peak at 2θ=18.5±1°. Most preferably, the diffraction peak at 2θ=31±1° is not observed. That is, this diffraction peak is derived from the spinel phase. The inclusion of the spinel phase is liable to cause a reduction in capacity and the degradation in rate characteristics, high-temperature storage characteristics, and high-temperature cycling characteristics of a battery including such a powder. Hence, preferably, this diffraction peak is not observed.

A powder of a lithium-nickel-manganese-cobalt composite oxide for a positive-electrode material in a lithium secondary battery according to the present invention will be described in further detail below, the composite oxide being represented by the composition formula (I'):

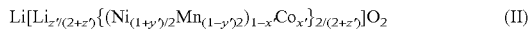
$$\text{Li}[\text{Li}_{z''/(2+z')}\{(\text{Ni}_{(1+y'/2)}\text{Mn}_{(1-y'/2)})_{1-x'}\text{Co}_{x'}\}_{2/(2+z')}]\text{O}_2 \quad \text{(II)}$$

where 0≦x'≦0.1, −0.1≦y'≦0.1, and (1−x')(0.05−0.98y')≦z'≦(1−x')(0.15−0.88y'), wherein the composite oxide has a crystal structure assigned to a layered structure, and wherein in powder X-ray diffraction measurement using CuKα radiation, 0.01≦FWHM (110)≦0.2 where FWHM (110) represents the half-width of the (110) diffraction peak observed at a diffraction angle 2θ of about 64.5°.

[Powder of Lithium-Nickel-Manganese-Cobalt Composite Oxide]

A powder of a lithium-nickel-manganese-cobalt composite oxide for a positive-electrode material in a lithium secondary battery according to the present invention will be described in further detail below, the composite oxide being represented by the composition formula (I'):

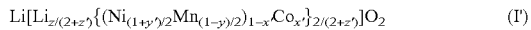
$$\text{Li}[\text{Li}_{z/(2+z')}\{(\text{Ni}_{(1+y'/2)}\text{Mn}_{(1-y'/2)})_{1-x'}\text{Co}_{x'}\}_{2/(2+z')}]\text{O}_2 \quad \text{(I')}$$

where 0≦x'≦0.1,
−0.1≦y'≦0.1, and
(1−x')(0.05−0.98y')≦z'≦(1−x')(0.15−0.88y'), wherein the composite oxide has a crystal structure assigned to a layered structure, and wherein in powder X-ray diffraction measurement using CuKα radiation, 0.01≦FWHM (110)≦0.2, where FWHM (110) represents the half-width of the (110) diffraction peak observed at a diffraction angle 2θ of about 64.50.

<Composition and Crystal Structure>

In the formula (I'), the x' value is 0 or more, preferably 0.01 or more, more preferably 0.02 or more, still more preferably 0.03 or more, and most preferably 0.04 or more, and 0.1 or less and preferably 0.099 or less.

The y' value is −0.1 or more, preferably −0.08 or more, still more preferably −0.05 or more, and most preferably −0.03 or

34 more, and 0.1 or less, preferably 0.08 or less, more preferably 0.05 or less, and most preferably 0.03 or less.

The z' value is (1−x')(0.05−0.98y') or more, preferably (1−x')(0.06−0.98y') or more, more preferably (1−x)(0.07−0.98y') or more, and most preferably (1−x')(0.08−0.98y') or 0.98y') or more, and (1−x')(0.15−0.88y') or less, preferably (1−x') more, preferably (1−x')(0.145−0.88y') or less, more preferably (1−x')(0.14−0.88y'), and most preferably (1−x')(0.13−0.88y') or less. A z' value of less than the lower limit reduces conductivity. A z' value exceeding the upper limit results in an excessively large amount of Li with which the transition-metal sites are replaced, thereby possibly degrading the performance of a lithium secondary battery including the compound, e.g., a reduction in battery capacity. An excessively large z' enhances the carbon-dioxide absorbency of the active-material powder. As a result, the powder easily absorbs carbon dioxide in the atmosphere. It is thus speculated that the carbon content is increased.

In the composition range of the formula (I') described above, the rate and output characteristics when a battery including the compound is produced tend to deteriorate as the z' value approaches the lower limit, which is stoichiometric. In contrast, as the z' value approaches the upper limit, the rate and output characteristics when a battery including the compound is produced tend to be improved, whereas the capacity tends to decrease. As the y' value approaches the lower limit, in other words, as the manganese/nickel atomic ratio approaches one, the capacity can be ensured at a low charging voltage, whereas the cycle characteristics and safety of a battery that can be charged at a high charging voltage tend to deteriorate. In contrast, as the y' value approaches the upper limit, the cycle characteristics and safety of a battery that can be charged at a high charging voltage are improved, whereas the discharge capacity, the rate characteristics, and the output characteristics tend to deteriorate. As the x' value approaches the lower limit, the load characteristics such as the rate and output characteristics tend to deteriorate. In contrast, as the x' value approaches the upper limit, the rate and output characteristics when a battery including the compound is produced tend to be improved. An x' value exceeding the upper limit degrades the cycle characteristics and safety of a battery that can be charged at a high charging voltage and increases material costs. Setting the above-described compositional parameters x', y', and z' within specified ranges is an important point of the present invention.

In the composition of the formula (I') described above, the atomic proportion of oxygen is defined as two for convenience but may be slightly nonstoichiometric. For example, the atomic proportion of oxygen may be in the range of 2±0.1.

The powder of the lithium-nickel-manganese-cobalt composite oxide of the present invention may contain an additional element. The additional element is at least one element selected from B, Na, Mg, Al, Si, K, Ca, Ti, V, Cr, Fe, Cu, Zn, Ga, Ge, Sr, Y, Zr, Nb, Mo, Ru, Ru, Rh, Pd, Ag, In, Sn, Sb, Te, Ba, Ta, W, Ir, Pt, Au, Pb, Bi, La, Ce, Pr, Nd, Sm, Eu, Gd, Tb, Dy, Ho, Er, Tm, Yb, Lu, N, F, P, S, Cl, Br, and I. These additional elements may be incorporated in the crystal structure of the lithium-nickel-manganese-cobalt composite oxide or may be localized as an elementary substance or a compound on surfaces of and grain boundaries in the particles without the incorporation in the crystal structure of the lithium-nickel-manganese-cobalt composite oxide.

The lithium-nickel-manganese-cobalt composite oxide of the present invention has a crystal structure assigned to a layered structure.

The layered structure will be described in detail below. A typical crystal system of the layered compounds such as LiCoO$_2$ and LiNiO$_2$ having the α-NaFeO$_2$ type structure is a hexagonal system that is assigned to the space group "R(−3)m layered structure" (the R(−3)m structure on a layer is as defined in the expression (4) described above) on the basis of symmetry thereof.

The structure of the layered LiMeO$_2$ is not limited to the R(−3)m layered structure. That is, LiMnO$_2$, which is also referred to as layered Mn, belongs to an orthorhombic system and the space group Pm2m. Li$_2$MnO$_3$, which is also referred to as the 213 phase, can also be expressed as Li[Li$_{1/3}$Mn$_{2/3}$]O$_2$, belongs to a monoclinic system and the space group C2/m, and is a layered compound having a Li layer, a [Li$_{1/3}$Mn$_{2/3}$] layer, and an oxygen layer stacked.

Chemical implications of the Li composition (z' and x') in the lithium transition-metal compound of the present invention will be described in detail below.

As described above, the layered structure is not necessarily limited to the R(−3)m structure but is preferably a structure that can be assigned to the R(−3)m structure from the viewpoint of achieving good electrochemical performance.

To determine x', y', and z' in the composition formula of the lithium-nickel-manganese-cobalt composite oxide, the transition metals and Li are analyzed with an inductively coupled plasma-atomic emission spectrometer (ICP-AES) to determine the ratio of Li/Ni/Mn/Co.

From the viewpoint of the structure, Li according to z' is occupy the same transition-metal site. Li according to z' increases an average Ni valence greater than two according to the electroneutrality principle (trivalent Ni formation). Since z' increases the average Ni valence, z' serves as an index of the Ni valence (the proportion of Ni(III)).

From the composition formula described above, the Ni valence (m) when z' changes is determined to be m=2z'/{(1−y)(1−3x)}+2, provided that Co has a valence of three and Mn has a valence of four. This shows that the Ni valence is not determined only by z' but is a function of x' and y'. When z'=0 and y'=0, the Ni valence remains two regardless of the x' value. When z' represents a negative value, the amount of Li in an active material is less than the stoichiometric amount. Possibly, a compound having an excessively large negative value does not produce the effect of the present invention. Furthermore, the equation shows that even when z' remains constant, a higher Ni content (increase in y') and/or a higher Co content (increase in x') of the composition results in a higher Ni valence. Use of such a compound in a battery improves rate and output characteristics but is liable to cause a reduction in capacity. Therefore, the upper limit and lower limit of the z' value are preferably defined as functions of x' and y'.

When 0≦x'≦0.1, i.e., when the Co content is low, the costs are reduced. Furthermore, the use of the compound in a lithium secondary battery that is designed to be charged at a high charging potential improves the charge/discharge capacity, cycle characteristics, and the level of safety.

As described above, a known battery including the powder of the lithium-nickel-manganese-cobalt composite oxide having the above composition as that of a positive-electrode active material disadvantageously has poor rate and output characteristics. In contrast, the lithium-nickel-manganese-cobalt composite oxide has high crystallinity and a significantly low heterophase content and exhibits a large amount of mercury intruded under pressure in a mercury intrusion curve and has large pore volumes between crystal particles. Thus, the use of the oxide of the present invention for a battery increases the contact area between the surface of the positive-electrode active material and an electrolytic solution or a conductive aid, thereby improving load characteristics required for a positive-electrode active material.

<Powder X-Ray Diffraction Peak>

The powder of the lithium-nickel-manganese-cobalt composite oxide of the present invention is characterized in that in powder X-ray diffraction measurement using CuKα radiation, 0.01≦FWHM (110)≦0.2, where FWHM (110) represents the half-width of the (110) diffraction peak observed at a diffraction angle 2θ of about 64.5°.

In general, the half-width of an X-ray diffraction peak is used as a measure of crystallinity. The inventors have conducted intensive studies on the correlation between crystallinity and battery performance and have found that when the value of the half-width of the (110) diffraction peak at a diffraction angle 2θ of about 64.5° is in a specified range, a satisfactory battery performance is provided.

In the present invention, FWHM (110) is usually 0.01 or more, preferably 0.05 or more, more preferably 0.10 or more, still more preferably 0.12 or more, and most preferably 0.14 or more, and 0.2 or less, preferably 0.196 or less, more preferably 0.19 or less, and most preferably 0.185 or less.

In the powder of the lithium-nickel-manganese-cobalt composite oxide, preferably, in powder X-ray diffraction measurement using CuKα radiation, no diffraction peak from a heterophase is observed on the higher-angle side of the peak top of each of the (018) diffraction peak at a diffraction angle 2θ of about 64°, the (110) diffraction peak at a diffraction angle 2θ of about 64.5°, and the (113) diffraction peak at a diffraction angle 2θ of about 68°, or in the case where a diffraction peak from a heterophase is observed, the ratio of the integrated intensity of the diffraction peak from the heterophase to the integrated intensity of a corresponding one of the diffraction peaks from a target crystal phase is within ranges described below:

$$0 \leq I_{018*}/I_{018} \leq 0.20,$$

$$0 \leq I_{110*}/I_{110} \leq 0.25, \text{ and}$$

$$0 \leq I_{113*}/I_{113} \leq 0.30,$$

where $I_{018}$ represents the integrated intensity of the (018) diffraction peak, $I_{110}$ represents the integrated intensity of the (110) diffraction peak, $I_{113}$ represents the integrated intensity of the (113) diffraction peak, $I_{018*}$ represents the integrated intensity of the diffraction peak from the heterophase observed on the higher-angle side of the peak top of the (018) diffraction peak, $I_{110*}$ represents the integrated intensity of the diffraction peak from the heterophase observed on the higher-angle side of the peak top of the (110) diffraction peak, and $I_{113*}$ represents the integrated intensity of the diffraction peak from the heterophase observed on the higher-angle side of the peak top of the (113) diffraction peak.

Details of a material exhibiting the diffraction peak from the heterophase are not clear. The inclusion of the heterophase impairs the capacity, rate characteristics, cycling characteristics, and the like. Thus, the diffraction peak may be included in the range in which the diffraction peak does not cause adversely effect on the performance of a battery of the present invention. Preferably, the diffraction peak is in the range described above. The ratios of the integrated intensities of the diffraction peaks from the heterophase to the integrated intensities of the respective diffraction peaks are $I_{018*}/I_{018} \leq 0.20$, $I_{110*}/I_{110} \leq 0.25$, and $I_{113*}/I_{113} \leq 0.30$, preferably $I_{018*}/I_{018} \leq 0.15$, $I_{110*}/I_{110} \leq 0.20$, and $I_{113*}/I_{113} \leq 0.25$, more preferably $I_{018*}/I_{018} \leq 0.10$, $I_{110*}/I_{110} \leq 0.16$, and $I_{113*}/I_{113} \leq 0.20$, and still more preferably $I_{018*}/I_{018} \leq 0.05$, $I_{110*}/$ $I_{110} \leq 0.10$, and $I_{113*}/I_{113} \leq 0.15$. Most preferably, the diffraction peaks derived from the heterophase are not observed.

<Pore Characteristics Based on Mercury Intrusion Porosimetry>

The powder of the lithium-nickel-manganese-cobalt composite oxide for a positive-electrode material in a lithium secondary battery according to the present invention preferably satisfies specific requirements in measurement by mercury intrusion porosimetry.

Mercury intrusion porosimetry employed for the evaluation of the powder of the lithium-nickel-manganese-cobalt composite oxide of the present invention is as described above.

With respect to the particles of the present invention, in a mercury intrusion curve obtained by mercury intrusion porosimetry, the amount of mercury intruded is preferably in the range of 0.7 cm$^3$/g to 1.5 cm$^3$/g when the pressure is increased from 3.86 kPa to 413 MPa. The amount of mercury intruded is more preferably 0.74 cm$^3$/g or more, still more preferably 0.8 cm$^3$/g or more, and most preferably 0.9 cm$^3$/g or more, and more preferably 1.4 cm$^3$/g or less, still more preferably 1.3 cm$^3$/g or less, and most preferably 1.2 cm$^3$/g or less. In the case where the amount of mercury intruded exceeds the upper limit of the above range, pores are excessively large. In this case, the use of the powder of the lithium-nickel-manganese-cobalt composite oxide of the present invention as that of a positive-electrode material reduces the filling rate of a positive-electrode active material into a positive-electrode plate (current collector of the positive electrode), thus disadvantageously limiting battery capacity. In the case where the amount of mercury intruded is less than the lower limit of the above range, pores among particles are excessively small. When a battery including the powder of the lithium-nickel-manganese-cobalt composite oxide of the present invention as that of a positive-electrode material is produced, lithium diffusion among particles is inhibited, thereby degrading load characteristics.

In the powder of the lithium-nickel-manganese-cobalt composite oxide of the present invention, when a pore-size distribution curve is measured by mercury intrusion porosimetry described above, a specific main peak described below is usually observed.

The terms "pore-size distribution curve", "main peak", "sub-peak", and "peak top" are as described above.

<Main Peak>

The peak top of the main peak in the pore-size distribution curve according to the present invention is observed at a pore radius of usually 300 nm or more, preferably 350 nm or more, and most preferably 400 nm or more, and usually 1,000 nm or less, preferably 980 nm or less, more preferably 970 nm or less, still more preferably 960 nm or less, and most preferably 950 nm or less. In the case where the peak top is observed at a pore radius exceeding the upper limit of the above range, when a battery including such a powder of the lithium-nickel-manganese-cobalt composite oxide of the present invention as that of a positive-electrode material is produced, load characteristics may be degraded because of inhibition of lithium diffusion in the positive electrode or the lack of conductive paths. In the case where the peak top is observed at a pore radius of less than the lower limit in the above range, when a battery including such a powder of the lithium-nickel-manganese-cobalt composite oxide of the present invention as that of a positive-electrode material is produced, the filling rate of the positive-electrode active material into a positive-electrode plate (current collector of the positive electrode) may be limited because of an increase in the amounts of conductive material and binder required, thereby limiting battery capacity. Furthermore, such particles have smaller diameters. Thus, a coating layer including the particles is hard or brittle and is likely to detach from the positive electrode during a winding step in the battery production process.

In the pore-size distribution curve according to the present invention, the pore volume of the main peak with a peak top that is present at a pore radius of 300 nm to 1,000 nm is usually 0.3 cm$^3$/g or more, preferably 0.35 cm$^3$/g or more, more preferably 0.4 cm$^3$/g or more, and most preferably 0.5 cm$^3$/g or more, and usually 1.0 cm$^3$/g or less, preferably 0.8 cm$^3$/g or less, 0.7 cm$^3$/g or less, and most preferably 0.6 cm$^3$/g or less. In the case where the pore volume exceeds the upper limit of the above range, pores are excessively large. In this case, the use of such a powder of the lithium-nickel-manganese-cobalt composite oxide of the present invention as that of a positive-electrode material may reduce the filling rate of a positive-electrode active material into a positive-electrode plate, thus disadvantageously limiting battery capacity. In the case where the pore volume is less than the lower limit of the above range, pores among particles are excessively small. When a battery including such a powder of the lithium-nickel-manganese-cobalt composite oxide of the present invention as that of a positive-electrode material is produced, lithium diffusion among secondary particles may be inhibited, thereby reducing load characteristics.

<Sub-Peak>

The pore-size distribution curve according to the present invention may have a plurality of sub-peaks in addition to the main peak. In this case, preferably, the sub-peaks are not observed in the pore-radius range of 80 nm to 300 nm.

<Reason that Powder of Lithium-Nickel-Manganese-Cobalt Composite Oxide of the Invention has Effect Described Above>

Details of reasons that the powder of the lithium-nickel-manganese-cobalt composite oxide of the present invention has the effect described above are not clear. The powder of the lithium-nickel-manganese-cobalt composite oxide has a high crystallinity, an optimum composition, and an appropriately large pore volume. Thus, the use of the powder in a battery increases the contact area between the surface of the positive-electrode active material and an electrolytic solution. It is therefore speculated that the load characteristics required for the positive-electrode active material are improved.

[Other Preferred Embodiments]

Other characteristics of the powder of the lithium-nickel-manganese-cobalt composite oxide of the present invention will be described in detail below. The following descriptions are merely of preferred embodiments. Other characteristics of the powder of the lithium-nickel-manganese-cobalt composite oxide of the present invention are not particularly limited as long as the powder has the characteristics described above.

<Median Diameter and 90% Cumulative Diameter ($D_{90}$)>

The median diameter of the powder of the lithium-nickel-manganese-cobalt composite oxide of the present invention is usually 1 μm or more, preferably 1.2 μm or more, more preferably 1.5 μm or more, and most preferably 2 μm or more, and usually 5 μm or less, 4.5 μm or less, more preferably 4 μm or less, more preferably 3.8 μm or less, and most preferably 3.5 μm or less. A median diameter of less than the lower limit may cause a problem of coatability in forming a positive-electrode-material layer. A median diameter exceeding the upper limit may degrade battery performance.

The 90% cumulative diameter ($D_{90}$) of secondary particles of the powder of the lithium-nickel-manganese-cobalt composite oxide of the present invention is usually 10 μm or less, preferably 9 μm or less, more preferably 8 μm or less, and most preferably 7 µm or less, and usually 1 µm or more, preferably 2 µm or more, more preferably 3 µm or more, and most preferably 3.5 µm or more. A 90% cumulative diameter exceeding the upper limit may degrade battery performance. A 90% cumulative diameter of less than the lower limit may cause a problem of coatability in forming a positive-electrode-material layer.

The median diameter as an average particle diameter and the 90% cumulative diameter ($D_{90}$) are determined as described above.

<Bulk Density>

The bulk density of the powder of the lithium-nickel-manganese-cobalt composite oxide of the present invention is usually 0.5 g/cc or more, preferably 0.6 g/cc or more, more preferably 0.7 g/cc or more, and most preferably 0.8 g/cc or more, and usually 1.7 g/cc or less, preferably 1.6 g/cc or less, more preferably 1.5 g/cc or less, and most preferably 1.3 g/cc or less. A bulk density exceeding the upper limit is preferred in order to improve powder packing and the density of the electrode but may result in an excessively small specific surface area to degrade battery performance. A bulk density of less than the lower limit may adversely affect powder packing and electrode preparation.

The bulk density is measured as described above.

<BET Specific Surface Area>

The BET specific surface area of the powder of the lithium-nickel-manganese-cobalt composite oxide is usually 1.4 m²/g or more, preferably 1.5 m²/g or more, more preferably 1.6 m²/g or more, and most preferably 1.7 m²/g or more, and usually 3 m²/g or less, preferably 2.8 m²/g or less, more preferably 2.5 m²/g or less, and most preferably 2.3 m²/g or less. A BET specific surface area of less than the above range is liable to cause the deterioration of battery performance. A BET specific surface area exceeding the above range may prevent an increase in bulk density and is thus liable to cause a problem of coatability in forming a positive-electrode active material.

The BET specific surface area is measured as described above.

<Carbon Content C>

The carbon content C (% by weight) of the powder of the lithium-nickel-manganese-cobalt composite oxide is usually 0.005% by weight or more, preferably 0.01% by weight or more, more preferably 0.015% by weight or more, and most preferably 0.02% by weight or more, and usually 0.05% by weight or less, preferably 0.045% by weight or less, more preferably 0.04% by weight or less, and most preferably 0.035% by weight or less. A carbon content C of less than the lower limit may degrade battery performance. A carbon content C exceeding the upper limit may increase the expansion of a battery including such a powder due to gas generation and degrade battery performance.

The carbon content C (% by weight) of the powder of the lithium-nickel-manganese-cobalt composite oxide is measured as described above.

In the case where the powder is combined with conductive carbon in order to further enhance electron conductivity, a C content outside the specified range described above may be detected. The C value of the powder of the lithium-nickel-manganese-cobalt composite oxide subjected to such treatment is not limited to the specified range described above.

In the powder of the lithium-nickel-manganese-cobalt composite oxide according to the present invention, lithium that is in the form of a carbonate is present in a very small amount and thus does not have an effect on the specified lithium composition (z) of the composite-oxide powder.

<Average Primary-Particle Diameter>

The average primary-particle diameter of the powder of the lithium-nickel-manganese-cobalt composite oxide of the present invention is preferably in the range of 0.05 µm to 1 µm. The lower limit is more preferably 0.1 µm or more, more preferably 0.15 µm or more, and most preferably 0.2 µm or more. The upper limit is more preferably 0.8 µm or less, more preferably 0.7 µm or less, and most preferably 0.5 µm or less. An average primary-particle diameter exceeding the upper limit exerts an adverse influence upon powder packing and reduces the specific surface area, thereby increasing the possibility that battery performance such as rate and output characteristics are degraded. An average primary-particle diameter of less than the lower limit may disadvantageously result in poor charge/discharge reversibility due to insufficient crystal growth.

The average primary-particle diameter (average particle diameter of primary particles) is measured as described above.

<Volume Resistivity>

The lower limit of the volume resistivity of the powder of the lithium-nickel-manganese-cobalt composite oxide of the present invention, the powder being compacted at a pressure of 40 MPa, is preferably $1\times10^3$ Ω·cm or more, more preferably $5\times10^3$ Ω·cm or more, and still more preferably $1\times10^4$ Ω·cm or more. The upper limit of the volume resistivity is preferably $1\times10^6$ Ω·cm or less, more preferably $5\times10^5$ Ω·cm or less, and more preferably $1\times10^6$ Ω·cm or less. A volume resistivity exceeding the upper limit may degrade load characteristics of a battery including the compound. A volume resistivity of less than the lower limit may degrade the safety etc. of a battery including the compound.

The volume resistivity is measured as described above.

A powder of a lithium transition-metal compound for a positive-electrode material in a lithium secondary battery according to the present invention will be described in detail below, in which the powder is composed of a lithium transition-metal compound, as a main component, capable of intercalating and deintercalating lithium ions, and the powder is prepared by incorporating at least one additive that inhibits grain growth and sintering during firing in the main component in an amount greater than or equal to 0.01 mol % and less than 2 mol % with respect to the total molar amount of the transition-metal elements in the main component and then performing firing.

[Powder of Lithium Transition-Metal Compound]

A powder of a lithium transition-metal compound (hereinafter, also referred to as a "positive-electrode active material") for a positive-electrode material in a lithium secondary battery of the present invention is characterized by containing a transition-metal compound, as a main component, capable of intercalating and deintercalating lithium ions, in which the powder is prepared by incorporating at least one additive that inhibits grain growth and sintering during firing in the main component in an amount greater than or equal to 0.01 mol % and less than 2 mol % with respect to the total molar amount of the transition-metal elements in the main component and then performing firing.

<Lithium Transition-Metal Compound>

The lithium transition-metal compound of the present invention represents a compound having a structure capable of intercalating and deintercalating lithium ions. Examples thereof include sulfides, phosphate compounds, and lithium transition-metal composite oxides. Examples of sulfides, phosphate compounds, and lithium transition-metal composite oxides are the same as described above.

The powder of the lithium transition-metal compound of the present invention preferably has a crystal structure assigned to an olivine structure, a spinel structure, or a layered structure from the viewpoint of the diffusion of lithium ions. In particular, the compound having a crystal structure assigned to a layered structure is particularly preferred.

The powder of the lithium transition-metal compound of the present invention may contain an additional element. The additional element is at least one element selected from B, Na, Mg, Al, Si, K, Ca, Ti, V, Cr, Fe, Cu, Zn, Ga, Ge, Sr, Y, Zr, Ru, Rh, Pd, Ag, In, Sn, Sb, Te, Ba, Os, Ir, Pt, Au, Pb, Bi, La, Ce, Pr, Nd, Sm, Eu, Gd, Tb, Dy, Ho, Er, Tm, Yb, Lu, N, F, P, S, Cl, Br, and I. These additional elements may be incorporated in the crystal structure of the lithium transition-metal compound or may be localized as an elementary substance or a compound on surfaces of and grain boundaries in the particles without the incorporation in the crystal structure of the lithium transition-metal compound.

<Additive Inhibiting Grain Growth and Sintering During Firing>

In the present invention, "additive that inhibits grain growth and sintering during firing" inhibits the sintering between primary particles or secondary particles during firing at a high temperature to suppress the growth of particles of the active material, thereby providing a fine powder having many pores and high crystallinity.

For example, in the case where the powder of the lithium-nickel-manganese-cobalt composite oxide having the composition specified by the suitable composition formula (I") of the present invention is produced, a mixture of solid powder materials is fired at a temperature of 970° C. or higher to produce a positive-electrode active material having high crystallinity and a crystal structure suitable for battery performance. However, grain growth and sintering proceed very easily, thus providing a powder unsuitable for battery performance. In other words, it is extremely difficult to improve both properties. However, the trade-off relationship can be overcome by incorporating the "additive that inhibits grain growth and sintering during firing" in the mixture and firing the mixture.

In the present invention, a mechanism in which a specific compound serving as the additive that inhibits grain growth and sintering during firing produces the effect of inhibiting grain growth and sintering during firing is not clear. As examples, compound containing metal elements capable of exhibiting a valence of five or six commonly produce the effect. Unlike the cationic elements constituting the lithium transition-metal compound, these metal elements can stably have higher valent states, e.g., pentavalent to heptavalent states, and do not form a solid solution by solid-phase reaction, so that these metal elements are localized on surfaces of or grain boundaries in the particles of the lithium transition-metal compound. It is therefore speculated that mass transfer between the positive-electrode active material particles in contact with each other is inhibited to suppress the growth and sintering of the particles.

Any type of the additive may be used as long as it produces the effect described above. A compound containing an element selected from Mo, W, Nb, Ta, and Re, which are stably present in higher valence states, is preferred. Two or more of these elements may be appropriately combined. As a compound containing such an element, an oxide material is usually used.

Examples of the compounds that can be used as the additive include $MoO$, $MoO_2$, $MoO_3$, $MoO_x$, $Mo_2O_3$, $Mo_2O_5$, $Li_2MoO_4$, $WO$, $WO_2$, $WO_3$, $WO_x$, $W_2O_3$, $W_2O_5$, $W_{18}O_{49}$, $W_{20}O_{58}$, $W_{24}O_{70}$, $W_{25}O_{73}$, $W_{40}O_{118}$, $Li_2WO_4$, $NbO$, $NbO_2$, $Nb_2O$, $Nb_2O_5$, $Nb_4O$, $Nb_6O$, $LiNbO_3$, $TaO$, $TaO_2$, $Ta_2O_5$, $LiTaO_3$, $ReO_2$, $ReO_3$, and $Re_2O_3$. Preferred examples thereof include $MoO_3$, $Li_2MoO_4$, $WO_3$, $Li_2WO_4$, $LiNbO_3$, $Ta_2O_5$, $LiTaO_3$, and $ReO_3$. Particularly preferred examples thereof include $WO_3$, $Li_2WO_4$, and $ReO_3$.

The amount of the additive added is usually 0.01 mol % or more, preferably 0.03 mol % or more, more preferably 0.04 mol % or more, particularly preferably 0.05 mol % or more, and usually less than 2 mol %, preferably 1.8 mol % or less, more preferably 1.5 mol % or less, and particularly preferably 1.3 mol % or less, with respect to the total molar amount of the transition-metal elements constituting the main component. At an amount less than the lower limit, possibly, the above effect is not produced. At an amount exceeding the upper limit, battery performance may be degraded.

The powder of the lithium transition-metal compound of the present invention is characterized in that an element (additive element) from the additive, i.e., at least one element selected from Mo, W, Nb, Ta, and Re, is preferably localized on surfaces of primary particles of the compound. Specifically, the molar ratio of the total amount of the additive element to the total amount of metal elements except Li and the additive element on the surfaces of the primary particles (namely, metal elements other than Li and the additive element) is usually five or more times the atomic ratio of the total amount of the additive element to the total amount of the metal elements except Li and the additive element in the entire particles. The lower limit of the ratio is preferably seven times or more, more preferably eight times or more, and particularly preferably nine times or more. The upper limit is usually not limited but preferably 150 times or less, more preferably 100 times or less, particularly preferably 50 times or less, and most preferably 30 times or less. An excessively small ratio results in a low effect of improving battery performance. An excessively large ratio may impair battery performance.

The surface composition of the primary particles of the powder of the lithium transition-metal compound is analyzed by X-ray photoelectron spectroscopy (XPS) using a monochromatic AlKα X-ray source under the conditions: analysis area: 0.8 mm in diameter, and take-off angle: 65°. An analyzable range (depth) varies depending on the composition of the primary particles but is usually 0.1 nm to 50 nm. In particular, for the positive-electrode active material, the range is usually 1 nm to 10 nm. In the present invention, therefore, the surfaces of the primary particles of the powder of the lithium transition-metal compound represent a measurable region under the conditions.

<Median Diameter and 90% Cumulative Diameter ($D_{90}$)>

The median diameter of the powder of the lithium transition-metal compound of the present invention is usually 0.1 μm or more, preferably 0.3 μm or more, more preferably 0.6 μm or more, still more preferably 0.8 μm or more, and most preferably 1.2 μm or more, and usually 5 μm or less, preferably 4 μm or less, more preferably 3 μm or less, still more preferably 2.8 μm or less, and most preferably 2.5 μm or less. A median diameter of less than the lower limit may cause a problem of coatability in forming a positive-electrode-material layer. A median diameter exceeding the upper limit may degrade battery performance.

The 90% cumulative diameter ($D_{90}$) of secondary particles of the powder of the lithium transition-metal compound of the present invention is usually 10 μm or less, preferably 8 μm or less, more preferably 6 μm or less, and most preferably 5 μm or less, and usually 0.5 μm or more, preferably 0.8 μm or more, more preferably 1 μm or more, and most preferably 1.5 μm or more. A 90% cumulative diameter exceeding the upper limit may degrade battery performance. A 90% cumulative diameter of less than the lower limit may cause a problem of coatability in forming a positive-electrode-material layer.

The median diameter as an average particle diameter and the 90% cumulative diameter ($D_{90}$) are determined as described above.

<Average Primary-Particle Diameter>

The average diameter of primary particles (average primary-particle diameter) of the powder of the lithium transition-metal compound of the present invention is not particularly limited. The lower limit is preferably 0.1 μm or more, more preferably 0.15 μm or more, still more preferably 0.2 μm or more, and most preferably 0.25 μm or more. The upper limit is preferably 0.9 μm or less, more preferably 0.8 μm or less, still more preferably 0.7 μm or less, and most preferably 0.5 μm or less. An average primary-particle diameter exceeding the upper limit exerts an adverse influence upon powder packing and reduces the specific surface area, thereby increasing the possibility that battery performance such as rate and output characteristics are degraded. An average primary-particle diameter of less than the lower limit may disadvantageously result in poor charge/discharge reversibility due to insufficient crystal growth.

In the present invention, the average primary-particle diameter is determined as described above.

<BET Specific Surface Area>

The BET specific surface area of the powder of the lithium transition-metal compound of the present invention is usually 1.5 $m^2/g$ or more, preferably 1.6 $m^2/g$ or more, more preferably 1.7 $m^2/g$ or more, and most preferably 1.8 $m^2/g$ or more, and usually 5 $m^2/g$ or less, preferably 4 $m^2/g$ or less, more preferably 3.5 $m^2/g$ or less, and most preferably 3 $m^2/g$ or less. A BET specific surface area of less than the above range is liable to cause the deterioration of battery performance. A BET specific surface area exceeding the above range may prevent an increase in bulk density and is thus liable to cause a problem of coatability in forming a positive-electrode active material.

The BET specific surface area is measured as described above.

<Pore Characteristics Based on Mercury Intrusion Porosimetry>

The powder of the lithium transition-metal compound for a positive-electrode material in a lithium secondary battery according to the present invention preferably satisfies specific requirements in measurement by mercury intrusion porosimetry. Mercury intrusion porosimetry employed for the evaluation of the powder of the powder of the lithium transition-metal compound of the present invention is as described above.

With respect to the powder of the lithium transition-metal compound of the present invention, in a mercury intrusion curve obtained by mercury intrusion porosimetry, the amount of mercury intruded is preferably in the range of 0.7 $cm^3/g$ to 1.5 $cm^3/g$ when the pressure is increased from 3.86 kPa to 413 MPa. The amount of mercury intruded is more preferably 0.74 $cm^3/g$ or more, still more preferably 0.8 $cm^3/g$ or more, and most preferably 0.9 $cm^3/g$ or more, and more preferably 1.4 $cm^3/g$ or less, still more preferably 1.3 $cm^3/g$ or less, and most preferably 1.2 $cm^3/g$ or less. In the case where the amount of mercury intruded exceeds the upper limit of the above range, pores are excessively large. In this case, the use of the powder of the lithium transition-metal compound of the present invention as that of a positive-electrode material reduces the filling rate of a positive-electrode active material into a positive-electrode plate (current collector of the positive electrode), thus disadvantageously limiting battery capacity. In the case where the amount of mercury intruded is less than the lower limit of the above range, pores among particles are excessively small. When a battery including the powder of the lithium transition-metal compound of the present invention as that of a positive-electrode material is produced, lithium diffusion among particles is inhibited, thereby degrading load characteristics.

In the powder of the lithium transition-metal compound of the present invention, when a pore-size distribution curve is measured by mercury intrusion porosimetry described above, a specific main peak described below is usually observed.

The definitions of "pore-size distribution curve", "pore-size distribution curve according to the present invention", "main peak", "sub-peak", and "peak top" are as described above.

<Main Peak>

The peak top of the main peak in the pore-size distribution curve according to the present invention is observed at a pore radius of usually 300 nm or more, preferably 350 nm or more, and most preferably 400 nm or more, and usually 1,000 nm or less, preferably 980 nm or less, more preferably 970 nm or less, still more preferably 960 nm or less, and most preferably 950 nm or less. In the case where the peak top is observed at a pore radius exceeding the upper limit of the above range, when a battery including such a powder of the lithium transition-metal compound of the present invention as that of a positive-electrode material is produced, load characteristics may be degraded because of inhibition of lithium diffusion in the positive electrode or the lack of conductive paths. In the case where the peak top is observed at a pore radius of less than the lower limit in the above range, when a battery including such a powder of the lithium transition-metal compound of the present invention as that of a positive-electrode material is produced, the filling rate of the positive-electrode active material into a positive-electrode plate (current collector of the positive electrode) may be limited because of an increase in the amounts of conductive material and binder required, thereby limiting battery capacity. Furthermore, such particles have smaller diameters. Thus, a coating layer including the particles is hard or brittle and is likely to detach from the positive electrode during a winding step in the battery production process.

In the pore-size distribution curve according to the present invention, the pore volume of the main peak with a peak top that is present at a pore radius of 300 nm to 1,000 nm is usually 0.4 $cm^3/g$ or more, preferably 0.41 $cm^3/g$ or more, more preferably 0.42 $cm^3/g$ or more, and most preferably 0.43 $cm^3/g$ or more, and usually 1 $cm^3/g$ or less, preferably 0.8 $cm^3/g$ or less, more preferably 0.7 $cm^3/g$ or less, and most preferably 0.6 $cm^3/g$ or less. In the case where the pore volume exceeds the upper limit of the above range, pores are excessively large. In this case, the use of such a powder of the lithium transition-metal compound of the present invention as that of a positive-electrode material may reduce the filling rate of a positive-electrode active material into a positive-electrode plate, thus disadvantageously limiting battery capacity. In the case where the pore volume is less than the lower limit of the above range, pores among particles are excessively small. When a battery including such a powder of the lithium transition-metal compound of the present invention as that of a positive-electrode material is produced, lithium diffusion among secondary particles may be inhibited, thereby reducing load characteristics.

<Sub-Peak>

The pore-size distribution curve according to the present invention may have a plurality of sub-peaks in addition to the main peak. In this case, preferably, the sub-peaks are not observed in the pore-radius range of 80 nm to 300 nm.

<Bulk Density>

The bulk density of the powder of the lithium transition-metal compound of the present invention is usually 0.5 g/cc or more, preferably 0.6 g/cc or more, more preferably 0.7 g/cc or more, and most preferably 0.8 g/cc or more, and usually 1.7 g/cc or less, preferably 1.6 g/cc or less, more preferably 1.5 g/cc or less, and most preferably 1.3 g/cc or less. A bulk density exceeding the upper limit is preferred in order to improve powder packing and the density of the electrode but may result in an excessively small specific surface area to degrade battery performance. A bulk density of less than the lower limit may adversely affect powder packing and electrode preparation.

The bulk density is measured as described above.

<Volume Resistivity>

The lower limit of the volume resistivity of the powder of the lithium transition-metal compound of the present invention, the powder being compacted at a pressure of 40 MPa, is preferably $1 \times 10^3$ Ω·cm or more, more preferably $5 \times 10^3$ Ω·cm or more, and still more preferably $1 \times 10^4$ Ω·cm or more. The upper limit of the volume resistivity is preferably $1 \times 10^6$ Ω·cm or less, more preferably $5 \times 10^5$ Ω·cm or less, and more preferably $1 \times 10^6$ Ω·cm or less. A volume resistivity exceeding the upper limit may degrade load characteristics of a battery including the compound. A volume resistivity of less than the lower limit may degrade the safety etc. of a battery including the compound.

The volume resistivity is measured as described above.

<Crystal Structure>

Preferably, the powder of the lithium transition-metal compound of the present invention mainly contains a lithium-nickel-manganese-cobalt composite oxide having a crystal structure assigned to a layered structure.

A typical crystal system of the layered compounds having the α-NaFeO$_2$ type structure described above is a hexagonal system that is assigned to the space group "R(−3)m layered structure" on the basis of symmetry thereof.

The structure of the layered LiMeO$_2$ is not limited to the R(−3)m layered structure as described above.

<Composition>

The powder of the lithium transition-metal compound of the present invention is preferably a powder of a lithium transition-metal compound represented by the composition formula (I") described below.

LiMO$_2$         (I")

where M represents Li, Ni, and Mn, or M represents Li, Ni, Mn, and Co. The Mn/Ni molar ratio is usually 0.8 or more, preferably 0.82 or more, more preferably 0.85 or more, still more preferably 0.88 or more, and most preferably 0.9 or more, and usually 5 or less, preferably 4 or less, more preferably 3 or less, still more preferably 2.5 or less, and most preferably 1.5 or less. The Co/(Mn+Ni+Co) molar ratio is usually 0 or more, preferably 0.01 or more, more preferably 0.02 or more, still more preferably 0.03 or more, and most preferably 0.05 or more, and usually 0.30 or less, preferably 0.20 or less, more preferably 0.15 or less, still more preferably 0.10 or less, and most preferably 0.099 or less. The ratio of Li to M is 0.001 or more, preferably 0.01 or more, more preferably 0.02 or more, still more preferably 0.03 or more, and most preferably 0.05 or more, and usually 0.2 or less, preferably 0.19 or less, more preferably 0.18 or less, still more preferably 0.17 or less, and most preferably 0.15 or less.

In the composition of the formula (I") described above, the atomic proportion of oxygen is described as two for convenience but may be slightly nonstoichiometric. If there is non-stoichiometry, the atomic proportion of oxygen is usually in the range of 2±0.2, preferably 2±0.15, more preferably 2±0.12, still more preferably 2±0.10, and particularly preferably 2±0.05.

The powder of the lithium transition-metal compound of the present invention is preferably fired at a high temperature in an oxygen-containing gas atmosphere in order to enhance the crystallinity of the positive-electrode active material. In particular, for the lithium-nickel-manganese-cobalt composite oxide having the composition represented by the composition formula (I"), the lower limit of the firing temperature is usually 970° C. or more, preferably 975° C. or more, more preferably 980° C. or more, still more preferably 985° C. or more, and most preferably 990° C. or more. The upper limit of the firing temperature is usually 1,200° C. or less, preferably 1,175° C. or less, more preferably 1,150° C. or less, and most preferably 1,125° C. or less. An excessively low firing temperature forms a heterophase and increases lattice distortion due to an insufficiently-developed crystal structure. Furthermore, the specific surface area is too large. An excessively high firing temperature results in excessively grown primary particles, so that sintering proceeds excessively between particles, thereby resulting in an excessively small specific surface area.

<Carbon Content C>

The carbon content C (% by weight) of the powder of the lithium transition-metal compound of the present invention is usually 0.005% by weight or more, preferably 0.01% by weight or more, more preferably 0.015% by weight or more, and most preferably 0.02% by weight or more, and usually 0.05% by weight or less, preferably 0.045% by weight or less, more preferably 0.04% by weight or less, and most preferably 0.035% by weight or less. A carbon content C of less than the lower limit may degrade battery performance. A carbon content C exceeding the upper limit may increase the expansion of a battery including such a powder due to gas generation and degrade battery performance.

In the present invention, the powder of the lithium transition-metal compound is determined as described above.

The carbon content of the powder of the lithium transition-metal compound determined by carbon analysis described below can be regarded as an indicator of information about the amount of a carbonate compound, in particular, lithium carbonate attached. The reason for this is as follows: a carbonate ion concentration calculated on the assumption that the amount of carbon determined by carbon analysis is completely derived from carbonate ions agrees substantially with a carbonate ion concentration determined by ion chromatography.

In the case where the powder is combined with conductive carbon in order to further enhance electron conductivity, a C content outside the specified range described above may be detected. The C value when such treatment is performed is not limited to the specified range described above.

<Preferred Composition>

In the powder of the lithium transition-metal compound for a positive-electrode material in a lithium secondary battery according to the present invention, M in the composition formula (I") is particularly preferably represented by the formula (II'):

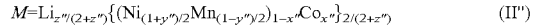

$$M=Li_{z''/(2+z'')}\{(Ni_{(1+y'')/2}Mn_{(1-y'')/2})_{1-x'}Co_{x''}\}_{2/(2+z'')} \quad (II'')$$

where
0≦x"≦0.1,
−0.1≦y"≦0.1, and
(1−x")(0.05−0.98y")≦z"≦(1−x")(0.20−0.88y").

In the formula (II"), the x" value is 0 or more, preferably 0.01 or more, more preferably 0.02 or more, still more preferably 0.03 or more, and most preferably 0.04 or more, and usually 0.1 or less, preferably 0.099 or less, and most preferably 0.098 or less.

The y" value is usually −0.1 or more, preferably −0.05 or more, more preferably −0.03 or more, and most preferably −0.02 or more, and usually 0.1 or less, preferably 0.05 or less, more preferably 0.03 or less, and most preferably 0.02 or less.

The z" value is usually (1−x")(0.05−0.98y") or more, preferably (1−x")(0.06−0.98y") or more, more preferably (1−x")(0.07−0.98y") or more, still more preferably (1−x")(0.08−0.98y") or more, and most preferably (1−x")(0.10−0.98y') or more, and usually (1−x")(0.20−0.88y") or less, preferably (1−x")(0.18−0.88y") or less, more preferably (1−x")(0.17−0.88y"), and most preferably (1−x")(0.16−0.88y") or less. A z" value of less than the lower limit reduces conductivity. A z" value exceeding the upper limit results in an excessively large amount of Li with which the transition-metal sites are replaced, thereby possibly degrading the performance of a lithium secondary battery including the compound, e.g., a reduction in battery capacity. An excessively large z" enhances the carbon-dioxide absorbency of the active-material powder. As a result, the powder easily absorbs carbon dioxide in the atmosphere. It is thus speculated that the carbon content is increased.

In the composition range of the formula (II") described above, the rate and output characteristics when a battery including the compound is produced tend to deteriorate as the z" value approaches the lower limit, which is stoichiometric. In contrast, as the z" value approaches the upper limit, the rate and output characteristics when a battery including the compound is produced tend to be improved, whereas the capacity tends to decrease. As the y" value approaches the lower limit, in other words, as the manganese/nickel atomic ratio approaches one, the capacity can be ensured at a low charging voltage, whereas the cycle characteristics and safety of a battery that can be charged at a high charging voltage tend to deteriorate. In contrast, as the y" value approaches the upper limit, the cycle characteristics and safety of a battery that can be charged at a high charging voltage are improved, whereas the discharge capacity, the rate characteristics, and the output characteristics tend to deteriorate. As the x" value approaches the lower limit, the load characteristics such as the rate and output characteristics tend to deteriorate. In contrast, as the x" value approaches the upper limit, the rate and output characteristics when a battery including the compound is produced tend to be improved. An x" value exceeding the upper limit degrades the cycle characteristics and safety of a battery that can be charged at a high charging voltage and increases material costs. Setting the above-described compositional parameters x", y", and z" within specified ranges is an important point of the present invention.

Chemical implications of the Li composition (z" and x") in the lithium-nickel-manganese-cobalt composite oxide, which is a suitable composition of the powder of the lithium transition-metal compound of the present invention will be described in detail below.

As described above, the layered structure is not necessarily limited to the R(−3)m structure but is preferably a structure that can be assigned to the R(−3)m structure from the viewpoint of achieving good electrochemical performance.

To determine x", y", and z" in the composition formula of the lithium-nickel-manganese-cobalt composite oxide, the transition metals and Li are analyzed with an inductively coupled plasma-atomic emission spectrometer (ICP-AES) to determine the ratio of Li/Ni/Mn/Co.

From the viewpoint of the structure, Li according to z" is occupy the same transition-metal site. Li according to z" increases an average Ni valence greater than two according to the electroneutrality principle (trivalent Ni formation). Since z" increases the average Ni valence, z" serves as an index of the Ni valence (the proportion of Ni(III)).

From the composition formula described above, the Ni valence (m) when z" changes is determined to be $m=2[2-\{(1-x"-z")/(1-x")(1+y")\}]$, provided that Co has a valence of three and Mn has a valence of four. This shows that the Ni valence is not determined only by z" but is a function of x" and y". When z"=0 and y"=0, the Ni valence remains two regardless of the x" value. When z" represents a negative value, the amount of Li in an active material is less than the stoichiometric amount. Possibly, a compound having an excessively large negative value does not produce the effect of the present invention. Furthermore, the equation shows that even when z" remains constant, a higher Ni content (increase in y") and/or a higher Co content (increase in x") of the composition results in a higher Ni valence. Use of such a compound in a battery improves rate and output characteristics but is liable to cause a reduction in capacity. Therefore, the upper limit and lower limit of the z" value are preferably defined as functions of x" and y".

When $0 \leq x" \leq 0.1$, i.e., when the Co content is low, the costs are reduced. Furthermore, the use of the compound in a lithium secondary battery that is designed to be charged at a high charging potential improves the charge/discharge capacity, cycle characteristics, and the level of safety.

<Powder X-Ray Diffraction Peak>

In the present invention, The powder of the lithium-nickel-manganese-cobalt composite oxide having the composition that satisfies the composition formulae (I") and (II") is characterized in that in powder X-ray diffraction measurement using CuKα radiation, $0.01 \leq FWHM(110) \leq 0.2$, where FWHM (110) represents the half-width of the (110) diffraction peak observed at a diffraction angle 2θ of about 64.5°.

With respect to the powder X-ray diffraction peak, the description of the powder of the lithium-nickel-manganese-cobalt composite oxide represented by the composition formula (I') is applied to this section.

<Reason that Powder of Lithium Transition-Metal Compound of the Invention has Effect Described Above>

The reason that the powder of the lithium transition-metal compound of the present invention has the effect described above is believed to be as follows.

The powder of the lithium transition-metal compound of the present invention has fine particles, a large amount of mercury intruded under pressure in the mercury intrusion curve, and a large pore volume among the crystal particles. Thus, the use of the powder in a battery increases the contact area between the surface of the positive-electrode active material and an electrolytic solution. Furthermore, the powder has high crystallinity and a significantly low heterophase content. It is therefore speculated that the load characteristics required for the positive-electrode active material are improved to a practical level.

A method for producing the lithium transition-metal compound of the present invention will be described in detail below.

The method for producing the lithium transition-metal compound of the present invention is not limited to a specific production method. A lithium-nickel-manganese-cobalt composite oxide is taken as an example. A lithium compound, a nickel compound, a manganese compound, and a cobalt compound are dispersed in a liquid medium to form a slurry. The resulting slurry is spray-dried and then fired to produce the composite oxide.

Alternatively, the lithium-nickel-manganese-cobalt composite oxide is suitably produced by a method for producing a powder of a lithium transition-metal compound for a positive-electrode material in a lithium secondary battery according to the present invention, the method including a slurry preparation step of pulverizing a lithium compound and a compound of at least one transition metal selected from V, Cr, Mn, Fe, Co, Ni, and Cu, and an additive that inhibits grain growth and sintering during firing in an liquid medium to form a slurry containing these compounds uniformly dispersed, a spray-drying step of spray-drying the resulting slurry to form a spray-dried powder, and a firing step of firing the spray-dried powder.

For example, a method for producing a powder of a lithium-nickel-manganese-cobalt composite oxide as a lithium transition-metal compound of the present invention will be described in detail below.

<Slurry Preparation Step>

In the case where the lithium-nickel-manganese-cobalt composite oxide is produced by the method of the present invention, examples of a lithium compound among material compounds used for the slurry preparation include $Li_2CO_3$, LiNO, $LiNO_3$, LiOH, $LiOH.H_2O$, LiH, LiF, LiCl, LiBr, LiI, $CH_3OOLi$, $Li_2O$, $Li_2SO_4$, lithium dicarboxylates, lithium citrate, lithium salts of fatty acids, and alkyllithiums. Among these lithium compounds, lithium compounds that do not contain a nitrogen atom, a sulfur atom, or a halogen atom are preferred from the viewpoint that the compounds do not generate a harmful substance, e.g., SOx or NOx, during firing. Furthermore, lithium compounds that generate decomposition gases during firing to easily form pores in secondary particles of a spray-dried powder are preferred. In view of these points, $Li_2CO_3$, LiOH, and $LiOH.H_2O$ are preferred. Among these, $Li_2CO_3$ is preferred because of easy handling and being relatively inexpensive. These lithium compounds may be used alone or in combination of two or more.

Examples of a nickel compound include $Ni(OH)_2$, NiO, NiOOH, $NiCO_3$, $2NiCO_3.3Ni(OH)_2.4H_2O$, $NiC_2O_4.2H_2O$, $Ni(NO_3)_2.6H_2O$, $NiSO_4$, $NiSO_4.6H_2O$, nickel salts of fatty acids, and nickel halides. Among these, nickel compounds, such as $Ni(OH)_2$, NiO, NiOOH, $NiCO_3$, $2NiCO_3.3Ni(OH)_2.4H_2O$, and $NiC_2O_4.2H_2O$, are preferred from the viewpoint that the compounds do not generate a harmful substance, e.g., SOx or NOx, during firing. $Ni(OH)_2$, NiO, NiOOH, and $NiCO_3$ are more preferred from the viewpoints of being inexpensively available as industrial materials and having high reactivity. $Ni(OH)_2$, NiOOH, and $NiCO_3$ are particularly preferred from the viewpoint that they generate decomposition gases during firing to readily form pores in secondary particles of a spray-dried powder. These nickel compounds may be used alone or in combination of two or more.

Examples of a manganese compound include manganese oxides, such as $Mn_2O_3$, $MnO_2$, and $Mn_3O_4$; manganese salts, such as $MnCO_3$, $Mn(NO_3)_2$, $MnSO_4$, manganese acetate, manganese dicarboxylates, manganese citrate, and manganese salts of fatty acids; oxyhydroxides; and halides such as manganese chlorides. Among these manganese compounds, $MnO_2$, $Mn_2O_3$, $Mn_3O_4$, and $MnCO_3$ are preferred because they do not generate a gas, e.g., NOx or SOx, during firing and are inexpensively available as industrial materials. These manganese compounds may be used alone or in combination of two or more.

Examples of the cobalt compound include $Co(OH)_2$, CoOOH, CoO, $Co_2O_3$, $Co_3O_4$, $Co(OCOCH_3)_2.4H_2O$, $CoCl_2$, $Co(NO_3)_2.6H_2O$, $Co(SO_4)_2.7H_2O$, and $CoCO_3$. Among these compounds, $Co(OH)_2$, CoOOH, COO, $Co_2O_3$, $Co_3O_4$, and $CoCO_3$ are preferred from the viewpoint that they do not generate a harmful substance, e.g., SOx or NOx, during a firing step. $Co(OH)_2$ and CoOOH are more preferred from the viewpoints of being inexpensively commercially available and having high reactivity. Furthermore, $Co(OH)_2$, CoOOH, and $CoCO_3$ are particularly preferred from the viewpoint that they generate decomposition gases during firing to easily form pores in secondary particles of a spray-dried powder. These cobalt compounds may be used alone or in combination of two or more.

In addition to these compounds of Li, Ni, Mn, and Co, elemental substitution may be performed to introduce the above-described additional element. Furthermore, a compound capable of efficiently forming pores in secondary particles formed by spray drying described below may be used. The compound capable of efficiently forming pores in secondary particles may be added before or after mixing the materials in response to characteristics of the compound. In particular, a compound that is easily decomposed due to the application of mechanical shearing stress in a mixing step is preferably added after the mixing step.

Any type of the additive that inhibits grain growth and sintering during firing may be used as long as it produces the effect described above. A compound containing an element selected from Mo, W, Nb, Ta, and Re, which are stably present in higher valence states, is preferred. Usually, an oxide material is used.

Examples of a compound used as the additive that inhibits grain growth and sintering during firing are as described above. These additives may be used alone or in combination of two or more.

A method for mixing the materials is not particularly limited. The materials may be mixed by a wet process or a dry process. Examples of the method include methods using apparatuses, such as a ball mill, an oscillating mill, a bead mill. Wet mixing, in which the material compounds are mixed in a liquid medium such as water or an alcohol, achieves uniform mixing and enhances the reactivity of the resulting mixture in a firing step and is thus preferred.

The mixing time varies depending on a method of mixing the materials. Any mixing time may be used as long as the materials are uniformly mixed on a particle level. For example, the mixing time in mixing with a ball mill (wet or dry mixing) is usually from about one hour to about two days. The residence time in mixing with a bead mill (continuous wet process) is usually from about 0.1 hour to six hours.

In the step of mixing the materials, preferably, the materials are simultaneously pulverized. The particle diameters of the material particles after pulverization serve as an index of the degree of pulverization. The degree of pulverization in terms of the average particle diameter (median diameter) is usually 0.4 µm or less, preferably 0.3 µm or less, more preferably 0.25 µm or less, and most preferably 0.2 µm or less. An excessively large average particle diameter of the material particles after pulverization reduces reactivity in the firing step and makes it difficult to provide a uniform composition. An unnecessary reduction in particle diameter increases the pulverization cost. Thus, pulverization may be performed in such a manner that the average particle diameter is usually 0.01 µm or more, preferably 0.02 µm or more, and more preferably 0.05 µm or more. Although a technique for achieving such a degree of pulverization is not particularly limited, a wet pulverization technique is preferred. An example thereof is a technique with Dyno-Mill.

Median diameters of pulverized particles in slurries described in examples of the present invention are measured as described above. Median diameters of spray-dried products described below are measured in the same conditions, except that the median diameters of the spray-dried products are measured after 0, 1, 3, or 5-minute ultrasonic dispersion.

<Spray-Drying Step>

After the materials are wet-mixed, the resulting mixture is usually dried. A method for drying the mixture is not particularly limited. Spray drying is preferred from the viewpoints of achieving good uniformity of particles formed and flowability and handleability of a powder formed and the efficient production of dry particles.

In the method for producing the powder of the lithium-nickel-manganese-cobalt composite oxide of the present invention, the materials are pulverized by a wet process and then spray-dried to provide a powder including secondary particles formed by the aggregation of primary particles. The structural characteristic of the spray-dried powder of the present invention is that the spray-dried powder includes the secondary particles formed by the aggregation of the primary particles. Examples of a method for determining the structure include SEM observation and cross-sectional SEM observation.

The median diameter (measured without ultrasonic dispersion here) of a spray-dried powder that also serves as a firing precursor of the powder of the lithium-nickel-manganese-cobalt composite oxide is usually 15 μm or less, preferably 12 μm or less, more preferably 9 μm or less, and most preferably 7 μm or less. However, a too small particle diameter tends to be difficult to achieve. Thus, the median diameter is usually 3 μm or more, preferably 4 μm or more, and more preferably 5 μm or more. In the case of the production of particles by spray drying, the particle diameters can be controlled by appropriately selecting a spray mode, pressurized-gas-stream feed rate, slurry feed rate, drying temperature, and the like.

For example, in the case where a slurry containing a lithium compound, a nickel compound, a manganese compound, and a cobalt compound dispersed in a liquid medium is spray-dried, and then the resulting powder is fired to form a powder of a lithium-nickel-manganese-cobalt composite oxide, spray drying is performed under the conditions of $50\ \mathrm{cp} \leq V \leq 4{,}000$ cp and $1{,}500 \leq G/S \leq 5{,}000$, where V represents the viscosity (cp) of the slurry during the spray drying, S represents the amount of slurry fed (L/min), and G represents the amount of gas fed (L/min).

An excessively low slurry viscosity V (cp) may make it difficult to provide a powder including secondary particles formed by the aggregation of primary particles. An excessively high slurry viscosity may cause the failure of a feed pump and nozzle clogging. Thus, the lower limit of the slurry viscosity V (cp) is usually 50 cp or more, preferably 100 cp or more, more preferably 300 cp or more, and most preferably 500 cp. The upper limit is usually 4,000 cp or less, preferably 3,500 cp or less, more preferably 3,000 cp or less, and most preferably 2,500 cp or less.

A gas-liquid ratio G/S of less than the lower limit is liable to cause an increase in the size of the secondary particles and the degradation of drying properties. A gas-liquid ratio G/S exceeding the upper limit may impair productivity. Thus, the lower limit of the gas-liquid ratio G/S is usually 1,500 or more, preferably 1,600 or more, more preferably 1,700 or more, and most preferably 1,800 or more. The upper limit of the gas-liquid ratio G/S is usually 5,000 or less, preferably 4,700 or less, more preferably 4,500 or less, and most preferably 4,200 or less.

The amount S of slurry fed and the amount G of gas fed are appropriately set in response to the viscosity of the slurry subjected to spray drying and the specification of a spray-dryer used.

In the method of the present invention, spray drying may be performed in such a manner that the slurry viscosity V (cp) described above is satisfied, the amount of slurry fed and the amount of gas fed are controlled so as to meet the specification of a spray-dryer used, and the gas-liquid ratio G/S described above is satisfied. Other conditions are appropriately set in response to the type of apparatus used. The following conditions are preferably satisfied.

The slurry is spray-dried at a temperature of usually 50° C. or higher, preferably 70° C. or higher, more preferably 120° C. or higher, and most preferably 140° C. or higher, and usually 300° C. or lower, preferably 250° C. or lower, more preferably 200° C. or lower, and most preferably 180° C. or lower. An excessively high temperature may increase the number of granulated particles each having a hollow structure, thereby reducing the packing density of the resulting powder. An excessively low temperature may disadvantageously cause powder adhesion, powder clogging, and the like due to dew condensation at an outlet for a powder.

The spray-dried powder for the powder of the lithium-nickel-manganese-cobalt composite oxide according to the present invention is characterized by a low cohesive force between primary particles. Such a low cohesive force can be determined by checking a change in median diameter when ultrasonic dispersion is performed. The upper limit of the median diameter of the spray-dried particles after five-minute ultrasonic dispersion (power: 30 W, frequency: 22.5 kHz) is usually 4 μm or less, preferably 3.5 μm or less, more preferably 3 μm or less, still more preferably 2.5 μm or less, and most preferably 2 μm or less. The lower limit is usually 0.01 μm or more, preferably 0.05 μm or more, more preferably 0.1 μm or more, and most preferably 0.2 μm or more. Particles of a lithium-nickel-manganese-cobalt composite oxide prepared by firing the spray-dried particles having a median diameter, measured after ultrasonic dispersion, larger than the value described above have a small number of pores among the particles and unimproved load characteristics. Particles of a lithium-nickel-manganese-cobalt composite oxide prepared by firing the spray-dried particles having a median diameter, measured after ultrasonic dispersion, smaller than the value described above have an excessively large number of pores among particles and thus may be liable to cause problems such as a reduction in bulk density and the degradation of coating properties.

The bulk density of the spray-dried powder for the powder of the lithium-nickel-manganese-cobalt composite oxide for a positive-electrode material in a lithium secondary battery according to the present invention is usually 0.1 g/cc or more, preferably 0.3 g/cc or more, more preferably 0.5 g/cc or more, and most preferably 0.7 g/cc or more. A bulk density of less than the lower limit may adversely affect powder packing and handleability of the powder. Furthermore, the bulk density is usually 1.7 g/cc or less, preferably 1.6 g/cc or less, more preferably 1.5 g/cc or less, and most preferably 1.4 g/cc or less. A bulk density exceeding the upper limit is preferred in view of powder packing and handleability of the powder but may result in an excessively small specific surface area, thereby possibly reducing reactivity in the firing step.

A small specific surface area of a powder prepared by spray drying disadvantageously reduces the reactivity among the material compounds in the subsequent firing step. Thus, as described above, the specific surface area is preferably maximized by, for example, a technique for pulverizing the starting materials before spray drying. However, excessively increasing the specific surface area is industrially disadvantageous and, in some cases, does not result in the lithium transition-metal compound of the present invention. Consequently, the resulting spray-dried particles have a BET specific surface area of usually 10 $m^2/g$ or more, preferably 20 $m^2/g$ or more, more preferably 30 $m^2/g$ or more, and most preferably 35 $m^2/g$ or more, and usually 70 $m^2/g$ or less, preferably 65 $m^2/g$ or less, and most preferably 60 $m^2/g$ or less.

In the case where the powder of the lithium-nickel-manganese-cobalt composite oxide for a positive-electrode material in a lithium secondary battery is produced, in which the oxide is composed of a compound represented by (I') and has a crystal structure assigned to a layered structure, and in which in powder X-ray diffraction measurement using CuKα radiation, $0.01 \leq FWHM (110) \leq 0.2$, where FWHM (110) represents the half-width of the (110) diffraction peak observed at a diffraction angle 2θ of about 64.5°, a powder prepared by spray drying has a BET specific surface area of usually 10 $m^2/g$ or more, preferably 20 $m^2/g$ or more, more preferably 30 $m^2/g$ or more, and most preferably 50 $m^2/g$ or more, and usually 100 $m^2/g$ or less, preferably 80 $m^2/g$ or less, more preferably 70 $m^2/g$ or less, and most preferably 65 $m^2/g$ or less.

<Firing Step>

The resulting firing precursor is then fired.

The term "firing precursor" in the present invention represents a lithium transition-metal compound precursor before firing, the precursor being prepared by treating the spray-dried product. For example, the firing precursor may be prepared by incorporating the above-described compound that generates a decomposition gas or sublimes during firing to form pores in secondary particles.

The firing conditions depend on the composition and the lithium compound material used. An excessively high firing temperature is liable to lead to excessively grown primary particles. In contrast, an excessively low firing temperature is liable to lead to insufficiently developed crystal structure and an excessively large specific surface area. The firing temperature is usually 800° C. or higher, preferably 850° C. or higher, more preferably 900° C. or higher, and most preferably 950° C. or higher, and usually 1,100° C. or lower, preferably 1,075° C. or lower, more preferably 1,050° C. or lower, and most preferably 1,025° C. or lower.

In the case where the powder of the lithium-nickel-manganese-cobalt composite oxide for a positive-electrode material in a lithium secondary battery is produced, in which the oxide is composed of a compound represented by (I') and has a crystal structure assigned to a layered structure, and in which in powder X-ray diffraction measurement using CuKα radiation, $0.01 \leq FWHM (110) \leq 0.2$, where FWHM (110) represents the half-width of the (110) diffraction peak observed at a diffraction angle 2θ of about 64.5°, the firing temperature T (° C.) is usually $940° C. \leq T \leq 1,200° C$. The firing temperature is preferably 950° C. or higher, more preferably 960° C. or higher, and most preferably 970° C. or higher, and usually 1,200° C. or lower, preferably 1,175° C. or lower, more preferably 1,150° C. or lower, and most preferably 1,125° C. or lower.

A powder of a lithium transition-metal compound for a positive-electrode material in a lithium secondary battery, the powder mainly containing a lithium transition-metal compound capable of intercalating and deintercalating lithium ions, is prepared by incorporating at least one additive that inhibits grain growth and sintering during firing in the main component in an amount greater than or equal to 0.01 mol % and less than 2 mol % with respect to the total molar amount of the transition-metal elements in the main component and then performing firing at usually 700° C. or higher. In the case where the powders of the lithium-nickel-manganese-cobalt composite oxides represented by the composition formulae (I") and (II") are produced, the firing temperature is usually 970° C. or higher, preferably 975° C. or higher, more preferably 980° C. or higher, and most preferably 990° C. or higher, and usually 1,200° C. or lower, preferably 1,175° C. or lower, more preferably 1,150° C. or lower, and most preferably 1,125° C. or lower.

A box furnace, a tubular furnace, a tunnel furnace, a rotary kiln, or the like can be used for firing. The firing step usually includes three substeps, i.e., a heating substep, a maximum-temperature-holding substep, and a cooling substep. The second maximum-temperature-holding substep is not always a single-stage substep, and may be conducted in two or more stages according to purposes. The heating, maximum-temperature-holding, and cooling substeps may be repeatedly conducted two or more times together with a disaggregation step of eliminating the aggregation to the extent that the secondary particles are not broken or a pulverization step of pulverizing secondary particles to primary particles or to finer particles, the disaggregation or pulverization step being conducted between sets of the three substeps repeated.

In the heating substep, the temperature in the furnace is elevated at a heating rate of usually 1° C./min to 10° C./min. Excessively low heating rates are industrially disadvantageous because much time is necessary. In some furnaces, excessively high heating rates make it impossible to adjust the temperature therein to a set temperature. The heating rate is preferably 2° C./min or more and more preferably 3° C./min or more, and preferably 7° C./min or less and more preferably 5° C./min or less.

The holding time in the maximum-temperature holding substep varies depending on the temperature. In the case where the temperature is in the above range, the holding time is usually 30 minutes or more, preferably 3 hours or more, more preferably 5 hours or more, and most preferably 6 hours or more, and 50 hours or less, preferably 25 hours or less, more preferably 20 hours or less, and most preferably 15 hours or less. An excessively short firing time makes it difficult to provide a powder of a lithium-nickel-manganese-cobalt composite oxide having satisfactory crystallinity. An excessively long firing time is impractical. An excessively long firing time requires disaggregation after firing and may make it difficult to disaggreagate the aggregation and is thus disadvantageous.

In the cooling substep, the temperature in the furnace is lowered at a cooling rate of usually 0.1° C./min to 10° C./min. An excessively low cooling rate is industrially disadvantageous because much time is necessary. An excessively high cooling rate is liable to lead to poor homogeneity of a target product or accelerated deterioration of the vessel. The cooling rate is preferably 1° C./min or more and more preferably 3° C./min or more, and preferably 7° C./min or less and more preferably 5° C./min or less.

As an atmosphere during firing, an oxygen-containing gas atmosphere such as air may be used. The oxygen concentration in the atmosphere is usually 1% by volume or more, preferably 10% by volume or more, and more preferably 15% by volume or more, and 100% by volume or less, preferably 50% by volume or less, and more preferably 25% by volume or less.

In the method for producing the powder of the lithium transition-metal compound having the above-described specific composition according to the present invention, when the production conditions are kept unchanged, the mixing proportion of a lithium compound, a nickel compound, a manganese compound, and a cobalt compound can be adjusted in preparing a slurry containing these compounds dispersed in a liquid medium to control a target Li/Ni/Mn/M molar ratio.

In the case of the addition of the additive that inhibits the growth and sintering of particles during firing in producing the powder of the lithium transition-metal compound having the above-described specific composition, when the production conditions are kept unchanged, the mixing proportion of a lithium compound, a nickel compound, a manganese compound, a cobalt compound, and the additive that inhibits grain growth and sintering during firing can be adjusted in preparing a slurry containing these compounds dispersed in a liquid medium to control a target Li/Ni/Mn/Co molar ratio.

The resulting lithium transition-metal compound provides a positive-electrode material for a lithium secondary battery, the positive-electrode material having a well-balanced characteristics, e.g., only a slight expansion due to gas generation, high capacity, excellent load characteristics such as rate and output characteristics, low-temperature output characteristics, and storage characteristics.

[Positive Electrode for Lithium Secondary Battery]

A positive electrode for a lithium secondary battery according to the present invention will be described in detail below.

The positive electrode for a lithium secondary battery according to the present invention includes a positive-electrode active-material layer on a current collector, the layer including the powder of the lithium-nickel-manganese-cobalt composite oxide for a positive-electrode material in a lithium secondary battery according to the present invention and a binder. The positive-electrode active-material layer is usually formed by dry-mixing the positive-electrode material and a binder optionally together with a conductive material, a thickener, and the like, forming the mixture into a sheet, and press-bonding the sheet to the positive-electrode current collector. Alternatively, these materials are dissolved or dispersed in a liquid medium to prepare a slurry, and then the resulting slurry is applied to the positive-electrode current collector and dried to form the positive-electrode active-material layer.

Usable examples of the material of the positive-electrode current collector usually include metallic materials, such as aluminum, stainless steel, nickel-plated materials, titanium, and tantalum; and carbon materials, such as carbon cloths and carbon paper. Among these, metallic materials are preferred. Aluminum is particularly preferred. Examples of shapes of metallic materials include metal foil, metal cylinders, metal coils, metal sheets, thin metal films, expanded metals, punched metals, and foamed metals. Examples of the shape of carbon materials include carbon plates, thin carbon films, and carbon cylinders. Among these, thin metal films are preferred because they are currently used in products industrially produced. A thin film may be appropriately formed into a mesh form.

In the case where a thin film is used as the positive-electrode current collector, the film may have any thickness. The thickness is usually 1 μm or more, preferably 3 μm or more, and more preferably 5 μm or more, and usually 100 mm or less, preferably 1 mm or less, and more preferably 50 μm or less. At a thickness of less than the above range, possibly, the film does not have the strength required for the current collector. At a thickness exceeding the above range, handleability may be impaired.

The binder for forming the positive-electrode active-material layer is not particularly limited. In the case of the formation of the layer by application, the binder may be composed of any material that is stable to the liquid medium used in preparing the electrode. Examples thereof include resinous polymers, such as polyethylene, polypropylene, polyethylene terephthalate, polymethyl methacrylate, aromatic polyamides, cellulose, and nitrocellulose; rubbery polymers, such as SBR (styrene/butadiene rubbers), NBR (acrylonitrile/butadiene rubbers), fluororubbers, isoprene rubbers, butadiene rubbers, and ethylene/propylene rubbers; thermoplastic elastomer polymers, such as styrene/butadiene/styrene block copolymers and hydrogenated products thereof, EPDM (ethylene/propylene/diene terpolymers), styrene/ethylene/butadiene/ethylene copolymers, and styrene/isoprene/styrene block copolymers and hydrogenated products thereof; flexible resinous polymers, such as syndiotactic 1,2-polybutadiene, polyvinyl acetate, ethylene/vinyl acetate copolymers, and propylene/α-olefin copolymers; fluoropolymers, such as polyvinylidene fluoride, polytetrafluoroethylene, fluorinated polyvinylidene fluoride, and polytetrafluoroethylene/ethylene copolymers; and polymer compositions having the property of conducting alkali metal ions (in particular, lithium ions). These materials may be used alone. Alternatively, any two or more of them may be combined in any proportion.

The proportion of the binder in the positive-electrode active-material layer is usually 0.1% by weight or more, preferably 1% by weight or more, and more preferably 5% by weight or more, and usually 80% by weight or less, preferably 60% by weight or less, more preferably 40% by weight or less, and most preferably 10% by weight or less. At an excessively low proportion of the binder, the positive-electrode active material is not sufficiently retained, so that the positive electrode may have insufficient mechanical strength, thereby degrading battery performance such as cycle characteristics. An excessively high proportion of the binder may lead to reductions in battery capacity and conductivity.

The positive-electrode active-material layer usually contains a conductive material in order to increase conductivity. The type of conductive material is not particularly limited. Examples thereof include metallic materials, such as copper and nickel; and carbon materials, such as graphites, e.g., natural graphite and artificial graphites, carbon blacks, e.g., acetylene black, and amorphous carbons, e.g., needle coke. These materials may be used alone. Alternatively, any two or more of them may be combined in any proportion. The proportion of the conductive material in the positive-electrode active-material layer is usually 0.01% by weight or more, preferably 0.1% by weight or more, and more preferably 1% by weight or more, and usually 50% by weight or less, preferably 30% by weight or less, and more preferably 20% by weight or less. An excessively low proportion of the conductive material may lead to insufficient conductivity. An excessively high proportion of the conductive material may reduce battery capacity.

Any type of liquid medium for preparing a slurry may be used as long as the powder of the lithium-nickel-manganese composite oxide as a positive-electrode material, the binder, and the conductive material and thickener optionally used can be dissolved or dispersed in the liquid medium. Either aqueous solvent or organic solvent may be used. Examples of the aqueous solvent include water and alcohols. Examples of the organic solvent include N-methylpyrrolidone (NMP), dimethylformamide, dimethylacetamide, methyl ethyl ketone, cyclohexanone, methyl acetate, methyl acrylate, diethyltriamine, N,N-dimethylaminopropylamine, ethylene oxide, tetrahydrofuran (THF), toluene, acetone, dimethyl ether, dimethylacetamide, hexamethylphosphoramide, dimethyl sulfoxide, benzene, xylene, quinoline, pyridine, methylnaphthalene, and hexane. In particular, when an aqueous solvent is used, a dispersant is used in combination with the thickener, and a latex of SBR or the like is used for slurry preparation. These solvents may be used alone. Alternatively, any two or more of them may be combined in any proportion.

The proportion of the powder of the lithium transition-metal compound of the present invention as a positive-electrode material in the positive-electrode active-material layer is usually 10% by weight or more, preferably 30% by weight or more, and more preferably 50% by weight or more, and usually 99.9% by weight or less and preferably 99% by weight or less. An excessively high proportion of the powder of the lithium transition-metal compound in the positive-electrode active-material layer is liable to lead to insufficient strength of the positive electrode. An excessively low proportion thereof may lead to insufficient capacity.

The positive-electrode active-material layer usually has a thickness of about 10 to about 200 µm.

It is preferred that the positive-electrode active-material layer prepared by application and drying be pressed and densified with a roller press or the like in order to increase the packing density of the positive-electrode active material.

Thereby, the positive electrode for a lithium secondary battery of the present invention is prepared.

[Lithium Secondary Battery]

A lithium secondary battery of the present invention will be described in detail below.

The lithium secondary battery of the present invention includes the above-described positive electrode for a lithium secondary battery, the positive electrode being capable of intercalating and deintercalating lithium; a negative electrode capable of intercalating and deintercalating lithium; a nonaqueous electrolyte containing a lithium salt as an electrolytic salt. A separator that holds the nonaqueous electrolyte may be arranged between the positive electrode and the negative electrode. In order to effectively prevent a short circuit due to the contact between the positive electrode and the negative electrode, the arrangement of the separator is desirable.

<Negative Electrode>

Like the positive electrode, the negative electrode usually includes a negative-electrode active-material layer provided on a negative-electrode current collector.

Usable examples of the material of the positive-electrode current collector usually include metallic materials, such as copper, nickel, stainless steel, and nickel-plated steel; and carbon materials, such as carbon cloths and carbon paper. In the case of the metallic material among these, examples of the current collector include metal foil, metal cylinders, metal coils, metal sheets, and thin metal films. In the case of the carbon material, examples of the current collector include carbon plates, thin carbon films, and carbon cylinders. Among these, thin metal films are preferred because they are currently used in products industrially produced. A thin film may be appropriately formed into a mesh form. In the case where a thin metal film is used as the negative-electrode current collector, the preferred range of the thickness thereof is the same as that for the positive-electrode current collector described above.

The negative-electrode active-material layer is composed of a negative-electrode active material. The type of negative-electrode active material is not particularly limited as long as the negative-electrode active material is capable of electrochemically intercalating and deintercalating lithium ions. A carbon material that is capable of intercalating and deintercalating lithium is used from the standpoint of a high level of safety.

The type of carbon material is not particularly limited. Examples thereof include graphites, such as artificial graphites and natural graphite; and pyrolysates of organic materials under various pyrolysis conditions. Examples of pyrolysates of organic materials include products of the carbonization of coal coke, petroleum coke, and coal pitch, products of the carbonization of petroleum pitch, products of the carbonization of materials obtained by oxidizing these pitches, products of the carbonization of needle coke, pitch coke, phenolic resins, and crystalline cellulose, carbon materials obtained by partly graphitizing these carbonization products, and furnace black, acetylene black, and pitch-derived carbon fibers. Among these, graphites are preferred. Especially preferred are artificial graphites produced by subjecting easily graphitizable pitches obtained from various raw materials to a high-temperature heat treatment, purified natural graphite, graphite materials comprising any of these graphites and a pitch incorporated therein, and the like. Such materials that have been subjected to various surface treatments are mainly used. These carbon materials may be used alone. Alternatively, any two or more of them may be combined in any proportion.

In the case where a graphite material is used as the negative-electrode active material, preferably, the value of d (interplanar spacing) for the lattice plane (002 plane) is usually 0.335 nm or more and usually 0.34 nm or less and preferably 0.337 nm or less, the value of d being determined by X-ray diffraction by the "Gakushin" method (the method of the Japan Society for Promotion of Scientific Research).

The ash content of the graphite material is usually 1% by weight or less, particularly 0.5% by weight or less, and especially 0.1% by weight or less, with respect to the weight of the carbon material.

The crystallite size (Lc) of the graphite material is usually 30 nm or more, preferably 50 nm or more, and particularly 100 nm or more, the crystallite size being determined by X-ray diffraction by the "Gakushin" method (the method of the Japan Society for Promotion of Scientific Research). The median diameter of the graphite material is usually 1 µm or more, preferably 3 µm or more, more preferably 5 µm or more, and particularly 7 µm or more, and usually 100 µm or less, preferably 50 µm or less, more preferably 40 µm or less, and particularly 30 µm or less, the median diameter being determined by the laser diffraction/scattering method.

The BET specific surface area of the graphite material is usually 0.5 m$^2$/g or more, preferably 0.7 m$^2$/g or more, more preferably 1.0 m$^2$/g or more, and still more preferably 1.5 m$^2$/g or more, and usually 25.0 m$^2$/g or less, preferably 20.0 m$^2$/g or less, more preferably 15.0 m$^2$/g or less, and still more preferably 10.0 m$^2$/g or less.

When the graphite material is analyzed by Raman spectroscopy using argon laser light, the graphite material preferably has an intensity ratio $I_A/I_B$ of 0 to 0.5, where $I_A$ represents the intensity of a peak $P_A$ observed in the range of 1,580 to 1,620 cm$^{-1}$ and $I_B$ represents the intensity of the peak $P_B$ observed in the range of 1,350 to 1,370 cm$^{-1}$. The half-width of the peak $P_A$ is preferably 26 cm$^{-1}$ or less and more preferably 25 cm$^{-1}$ or less.

In addition to the various carbon materials described above, other materials capable of intercalating and deintercalating lithium may be used as negative-electrode active materials. Examples of the negative-electrode active materials except carbon materials include metal oxides such as tin oxide and silicon oxide; nitrides such as $Li_{2.6}Co_{0.4}N$; elemental lithium; and lithium alloys such as lithium-aluminum alloys. These materials except carbon materials may be used alone or in combination of two or more. Furthermore, these materials may be used in combination with any of the carbon materials described above.

Like the positive-electrode active-material layer, the negative-electrode active-material layer may be usually produced by mixing the negative-electrode active material and a binder optionally together with a conductive material and a thickener in a liquid medium to form a slurry, applying the resulting slurry to a negative-electrode current collector, and drying the slurry. The liquid medium, the binder, the thickener, the conductive material, and the like constituting the slurry may be the same as those described above with regard to the positive-electrode active-material layer.

<Nonaqueous Electrolyte>

Examples of the nonaqueous electrolyte usable include known organic electrolytic solutions, solid polyelectrolytes, gel electrolytes, and solid inorganic electrolytes. Among these, organic electrolytic solutions are preferred. The organic electrolytic solutions each contain a solute (electrolyte) dissolved in an organic solvent.

The type of organic solvent is not particularly limited. Examples of the organic solvent usable include carbonates, ethers, ketones, sulfolane compounds, lactones, nitrites, chlorinated hydrocarbons, ethers, amines, esters, amides, and phosphoric ester compounds. Typical examples thereof include dimethyl carbonate, diethyl carbonate, ethyl methyl carbonate, propylene carbonate, ethylene carbonate, vinylene carbonate, vinylethylene carbonate, tetrahydrofuran, 2-methyltetrahydrofuran, 1,4-dioxane, 4-methyl-2-pentanone, 1,2-dimethoxyethane, 1,2-diethoxyethane, γ-butyrolactone, 1,3-dioxolan, 4-methyl-1,3-dioxolan, diethyl ether, sulfolane, methylsulfolane, acetonitrile, propionitrile, benzonitrile, butyronitrile, valeronitrile, 1,2-dichloroethane, dimethylformamide, dimethyl sulfoxide, trimethyl phosphate, and triethyl phosphate. Hydrogen atoms in these compounds may be partially replaced with halogen atoms. These solvents may be used alone or as a mixed solvent of two or more thereof.

The organic solvent preferably contains a high-permittivity solvent so as to dissociate the electrolyte salt. The term "high-permittivity solvent" herein means a compound having a relative permittivity of 20 or more at 25° C. Among high-permittivity solvents, ethylene carbonate, propylene carbonate, and compounds obtained by replacing one or more hydrogen atoms of these carbonates with one or more of other elements, e.g., halogens, alkyl groups, etc. The proportion of the high-permittivity solvent in the electrolyte solution is preferably 20% by weight or more, more preferably 25% by weight or more, and most preferably 30% by weight or more.

When the proportion of the high-permittivity solvent is less than the above range, an intended battery characteristics are not obtained, in some cases.

An additive that forms a satisfactory coating film, enabling efficient charge and discharge of lithium ions, on the negative-electrode surface may be added to the organic electrolytic solution in any proportion. Examples of the additive include gases, such as $CO_2$, $N_2O$, CO, $SO_2$; vinylene carbonate; and polysulfide $Sx^{2-}$. Among these, vinylene carbonate is preferred.

The type of electrolyte salt is not particularly limited. Any known solute may be used. Examples thereof include $LiClO_4$, $LiAsF_6$, $LiPF_6$, $LiBF_4$, $LiB(C_6H_5)_4$, LiBOB, LiCl, LiBr, $CH_3SO_3Li$, $CF_3SO_3Li$, $LiN(SO_2CF_3)_2$, $LiN(SO_2C_2F_5)_2$, $LiC(SO_2CF_3)_3$, and $LiN(SO_3CF_3)_2$. These electrolyte salts may be used alone. Alternatively, any two or more of them may be combined in any proportion. Furthermore, an additive that forms a satisfactory coating film, enabling efficient charge and discharge of lithium ions, on the negative-electrode surface may be added in any proportion.

The lithium salt serving as the electrolyte salt is incorporated in the electrolytic solution in a concentration of usually 0.5 mol/L to 1.5 mol/L. A concentration of less than 0.5 mol/L or exceeding 1.5 mol/L reduces electric conductivity, thereby adversely affecting battery characteristics, in some cases. The lower limit of the concentration is preferably 0.75 mol/L or more. The upper limit of the concentration is preferably 1.25 mol/L or less.

In the case where a solid polyelectrolyte is used, the type of solid polyelectrolyte is not particularly limited. Any crystalline or amorphous inorganic material known as a solid electrolyte may be used. Examples of the crystalline inorganic solid electrolyte include LiI, $Li_3N$, $Li_{1+x}J_xTi_{2-x}(PO_4)_3$ (J=Al, Sc, Y, or La), and $Li_{0.5-3x}RE_{0.5+x}TiO_3$ (RE=La, Pr, Nd, or Sm). Examples of the amorphous inorganic solid electrolyte include oxide glasses such as $4.9LiI-34.1Li_2O-61B_2O_5$ and $33.3Li_2O-66.7SiO_2$. These may be used alone. Alternatively, any two or more of them may be combined in any proportion.

<Separator>

In the case where the organic electrolytic solution described above is used as an electrolyte, a separator is provided between the positive electrode and negative electrode in order to prevent short-circuiting between the electrodes. The material and shape of the separator are not particularly limited. Preferably, the separator is stable to the organic electrolytic solution, has the excellent ability to retain the electrolyte solution, and surely prevents short-circuiting between the electrodes. Preferred examples thereof include microporous films, sheets, and nonwoven fabrics composed of various polymeric materials. Examples of the polymeric materials include nylon, cellulose acetate, nitrocellulose, polysulfone, polyacrylonitrile, polyvinylidene fluoride, and polyolefin polymers, such as polypropylene, polyethylene, and polybutene. In particular, polyolefin polymers are preferred from the viewpoint of chemical and electrochemical stability, which is an important factor in separators. From the viewpoint of self-shutoff temperature, which is one of the purposes of the use of a separator in cells, polyethylene is particularly desirable.

In the case of using a separator made of polyethylene, ultrahigh-molecular-weight polyethylene is preferably used from the viewpoint that ultrahigh-molecular-weight polyethylene holds its shape at high temperatures. The lower limit of the molecular weight is preferably 500,000, more preferably 1,000,000, and most preferably 1,500,000. The upper limit of the molecular weight is preferably 5,000,000, more preferably 4,000,000, and most preferably 3,000,000. This is because an excessively high molecular weight results in an excessively low flowability, so that pores of the separator do not close upon heating, in some cases.

<Battery Shape>

The lithium secondary battery of the present invention is produced by assembling the positive electrode for lithium secondary battery of the present invention, the negative electrode, and the electrolyte described above into a proper shape optionally together with the separator described above. It is also possible to use other constituent elements, e.g., an outer case, as needed.

The shape of the lithium secondary battery of the present invention is not particularly limited. The lithium secondary battery may have a shape suitable for the intended use of the battery, the shape being selected from various shapes generally employed. Examples of the shape generally used include a cylindrical shape in which sheet electrodes and separators are spirally packed, a cylindrical shape having an inside-out structure employing a combination of pellet electrodes and a separator, and a coin shape in which pellet electrodes and a separator are stacked. A method for fabricating the battery is not particularly limited. A proper method may be appropriately selected from various methods commonly used, in response to an intended battery shape.

<Charging Potential of Positive Electrode in Fully Charged State>

The lithium secondary battery of the present invention is preferably designed in such a manner that the initial charging potential is 4.5 V or more (vs. Li/Li+) in a fully charged state. In other words, the powder of the lithium transition-metal compound having the specific composition for a positive-electrode material in a lithium secondary battery according to the present invention effectively produces the effect of improving cycle characteristics and safety when the powder is used in the lithium secondary battery designed in such a manner that the initial charging potential is as high as 4.5 V or more (vs. Li/Li+). However, the battery may also be used when the charging potential is set to less than 4.5 V.

While typical embodiments of the lithium secondary battery of the present invention have been described above, the lithium secondary battery of the present invention is not limited to the above embodiments. Various changes may be made without departing from the scope of the invention.

EXAMPLES

While the present invention will be described in further detail below with reference to examples, the present invention is not limited thereto.

[Measurement Method of Physical Properties]

Physical properties and the like of powders of lithium transition-metal compounds produced in examples and comparative examples were measured as described below.

Composition (Li/Ni/Mn/Co):

The composition was determined by ICP-AES analysis.

Measurement of Various Physical Properties by Mercury Intrusion Porosimetry:

Measurement by mercury intrusion porosimetry was performed with AutoPore III9420, manufactured by Micromeritics. The measurement by mercury intrusion porosimetry was performed at room temperature while the pressure was increased from 3.86 kPa to 413 MPa. The surface tension of mercury was assumed to be 480 dyn/cm, and the contact angle of mercury was assumed to be 141.3°.

Average Primary-Particle Diameter:

The average primary-particle diameter was determined from a 30,000×SEM image.

Median Diameter of Secondary Particles:

The median diameter was measured after a 5-minute ultrasonic dispersion.

Bulk Density:

The bulk density was determined by placing 4 to 10 g of a sample powder in a 10-mL glass graduated cylinder, tapping this cylinder 200 times with a stroke of about 20 mm, and then measuring the density of the powder thus packed.

Specific Surface Area:

The specific surface area was determined by the BET method.

Carbon Content C:

A Carbon/sulfur analyzer EMIA-520, manufactured by Horiba Ltd., was used. Several tens of milligrams to 100 mg of a sample was placed in a pre-burned porcelain crucible. A combustion aid was added thereto. Carbon was extracted by combustion in an oxygen stream in a high-frequency heating furnace. The amount of the CO2 contained in the combustion gas was determined by non-dispersive infrared absorptiometry. For sensitivity calibration was used 150-15 low alloy steel No. 1 (guarantee carbon content: 0.469% by weight) manufactured by Japan Iron and Steel Federation.

Volume Resistivity:

A powder resistivity measurement apparatus (Model PD-41, Loresta GP Powder Resistivity Measurement System, manufactured by Dia Instruments Co., Ltd) was used to measure the volume resistivities [Ω·cm] of sample powders compacted under pressures using a probe unit for powders (ring-type electrode and four-pin probe, inter-pin distance: 5.0 mm, pin radius: 1.0 mm, sample radius: 12.5 mm) at a sample weight of 3 g and an applied-voltage limit of 90 V. The values of volume resistivity as measured under a pressure of 40 MPa were compared.

Crystal Phase:

The crystal phase was determined from a pattern obtained by powder X-ray diffraction using CuKα radiation.

[Powder X-ray diffractometer] PANalytical PW1700

[Measurement conditions] X-ray output: 40 kV, 30 mA, scan axis: θ/2θ

Scan range (2θ): 10.0° to 90.0°

Measurement mode: Continuous

Scan step: 0.05°, Scan rate: 3.0°/min

Slit: DS 1°, SS 1°, RS 0.2 mm

Median Diameter of Pulverized Particles in Slurry:

The median diameter of pulverized particles in a slurry was determined from volume-based particle diameters measured with a known laser diffraction/scattering particle size distribution analyzer using the refractive index set at 1.24. An aqueous solution of 0.1% by weight sodium hexametaphosphate was used as a dispersion medium. The measurement was performed after five-minute ultrasonic dispersion (power: 30 W, frequency: 22.5 kHz).

Median Diameter, as Average Particle Diameter, of $Li_2CO_3$ Material Powder:

The median diameter was determined from volume-based particle diameters measured with a known laser diffraction/scattering particle size distribution analyzer (LA-920, manufactured by Horiba Ltd.) using the refractive index set at 1.24. Ethyl alcohol was used as a dispersion medium. The measurement was performed after five-minute ultrasonic dispersion (power: 30 W, frequency: 22.5 kHz).

Physical Properties of Powder Prepared by Spray Drying:

The structure of the powder was determined by SEM observation and cross-sectional SEM observation. The median diameter as an average particle diameter and the 90% cumulative diameter ($D_{90}$) were determined from volume-based particle diameters measured with a known laser diffraction/scattering particle size distribution analyzer (LA-920, manufactured by Horiba Ltd.) using the refractive index set at 1.24. An aqueous solution of 0.1% by weight sodium hexametaphosphate was used as a dispersion medium. The measurement was performed after zero-, 1-, 3-, 5-minute ultrasonic dispersion (power: 30 W, frequency: 22.5 kHz). The specific surface area was measured by the BET method. The bulk density was determined by placing 4 to 6 g of a sample powder in a 10-mL glass graduated cylinder, tapping this cylinder 200 times with a stroke of about 20 mm, and then measuring the density of the powder thus packed. Determination of crystal phase (layered structure) and measurement of half-width FWHM (110):

Determination of presence or absence of peak from heterophase in (018), (110), and (113) diffraction peaks and calculation of integrated intensity of diffraction peaks from heterophase and target crystal phase and ratio of integrated intensity of diffraction peak from heterophase to integrated intensity of diffraction peaks from target crystal phase:

The properties were determined by powder X-ray diffraction measurement using CuKα radiation described below. With respect to (018), (110), and (113) diffraction peaks observed in each sample and derived from a hexagonal system R-3m (No. 166), profile fitting was performed to calculate the integrated intensities, the proportion of the integrated intensities, and the like.

The half-width and area were calculated from a diffraction pattern measured in a fixed slit mode by a focusing method.

In actual XRD measurement (Example and Comparative Examples), the measurement was performed in a variable slit mode, the resulting data in the variable slit mode was converted into data in a fixed slit mode.

The conversion from the data in the variable slit mode into the data in the fixed slit mode was performed according to the formula intensity (fixed)=intensity (variable)/sin θ.

<Specification of Powder X-Ray Diffractometer>
  Model: X'Pert Pro MPD, manufactured by PANalytical
  Optical system: Optical system according to the focusing method
<Specification of Optical System>
  Incident side: Sealed X-ray tube (CuKα)
  Soller Slit (0.04 rad)
  Divergence Slit (variable slit)
  Sample stage: Rotating sample stage (spinner)
  Receiving side: Semiconductor array detector (X'Celerator)
  Ni-filter
  Goniometer radius: 243 mm
<Measurement Conditions>
  Measurement conditions are as described above.
<Quantification of Additive Elements (Mo, W, Nb, B, and Sn)>
  The amounts of the additive elements were determined by ICP-AES analysis.
<Composition Analysis of Surface of Primary Particles by X-Ray Photoelectron Spectroscopy (XPS)>
  The composition analysis was performed with an X-ray photoelectron spectrometer (model: ESCA-5700, manufactured by Physical Electronics, Inc.) under the conditions described below.
  X-ray source: Monochromatic AlKα
  Analysis area: 0.8 mm in diameter
  Take-off angle: 65°
  Quantification method: The correction of the area of each of B1s, $Mn2p_{1/2}$, $Co2p_{3/2}$, $Ni2p_{3/2}$, Nb3d, Mo3d, $Sn3d_{5/2}$, and W4f peaks was performed with sensitivity coefficients.

[Production of Powder of Lithium Transition-Metal Compound (Examples and Comparative Examples)]

Example 1

$Li_2CO_3$, $Ni(OH)_2$, and $Mn_3O_4$ were weighed and mixed in such a manner that the molar ratio was Li:Ni:Mn=1.267:0.250:0.583. Deionized water was added to the mixture to form a slurry. The slurry was stirred to pulverize the solid components in the slurry in such a manner that the solid components have a median diameter of 0.15 μm, with a circulating wet pulverizer of the dispersing medium agitation type.

The slurry was spray-dried with a spray dryer to form a powder. About 15 g of the resulting powder was charged into an alumina crucible and fired at 950° C. for 12 hours (heating and cooling rates: 5° C./min) in an air atmosphere. The fired powder was disaggregated to yield a lithium-nickel-manganese composite oxide having a composition of $Li_{1.088}(Li_{0.167}Ni_{0.254}Mn_{0.579})O_2$ (x=0.167, y=0, and z=0.088), a volume resistivity of 3.7×10⁶ Ω·cm, and a carbon content of 0.092% by weight. The average primary-particle diameter was 0.2 μm. The median diameter was 1.7 μm. The 90% cumulative diameter (hereinafter, also referred to as "$D_{90}$") was 3.6 μm. The bulk density was 0.8 g/cc. The BET specific surface area was 3.1 m²/g.

Example 2

$Li_2CO_3$, $Ni(OH)_2$, and $Mn_3O_4$ were weighed and mixed in such a manner that the molar ratio was Li:Ni:Mn=1.267:0.250:0.583. Deionized water was added to the mixture to form a slurry. The slurry was stirred to pulverize the solid components in the slurry in such a manner that the solid components have a median diameter of 0.16 μm, with a circulating wet pulverizer of the dispersing medium agitation type.

The slurry was spray-dried with a spray dryer to form a powder. About 15 g of the resulting powder was charged into an alumina crucible and fired at 1,000° C. for 12 hours (heating and cooling rates: 5° C./min) in an air atmosphere. The fired powder was disaggregated to yield a lithium-nickel-manganese composite oxide having a composition of $Li_{1.067}(Li_{0.167}Ni_{0.254}Mn_{0.579})O_2$ (x=0.167, y=0, and z=0.067), a volume resistivity of 9.2×10⁵ Ω·cm, and a carbon content of 0.059% by weight. The average primary-particle diameter was 0.5 μm. The median diameter was 2.6 μm. $D_{90}$ was 4.6 μm. The bulk density was 1.0 g/cc. The BET specific surface area was 2.1 m²/g.

Example 3

$Li_2CO_3$, $Ni(OH)_2$, and $Mn_3O_4$ were weighed and mixed in such a manner that the molar ratio was Li:Ni:Mn=1.211:0.333:0.556. Deionized water was added to the mixture to form a slurry. The slurry was stirred to pulverize the solid components in the slurry in such a manner that the solid components have a median diameter of 0.17 μm, with a circulating wet pulverizer of the dispersing medium agitation type.

The slurry was spray-dried with a spray dryer to form a powder. About 15 g of the resulting powder was charged into an alumina crucible and fired at 900° C. for 12 hours (heating and cooling rates: 5° C./min) in an air atmosphere. The fired powder was disaggregated to yield a lithium-nickel-manganese composite oxide having a composition of $Li_{1.066}(Li_{0.111}Ni_{0.334}Mn_{0.555})O_2$ (x=0.111, y=0, and z=0.066), a volume resistivity of 2.0×10⁵ Ω·cm, and a carbon content of 0.084% by weight. The crystal structure was determined to have the R(−3)m layered structure. The average primary-particle diameter was 0.2 μm. The median diameter was 2.7 μm. $D_{90}$ was 5.1 μm. The bulk density was 0.8 g/cc. The BET specific surface area was 3.0 m²/g.

Example 4

$Li_2CO_3$, $Ni(OH)_2$, and $Mn_3O_4$ were weighed and mixed in such a manner that the molar ratio was Li:Ni:Mn=1.20:0.50:0.50. Deionized water was added to the mixture to form a slurry. The slurry was stirred to pulverize the solid components in the slurry in such a manner that the solid components have a median diameter of 0.21 μm, with a circulating wet pulverizer of the dispersing medium agitation type.

The slurry was spray-dried with a spray dryer to form a powder. About 15 g of the resulting powder was charged into an alumina crucible and fired at 950° C. for 12 hours (heating and cooling rates: 5° C./min) in an air atmosphere. The fired powder was disaggregated to yield a lithium-nickel-manganese composite oxide having a composition of $Li_{1.133}(Ni_{0.501}Mn_{0.499})O_2$ (x=0, y=0, and z=0.133), a volume resistivity of $4.6 \times 10^4$ Ω·cm, and a carbon content of 0.050% by weight. The average primary-particle diameter was 0.6 µm. The median diameter was 3.8 µm. $D_{90}$ was 6.1 µm. The bulk density was 1.0 g/cc. The BET specific surface area was 1.9 m²/g.

Example 5

$Li_2CO_3$, $Ni(OH)_2$, $Mn_3O_4$, and CoOOH were weighed and mixed in such a manner that the molar ratio was Li:Ni:Mn:Co=1.143:0.278:0.463:0.167. Deionized water was added to the mixture to form a slurry. The slurry was stirred to pulverize the solid components in the slurry in such a manner that the solid components have a median diameter of 0.18 µm, with a circulating wet pulverizer of the dispersing medium agitation type.

The slurry was spray-dried with a spray dryer to form a powder. About 15 g of the resulting powder was charged into an alumina crucible and fired at 950° C. for 12 hours (heating and cooling rates: 5° C./min) in an air atmosphere. The fired powder was disaggregated to yield a lithium-nickel-manganese-cobalt composite oxide having a composition of $Li_{0.986}(Li_{0.093}Ni_{0.281}Mn_{0.458}Co_{0.168})O_2$ (x=0.112, y=0.168, and z=−0.014), a volume resistivity of $5.0 \times 10^5$ Ω·cm, and a carbon content of 0.052% by weight. The average primary-particle diameter was 0.3 µm. The median diameter was 3.0 µm. 90% $D_{90}$ was 5.1 µm. The bulk density was 1.0 g/cc. The BET specific surface area was 2.6 m²/g.

Example 6

$Li_2CO_3$, $Ni(OH)_2$, $Mn_3O_4$, and CoOOH were weighed and mixed in such a manner that the molar ratio was Li:Ni:Mn:Co=1.10:0.45:0.45:0.10. Deionized water was added to the mixture to form a slurry. The slurry was stirred to pulverize the solid components in the slurry in such a manner that the solid components have a median diameter of 0.16 µm, with a circulating wet pulverizer of the dispersing medium agitation type.

The slurry was spray-dried with a spray dryer to form a powder. About 15 g of the resulting powder was charged into an alumina crucible and fired at 925° C. for 6 hours (heating and cooling rates: 3.33° C./min) in an air atmosphere. The fired powder was disaggregated to yield a lithium-nickel-manganese-cobalt composite oxide having a composition of $Li_{1.125}(Ni_{0.455}Mn_{0.455}Co_{0.100})O_2$ (x=0, y=0.100, and z=0.125), a volume resistivity of $1.9 \times 10^4$ Ω·cm, and a carbon content of 0.043% by weight. The average primary-particle diameter was 0.2 µm. The median diameter was 1.1 µm. $D_{90}$ was 1.6 µm. The bulk density was 0.9 g/cc. The BET specific surface area was 3.3 m²/g.

Example 7

$Li_2CO_3$, $Ni(OH)_2$, and $Mn_3O4$ were weighed and mixed in such a manner that the molar ratio was Li:Ni:Mn=1.15:0.50:0.50. Deionized water was added to the mixture to form a slurry. The slurry was stirred to pulverize the solid components in the slurry in such a manner that the solid components have a median diameter of 0.14 µm, with a circulating wet pulverizer of the dispersing medium agitation type.

The slurry was spray-dried with a spray dryer to form a powder. About 15 g of the resulting powder was charged into an alumina crucible and fired at 1,000° C. for 6 hours (heating and cooling rates: 3.33° C./min) in an air atmosphere. The fired powder was disaggregated to yield a lithium-nickel-manganese composite oxide having a composition of $Li_{1.166}(Ni_{0.504}Mn_{0.496})O_2$ (x=0, y=0, and z=0.166), a volume resistivity of $2.1 \times 10^4$ Ω·cm, and a carbon content of 0.045% by weight. The average primary-particle diameter was 0.5 µm. The median diameter was 3.3 µm. $D_{90}$ was 5.6 µm. The bulk density was 1.2 g/cc. The BET specific surface area was 1.9 m²/g.

Comparative Example 1

$Ni(OH)_2$ and $Mn_3O_4$ were weighed and mixed in such a manner that the molar ratio was Ni:Mn=0.250:0.583. Deionized water was added to the mixture to form a slurry. The slurry was stirred to pulverize the solid components in the slurry in such a manner that the solid components have a median diameter of 0.16 µm, with a circulating wet pulverizer of the dispersing medium agitation type.

The slurry was spray-dried with a spray dryer to form a powder. A $Li_2CO_3$ having a median diameter of 9 µm was mixed with the powder. About 100 g of the resulting mixture powder was uniformly divided into six alumina crucibles and fired at 950° C. for 12 hours (heating and cooling rates: 5° C./min) in an air stream. The fired powder was disaggregated to yield a lithium-nickel-manganese composite oxide having a composition of $Li_{1.035}(Li_{0.167}Ni_{0.252}Mn_{0.581})O_2$ (x=0.167, y=0, z=0.035), a volume resistivity of $1.4 \times 10^6$ Ω·cm, and a carbon content of 0.034% by weight. The average primary-particle diameter was 0.3 µm. The median diameter was 5.7 µm. The 90% cumulative diameter was 8.6 µm. The bulk density was 1.7 g/cc. The BET specific surface area was 2.0 m²/g.

Comparative Example 2

$Ni(OH)_2$ and $Mn_3O_4$ were weighed and mixed in such a manner that the molar ratio was Ni:Mn=0.333:0.556. Deionized water was added to the mixture to form a slurry. The slurry was stirred to pulverize the solid components in the slurry in such a manner that the solid components have a median diameter of 0.15 µm, with a circulating wet pulverizer of the dispersing medium agitation type.

The slurry was spray-dried with a spray dryer to form a powder. A $Li_2CO_3$ having a median diameter of 9 µm was mixed with the powder. About 15.9 g of the resulting mixture powder was charged into an alumina crucible and fired at 1,000° C. for 12 hours (heating and cooling rates: 5° C./min) in an air stream. The fired powder was disaggregated to yield a lithium-nickel-manganese composite oxide having a composition of $Li_{1.082}(Li_{0.111}Ni_{0.335}Mn_{0.554})O_2$ (x=0.111, y=0, z=0.082), a volume resistivity of $9.4 \times 10^4$ Ω·cm, and a carbon content of 0.045% by weight. The crystal structure was determined to have the R(−3)m layered structure. The average primary-particle diameter was 0.4 µm. The median diameter was 5.9 µm. $D_{90}$ was 8.8 µm. The bulk density was 1.5 g/cc. The BET specific surface area was 1.1 m²/g.

Comparative Example 3

$Ni(OH)_2$ and $Mn_3O_4$ were weighed and mixed in such a manner that the molar ratio was Ni:Mn=0.50:0.50. Deionized water was added to the mixture to form a slurry. The slurry was stirred to pulverize the solid components in the slurry in such a manner that the solid components have a median diameter of 0.16 μm, with a circulating wet pulverizer of the dispersing medium agitation type.

The slurry was spray-dried with a spray dryer to form a powder. A $Li_2CO_3$ having a median diameter of 9 μm was mixed with the powder. About 87.8 g of the resulting mixture powder was uniformly divided into six alumina crucibles and fired at 1,000° C. for 12 hours (heating and cooling rates: 5° C./min) in an air stream. The fired powder was disaggregated to yield a lithium-nickel-manganese composite oxide having a composition of $Li_{1.084}(Ni_{0.505}Mn_{0.495})O_2$ (x=0, y=0, z=0.084), a volume resistivity of $3.9×10^4$ Ω·cm, and a carbon content of 0.031% by weight. The crystal structure was determined to have the R(-3)m layered structure. The average primary-particle diameter was 0.5 μm. The median diameter was 4.7 μm. $D_{90}$ was 6.9 μm. The bulk density was 1.6 g/cc. The BET specific surface area was 1.2 m²/g.

Comparative Example 4

$Ni(OH)_2$ and $Mn_3O_4$ were weighed and mixed in such a manner that the molar ratio was Ni:Mn=0.50:0.50. Deionized water was added to the mixture to form a slurry. The slurry was stirred to pulverize the solid components in the slurry in such a manner that the solid components have a median diameter of 0.16 μm, with a circulating wet pulverizer of the dispersing medium agitation type.

The slurry was spray-dried with a spray dryer to form a powder. A $Li_2CO_3$ having a median diameter of 9 μm was mixed with the powder. About 15 g of the resulting mixture powder was charged into an alumina crucible and fired at 1,000° C. for 12 hours (heating and cooling rates: 3.33° C./min) in an air stream. The fired powder was disaggregated to yield a lithium-nickel-manganese composite oxide having a composition of $Li_{1.152}(Ni_{0.505}Mn_{0.495})O_2$ (x=0, y=0, z=0.152), a volume resistivity of $1.2×10^4$ Ω·cm, and a carbon content of 0.035% by weight. The average primary-particle diameter was 0.6 μm. The median diameter was 6.1 μm. $D_{90}$ was 9.1 μm. The bulk density was 1.5 g/cc. The BET specific surface area was 0.7 m²/g.

Comparative Example 5

$Ni(OH)_2$, $Mn_3O_4$, and CoOOH were weighed and mixed in such a manner that the molar ratio was Ni:Mn:Co=0.278: 0.463:0.167. Deionized water was added to the mixture to form a slurry. The slurry was stirred to pulverize the solid components in the slurry in such a manner that the solid components have a median diameter of 0.16 μm, with a circulating wet pulverizer of the dispersing medium agitation type.

The slurry was spray-dried with a spray dryer to form a powder. A $Li_2CO_3$ having a median diameter of 9 μm was mixed with the powder. About 15.4 g of the resulting mixture powder was charged into an alumina crucible and fired at 900° C. for 12 hours (heating and cooling rates: 5° C./min) in an air stream. The fired powder was disaggregated to yield a lithium-nickel-manganese-cobalt composite oxide having a composition of $Li_{0.960}(Ni_{0.280}Mn_{0.459}Co_{0.168})O_2$ (x=0.112, y=0.168, z=-0.040), a volume resistivity of $1.1×10^6$ Ω·cm, and a carbon content of 0.046% by weight. The average primary-particle diameter was 0.2 μm. The median diameter was 5.2 μm. $D_{90}$ was 7.7 μm. The bulk density was 1.8 g/cc. The BET specific surface area was 2.2 m²/g.

Comparative Example 6

$Ni(OH)_2$, $Mn_3O_4$, and $Co(OH)_2$ were weighed and mixed in such a manner that the molar ratio was Ni:Mn:Co=0.45: 0.45:0.10. Deionized water was added to the mixture to form a slurry. The slurry was stirred to pulverize the solid components in the slurry in such a manner that the solid components have a median diameter of 0.15 μm, with a circulating wet pulverizer of the dispersing medium agitation type.

The slurry was spray-dried with a spray dryer to form a powder. A LiOH powder pulverized so as to have a median diameter of 20 μm or less was mixed with the powder. About 13.1 g of the resulting mixture powder was charged into an alumina crucible and fired at 950° C. for 10 hours (heating and cooling rates: 5° C./min) in an air stream. The fired powder was disaggregated to yield a lithium-nickel-manganese-cobalt composite oxide having a composition of $Li_{1.130}(Ni_{0.443}Mn_{0.453}Co_{0.105})O_2$ (x=0, y=0.105, z=0.130), a volume resistivity of $1.7×10^4$ Ω·cm, and a carbon content of 0.031% by weight. The average primary-particle diameter was 0.5 μm. The median diameter was 11.1 μm. $D_{90}$ was 18.4 μm. The bulk density was 1.8 g/cc. The BET specific surface area was 1.3 m²/g.

Tables 1 and 2 show the compositions and physical properties of the powders (positive-electrode material) of the lithium transition-metal compounds produced in Examples 1 to 7 and Comparative Examples 1 to 6 described above.

TABLE 1

| Positive-electrode material | | x | y | z | Composition Lower limit of z | Upper limit of z*1 | Carbon content C (wt %) | Volume resistivity (Ω·cm) |
|---|---|---|---|---|---|---|---|---|
| Example | 1 | 0.167 | 0 | 0.088 | −0.02 | 0.100 | 0.092 | $3.7 × 10^6$ |
|  | 2 | 0.167 | 0 | 0.067 | −0.02 | 0.100 | 0.059 | $9.2 × 10^5$ |
|  | 3 | 0.111 | 0 | 0.066 | −0.02 | 0.133 | 0.084 | $2.0 × 10^5$ |
|  | 4 | 0 | 0 | 0.133 | −0.02 | 0.200 | 0.050 | $4.6 × 10^4$ |
|  | 5 | 0.112 | 0.168 | −0.014 | −0.02 | 0.120 | 0.052 | $5.0 × 10^5$ |
| Comparative Example | 1 | 0.167 | 0 | 0.035 | −0.02 | 0.100 | 0.034 | $1.4 × 10^6$ |
|  | 2 | 0.111 | 0 | 0.082 | −0.02 | 0.133 | 0.045 | $9.4 × 10^4$ |
|  | 3 | 0 | 0 | 0.084 | −0.02 | 0.200 | 0.031 | $3.9 × 10^4$ |
|  | 4 | 0 | 0 | 0.152 | −0.02 | 0.200 | 0.035 | $1.2 × 10^4$ |
|  | 5 | 0.112 | 0.168 | −0.040 | −0.02 | 0.120 | 0.046 | $1.1 × 10^6$ |

*1: $0.2(1 - y)(1 - 3x)$

TABLE 2

| Positive-electrode material | | Amount of mercury intruded[3] (ml/g) | Pore radius (nm) | | Partial pore volume (ml/g) | | Average primary-particle diameter (μm) | Median diameter (μm) | 90% cumulative diameter (D90) (μm) | Bulk density (g/cm$^3$) | BET specific surface area (m$^2$/g) |
|---|---|---|---|---|---|---|---|---|---|---|---|
| | | | Peak top1[4] | Peak top2[5] | Peak top1 | Peak top2 | | | | | |
| Example | 1 | 1.15 | — | 403 | — | 0.66 | 0.2 | 1.7 | 3.6 | 0.8 | 3.1 |
| | 2 | 1.02 | — | 621 | — | 0.55 | 0.5 | 2.6 | 4.6 | 1.0 | 2.1 |
| | 3 | 1.69 | — | 403 | — | 0.63 | 0.2 | 2.7 | 5.1 | 0.8 | 3.0 |
| | 4 | 0.93 | — | 777 | — | 0.58 | 0.6 | 3.8 | 6.1 | 1.0 | 1.9 |
| | 5 | 1.16 | — | 495 | — | 0.60 | 0.3 | 3.0 | 5.1 | 1.0 | 2.6 |
| Comparative Example | 1 | 0.67 | 209 | 944 | 0.06 | 0.32 | 0.3 | 5.7 | 8.6 | 1.7 | 2.0 |
| | 2 | 0.70 | 170 | 1447 | 0.03 | 0.39 | 0.4 | 5.9 | 8.8 | 1.5 | 1.1 |
| | 3 | 0.60 | 170 | 940 | 0.04 | 0.32 | 0.5 | 4.7 | 6.9 | 1.6 | 1.2 |
| | 4 | 0.63 | — | 941 | — | 0.41 | 0.6 | 6.1 | 9.1 | 1.5 | 0.7 |
| | 5 | 0.55 | 136 | 1072 | 0.06 | 0.28 | 0.2 | 5.2 | 7.7 | 1.8 | 2.2 |

[2] In a mercury intrusion curve obtained by mercury intrusion porosimetry, the amount of mercury intruded when the pressure is increased from 3.86 kPa to 413 MPa.
[3] In a pore-size distribution curve, the peak top of a sub-peak observed at a pore radius greater than or equal to 80 nm and less than 300 nm.
[4] In a pore-size distribution curve, the peak top of a main peak observed at a pore radius of 300 nm or more.

Example 8

$Li_2CO_3$, $Ni(OH)_2$, $Mn_3O_4$, and CoOOH were weighed and mixed in such a manner that the molar ratio was Li:Ni:Mn:Co=1.10:0.45:0.45:0.10. Deionized water was added to the mixture to form a slurry. The slurry was stirred to pulverize the solid components in the slurry in such a manner that the solid components have a median diameter of 0.16 μm, with a circulating wet pulverizer of the dispersing medium agitation type.

The slurry (solid content: 13% by weight, viscosity: 1,350 cp) was spray-dried with a spray dryer using a two-fluid nozzle (model: LT-8, manufactured by Ohkawara Kakohki Co., Ltd). As a drying gas, air was used. The amount G of drying gas fed was set at 45 L/min. The amount S of slurry fed was set at $11 \times 10^{-3}$ mL/min (the gas-liquid ratio G/S=4,091). The temperature of an inlet was set at 150° C. About 15 g of the powder prepared by spray-drying the slurry with the spray dryer was charged into an alumina crucible and fired at 1,000° C. for 6 hours (heating and cooling rates: 3.33° C./min) in an air atmosphere. The fired powder was disaggregated to yield a layered lithium-nickel-manganese-cobalt composite oxide having a composition of $Li_{1.096}(Ni_{0.458}Mn_{0.444}Co_{0.098})O_2$ (x'=0.098, y'=0.016, and z'=0.096), a volume resistivity of $2.7 \times 10^4$ Ω·cm, and a carbon content of 0.023% by weight. The powder of the lithium-nickel-manganese-cobalt composite oxide had an average primary-particle diameter of 0.6 μm, a median diameter of 3.0 μm, a $D_{90}$ of 5.1 μm, a bulk density of 1.2 g/cc, and BET specific surface area of 1.7 m$^2$/g.

Example 9

$Li_2CO_3$, $Ni(OH)_2$, $Mn_3O_4$, and CoOOH were weighed and mixed in such a manner that the molar ratio was Li:Ni:Mn:Co=1.10:0.45:0.45:0.10. Deionized water was added to the mixture to form a slurry. The slurry was stirred to pulverize the solid components in the slurry in such a manner that the solid components have a median diameter of 0.16 μm, with a circulating wet pulverizer of the dispersing medium agitation type.

The slurry (solid content: 13% by weight, viscosity: 1,350 cp) was spray-dried with a spray dryer using a two-fluid nozzle (model: LT-8, manufactured by Ohkawara Kakohki Co., Ltd). As a drying gas, air was used. The amount G of drying gas fed was set at 45 L/min. The amount S of slurry fed was set at $11 \times 10^{-3}$ L/min (the gas-liquid ratio G/S=4,091). The temperature of an inlet was set at 150° C. About 15 g of the powder prepared by spray-drying the slurry with the spray dryer was charged into an alumina crucible and fired at 975° C. for 6 hours (heating and cooling rates: 3.33° C./min) in an air atmosphere. The fired powder was disaggregated to yield a layered lithium-nickel-manganese-cobalt composite oxide having a composition of $Li_{1.118}(Ni_{0.456}Mn_{0.445}Co_{0.099})O_2$ (x'=0.099, y'=0.012, and z'=0.118), a volume resistivity of $2.2 \times 10^4$ Ω·cm, and a carbon content of 0.030% by weight. The powder of the lithium-nickel-manganese-cobalt composite oxide had an average primary-particle diameter of 0.5 μm, a median diameter of 3.1 μm, a $D_{90}$ of 5.5 μm, a bulk density of 1.1 g/cc, and BET specific surface area of 2.2 m$^2$/g.

Example 10

$Li_2CO_3$, $Ni(OH)_2$, $Mn_3O_4$, and CoOOH were weighed and mixed in such a manner that the molar ratio was Li:Ni:Mn:Co=1.05:0.45:0.45:0.10. Deionized water was added to the mixture to form a slurry. The slurry was stirred to pulverize the solid components in the slurry in such a manner that the solid components have a median diameter of 0.16 μm, with a circulating wet pulverizer of the dispersing medium agitation type.

The slurry (solid content: 13% by weight, viscosity: 1,310 cp) was spray-dried with a spray dryer using a two-fluid nozzle (model: LT-8, manufactured by Ohkawara Kakohki Co., Ltd). As a drying gas, air was used. The amount G of drying gas fed was set at 45 L/min. The amount S of slurry fed was set at $11 \times 10^{-3}$ L/min (the gas-liquid ratio G/S=4,091). The temperature of an inlet was set at 150° C. About 15 g of the powder prepared by spray-drying the slurry with the spray dryer was charged into an alumina crucible and fired at 1,000° C. for 6 hours (heating and cooling rates: 3.33° C./min) in an air atmosphere. The fired powder was disaggregated to yield a layered lithium-nickel-manganese-cobalt composite oxide having a composition of $Li_{1.064}(Ni_{0.457}Mn_{0.445}Co_{0.098})O_2$ (x'=0.098, y'=0.013, and z'=0.064), a volume resistivity of $9.3 \times 10^4$ Ω·cm, and a carbon content of 0.030% by weight. The powder of the lithium-nickel-manganese-cobalt composite oxide had an average primary-particle diameter of 0.5 μm, a median diameter of 2.1 μm, a $D_{90}$ of 3.8 μm, a bulk density of 1.2 g/cc, and BET specific surface area of 1.9 m$^2$/g.

Example 11

$Li_2CO_3$, $Ni(OH)_2$, $Mn_3O_4$, and CoOOH were weighed and mixed in such a manner that the molar ratio was Li:Ni:Mn:Co=1.10:0.475:0.475:0.05. Deionized water was added to the mixture to form a slurry. The slurry was stirred to pulverize the solid components in the slurry in such a manner that the solid components have a median diameter of 0.13 μm, with a circulating wet pulverizer of the dispersing medium agitation type.

The slurry (solid content: 14% by weight, viscosity: 1,960 cp) was spray-dried with a spray dryer using a two-fluid nozzle (model: LT-8, manufactured by Ohkawara Kakohki Co., Ltd). As a drying gas, air was used. The amount G of drying gas fed was set at 45 L/min. The amount S of slurry fed was set at $11 \times 10^{-3}$ L/min (the gas-liquid ratio G/S=4,091). The temperature of an inlet was set at 150° C. About 15 g of the powder prepared by spray-drying the slurry with the spray dryer was charged into an alumina crucible and fired at 1,000° C. for 6 hours (heating and cooling rates: 3.33° C./min) in an air atmosphere. The fired powder was disaggregated to yield a layered lithium-nickel-manganese-cobalt composite oxide having a composition of $Li_{1.115}(Ni_{0.481}Mn_{0.470}Co_{0.049})O_2$ (x'=0.049, y'=0.012, and z'=0.115), a volume resistivity of $2.6 \times 10^4$ Ω·cm, and a carbon content of 0.031% by weight. The powder of the lithium-nickel-manganese-cobalt composite oxide had an average primary-particle diameter of 0.4 μm, a median diameter of 3.7 μm, a $D_{90}$ of 6.1 μm, a bulk density of 1.1 g/cc, and BET specific surface area of 1.9 m²/g.

Comparative Example 7

$Ni(OH)_2$, $Mn_3O_4$, and $Co(OH)_2$ were weighed and mixed in such a manner that the molar ratio was Ni:Mn:Co=0.45:0.45:0.10. Deionized water was added to the mixture to form a slurry. The slurry was stirred to pulverize the solid components in the slurry in such a manner that the solid components have a median diameter of 0.15 μm, with a circulating wet pulverizer of the dispersing medium agitation type.

The slurry (solid content: 12% by weight, viscosity: 700 cp) was spray-dried with a spray dryer using a two-fluid nozzle (model: LT-8, manufactured by Ohkawara Kakohki Co., Ltd). As a drying gas, air was used. The amount G of drying gas fed was set at 30 L/min. The amount S of slurry fed was set at $38 \times 10^{-3}$ L/min (the gas-liquid ratio G/S=789). The temperature of an inlet was set at 150° C.

A LiOH powder pulverized so as to have a median diameter of 20 μm or less was mixed with the powder prepared by spray drying as described above. About 13.1 g of the resulting mixture powder was charged into an alumina crucible and fired at 950° C. for 10 hours (heating and cooling rates: 5° C./min) in an air stream. The fired powder was disaggregated to yield a layered lithium-nickel-manganese-cobalt composite oxide having a composition of $Li_{1.130}(Ni_{0.443}Mn_{0.453}Co_{0.105})O_2$ (x=0.105, y=0.012, z=0.130), a volume resistivity of $1.7 \times 10^4$ Ω·cm, and a carbon content of 0.031% by weight. The powder of the lithium-nickel-manganese-cobalt composite oxide had an average primary-particle diameter of 0.5 μm, a median diameter of 11.1 μm, a $D_{90}$ of 18.4 μm, a bulk density of 1.8 g/cc, and BET specific surface area of 1.3 m²/g.

Comparative Example 8

$Li_2CO_3$, $Ni(OH)_2$, and $Mn_3O_4$ were weighed and mixed in such a manner that the molar ratio was Li:Ni:Mn=1.10:0.50:0.50. Deionized water was added to the mixture to form a slurry. The slurry was stirred to pulverize the solid components in the slurry in such a manner that the solid components have a median diameter of 0.14 μm, with a circulating wet pulverizer of the dispersing medium agitation type.

The slurry (solid content: 13% by weight, viscosity: 1,270 cp) was spray-dried with a spray dryer using a two-fluid nozzle (model: LT-8, manufactured by Ohkawara Kakohki Co., Ltd). As a drying gas, air was used. The amount G of drying gas fed was set at 45 L/min. The amount S of slurry fed was set at $11 \times 10^{-3}$ L/min (the gas-liquid ratio G/S=4,091). The temperature of an inlet was set at 150° C. About 15 g of the powder prepared by spray-drying the slurry with the spray dryer was charged into an alumina crucible and fired at 1,000° C. for 6 hours (heating and cooling rates: 3.33° C./min) in an air atmosphere. The fired powder was disaggregated to yield a layered lithium-nickel-manganese composite oxide having a composition of $Li_{1.080}(Ni_{0.505}Mn_{0.495})O_2$ (x'=0, y'=0.010, and z'=0.081), a volume resistivity of $2.4 \times 10^4$ Ω·cm, and a carbon content of 0.044% by weight. The powder of the lithium-nickel-manganese composite oxide had an average primary-particle diameter of 0.4 μm, a median diameter of 1.4 μm, a $D_{90}$ of 2.1 μm, a bulk density of 1.0 g/cc, and BET specific surface area of 2.7 m²/g.

Comparative Example 9

$Li_2CO_3$, $Ni(OH)_2$, and $Mn_3O_4$ were weighed and mixed in such a manner that the molar ratio was Li:Ni:Mn=1.15:0.50:0.50. Deionized water was added to the mixture to form a slurry. The slurry was stirred to pulverize the solid components in the slurry in such a manner that the solid components have a median diameter of 0.14 μm, with a circulating wet pulverizer of the dispersing medium agitation type.

The slurry (solid content: 13% by weight, viscosity: 1,020 cp) was spray-dried with a spray dryer using a two-fluid nozzle (model: LT-8, manufactured by Ohkawara Kakohki Co., Ltd). As a drying gas, air was used. The amount G of drying gas fed was set at 45 L/min. The amount S of slurry fed was set at $11 \times 10^{-3}$ L/min (the gas-liquid ratio G/S=4,091). The temperature of an inlet was set at 150° C. About 15 g of the powder prepared by spray-drying the slurry with the spray dryer was charged into an alumina crucible and fired at 1,000° C. for 6 hours (heating and cooling rates: 3.33° C./min) in an air atmosphere. The fired powder was disaggregated to yield a layered lithium-nickel-manganese composite oxide having a composition of $Li_{1.166}(Ni_{0.505}Mn_{0.495})O_2$ (x'=0, y'=0.008, and z'=0.166), a volume resistivity of $2.1 \times 10^4$ Ω·cm, and a carbon content of 0.045% by weight. The powder of the lithium-nickel-manganese composite oxide had an average primary-particle diameter of 0.5 μm, a median diameter of 3.3 μm, a $D_{90}$ of 5.6 μm, a bulk density of 1.2 g/cc, and BET specific surface area of 1.9 m²/g.

Tables 3 to 6 show the compositions and physical properties of the powders of the lithium-nickel-manganese-cobalt composite oxides and the powder of the lithium-nickel-manganese composite oxides produced in Examples 8 to 11 and Comparative Examples 7 to 9 as described above. Table 4' shows the powder properties of the spray-dried powder as the firing precursor.

TABLE 3

| Positive-electrode material | | x | y | z | Lower limit of z*¹ | Upper limit of z*² | FWHM (110) | Carbon content C (wt %) | Volume resistivity (Ω · cm) |
|---|---|---|---|---|---|---|---|---|---|
| Example | 1 | 0.098 | 0.016 | 0.096 | 0.031 | 0.123 | 0.162 | 0.023 | $2.7 \times 10^4$ |
|  | 2 | 0.099 | 0.012 | 0.118 | 0.034 | 0.126 | 0.196 | 0.030 | $2.2 \times 10^4$ |
|  | 3 | 0.098 | 0.013 | 0.064 | 0.034 | 0.125 | 0.140 | 0.030 | $9.3 \times 10^4$ |
|  | 4 | 0.049 | 0.012 | 0.115 | 0.036 | 0.133 | 0.183 | 0.031 | $2.6 \times 10^4$ |

TABLE 3-continued

| Positive-electrode material | | Composition | | | Lower limit of z*1 | Upper limit of z*2 | FWHM (110) | Carbon content C (wt %) | Volume resistivity (Ω·cm) |
|---|---|---|---|---|---|---|---|---|---|
| | | x | y | z | | | | | |
| Comparative Example | 1 | 0.105 | −0.010 | 0.130 | 0.054 | 0.143 | 0.224 | 0.031 | $1.7 \times 10^4$ |
| | 2 | 0 | 0.010 | 0.081 | 0.040 | 0.141 | 0.212 | 0.044 | $2.4 \times 10^4$ |
| | 3 | 0 | 0.008 | 0.166 | 0.038 | 0.143 | 0.236 | 0.045 | $2.1 \times 10^4$ |

*1(1 − x)(0.05 − 0.98y)
*2(1 − x)(0.15 − 0.88y)

TABLE 4

| Positive-electrode material | | FWHM (110) | Integrated intensity | | | Ratio of integrated intensity | | |
|---|---|---|---|---|---|---|---|---|
| | | | $I_{018}$ ($I_{018*}$) | $I_{110}$ ($I_{110*}$) | $I_{113}$ ($I_{113*}$) | $I_{018*}/I_{018}$ | $I_{110*}/I_{110}$ | $I_{113*}/I_{113}$ |
| Example | 1 | 0.162 | 2542 (Heterophase undetected) | 2494 (Heterophase undetected) | 1286 (Heterophase undetected) | 0 | 0 | 0 |
| | 2 | 0.196 | 2270 (Heterophase undetected) | 2220 (Heterophase undetected) | 1177 (Heterophase undetected) | 0 | 0 | 0 |
| | 3 | 0.140 | 2451 (Heterophase undetected) | 2390 (Heterophase undetected) | 1245 (Heterophase undetected) | 0 | 0 | 0 |
| | 4 | 0.183 | 2310 (Heterophase undetected) | 2001 (319) | 1148 (Heterophase undetected) | 0 | 0.159 | 0 |
| Comparative Example | 1 | 0.224 | 1882 (Heterophase undetected) | 1864 (Heterophase undetected) | 968 (Heterophase undetected) | 0 | 0 | 0 |
| | 2 | 0.212 | 2037 (493) | 2026 (578) | 913 (270) | 0.242 | 0.285 | 0.296 |
| | 3 | 0.236 | 1678 (511) | 1552 (748) | 681 (382) | 0.305 | 0.482 | 0.561 |

TABLE 5

| Positive-electrode material | | Amount of mercury intruded[3] (ml/g) | Pore radius (nm) | | Partial pore volume (ml/g) | | Average primary-particle diameter (μm) | Median diameter (μm) | 90% cumulative diameter (D90) (μm) | Bulk density (g/cm³) | BET specific surface area (m²/g) |
|---|---|---|---|---|---|---|---|---|---|---|---|
| | | | Peak top1[4] | Peak top2[5] | Peak top1[4] | Peak top2[5] | | | | | |
| Example | 1 | 1.01 | — | 942 | — | 0.55 | 0.6 | 3.0 | 5.1 | 1.2 | 1.7 |
| | 2 | 0.96 | — | 495 | — | 0.56 | 0.5 | 3.1 | 5.5 | 1.1 | 2.2 |
| | 3 | 0.98 | — | 777 | — | 0.55 | 0.5 | 2.1 | 3.8 | 1.2 | 1.9 |
| | 4 | 0.74 | — | 402 | — | 0.38 | 0.4 | 3.7 | 6.1 | 1.1 | 1.9 |
| Comparative Example | 1 | 0.53 | 208 | 1818 | 0.09 | 0.25 | 0.5 | 11.1 | 18.4 | 1.8 | 1.3 |
| | 2 | 0.62 | — | 330 | — | 0.38 | 0.4 | 1.4 | 2.1 | 1.0 | 2.7 |
| | 3 | 1.07 | — | 780 | — | 0.58 | 0.5 | 3.3 | 5.6 | 1.2 | 1.9 |

[3]In a mercury intrusion curve obtained by mercury intrusion porosimetry, the amount of mercury intruded when the pressure is increased from 3.86 kPa to 413 MPa.
[4]In a pore-size distribution curve, the peak top of a sub-peak observed at a pore radius greater than or equal to 80 nm and less than 300 nm.
[5]In a pore-size distribution curve, the peak top of a main peak observed at a pore radius of 300 nm or more.

TABLE 6

| Positive-electrode material | | Powder properties of dry powder | | | | | |
|---|---|---|---|---|---|---|---|
| | | Median diameter (μm) | | | | Bulk density (g/cm³) | BET specific surface area (m²/g) |
| | | US 0 min | US 1 min | US 3 min | US 5 min | | |
| Example | 1 | 6.2 | 5.5 | 4.2 | 1.9 | 0.8 | 60.0 |
| | 2 | 6.2 | 5.5 | 4.2 | 1.9 | 0.8 | 60.0 |
| | 3 | 6.0 | 5.3 | 4.4 | 1.9 | 1.1 | 59.8 |
| | 4 | 7.2 | 5.4 | 0.8 | 0.4 | 0.9 | 58.2 |
| Comparative Example | 1 | 11.9 | 11.7 | 11.1 | 10.4 | 1.3 | 31.5 |
| | 2 | 5.2 | 5.2 | 3.2 | 0.7 | 0.8 | 50.7 |
| | 3 | 5.8 | 5.0 | 3.9 | 2.4 | 0.8 | 50.1 |

[6]US represents "ultrasonic dispersion" treatment. The numeric value next to US represents treatment time (min).

Figure 40:
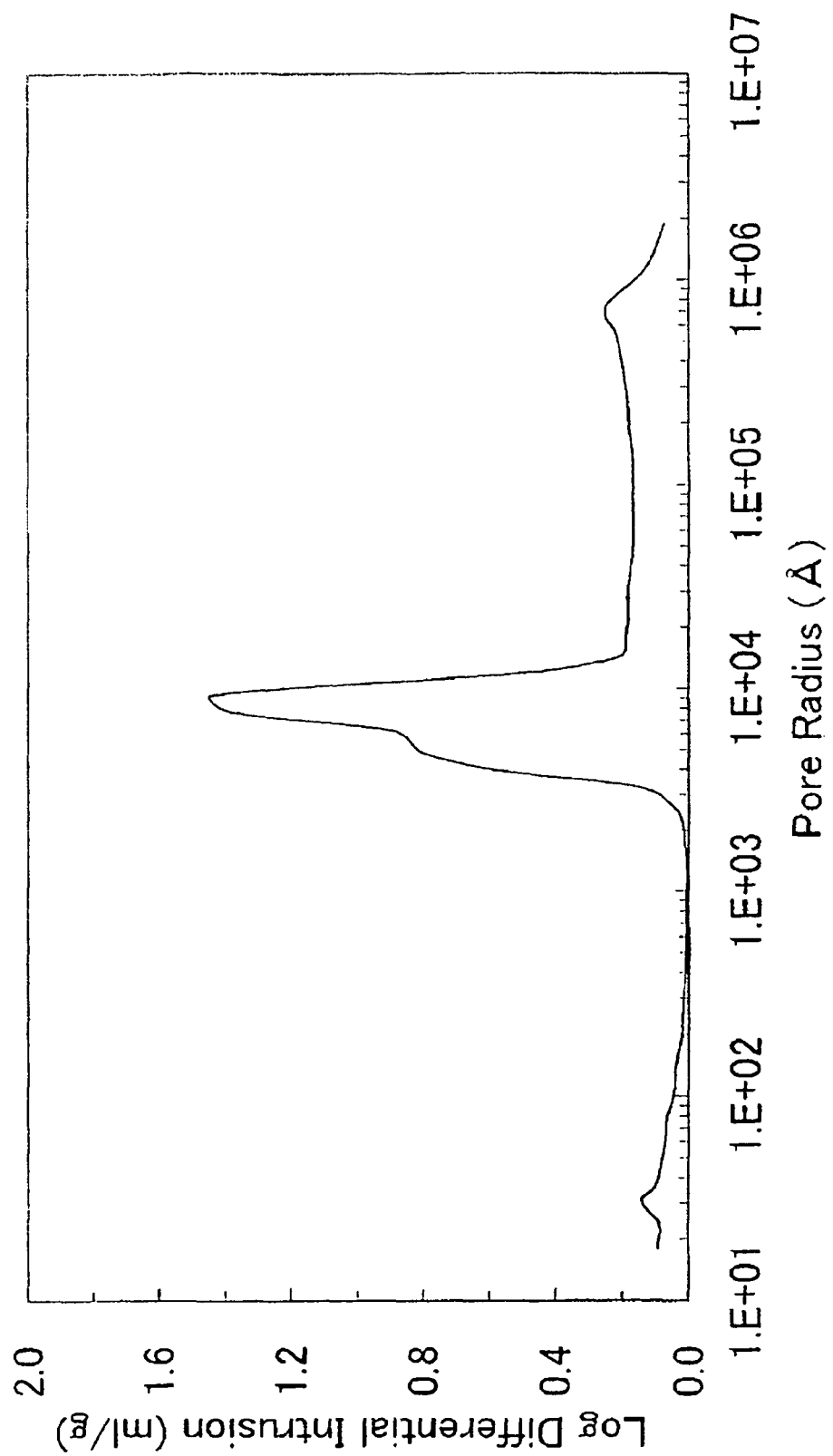
FIG. 40 is a graph showing a pore-size distribution curve of a lithium-nickel-manganese-cobalt composite-oxide powder prepared in EXAMPLE 8.
Figure 41:
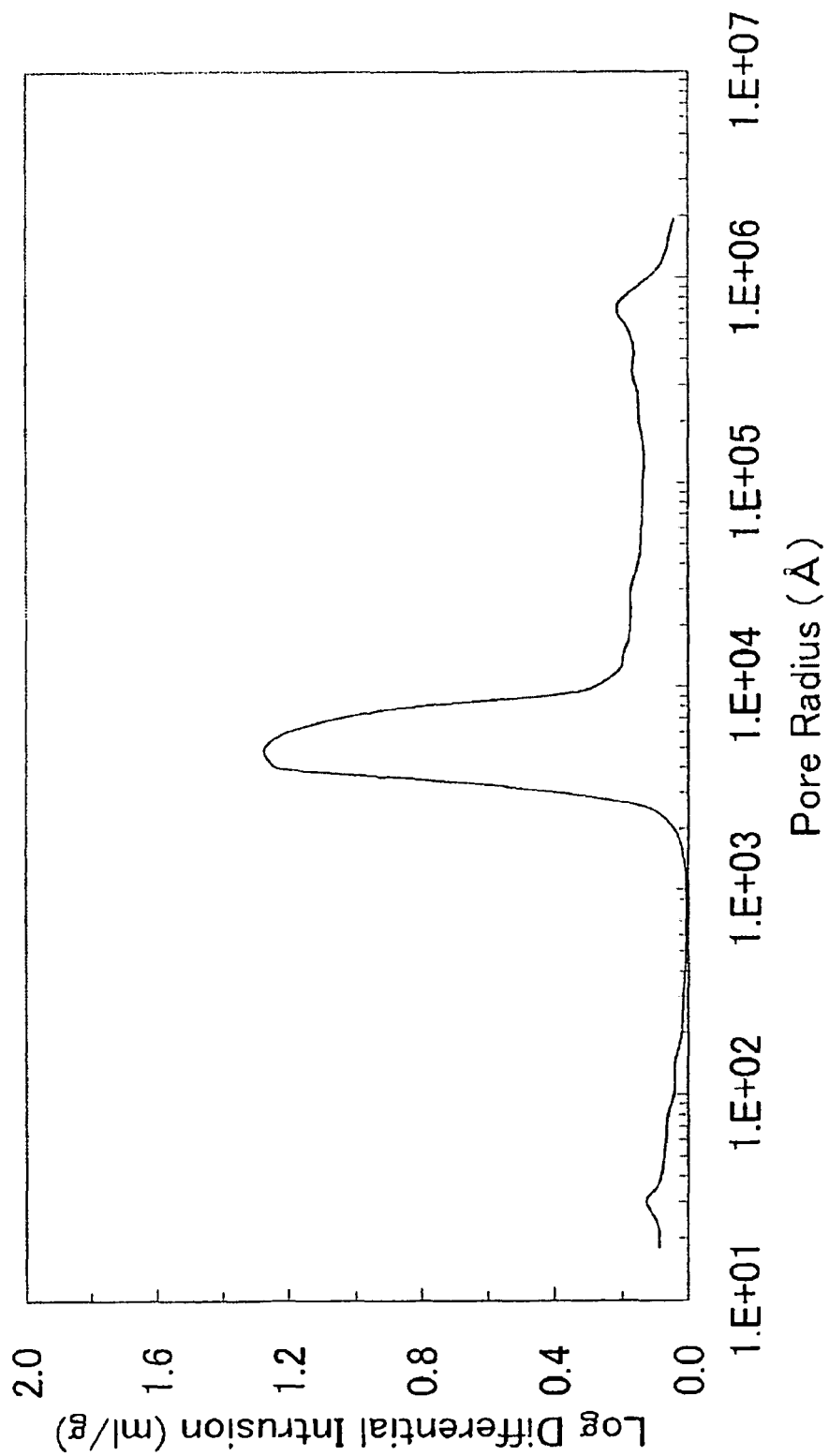
FIG. 41 is a graph showing a pore-size distribution curve of a lithium-nickel-manganese-cobalt composite-oxide powder prepared in EXAMPLE 9.
Figure 42:
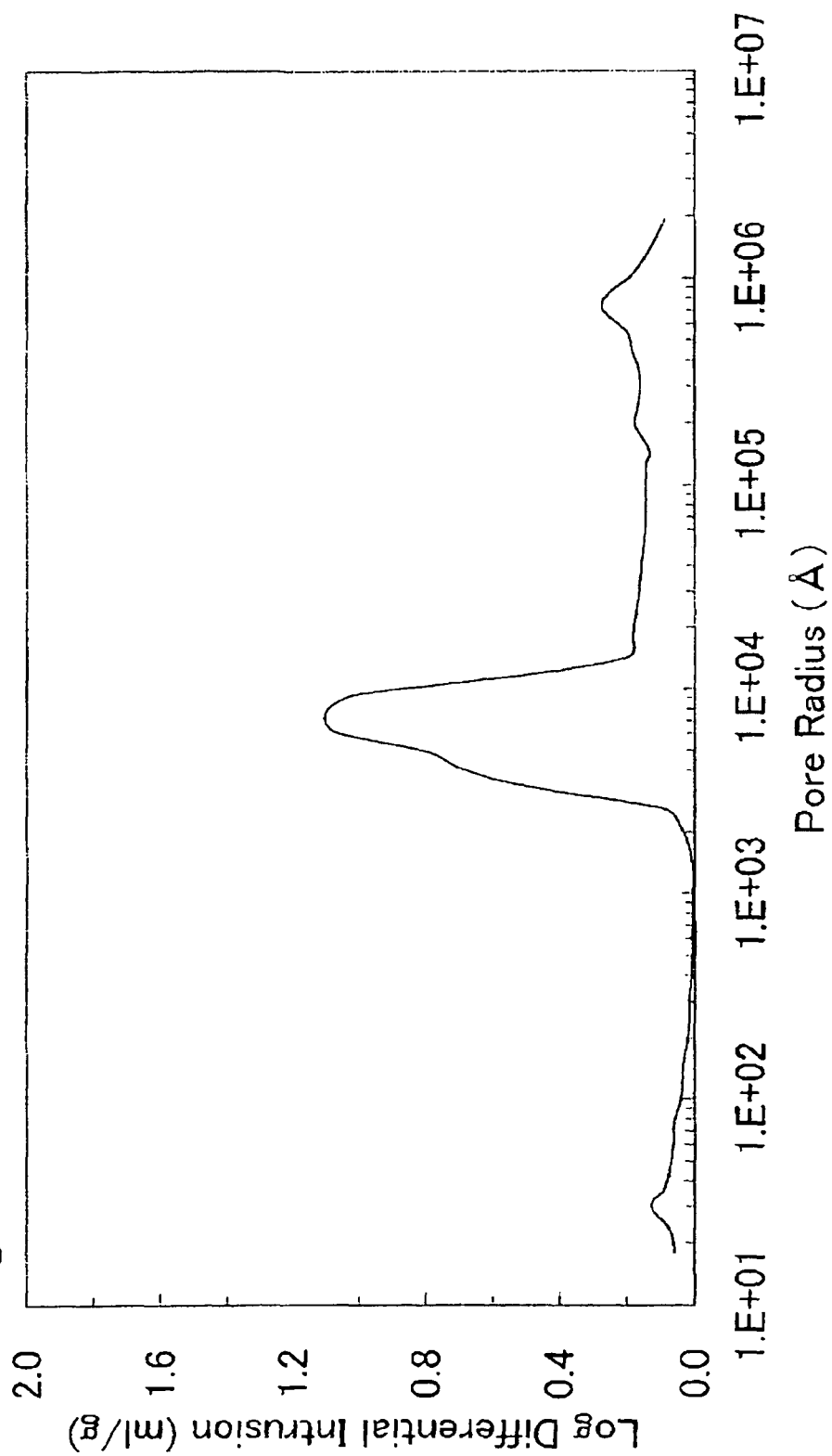
FIG. 42 is a graph showing a pore-size distribution curve of a lithium-nickel-manganese-cobalt composite-oxide powder prepared in EXAMPLE 10.
Figure 43:
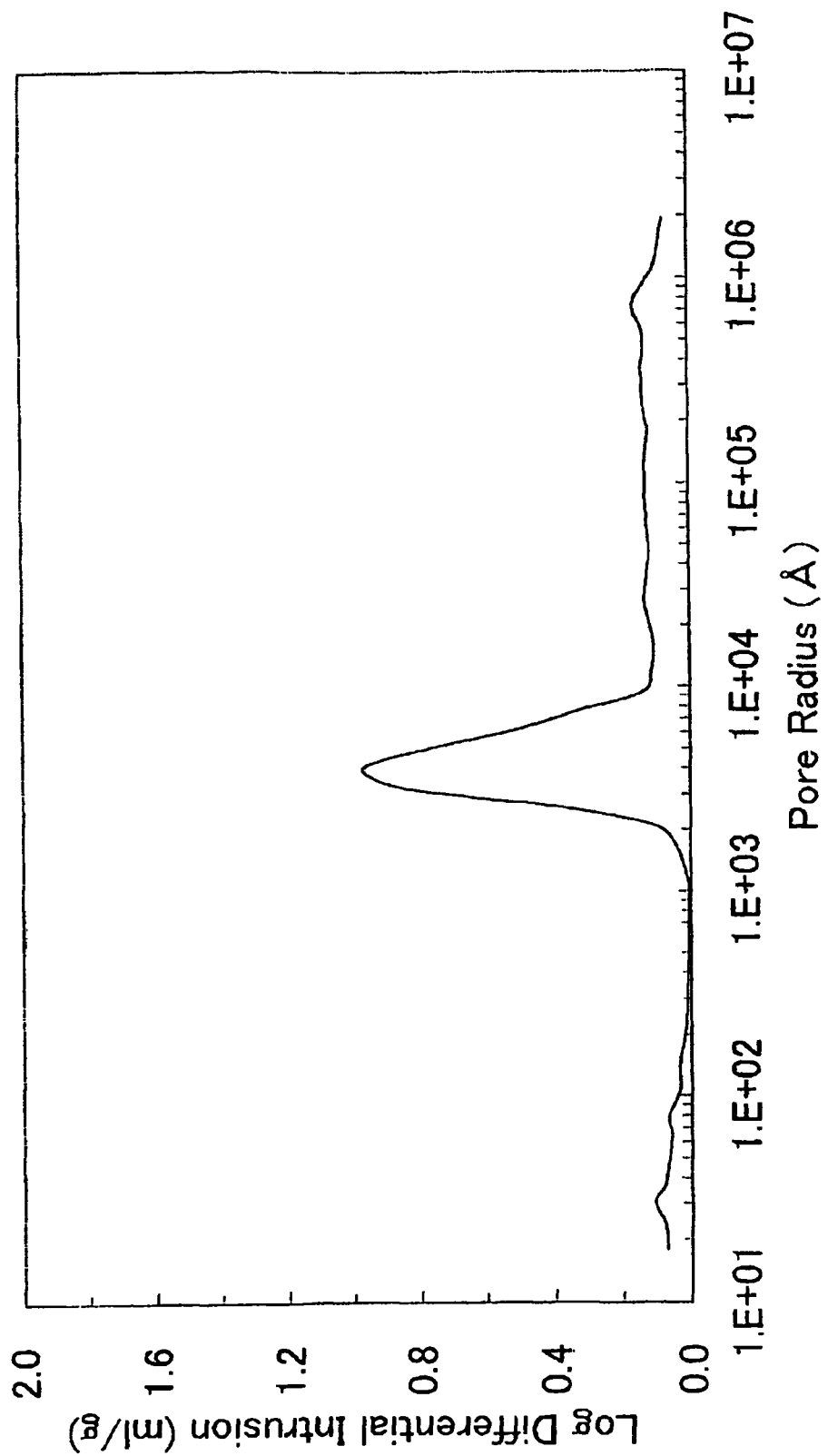
FIG. 43 is a graph showing a pore-size distribution curve of a lithium-nickel-manganese-cobalt composite-oxide powder prepared in EXAMPLE 11.
Figure 44:
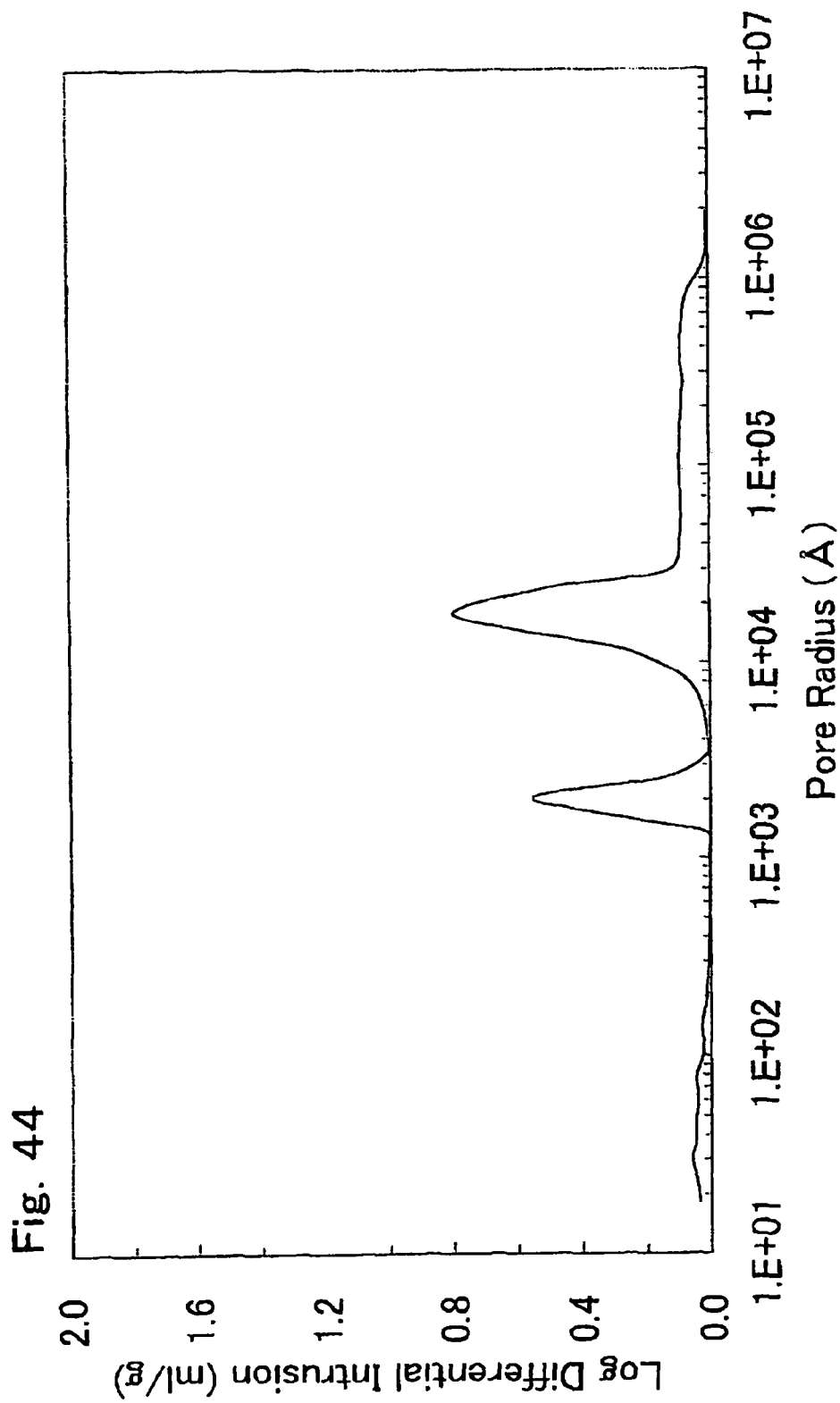
FIG. 44 is a graph showing a pore-size distribution curve of a lithium-nickel-manganese-cobalt composite-oxide powder prepared in COMPARATIVE EXAMPLE 7.
Figure 45:
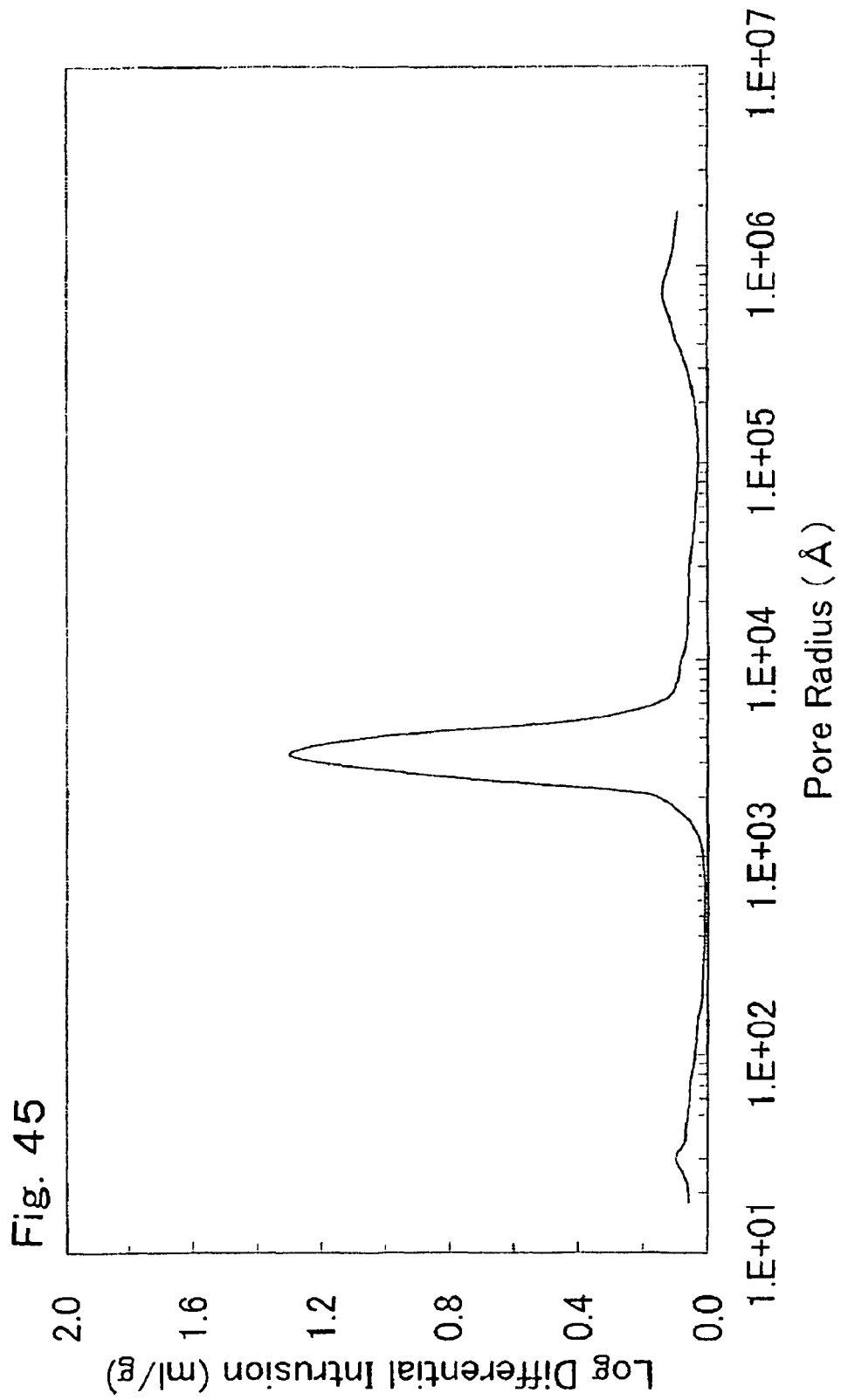
FIG. 45 is a graph showing a pore-size distribution curve of a lithium-nickel-manganese composite-oxide powder prepared in COMPARATIVE EXAMPLE 8.
Figure 46:
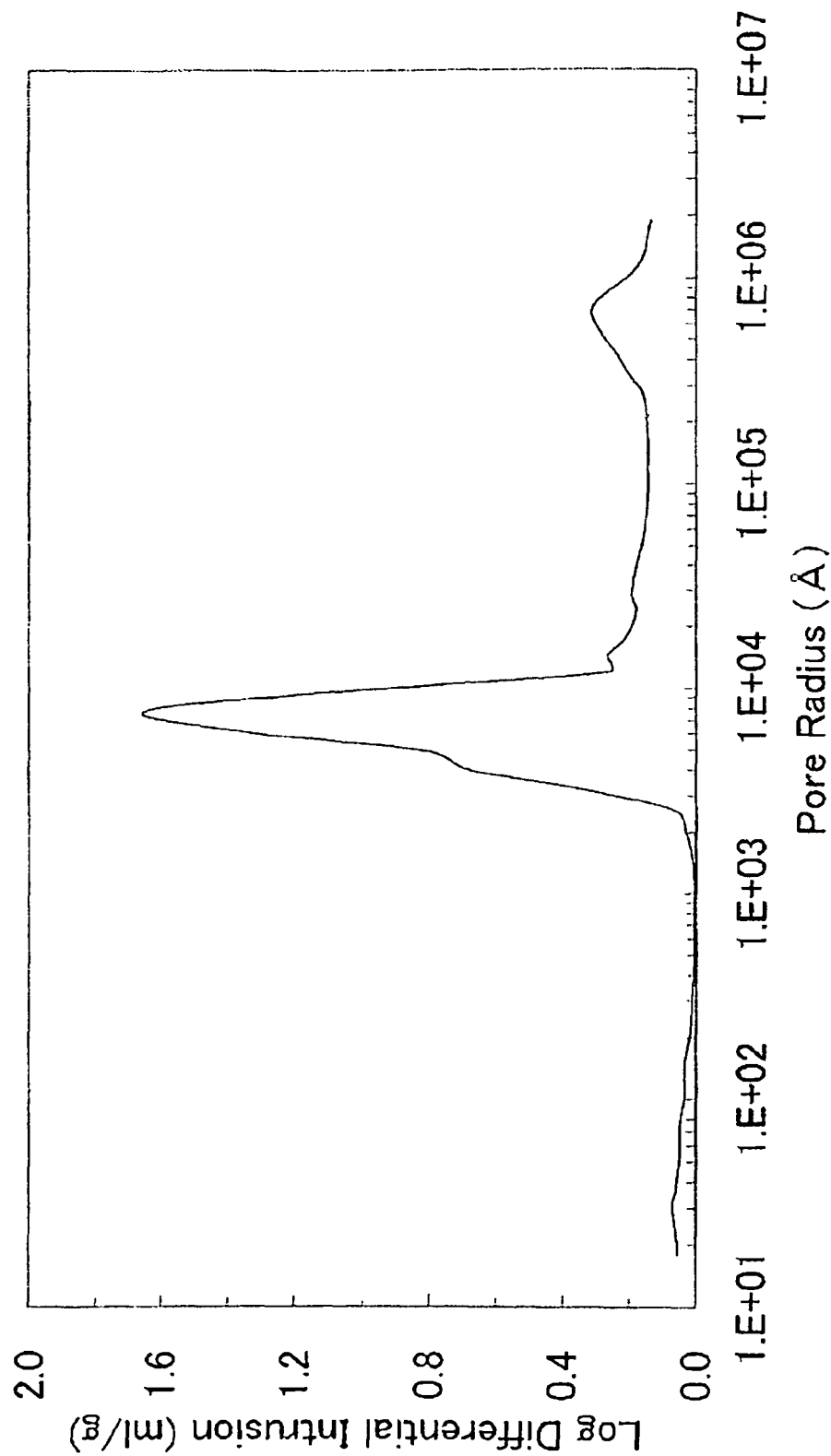
FIG. 46 is a graph showing a pore-size distribution curve of a lithium-nickel-manganese composite-oxide powder prepared in COMPARATIVE EXAMPLE 9.
Figure 47:
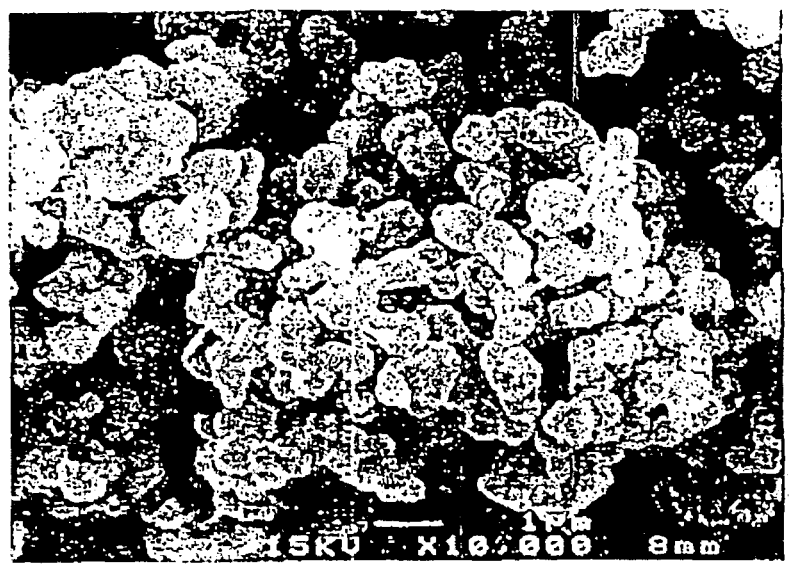
FIG. 47 is a SEM image (photograph) (×10,000) of a lithium-nickel-manganese-cobalt composite oxide prepared in EXAMPLE 8.
Figure 48:
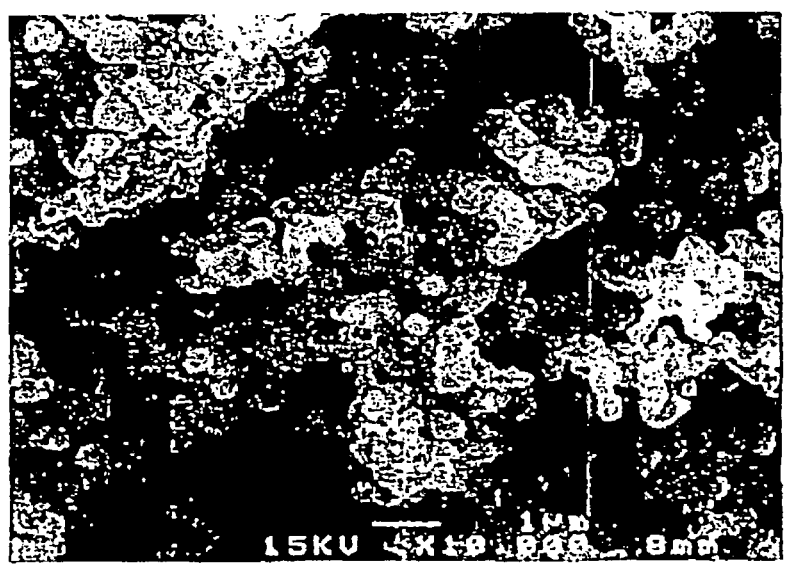
FIG. 48 is a SEM image (photograph) (×10,000) of a lithium-nickel-manganese-cobalt composite oxide prepared in EXAMPLE 9.
Figure 49:
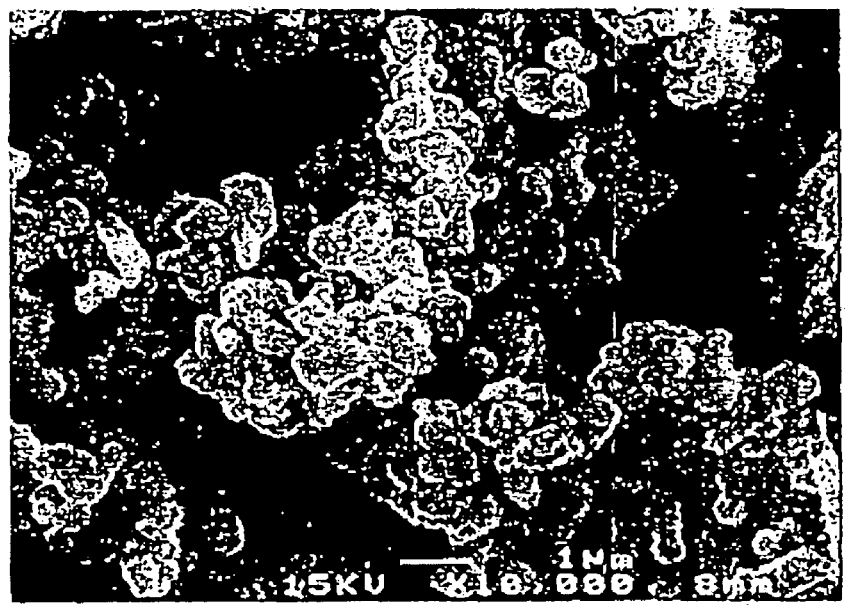
FIG. 49 is a SEM image (photograph) (×10,000) of a lithium-nickel-manganese-cobalt composite oxide prepared in EXAMPLE 10.
Figure 50:
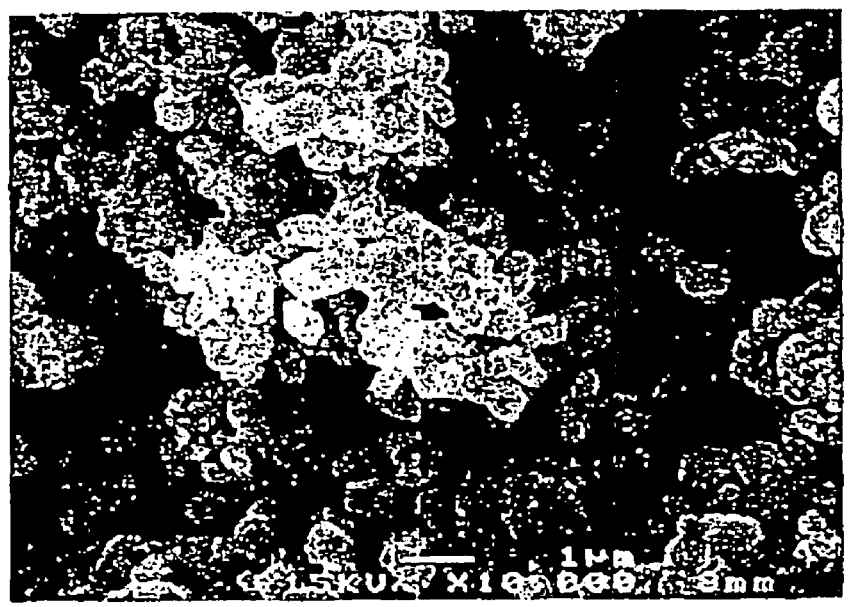
FIG. 50 is a SEM image (photograph) (×10,000) of a lithium-nickel-manganese-cobalt composite oxide prepared in EXAMPLE 11.
Figure 51:
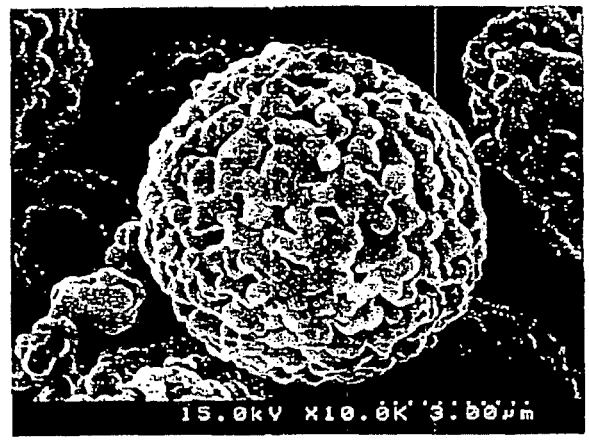
FIG. 51 is a SEM image (photograph) (×10,000) of a lithium-nickel-manganese-cobalt composite oxide prepared in COMPARATIVE EXAMPLE 7.
Figure 52:
FIG. 52 is a SEM image (photograph) (×10,000) of a lithium-nickel-manganese composite oxide prepared in COMPARATIVE EXAMPLE 8.
Figure 53:
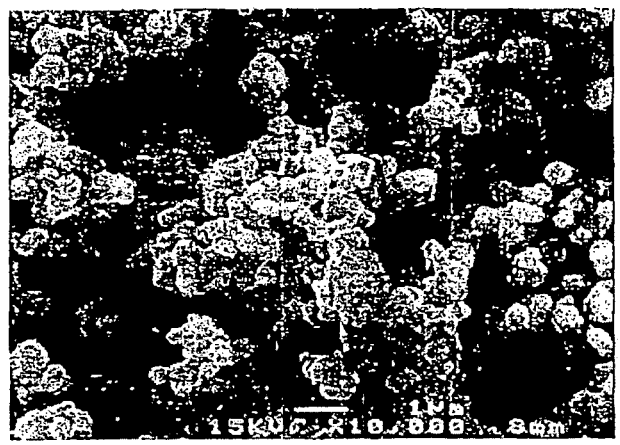
FIG. 53 is a SEM image (photograph) (×10,000) of a lithium-nickel-manganese composite oxide prepared in COMPARATIVE EXAMPLE 9.
Figure 54:
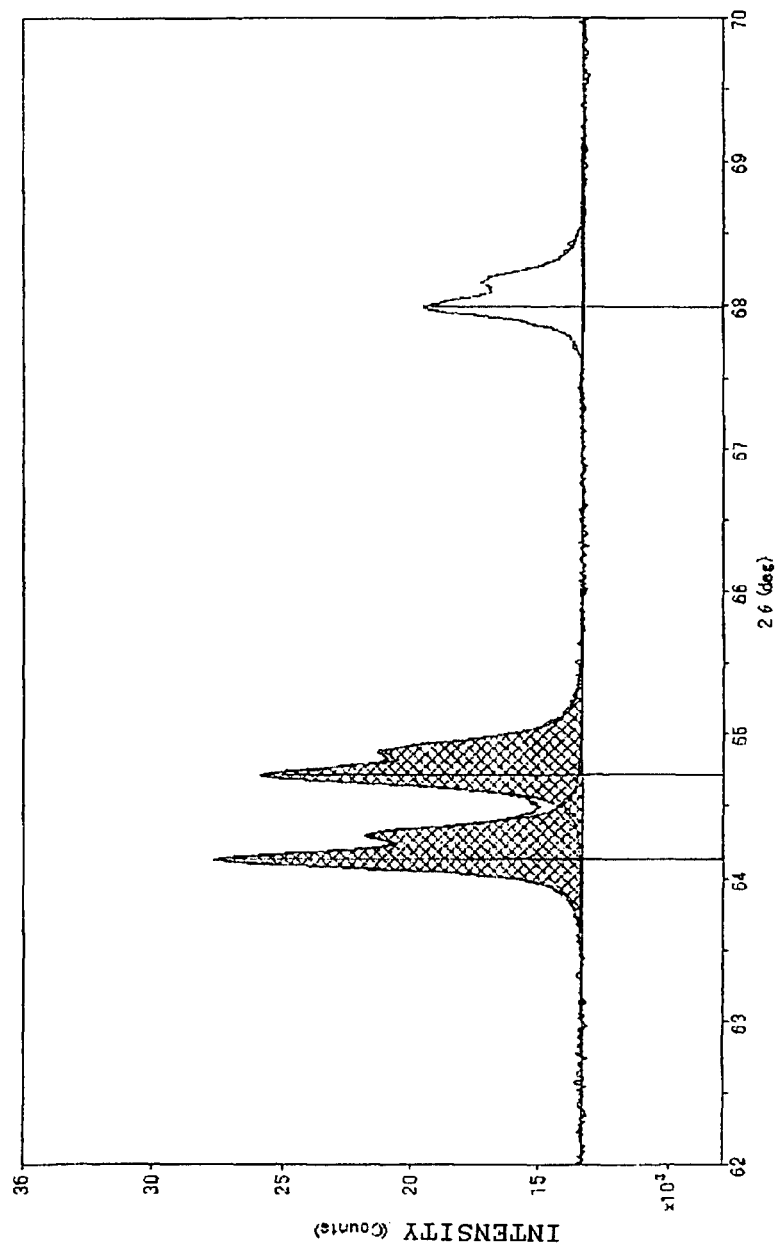
FIG. 54 is a powder X-ray diffraction pattern of a lithium-nickel-manganese-cobalt composite oxide prepared in EXAMPLE 8.
Figure 55:
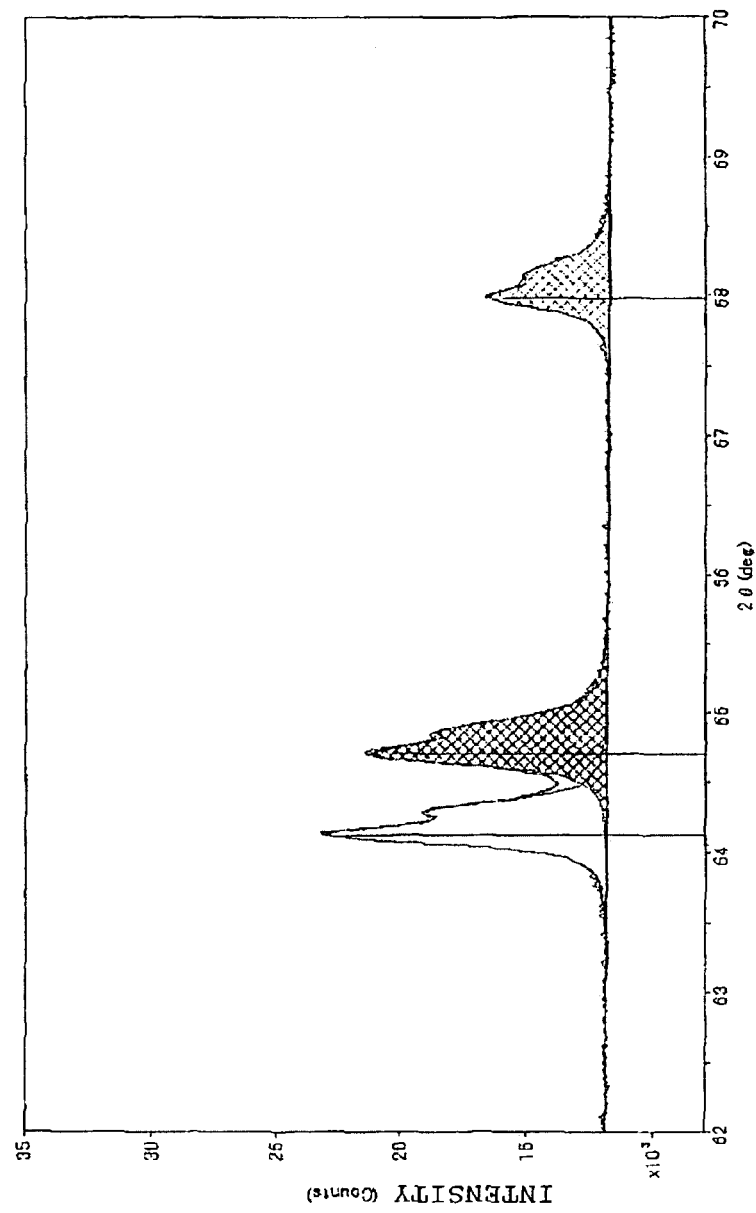
FIG. 55 is a powder X-ray diffraction pattern of a lithium-nickel-manganese-cobalt composite oxide prepared in EXAMPLE 9.
Figure 56:
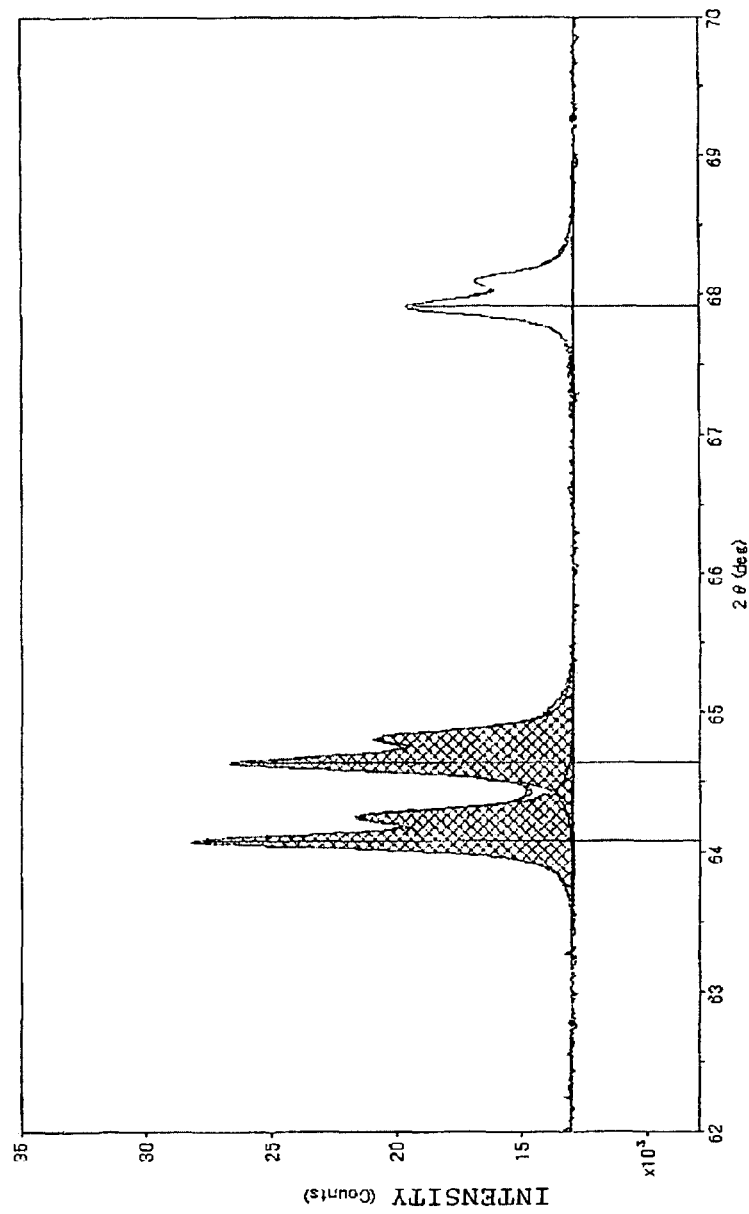
FIG. 56 is a powder X-ray diffraction pattern of a lithium-nickel-manganese-cobalt composite oxide prepared in EXAMPLE 10.
Figure 57:
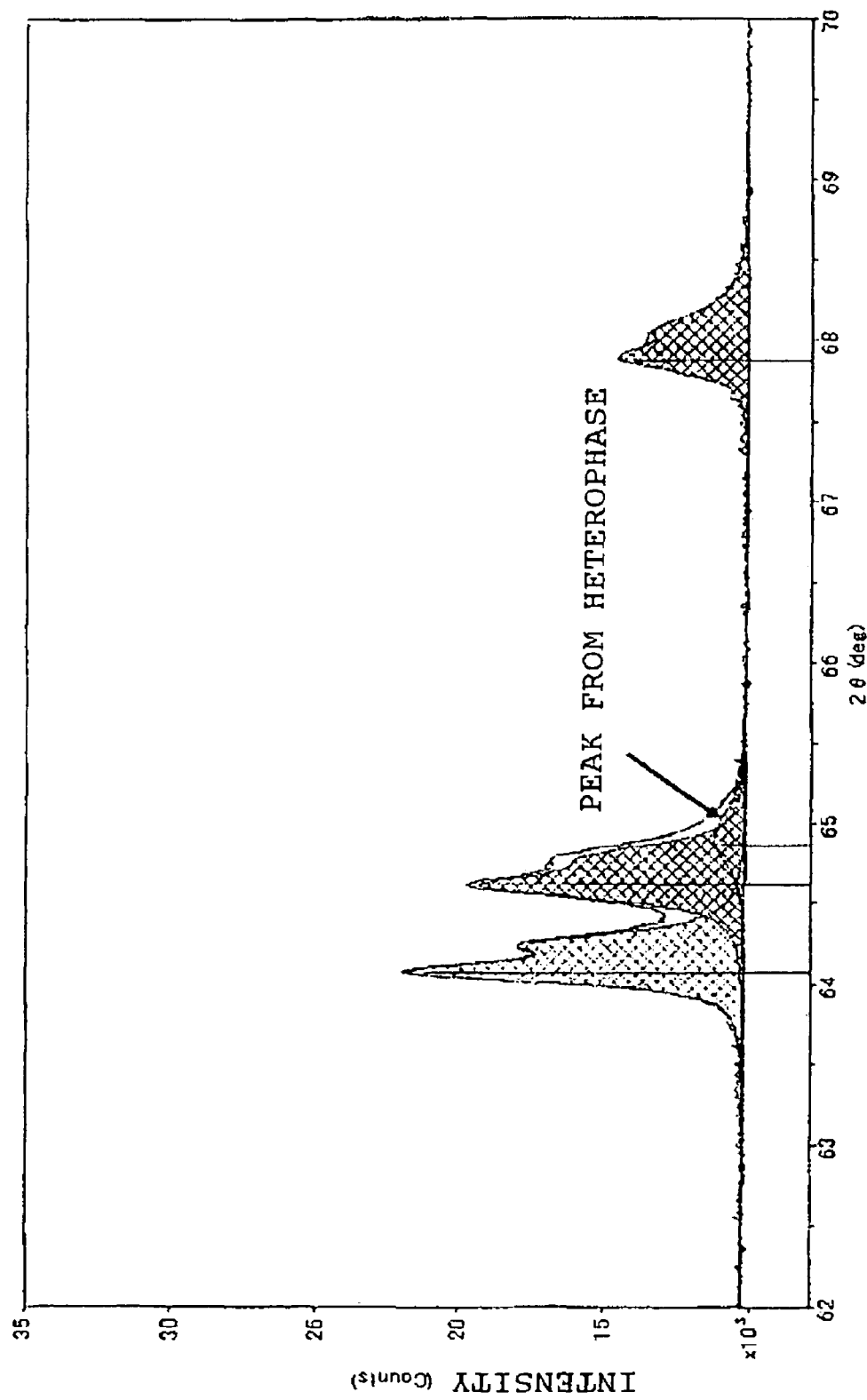
FIG. 57 is a powder X-ray diffraction pattern of a lithium-nickel-manganese-cobalt composite oxide prepared in EXAMPLE 11.
Figure 58:
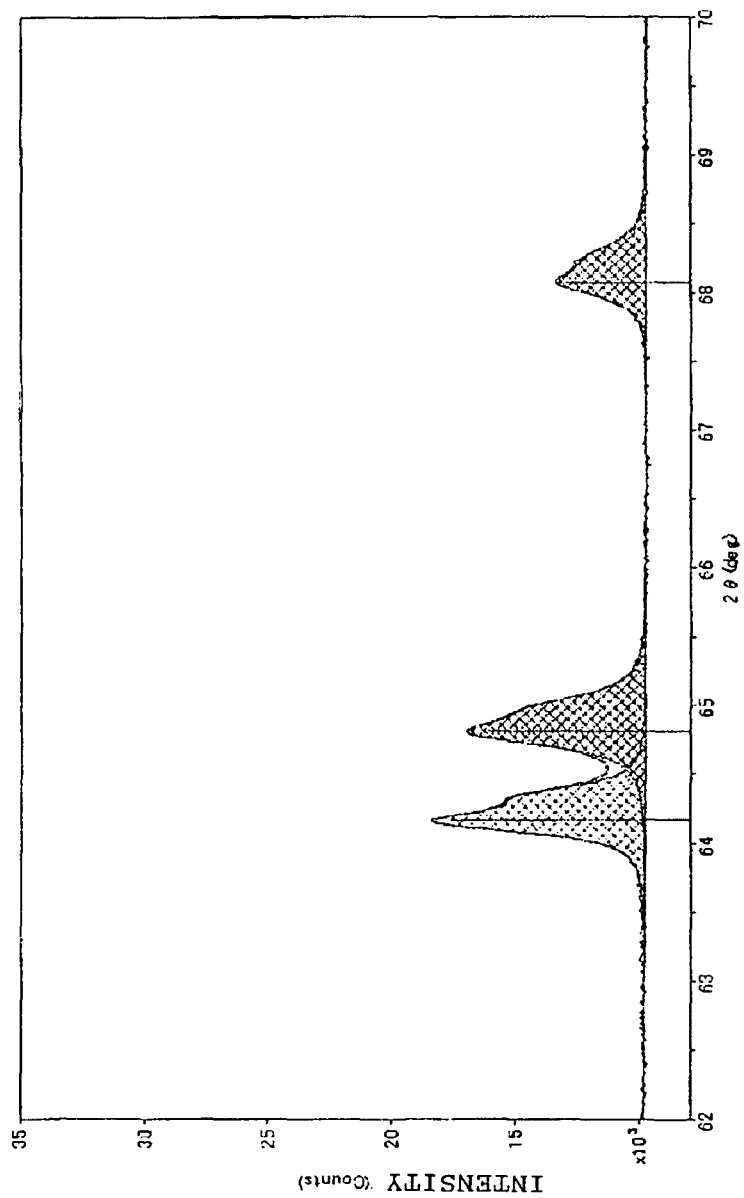
FIG. 58 is a powder X-ray diffraction pattern of a lithium-nickel-manganese-cobalt composite oxide prepared in COMPARATIVE EXAMPLE 7.
Figure 59:
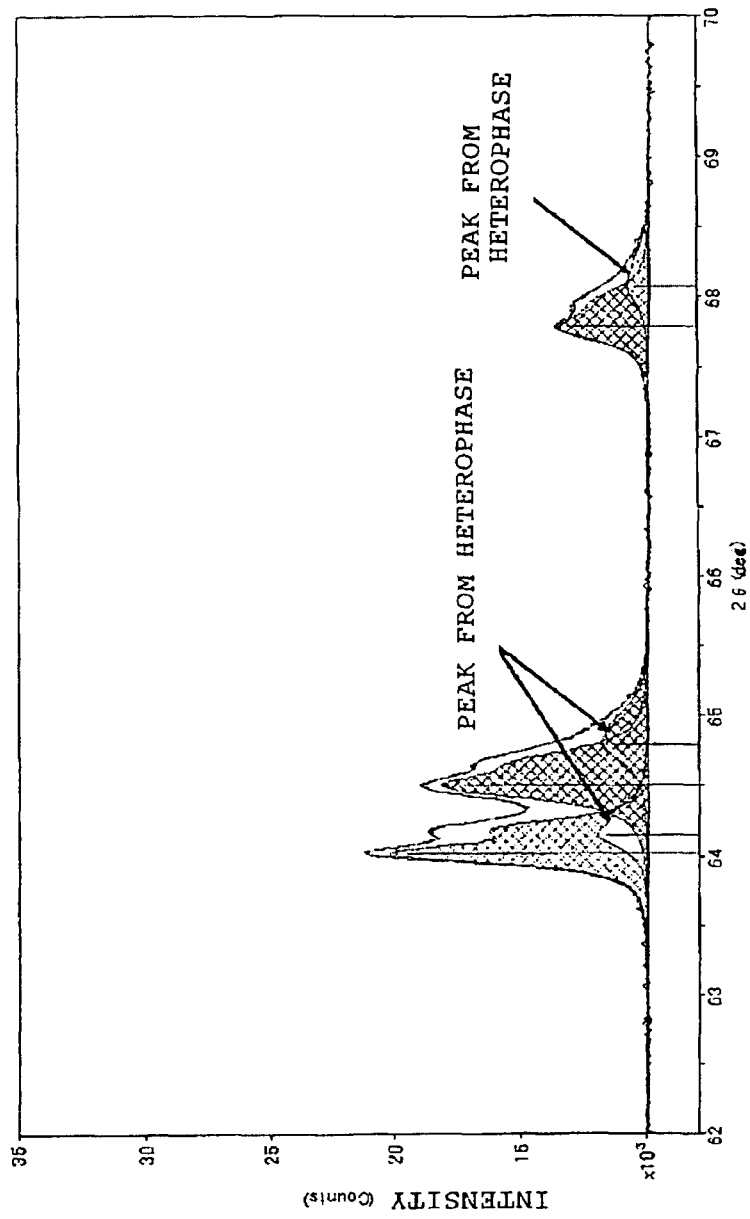
FIG. 59 is a powder X-ray diffraction pattern of a lithium-nickel-manganese composite oxide prepared in COMPARATIVE EXAMPLE 8.
Figure 60:
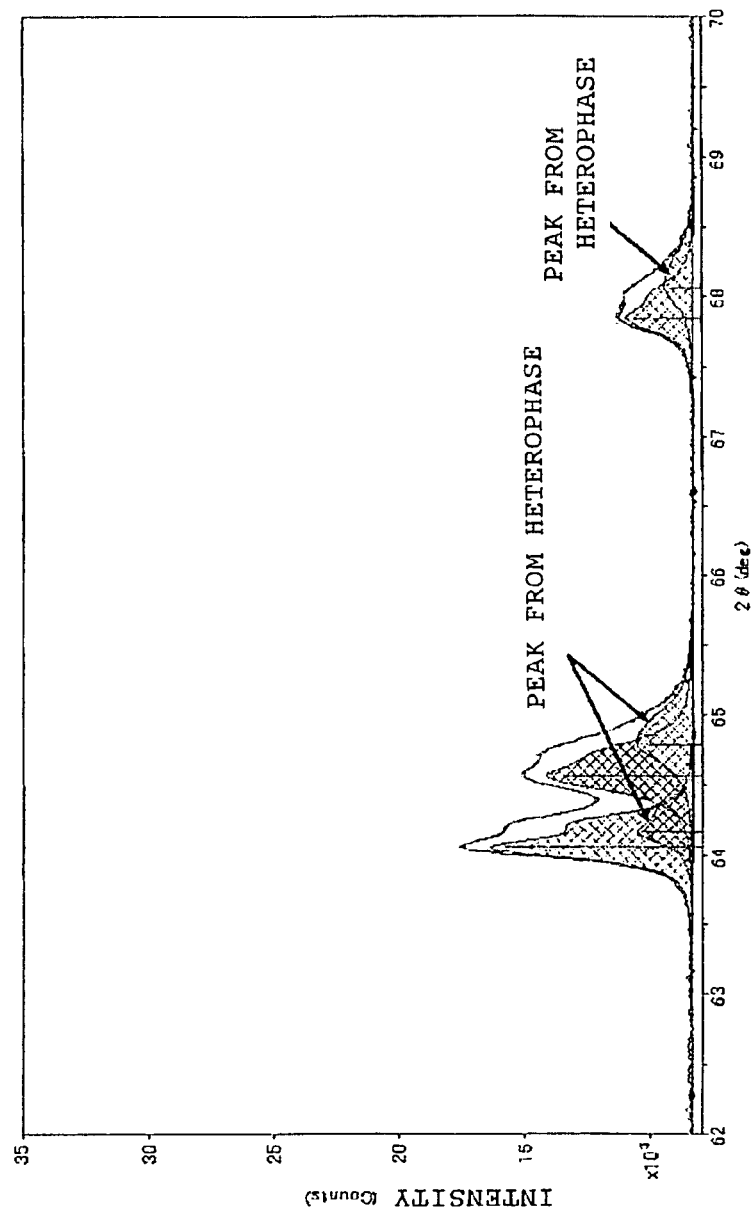
FIG. 60 is a powder X-ray diffraction pattern of a lithium-nickel-manganese composite oxide prepared in COMPARATIVE EXAMPLE 9.

FIGS. 40 to 46 show pore-size distribution curves of the powders of the lithium-nickel-manganese-cobalt composite oxides and the powder of the lithium-nickel-manganese composite oxides produced in Examples 8 to 11 and Comparative Examples 7 to 9. FIGS. 47 to 53 show SEM images (photographs) (×10,000) of the powders. FIGS. 54 to 60 show powder X-ray diffraction patterns of the powders.

Example 12

$Li_2CO_3$, $Ni(OH)_2$, $Mn_3O_4$, CoOOH, and $Li_2WO_4$ were weighed and mixed in such a manner that the molar ratio was Li:Ni:Mn:Co:W=1.10:0.45:0.45:0.10:0.005. Deionized water was added to the mixture to form a slurry. The slurry was stirred to pulverize the solid components in the slurry in such a manner that the solid components have a median diameter of 0.16 μm, with a circulating wet pulverizer of the dispersing medium agitation type.

The slurry (solid content: 15% by weight, viscosity: 1,720 cp) was spray-dried with a spray dryer using a two-fluid nozzle (model: LT-8, manufactured by Ohkawara Kakohki Co., Ltd). As a drying gas, air was used. The amount G of drying gas fed was set at 45 L/min. The amount S of slurry fed was set at $11\times10^{-3}$ mL/min (the gas-liquid ratio G/S=4,091). The temperature of an inlet was set at 150° C. About 15 g of the powder prepared by spray-drying the slurry with the spray dryer was charged into an alumina crucible and fired at 1,000° C. for 6 hours (heating and cooling rates: 3.33° C./min) in an air atmosphere. The fired powder was disaggregated to yield a layered lithium-nickel-manganese-cobalt composite oxide having a composition of $Li_{1.114}(Ni_{0.453}Mn_{0.450}Co_{0.097})O_2$ (x"=0.097, y"=0.003, and z"=0.114), a volume resistivity of $5.4\times10^4$ Ω·cm, and a carbon content of 0.042% by weight. When the total molar amount of (Ni, Mn, Co) was defined as 1, the molar proportion of W was 0.62 mol %. The average primary-particle diameter was 0.4 μm. The median diameter was 1.4 μm. The $D_{90}$ was 2.1 μm. The bulk density was 1.1 g/cc. The BET specific surface area was 2.1 m²/g. The atomic ratio of tungsten (W) to (Ni+Mn+Co), i.e., W/(Ni+Mn+Co), on surfaces of the primary particles was 9.8 times the atomic ratio of W to (Ni+Mn+Co) in the entire particles.

Example 13

$Li_2CO_3$, $Ni(OH)_2$, $Mn_3O_4$, CoOOH, and $Li_2WO_4$ were weighed and mixed in such a manner that the molar ratio was Li:Ni:Mn:Co:W=1.10:0.45:0.45:0.10:0.01. Deionized water was added to the mixture to form a slurry. The slurry was stirred to pulverize the solid components in the slurry in such a manner that the solid components have a median diameter of 0.17 μm, with a circulating wet pulverizer of the dispersing medium agitation type.

The slurry (solid content: 15% by weight, viscosity: 1,890 cp) was spray-dried with a spray dryer using a two-fluid nozzle (model: LT-8, manufactured by Ohkawara Kakohki Co., Ltd). As a drying gas, air was used. The amount G of drying gas fed was set at 45 L/min. The amount S of slurry fed was set at $11\times10^{-3}$ mL/min (the gas-liquid ratio G/S=4,091). The temperature of an inlet was set at 150° C. About 15 g of the powder prepared by spray-drying the slurry with the spray dryer was charged into an alumina crucible and fired at 1,000° C. for 6 hours (heating and cooling rates: 3.33° C./min) in an air atmosphere. The fired powder was disaggregated to yield a layered lithium-nickel-manganese-cobalt composite oxide having a composition of $Li_{1.139}(Ni_{0.450}Mn_{0.452}Co_{0.098})O_2$ (x"=0.098, y"=−0.002, and z"=0.139), a volume resistivity of $4.7\times10^4$ Ω·cm, and a carbon content of 0.030% by weight. When the total molar amount of (Ni, Mn, Co) was defined as 1, the molar proportion of W was 1.03 mol %. The average primary-particle diameter was 0.3 μm. The median diameter was 2.2 μm. The $D_{90}$ was 3.9 μm. The bulk density was 1.0 g/cc. The BET specific surface area was 2.9 m²/g. The atomic ratio of tungsten (W) to (Ni+Mn+Co), i.e., W/(Ni+Mn+Co), on surfaces of the primary particles was 9.4 times the atomic ratio of W to (Ni+Mn+Co) in the entire particles.

Example 14

$Li_2CO_3$, $Ni(OH)_2$, $Mn_3O_4$, CoOOH, and $Li_2MoO_4$ were weighed and mixed in such a manner that the molar ratio was Li:Ni:Mn:Co:Mo=1.10:0.45:0.45:0.10:0.005. Deionized water was added to the mixture to form a slurry. The slurry was stirred to pulverize the solid components in the slurry in such a manner that the solid components have a median diameter of 0.16 μm, with a circulating wet pulverizer of the dispersing medium agitation type.

The slurry (solid content: 15% by weight, viscosity: 1,710 cp) was spray-dried with a spray dryer using a two-fluid nozzle (model: LT-8, manufactured by Ohkawara Kakohki Co., Ltd). As a drying gas, air was used. The amount G of drying gas fed was set at 45 L/min. The amount S of slurry fed was set at $11\times10^{-3}$ mL/min (the gas-liquid ratio G/S=4,091). The temperature of an inlet was set at 150° C. About 15 g of the powder prepared by spray-drying the slurry with the spray dryer was charged into an alumina crucible and fired at 1,000° C. for 6 hours (heating and cooling rates: 3.33° C./min) in an air atmosphere. The fired powder was disaggregated to yield a layered lithium-nickel-manganese-cobalt composite oxide having a composition of $Li_{1.124}(Ni_{0.452}Mn_{0.45}Co_{0.098})O_2$ (x"=0.098, y"=0.002, and z"=0.124), a volume resistivity of $3.6\times10^4$ Ω·cm, and a carbon content of 0.027% by weight. When the total molar amount of (Ni, Mn, Co) was defined as 1, the molar proportion of Mo was 0.48 mol %. The average primary-particle diameter was 0.7 μm. The median diameter was 2.0 μm. The $D_{90}$ was 3.2 μm. The bulk density was 1.3 g/cc. The BET specific surface area was 1.6 m²/g. The atomic ratio of molybdenum (Mo) to (Ni+Mn+Co), i.e., Mo/(Ni+Mn+Co), on surfaces of the primary particles was 21 times the atomic ratio of Mo to (Ni+Mn+Co) in the entire particles.

Example 15

$Li_2CO_3$, $Ni(OH)_2$, $Mn_3O_4$, CoOOH, and $WO_3$ were weighed and mixed in such a manner that the molar ratio was Li:Ni:Mn:Co:W=1.10:0.45:0.45:0.10:0.005. Deionized water was added to the mixture to form a slurry. The slurry was stirred to pulverize the solid components in the slurry in such a manner that the solid components have a median diameter of 0.17 μm, with a circulating wet pulverizer of the dispersing medium agitation type.

The slurry (solid content: 14% by weight, viscosity: 1,670 cp) was spray-dried with a spray dryer using a two-fluid nozzle (model: LT-8, manufactured by Ohkawara Kakohki Co., Ltd). As a drying gas, air was used. The amount G of drying gas fed was set at 45 L/min. The amount S of slurry fed was set at $11\times10^{-3}$ mL/min (the gas-liquid ratio G/S=4,091). The temperature of an inlet was set at 150° C. About 15 g of the powder prepared by spray-drying the slurry with the spray dryer was charged into an alumina crucible and fired at 1,000° C. for 6 hours (heating and cooling rates: 3.33° C./min) in an air atmosphere. The fired powder was disaggregated to yield a layered lithium-nickel-manganese-cobalt composite oxide having a composition of $Li_{1.094}(Ni_{0.453}Mn_{0.450}Co_{0.097})O_2$ (x"=0.097, y"=0.003, and z"=0.094), a volume resistivity of $5.8\times10^4$ Ω·cm, and a carbon content of 0.033% by weight. When the total molar amount of (Ni, Mn, Co) was defined as 1, the molar proportion of W was 0.51 mol %. The average primary-particle diameter was 0.5 µm. The median diameter was 1.6 µm. The $D_{90}$ was 2.4 µm. The bulk density was 1.0 g/cc. The BET specific surface area was 2.2 2.1 m$^2$/g. The atomic ratio of tungsten (W) to (Ni+Mn+Co), i.e., W/(Ni+Mn+Co), on surfaces of the primary particles was 12 times the atomic ratio of W to (Ni+Mn+Co) in the entire particles.

Example 16

$Li_2CO_3$, $Ni(OH)_2$, $Mn_3O_4$, CoOOH, and $Nb_2O_5$ were weighed and mixed in such a manner that the molar ratio was Li:Ni:Mn:Co:Nb=1.10:0.45:0.45:0.10:0.005. Deionized water was added to the mixture to form a slurry. The slurry was stirred to pulverize the solid components in the slurry in such a manner that the solid components have a median diameter of 0.17 µm, with a circulating wet pulverizer of the dispersing medium agitation type.

The slurry (solid content: 14% by weight, viscosity: 1,660 cp) was spray-dried with a spray dryer using a two-fluid nozzle (model: LT-8, manufactured by Ohkawara Kakohki Co., Ltd). As a drying gas, air was used. The amount G of drying gas fed was set at 45 L/min. The amount S of slurry fed was set at 11×10$^{-3}$ mL/min (the gas-liquid ratio G/S=4,091). The temperature of an inlet was set at 150° C. About 15 g of the powder prepared by spray-drying the slurry with the spray dryer was charged into an alumina crucible and fired at 1,000° C. for 6 hours (heating and cooling rates: 3.33° C./min) in an air atmosphere. The fired powder was disaggregated to yield a layered lithium-nickel-manganese-cobalt composite oxide having a composition of $Li_{1.118}(Ni_{0.448}Mn_{0.450}Co_{0.102})O_2$ (x"=0.012, y"=−0.002, and z"=0.118), a volume resistivity of 4.4×10$^4$ Ω·cm, and a carbon content of 0.027% by weight. When the total molar amount of (Ni, Mn, Co) was defined as 1, the molar proportion of Nb was 0.48 mol %. The average primary-particle diameter was 0.6 µm. The median diameter was 2.0 µm. The $D_{90}$ was 3.3 µm. The bulk density was 1.2 g/cc. The BET specific surface area was 1.9 m$^2$/g. The atomic ratio of niobium (Nb) to (Ni+Mn+Co), i.e., Nb/(Ni+Mn+Co), on surfaces of the primary particles was 8.8 times the atomic ratio of Nb to (Ni+Mn+Co) in the entire particles.

Comparative Example 10

$Li_2CO_3$, $Ni(OH)_2$, $Mn_3O_4$, and CoOOH were weighed and mixed in such a manner that the molar ratio was Li:Ni:Mn:Co=1.10:0.45:0.45:0.10. Deionized water was added to the mixture to form a slurry. The slurry was stirred to pulverize the solid components in the slurry in such a manner that the solid components have a median diameter of 0.16 µm, with a circulating wet pulverizer of the dispersing medium agitation type.

The slurry (solid content: 13% by weight, viscosity: 1,350 cp) was spray-dried with a spray dryer using a two-fluid nozzle (model: LT-8, manufactured by Ohkawara Kakohki Co., Ltd). As a drying gas, air was used. The amount G of drying gas fed was set at 45 L/min. The amount S of slurry fed was set at 11×10$^{-3}$ mL/min (the gas-liquid ratio G/S=4,091). The temperature of an inlet was set at 150° C. About 15 g of the powder prepared by spray-drying the slurry with the spray dryer was charged into an alumina crucible and fired at 1,000° C. for 6 hours (heating and cooling rates: 3.33° C./min) in an air atmosphere. The fired powder was disaggregated to yield a lithium-nickel-manganese-cobalt composite oxide having a composition of $Li_{1.096}(Ni_{0.458}Mn_{0.444}Co_{0.098})O_2$ (x"=0.098, y"=0.016, and z"=0.096), a volume resistivity of 2.7×10$^4$ Ω·cm, and a carbon content of 0.023% by weight. The average primary-particle diameter was 0.6 µm. The median diameter was 3.0 µm. The $D_{90}$ was 5.1 µm. The bulk density was 1.2 g/cc. The BET specific surface area was 1.7 m$^2$/g.

Comparative Example 11

$Li_2CO_3$, $Ni(OH)_2$, $Mn_3O_4$, CoOOH, and $Li_2WO_4$ were weighed and mixed in such a manner that the molar ratio was Li:Ni:Mn:Co:W=1.10:0.45:0.45:0.10:0.002. Deionized water was added to the mixture to form a slurry. The slurry was stirred to pulverize the solid components in the slurry in such a manner that the solid components have a median diameter of 0.13 µm, with a circulating wet pulverizer of the dispersing medium agitation type.

The slurry (solid content: 15% by weight, viscosity: 1,910 cp) was spray-dried with a spray dryer using a two-fluid nozzle (model: LT-8, manufactured by Ohkawara Kakohki Co., Ltd). As a drying gas, air was used. The amount G of drying gas fed was set at 45 L/min. The amount S of slurry fed was set at 11×10$^{-3}$ mL/min (the gas-liquid ratio G/S=4,091). The temperature of an inlet was set at 150° C. About 15 g of the powder prepared by spray-drying the slurry with the spray dryer was charged into an alumina crucible and fired at 1,000° C. for 6 hours (heating and cooling rates: 3.33° C./min) in an air atmosphere. The fired powder was disaggregated to yield a lithium-nickel-manganese-cobalt composite oxide having a composition of Li1.124(Ni0.457Mn0.446Co0.097)O2 (x"=0.097, y"=0.012, and z"=0.124), a volume resistivity of 1.1×10$^4$ Ω·cm, and a carbon content of 0.050% by weight. When the total molar amount of (Ni, Mn, Co) was defined as 1, the molar proportion of W was 2.06 mol %. The average primary-particle diameter was 0.2 µm. The median diameter was 0.8 µm. The $D_{90}$ was 1.3 µm. The bulk density was 0.9 g/cc. The BET specific surface area was 3.8 m$^2$/g. The atomic ratio of tungsten (W) to (Ni+Mn+Co), i.e., W/(Ni+Mn+Co), on surfaces of the primary particles was 6.0 times the atomic ratio of W to (Ni+Mn+Co) in the entire particles.

Comparative Example 12

$Li_2CO_3$, $Ni(OH)_2$, $Mn_3O_4$, CoOOH, and $Li_2B_4O_7$ were weighed and mixed in such a manner that the molar ratio was Li:Ni:Mn:Co:B=1.10:0.45:0.45:0.10:0.005. Deionized water was added to the mixture to form a slurry. The slurry was stirred to pulverize the solid components in the slurry in such a manner that the solid components have a median diameter of 0.16 µm, with a circulating wet pulverizer of the dispersing medium agitation type.

The slurry (solid content: 15% by weight, viscosity: 1,460 cp) was spray-dried with a spray dryer using a two-fluid nozzle (model: LT-8, manufactured by Ohkawara Kakohki Co., Ltd). As a drying gas, air was used. The amount G of drying gas fed was set at 45 L/min. The amount S of slurry fed was set at 11×10$^{-3}$ mL/min (the gas-liquid ratio G/S=4,091). The temperature of an inlet was set at 150° C. About 15 g of the powder prepared by spray-drying the slurry with the spray dryer was charged into an alumina crucible and fired at 1,000° C. for 6 hours (heating and cooling rates: 3.33° C./min) in an air atmosphere. The fired powder was disaggregated to yield a lithium-nickel-manganese-cobalt composite oxide having a composition of $Li_{1.096}(Ni_{0.450}Mn_{0.451}Co_{0.099})O_2$ (x"=0.099, y"=−0.001, and z"=0.096), a volume resistivity of 5.3×10$^4$ Ω·cm, and a carbon content of 0.047% by weight. When the total molar amount of (Ni, Mn, Co) was defined as 1, the molar proportion of B was 0.24 mol %. The average primary-particle diameter was 1.0 µm. The median diameter was 5.9 µm. The $D_{90}$ was 8.9 µm. The bulk density was 1.8 g/cc. The BET specific surface area was 0.8 m²/g. The atomic ratio of boron (B) to (Ni+Mn+Co), i.e., B/(Ni+Mn+Co), on surfaces of the primary particles was 213 times the atomic ratio of B to (Ni+Mn+Co) in the entire particles.

Comparative Example 13

$Li_2CO_3$, $Ni(OH)_2$, $Mn_3O_4$, CoOOH, and $SnO_2$ were weighed and mixed in such a manner that the molar ratio was Li:Ni:Mn:Co:Sn=1.10:0.45:0.45:0.10:0.005. Deionized water was added to the mixture to form a slurry. The slurry was stirred to pulverize the solid components in the slurry in such a manner that the solid components have a median diameter of 0.17 μm, with a circulating wet pulverizer of the dispersing medium agitation type.

The slurry (solid content: 14% by weight, viscosity: 1,580 cp) was spray-dried with a spray dryer using a two-fluid nozzle (model: LT-8, manufactured by Ohkawara Kakohki Co., Ltd). As a drying gas, air was used. The amount G of drying gas fed was set at 45 L/min. The amount S of slurry fed was set at $11 \times 10^{-3}$ mL/min (the gas-liquid ratio G/S=4,091). The temperature of an inlet was set at 150° C. About 15 g of the powder prepared by spray-drying the slurry with the spray dryer was charged into an alumina crucible and fired at 1,000° C. for 6 hours (heating and cooling rates: 3.33° C./min) in an air atmosphere. The fired powder was disaggregated to yield a lithium-nickel-manganese-cobalt composite oxide having a composition of $Li_{1.083}(Ni_{0.448}Mn_{0.456}Co_{0.096})O_2$ (x"=0.096, y"=−0.009, and z"=0.083), a volume resistivity of $3.1 \times 10^4$ Ω·cm, and a carbon content of 0.028% by weight. When the total molar amount of (Ni, Mn, Co) was defined as 1, the molar proportion of Sn was 0.49 mol %. The average primary-particle diameter was 0.5 μm. The median diameter was 3.8 μm. The $D_{90}$ was 6.2 μm. The bulk density was 1.1 g/cc. The BET specific surface area was 1.7 m²/g. The atomic ratio of tin (Sn) to (Ni+Mn+Co), i.e., Sn/(Ni+Mn+Co), on surfaces of the primary particles was 3.5 times the atomic ratio of Sn to (Ni+Mn+Co) in the entire particles.

Tables 7 to 10 and 11 show the compositions and physical properties of the powders of the lithium transition-metal compounds produced in Examples 12 to 16 and Comparative Examples 10 to 13 as described above. Table 5" shows the powder properties of the spray-dried powder as the firing precursor.

Figure 61:
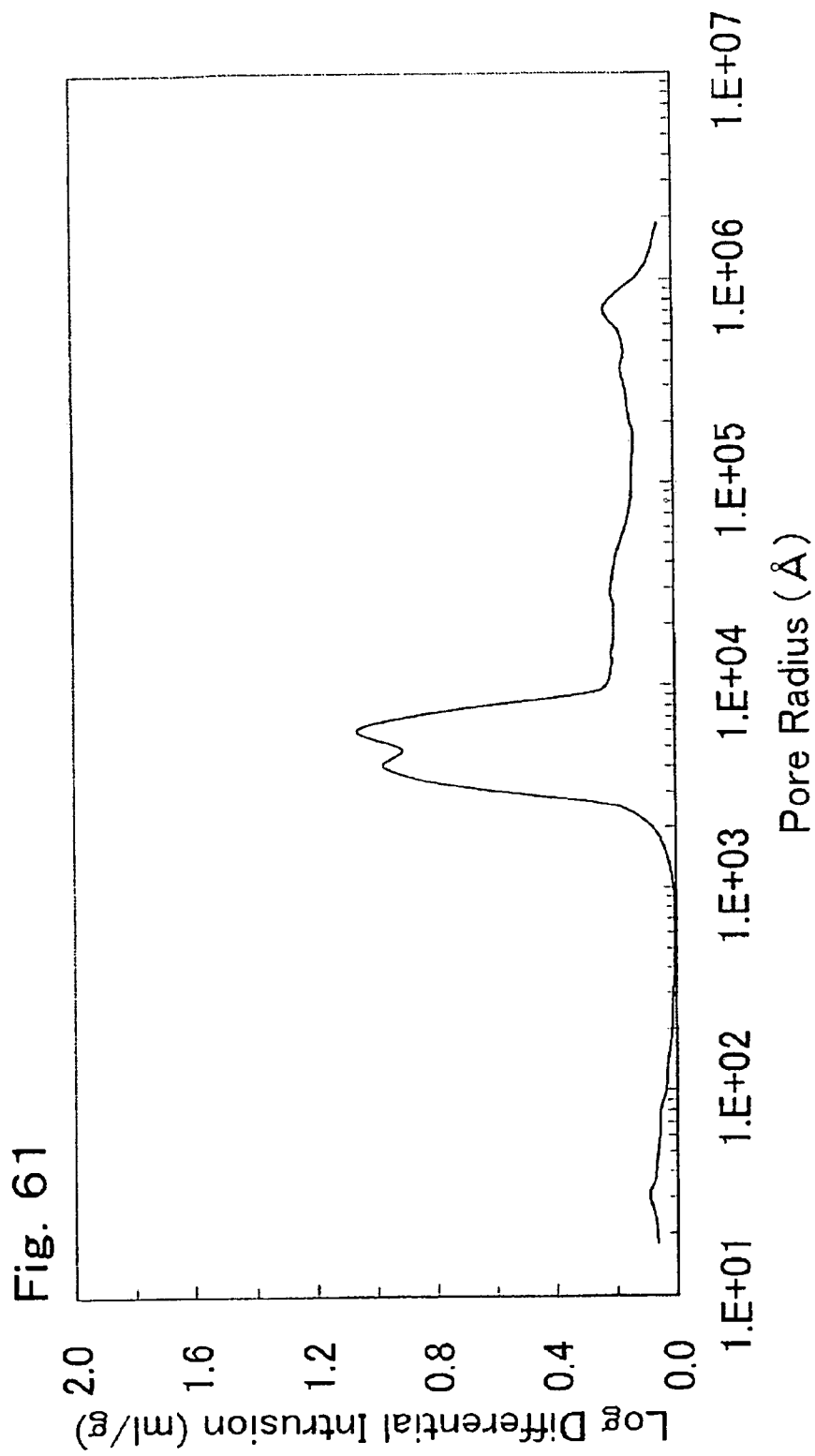
FIG. 61 is a graph showing a pore-size distribution curve of a lithium-nickel-manganese-cobalt composite-oxide powder prepared in EXAMPLE 12.
Figure 62:
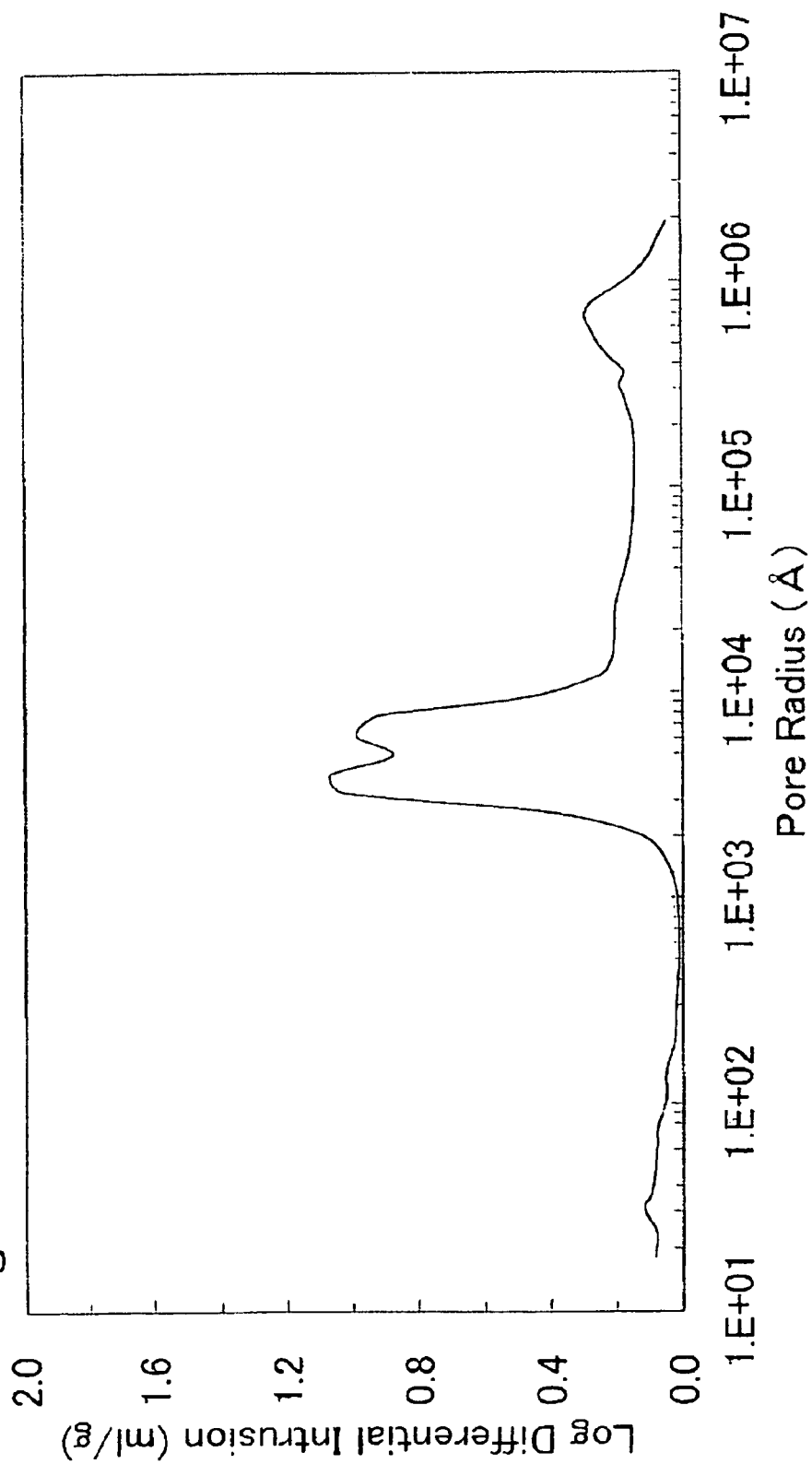
FIG. 62 is a graph showing a pore-size distribution curve of a lithium-nickel-manganese-cobalt composite-oxide powder prepared in EXAMPLE 13.
Figure 63:
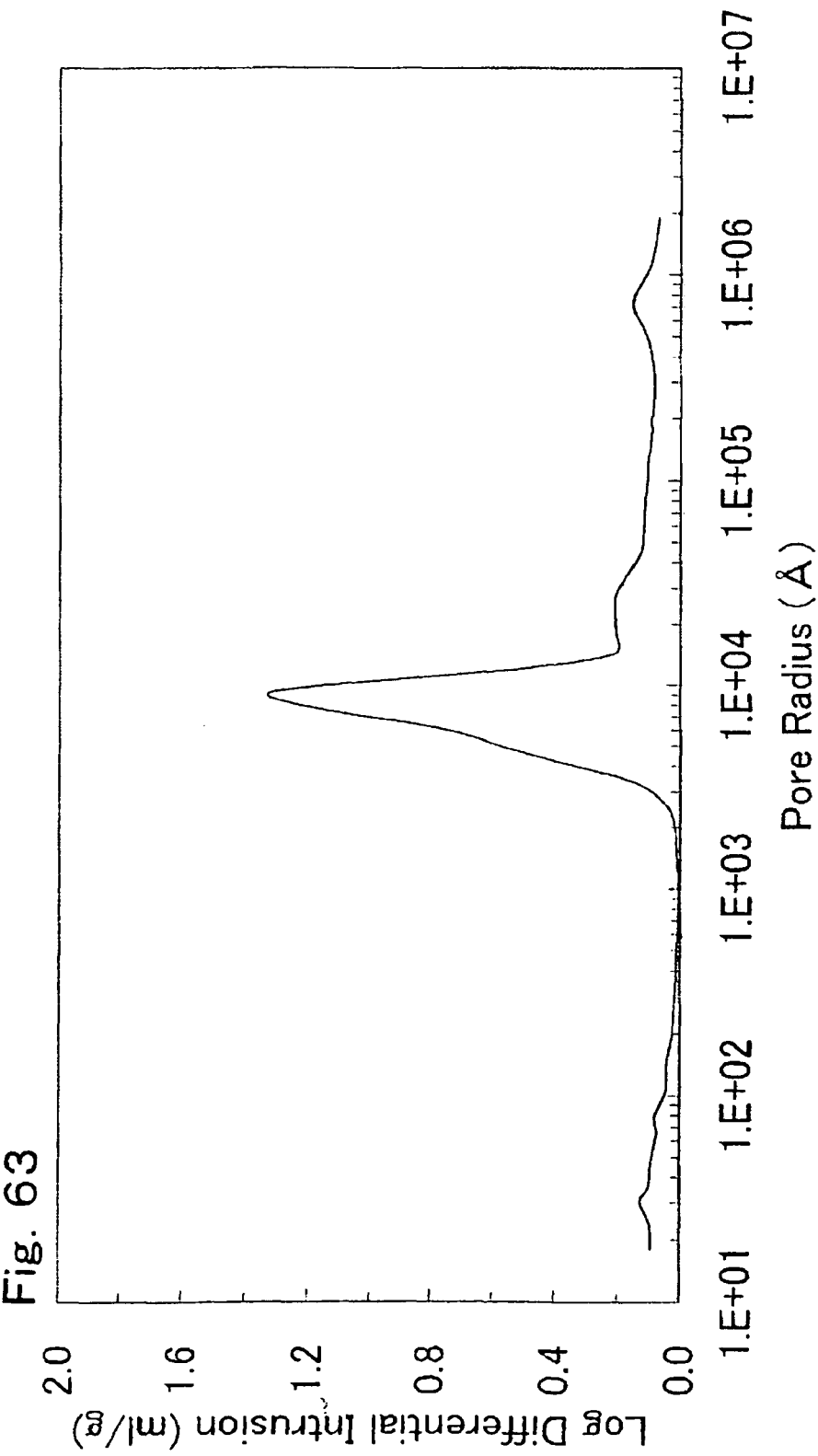
FIG. 63 is a graph showing a pore-size distribution curve of a lithium-nickel-manganese-cobalt composite-oxide powder prepared in EXAMPLE 14.
Figure 64:
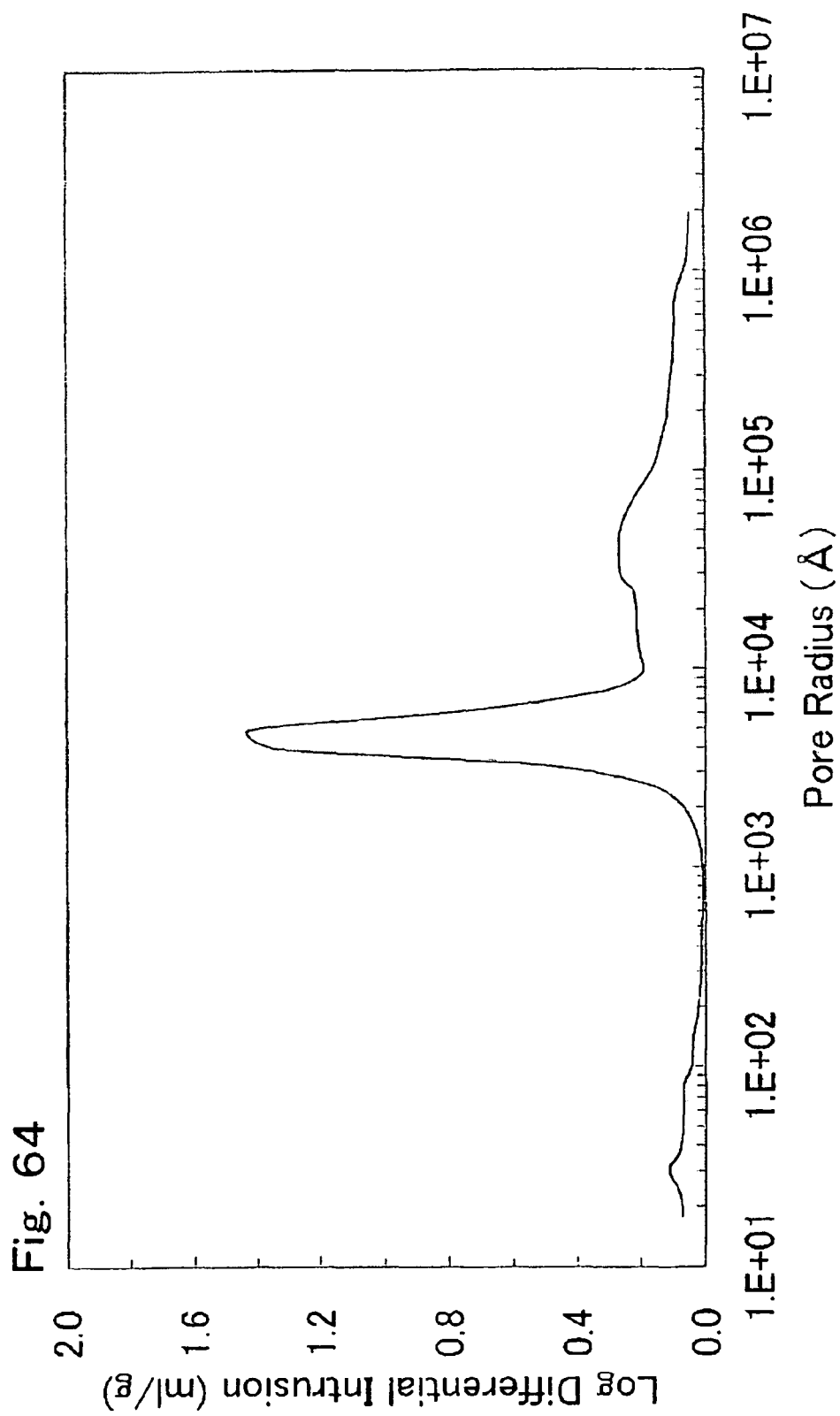
FIG. 64 is a graph showing a pore-size distribution curve of a lithium-nickel-manganese-cobalt composite-oxide powder prepared in EXAMPLE 15.
Figure 65:
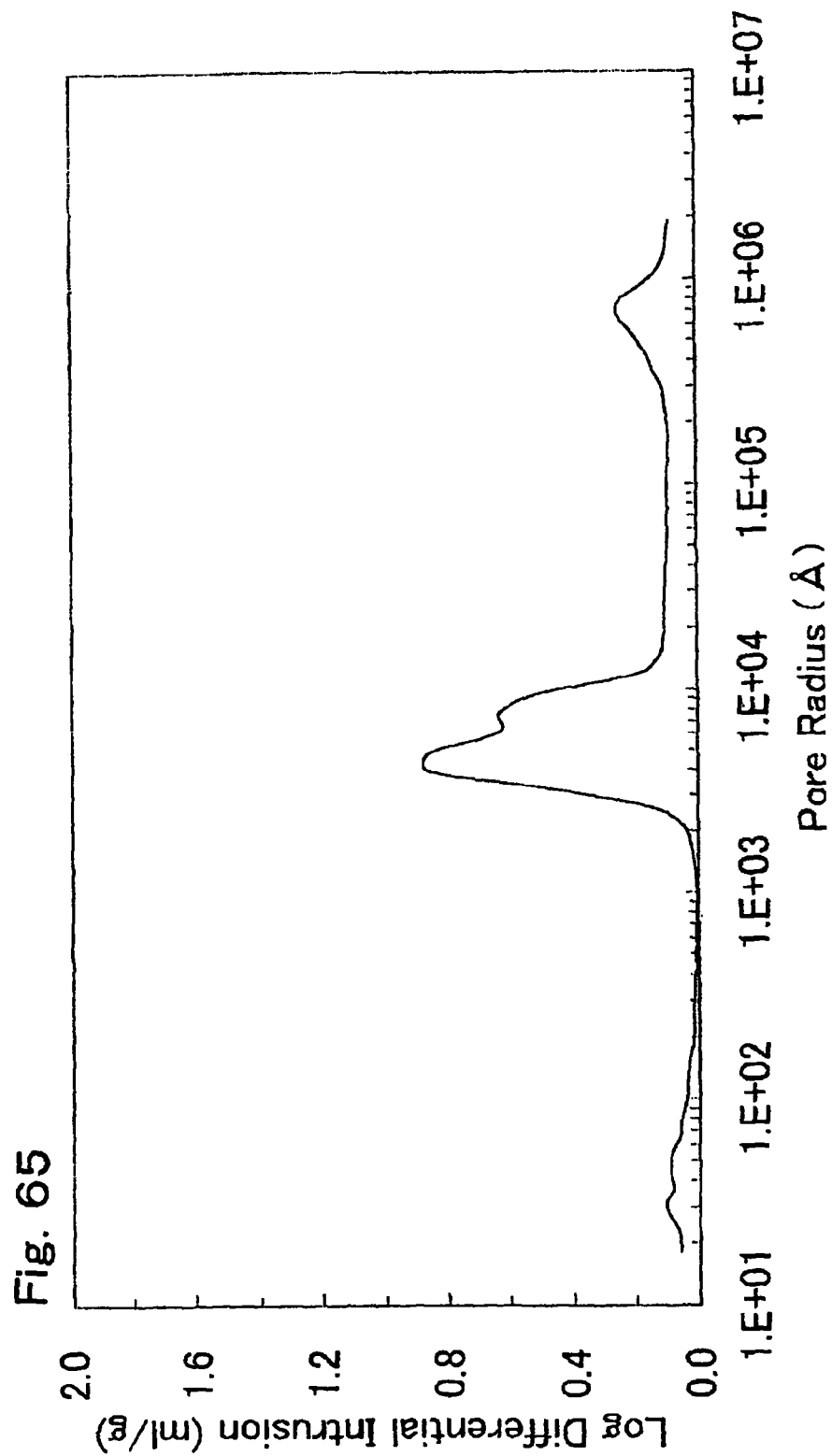
FIG. 65 is a graph showing a pore-size distribution curve of a lithium-nickel-manganese-cobalt composite-oxide powder prepared in EXAMPLE 16.
Figure 66:
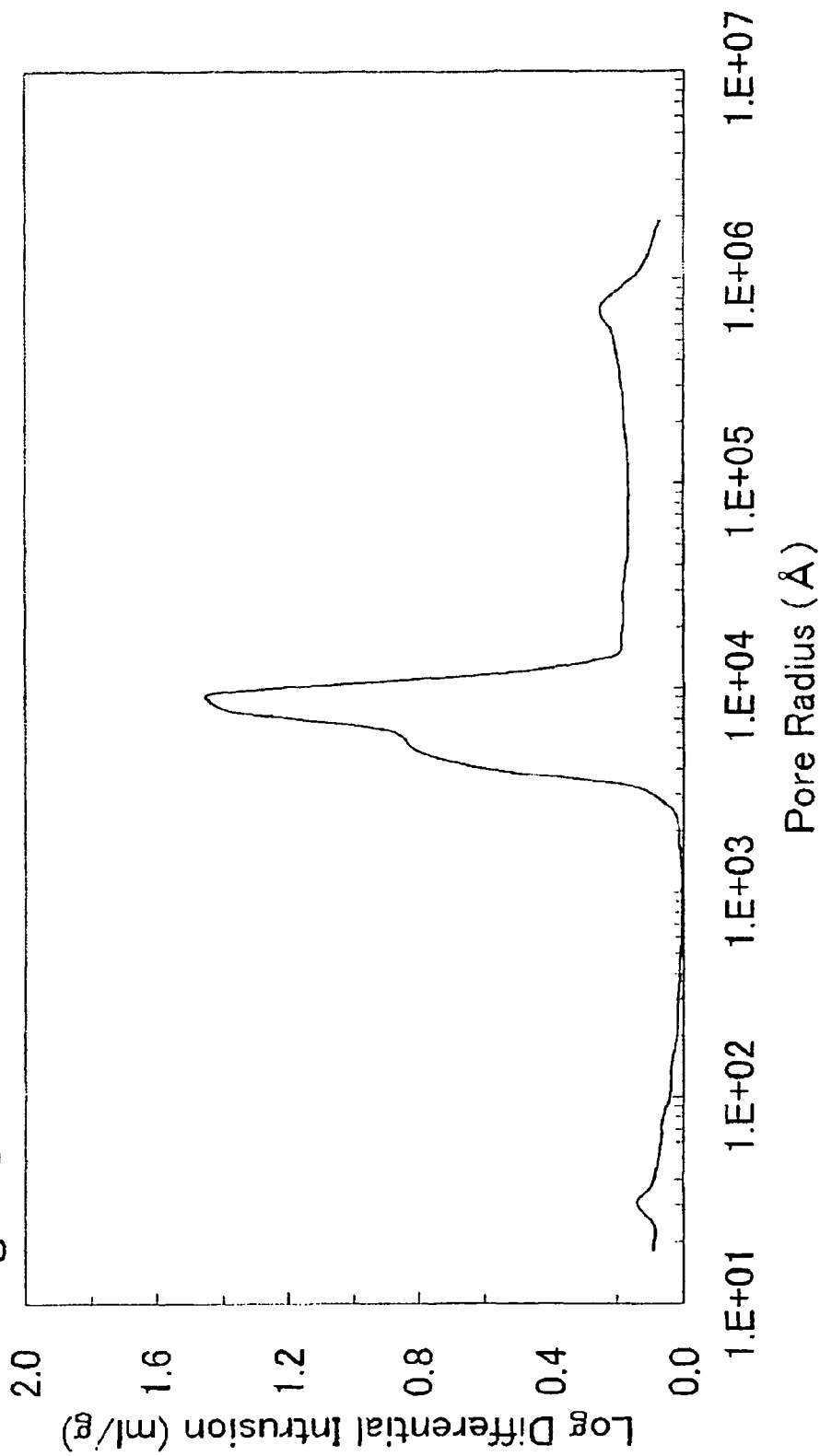
FIG. 66 is a graph showing a pore-size distribution curve of a lithium-nickel-manganese-cobalt composite-oxide powder prepared in COMPARATIVE EXAMPLE 10.
Figure 67:
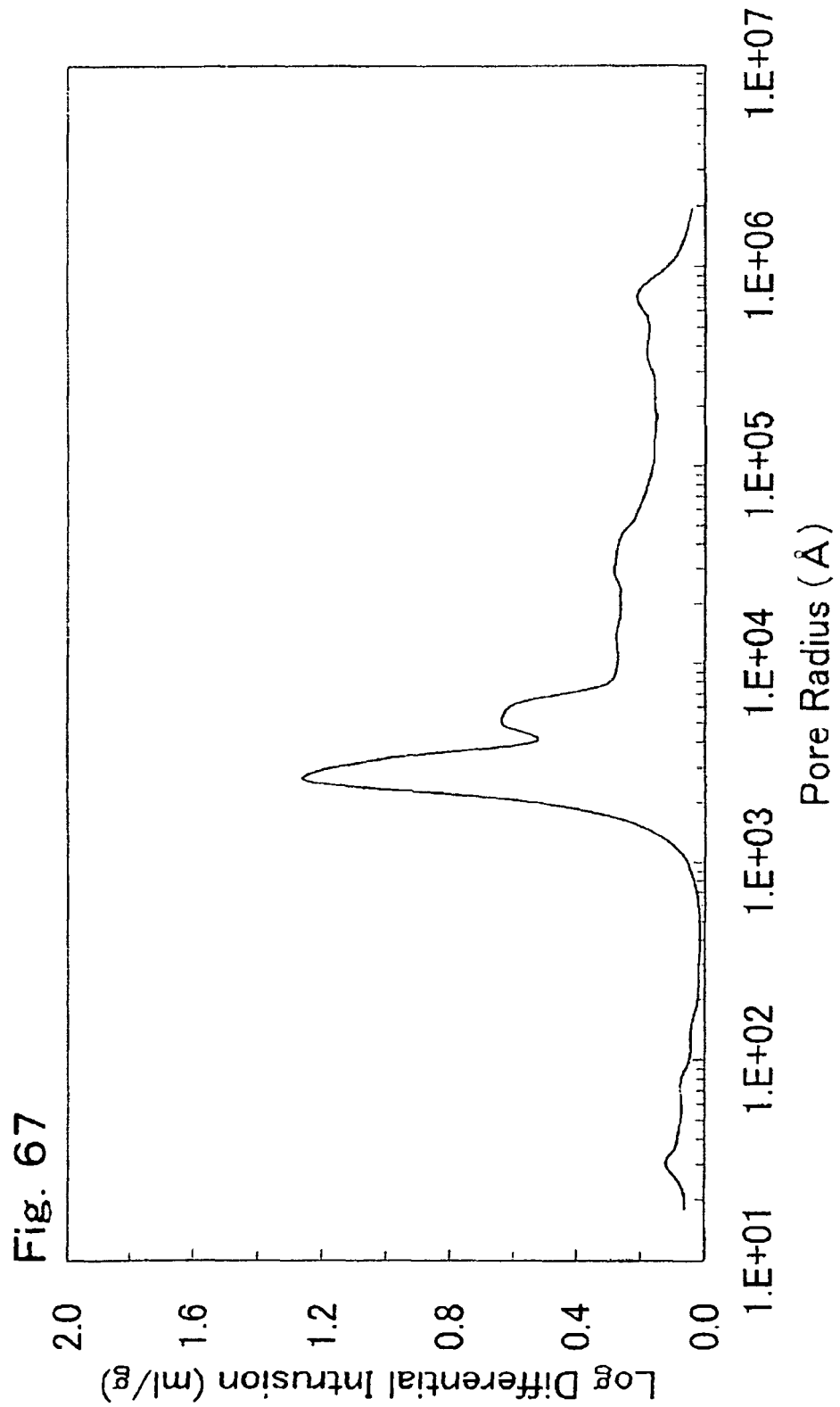
FIG. 67 is a graph showing a pore-size distribution curve of a lithium-nickel-manganese-cobalt composite-oxide powder prepared in COMPARATIVE EXAMPLE 11.
Figure 68:
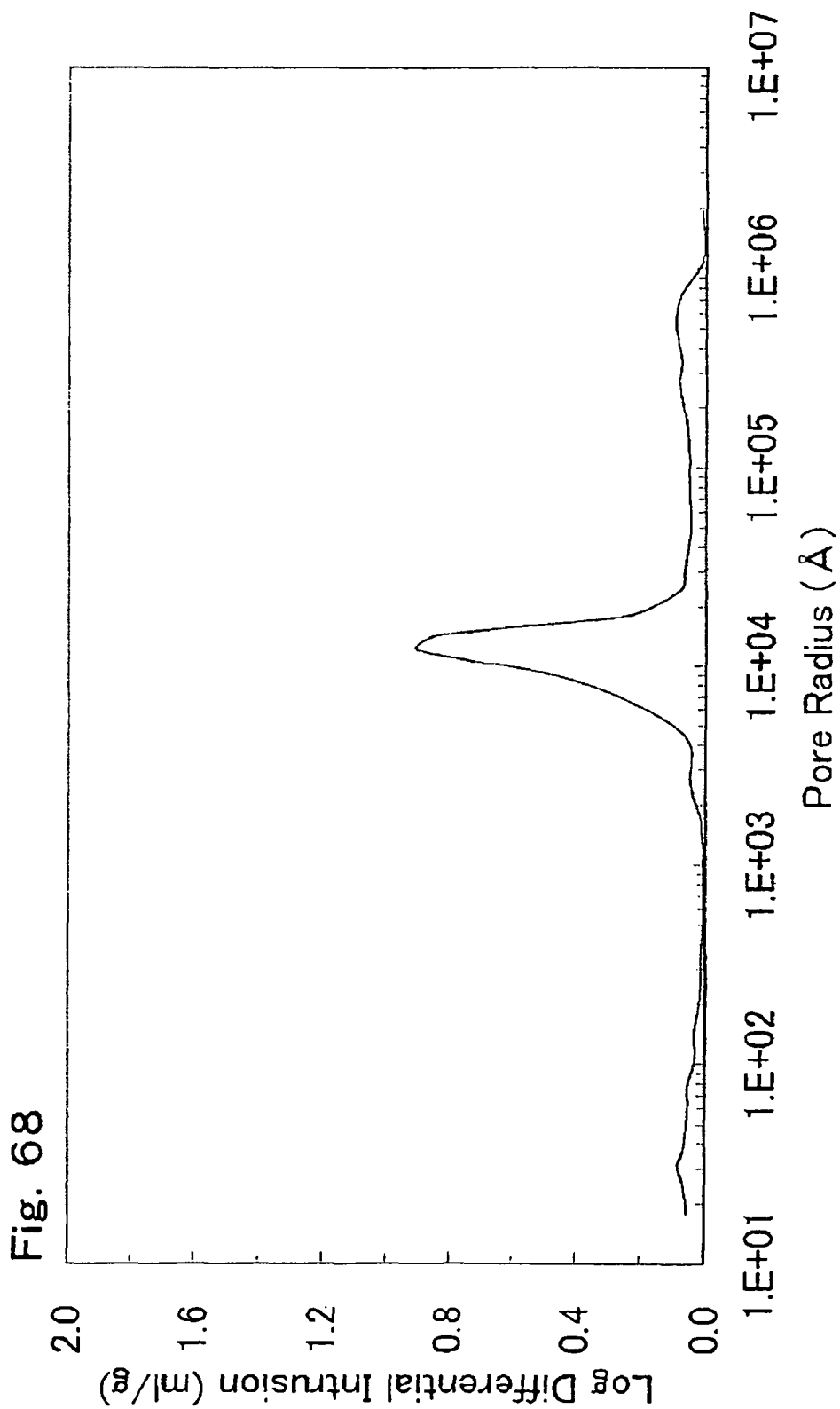
FIG. 68 is a graph showing a pore-size distribution curve of a lithium-nickel-manganese-cobalt composite-oxide powder prepared in COMPARATIVE EXAMPLE 12.
Figure 69:
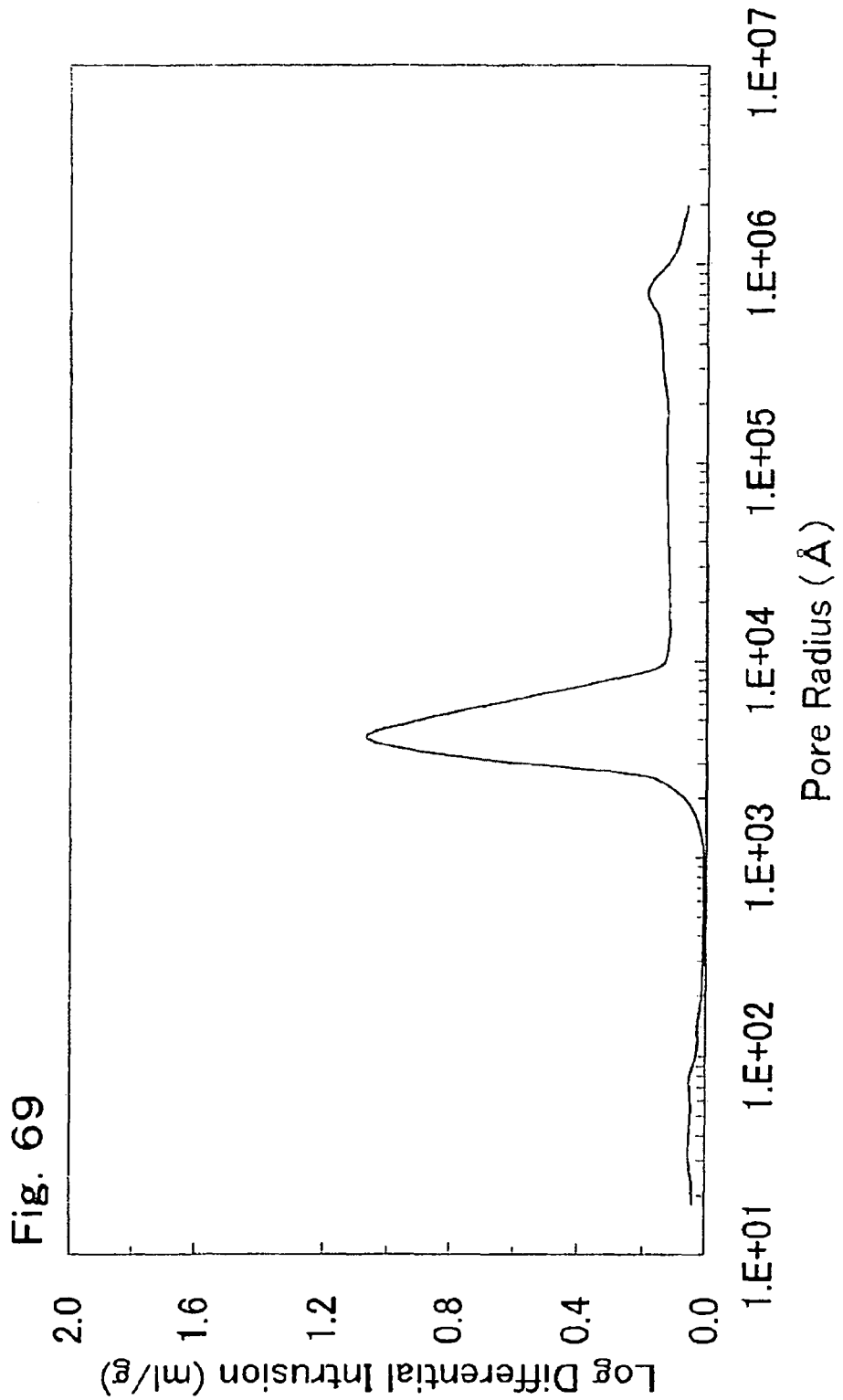
FIG. 69 is a graph showing a pore-size distribution curve of a lithium-nickel-manganese-cobalt composite-oxide powder prepared in COMPARATIVE EXAMPLE 13.
Figure 70:
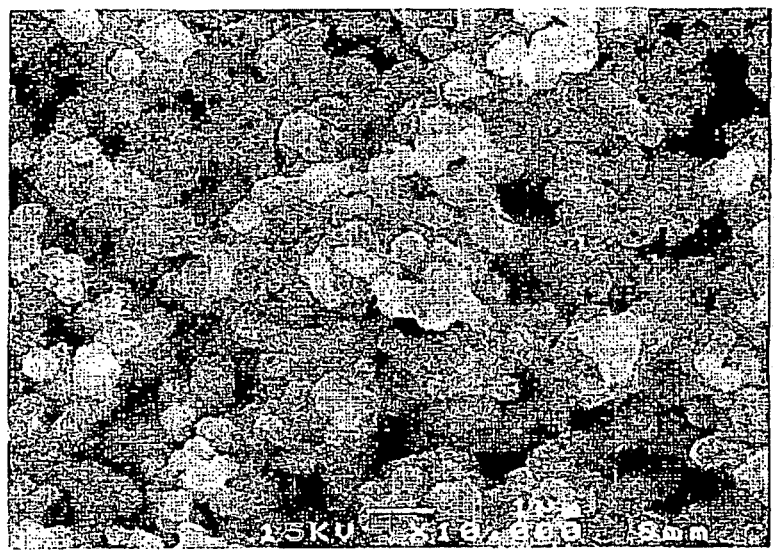
FIG. 70 is a SEM image (photograph) (×10,000) of a lithium-nickel-manganese-cobalt composite oxide prepared in EXAMPLE 12.
Figure 71:
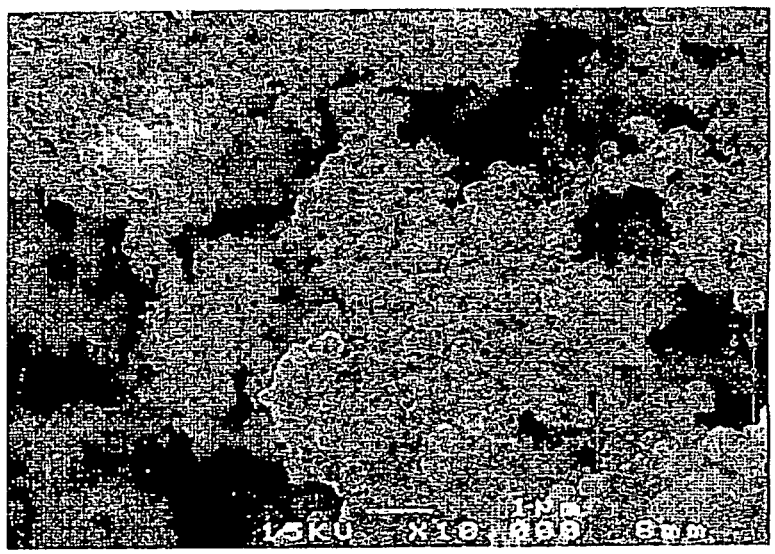
FIG. 71 is a SEM image (photograph) (×10,000) of a lithium-nickel-manganese-cobalt composite oxide prepared in EXAMPLE 13.
Figure 72:
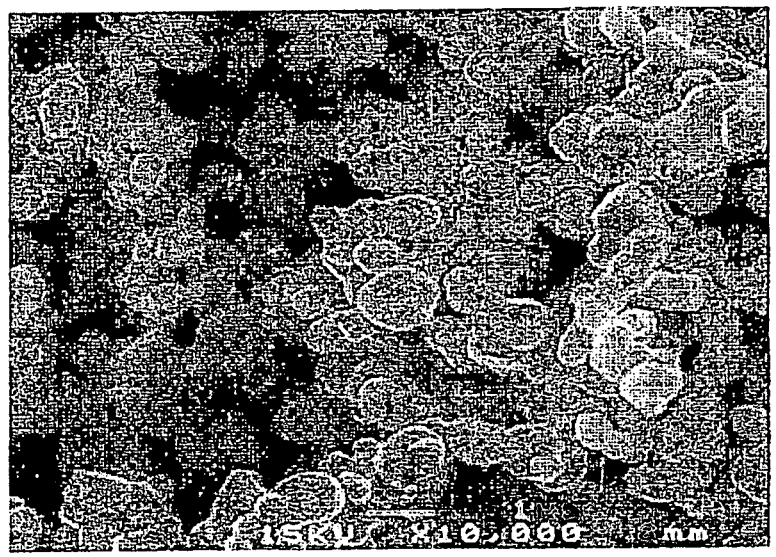
FIG. 72 is a SEM image (photograph) (×10,000) of a lithium-nickel-manganese-cobalt composite oxide prepared in EXAMPLE 14.
Figure 73:
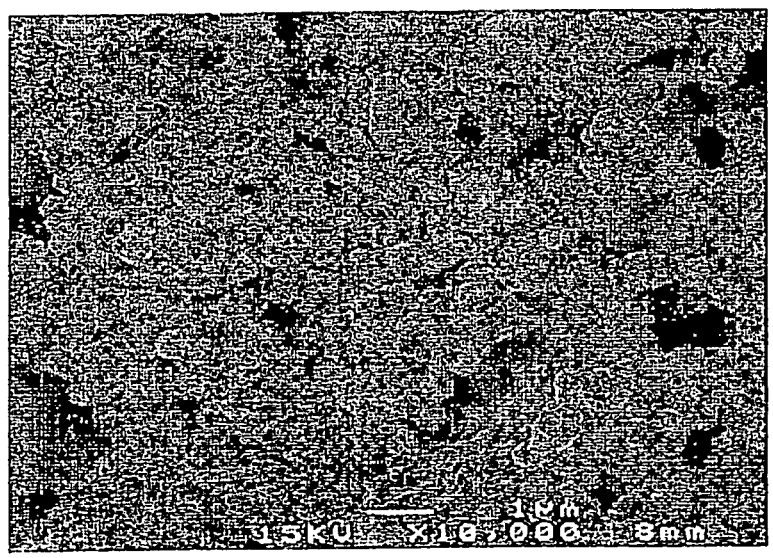
FIG. 73 is a SEM image (photograph) (×10,000) of a lithium-nickel-manganese-cobalt composite oxide prepared in EXAMPLE 15.
Figure 74:
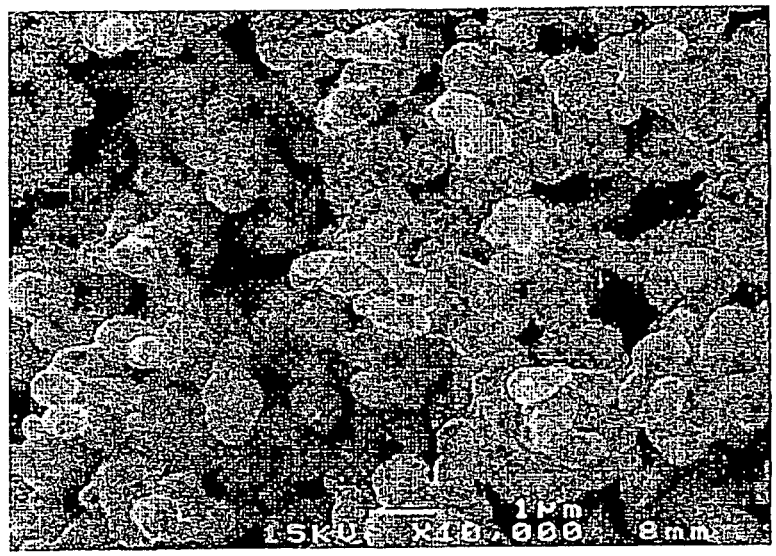
FIG. 74 is a SEM image (photograph) (×10,000) of a lithium-nickel-manganese-cobalt composite oxide prepared in EXAMPLE 16.
Figure 75:
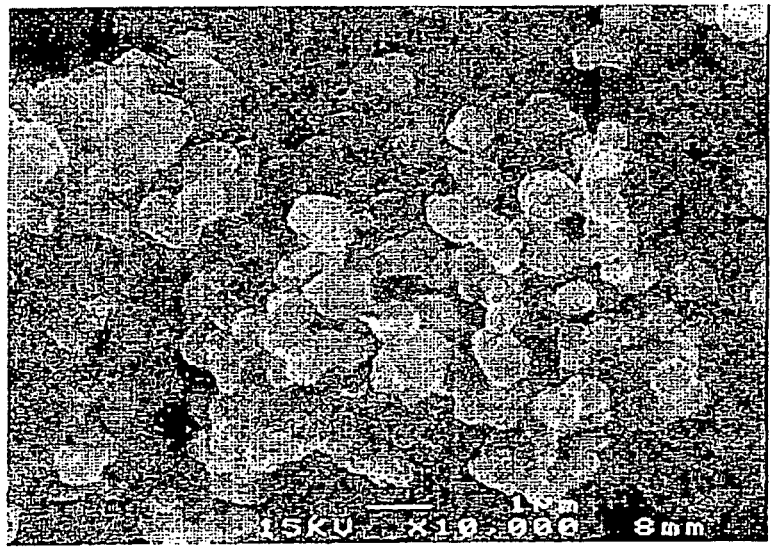
FIG. 75 is a SEM image (photograph) (×10,000) of a lithium-nickel-manganese-cobalt composite oxide prepared in COMPARATIVE EXAMPLE 10.
Figure 76:
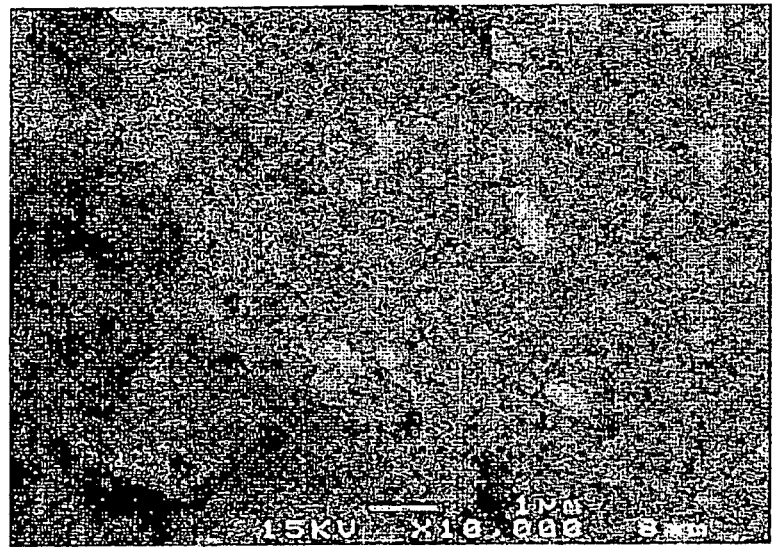
FIG. 76 is a SEM image (photograph) (×10,000) of a lithium-nickel-manganese-cobalt composite oxide prepared in COMPARATIVE EXAMPLE 11.
Figure 77:
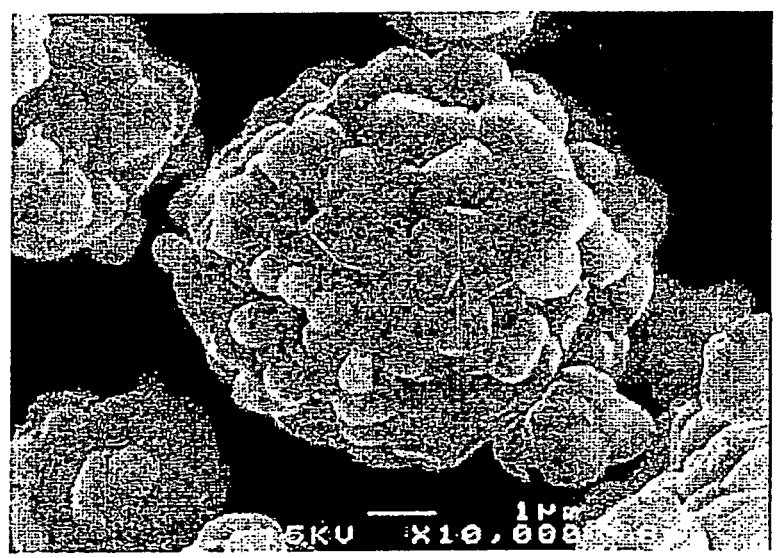
FIG. 77 is a SEM image (photograph) (×10,000) of a lithium-nickel-manganese-cobalt composite oxide prepared in COMPARATIVE EXAMPLE 12.
Figure 78:
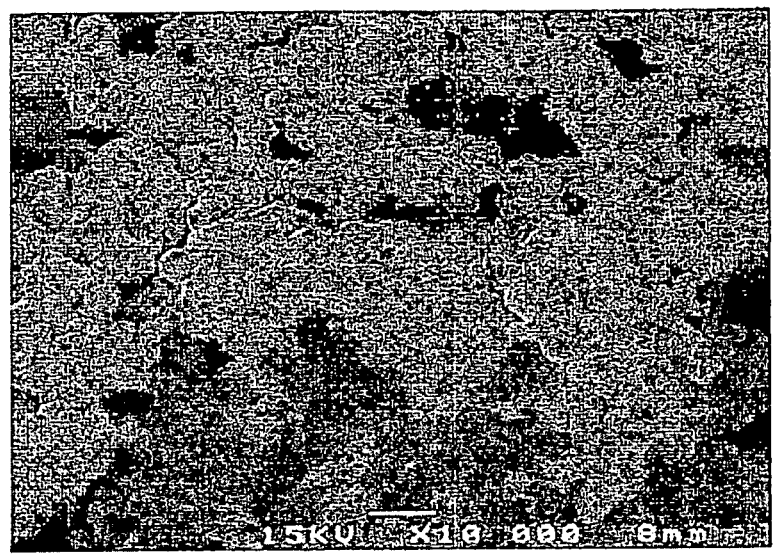
FIG. 78 is a SEM image (photograph) (×10,000) of a lithium-nickel-manganese-cobalt composite oxide prepared in COMPARATIVE EXAMPLE 13.
Figure 79:
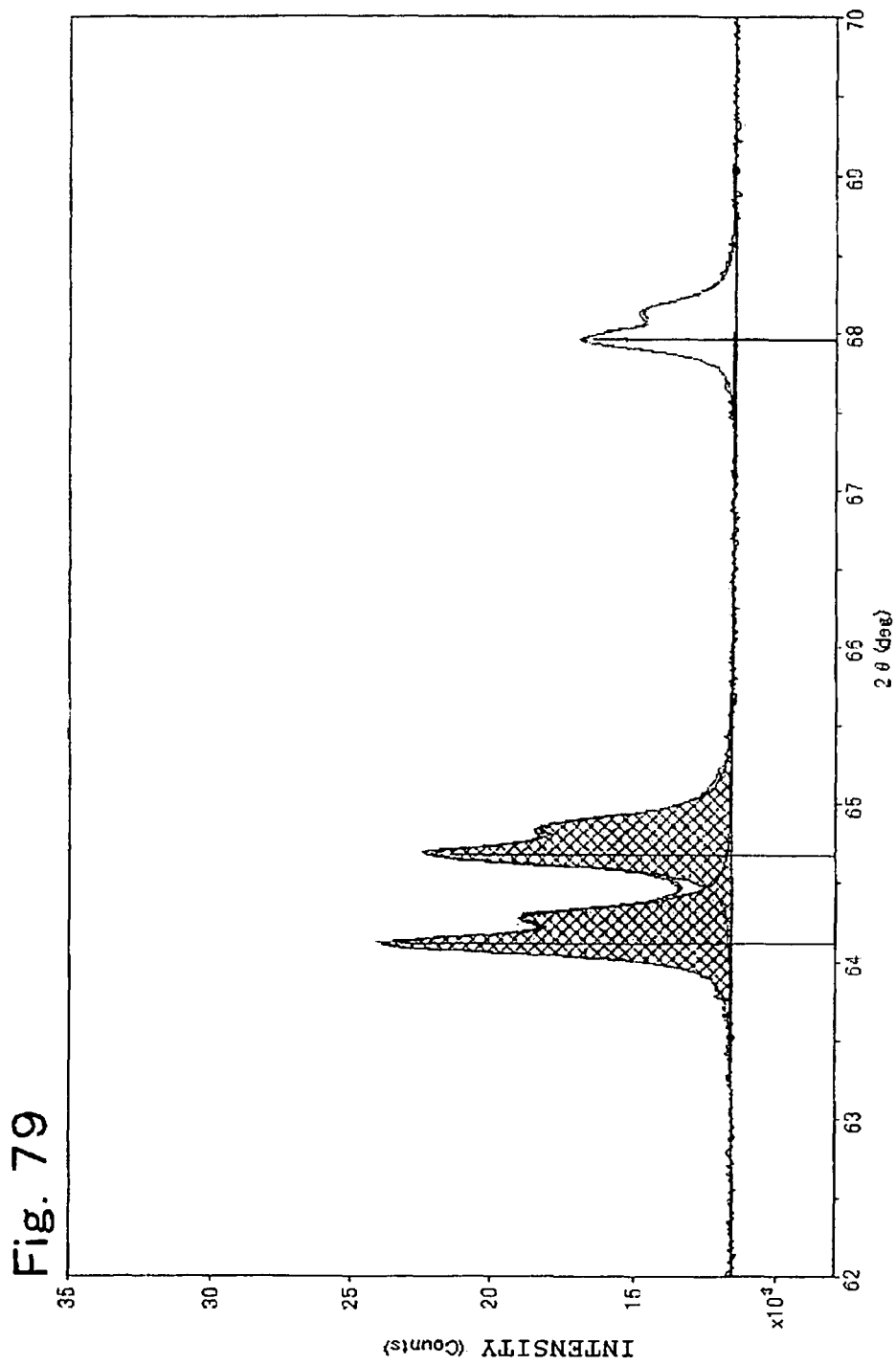
FIG. 79 is an XRD pattern of a lithium-nickel-manganese-cobalt composite oxide prepared in EXAMPLE 12.
Figure 80:
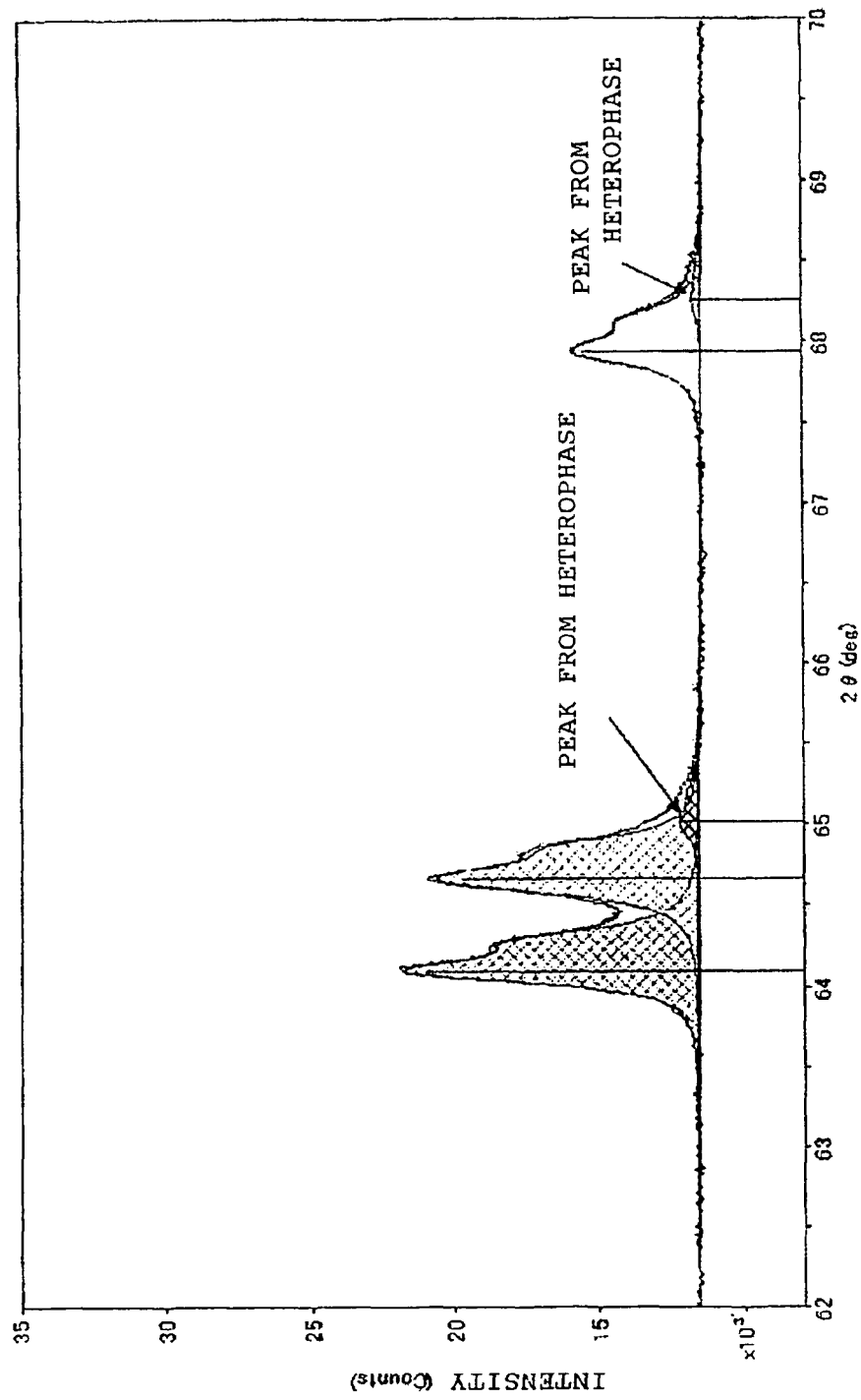
FIG. 80 is an XRD pattern of a lithium-nickel-manganese-cobalt composite oxide prepared in EXAMPLE 13.
Figure 81:
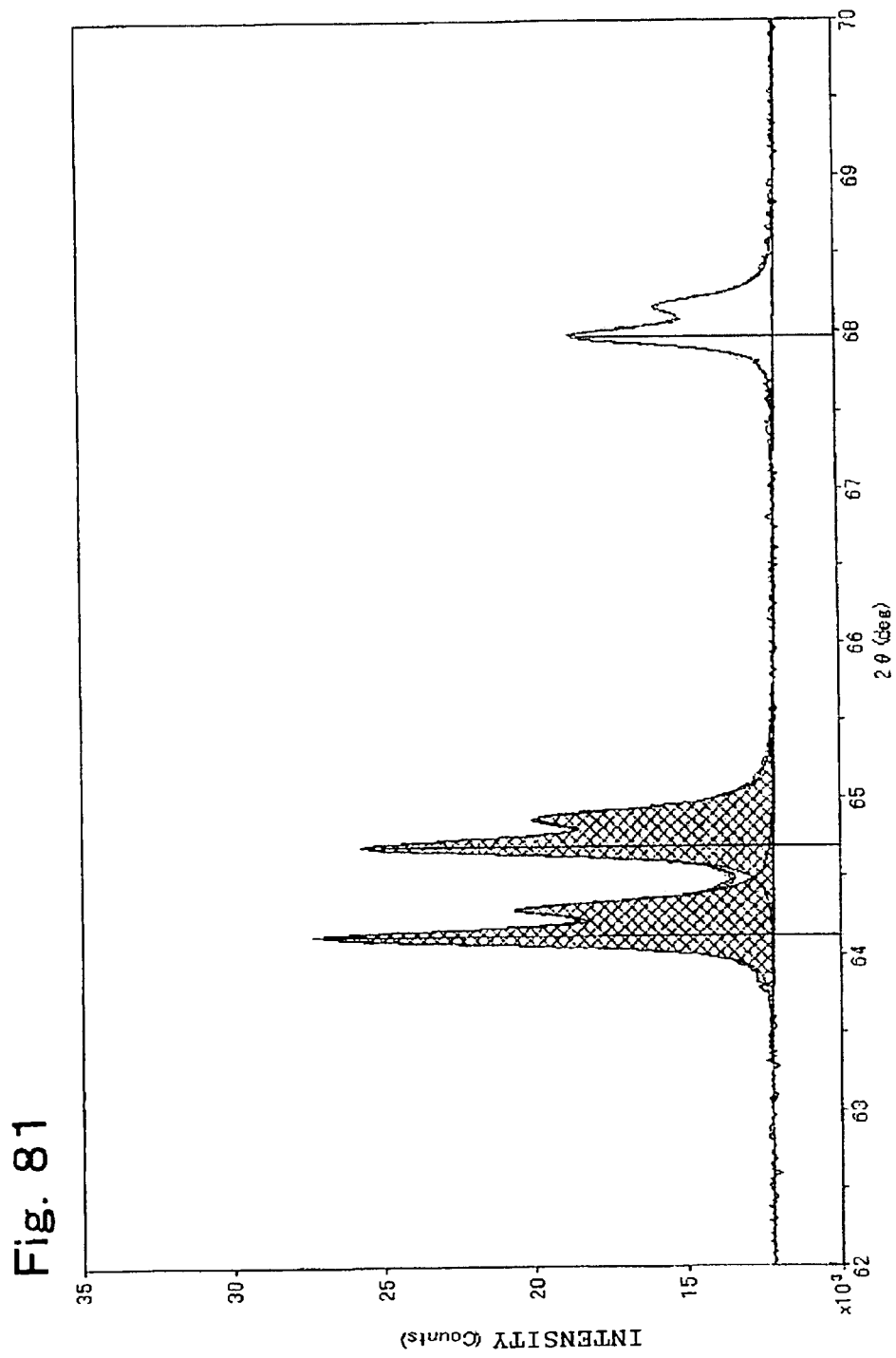
FIG. 81 is an XRD pattern of a lithium-nickel-manganese-cobalt composite oxide prepared in EXAMPLE
Figure 82:
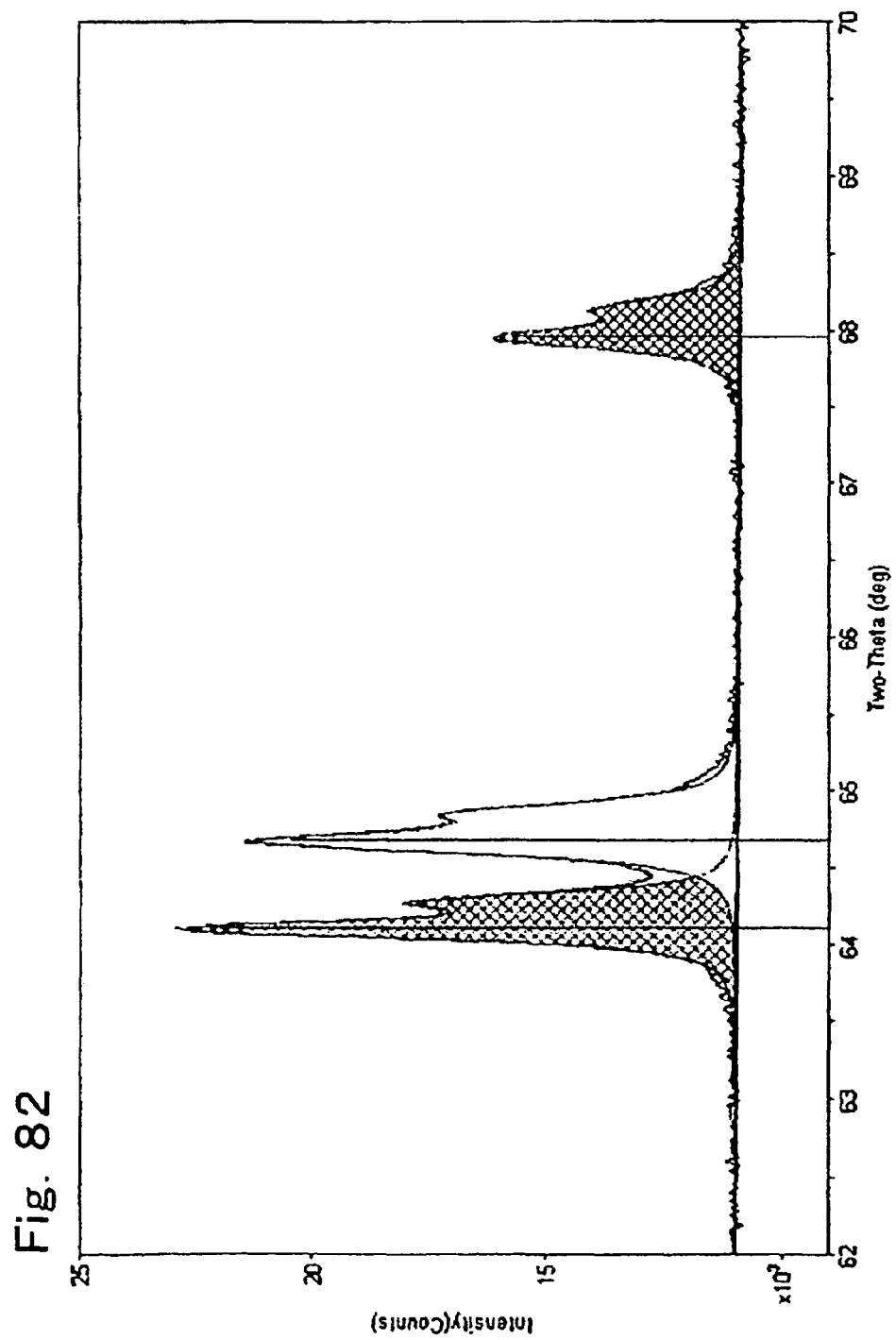
FIG. 82 is an XRD pattern of a lithium-nickel-manganese-cobalt composite oxide prepared in EXAMPLE 15.
Figure 83:
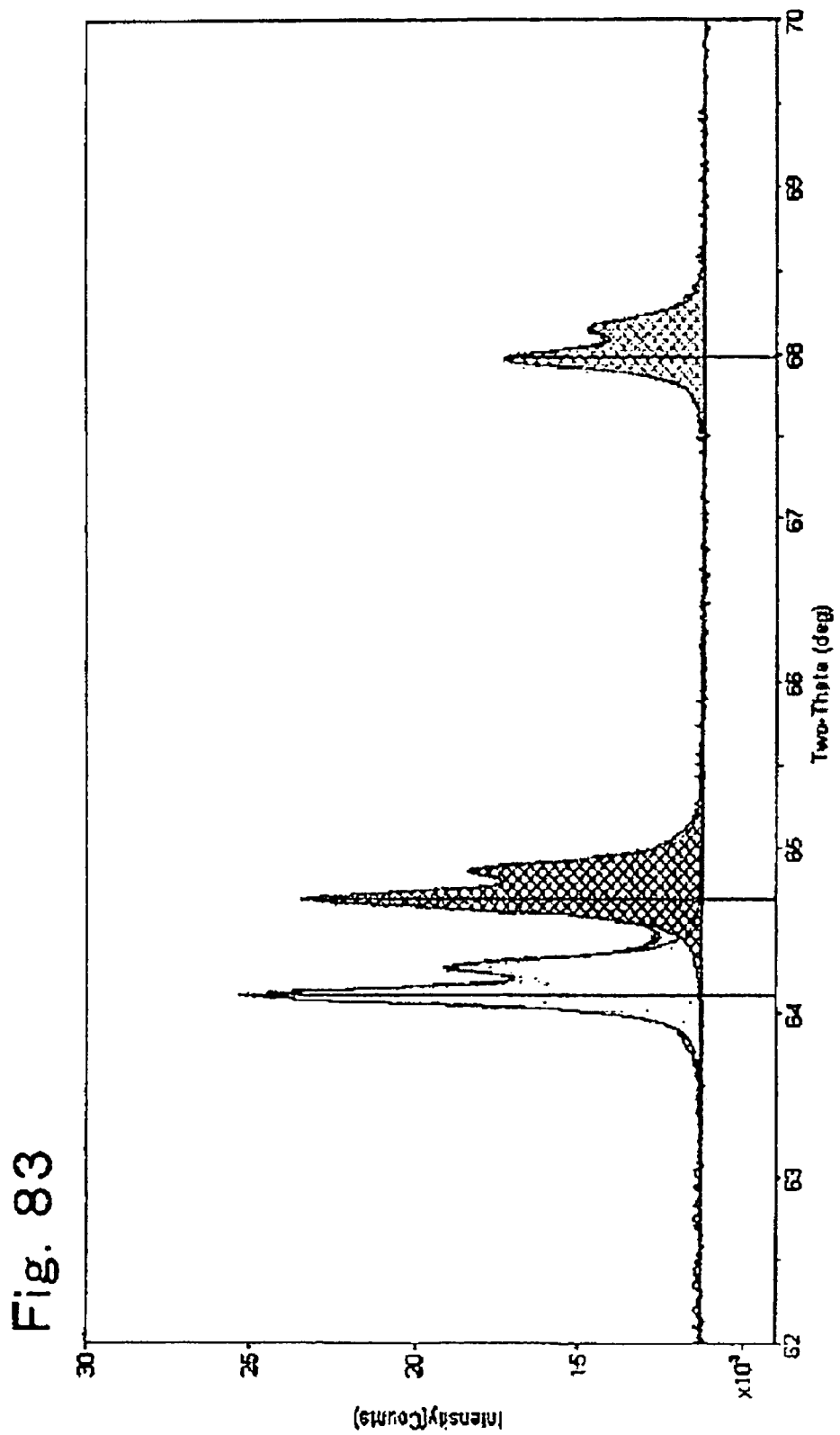
FIG. 83 is an XRD pattern of a lithium-nickel-manganese-cobalt composite oxide prepared in EXAMPLE 16.
Figure 84:
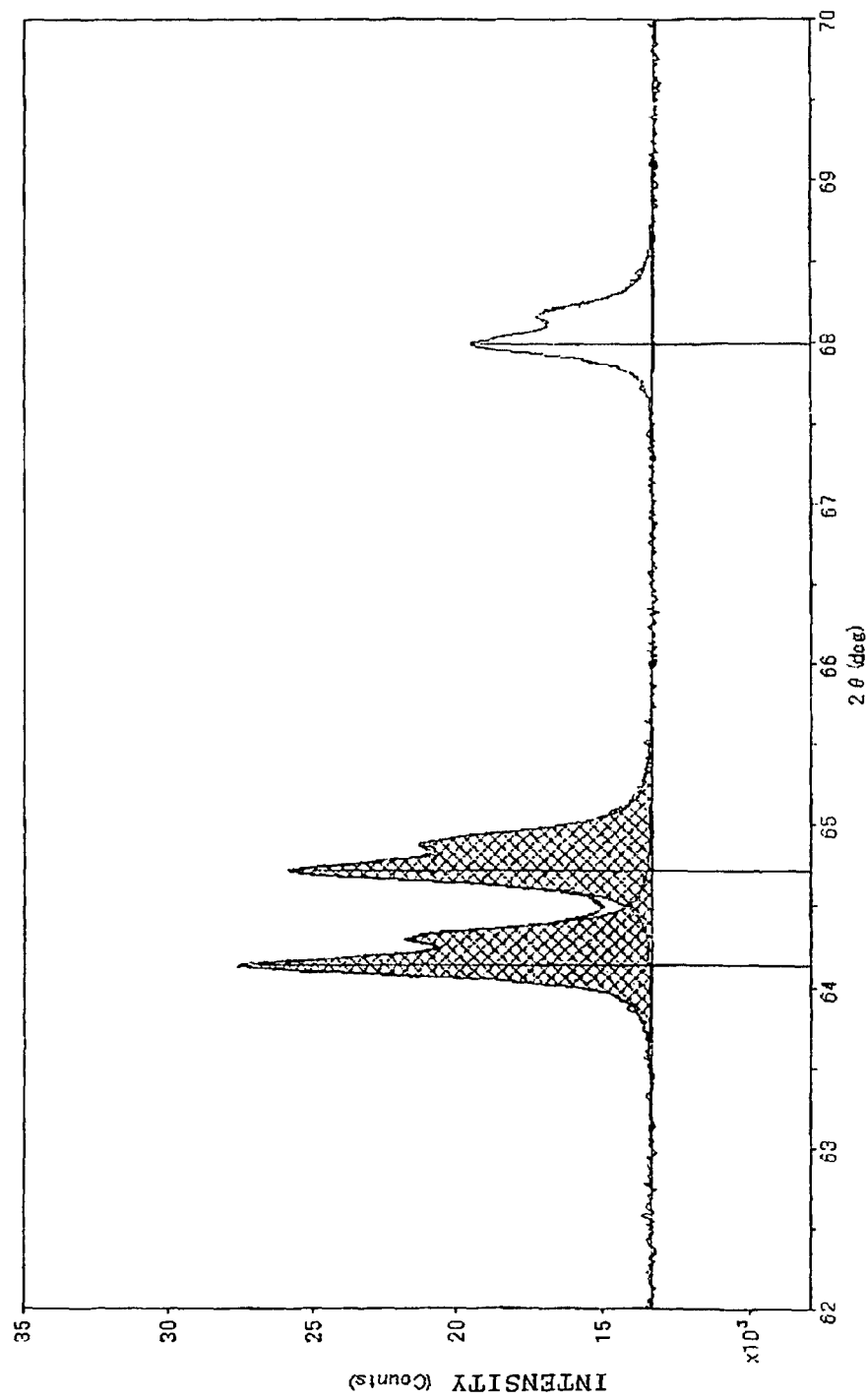
FIG. 84 is an XRD pattern of a lithium-nickel-manganese-cobalt composite oxide prepared in COMPARATIVE EXAMPLE 10.
Figure 85:
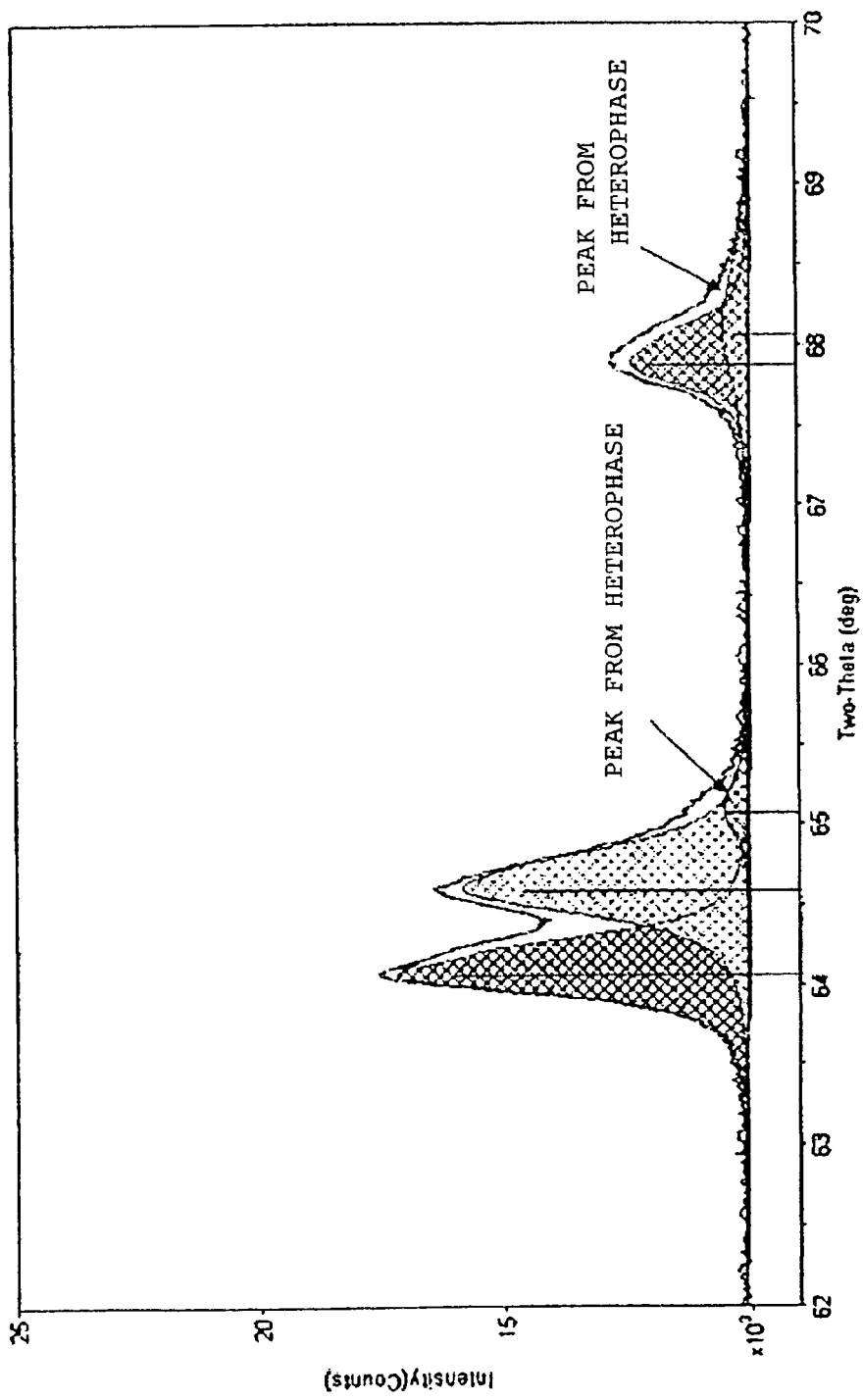
FIG. 85 is an XRD pattern of a lithium-nickel-manganese-cobalt composite oxide prepared in COMPARATIVE EXAMPLE 11.
Figure 86:
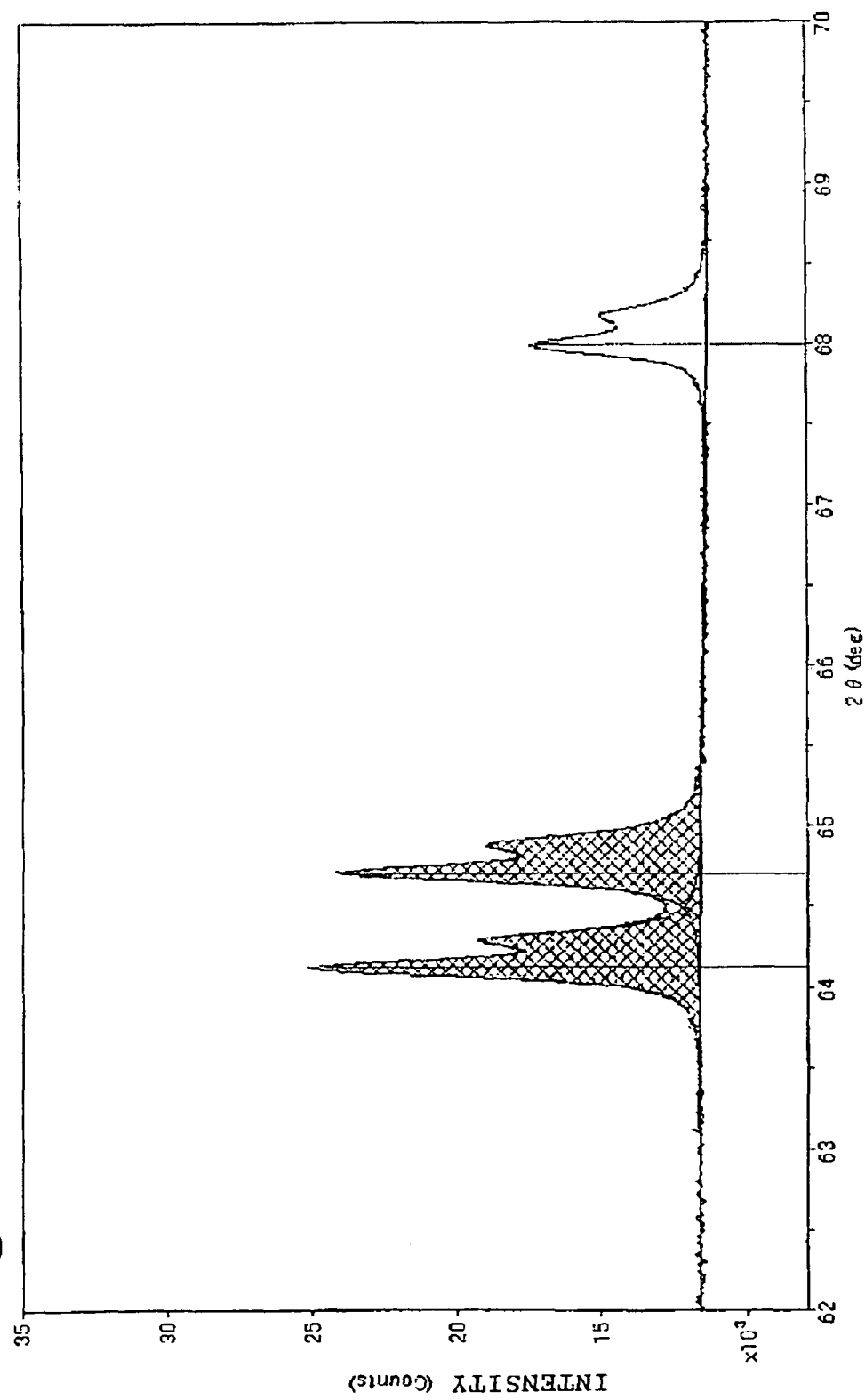
FIG. 86 is an XRD pattern of a lithium-nickel-manganese-cobalt composite oxide prepared in COMPARATIVE EXAMPLE 12.
Figure 87:
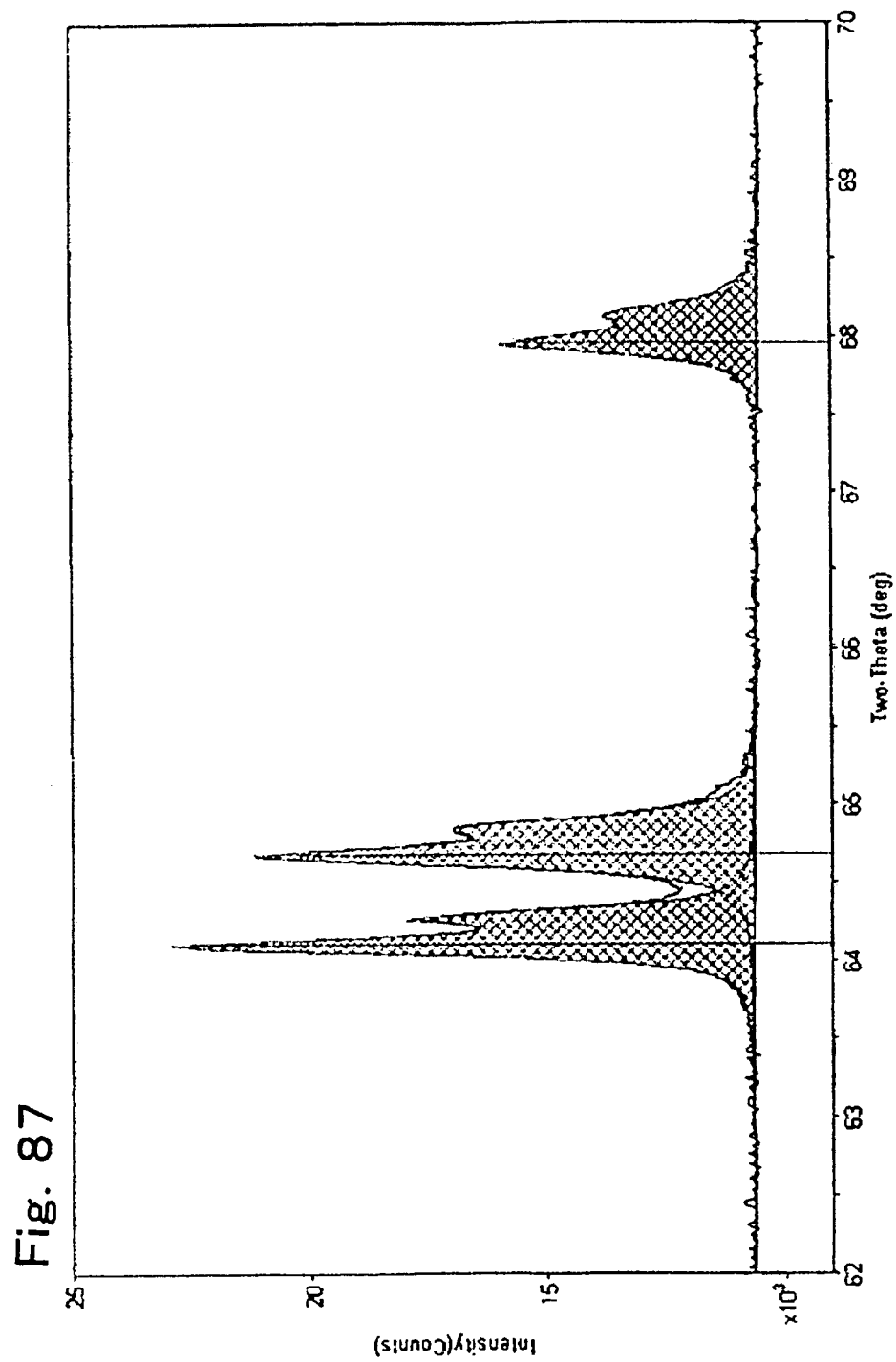
FIG. 87 is an XRD pattern of a lithium-nickel-manganese-cobalt composite oxide prepared in COMPARATIVE EXAMPLE 13.

FIGS. 61 to 69 show pore-size distribution curves of the powders of the lithium-nickel-manganese-cobalt composite oxides produced in Examples 12 to 16 and Comparative Examples 10 to 13. FIGS. 70 to 78 show SEM images (photographs) (×10,000) of the powders. FIGS. 79 to 87 show powder X-ray diffraction patterns of the powders.

TABLE 7

| Positive-electrode material | | Additive element | Molar proportion of additive element (mol %) (additive element/(Ni + Mn + Co)) | | *1 |
|---|---|---|---|---|---|
| | | | Feed | Analysis | |
| Example | 1 | W | 0.5 | 0.62 | 9.8 |
| | 2 | W | 1.0 | 1.03 | 9.4 |
| | 3 | Mo | 0.5 | 0.48 | 21 |
| | 4 | W | 0.5 | 0.51 | 12 |
| | 5 | Nb | 0.5 | 0.48 | 8.8 |
| Comparative Example | 1 | — | — | — | — |
| | 2 | W | 2.0 | 2.06 | 6.0 |
| | 3 | B | 0.5 | 0.24 | 213 |
| | 4 | Sn | 0.5 | 0.49 | 3.5 |

*1 The atomic ratio of the total amount of the additive element to the total amount of metal elements except lithium and the additive element, i.e., additive element/(Ni + Mn + Co), on surfaces of primary particles with respect to the atomic ratio in the entire primary particles.

TABLE 8

| Positive-electrode material | | Amount of mercury intruded*2) (ml/g) | Pore radius (nm) | | Partial pore volume | | Average primary-particle diameter (μm) | Median diameter (μm) | 90% cumulative diameter (D90) (μm) | Bulk density (g/cm³) | BET specific surface area (m²/g) |
|---|---|---|---|---|---|---|---|---|---|---|---|
| | | | Peak top1*3) | Peak top2*4) | Peak top1*3) | Peak top2*4) | | | | | |
| Example | 1 | 0.91 | — | 400, 620 | — | 0.48 | 0.4 | 1.4 | 2.1 | 1.1 | 2.1 |
| | 2 | 1.05 | — | 401, 621 | — | 0.59 | 0.3 | 2.2 | 3.9 | 1.0 | 2.9 |
| | 3 | 0.83 | — | 943 | — | 0.47 | 0.7 | 2.0 | 3.2 | 1.3 | 1.6 |
| | 4 | 0.88 | — | 494 | — | 0.44 | 0.5 | 1.6 | 2.4 | 1.0 | 2.2 |
| | 5 | 0.75 | — | 402, 772 | — | 0.41 | 0.6 | 2.0 | 3.3 | 1.2 | 1.9 |
| Comparative Example | 1 | 1.01 | — | 942 | — | 0.55 | 0.6 | 3.0 | 5.1 | 1.2 | 1.7 |
| | 2 | 1.07 | 259 | 494 | 0.36 | 0.18 | 0.2 | 0.8 | 1.3 | 0.9 | 3.8 |
| | 3 | 0.49 | — | 1210 | — | 0.30 | 1.0 | 5.9 | 8.9 | 1.8 | 0.8 |
| | 4 | 0.88 | — | 402 | — | 0.40 | 0.5 | 3.8 | 6.2 | 1.1 | 1.7 |

*2)In a mercury intrusion curve obtained by mercury intrusion porosimetry, the amount of mercury intruded when the pressure is increased from 3.86 kPa to 413 MPa.
*3)In a pore-size distribution curve, the peak top of a sub-peak observed at a pore radius greater than or equal to 80 nm and less than 300 nm.
*4)In a pore-size distribution curve, the peak top of a main peak observed at a pore radius of 300 nm or more.

TABLE 9

| Positive-electrode material | Composition | | | | | Carbon content C (wt %) | Volume resistivity (Ω · cm) |
|---|---|---|---|---|---|---|---|
| | x | y | z | Lower limit of z*5 | Upper limit of z*6 | | |
| 1 | 0.097 | 0.003 | 0.114 | 0.042 | 0.178 | 0.042 | $5.4 \times 10^4$ |
| 2 | 0.098 | −0.002 | 0.139 | 0.047 | 0.182 | 0.030 | $4.7 \times 10^4$ |
| 3 | 0.098 | 0.002 | 0.124 | 0.043 | 0.179 | 0.027 | $3.6 \times 10^4$ |

TABLE 9-continued

| Positive-electrode material | | Composition | | | Carbon content C (wt %) | Volume resistivity ($\Omega \cdot cm$) |
|---|---|---|---|---|---|---|
| | | x | y | z | Lower limit of z*5 | Upper limit of z*6 | | |
| | 4 | 0.097 | 0.003 | 0.094 | 0.042 | 0.178 | 0.033 | $5.8 \times 10^4$ |
| | 5 | 0.102 | −0.002 | 0.118 | 0.047 | 0.181 | 0.027 | $4.4 \times 10^4$ |
| Comparative Example | 1 | 0.098 | 0.016 | 0.096 | 0.031 | 0.168 | 0.023 | $2.7 \times 10^4$ |
| | 2 | 0.097 | 0.012 | 0.124 | 0.035 | 0.171 | 0.050 | $1.1 \times 10^4$ |
| | 3 | 0.099 | −0.001 | 0.096 | 0.046 | 0.181 | 0.047 | $5.3 \times 10^4$ |
| | 4 | 0.096 | −0.009 | 0.083 | 0.037 | 0.188 | 0.028 | $3.1 \times 10^4$ |

*5 $(1-x)(0.05-0.98y)$
*6 $(1-x)(0.20-0.88y)$

TABLE 10

| Positive-electrode material | | FWHM (110) | Integrated intensity | | | Ratio of integrated intensity | | |
|---|---|---|---|---|---|---|---|---|
| | | | $I_{018}$ ($I_{018}$*) | $I_{110}$ ($I_{110}$*) | $I_{113}$ ($I_{113}$*) | $I_{018}$*/$I_{018}$ | $I_{110}$*/$I_{110}$ | $I_{113}$*/$I_{113}$ |
| Example | 1 | 0.169 | 2248 (Heterophase undetected) | 2184 (Heterophase undetected) | 1118 (Heterophase undetected) | 0 | 0 | 0 |
| | 2 | 0.193 | 2238 (Heterophase undetected) | 2062 (160) | 1049 (73) | 0 | 0.078 | 0.070 |
| | 3 | 0.135 | 2322 (Heterophase undetected) | 2279 (Heterophase undetected) | 1182 (Heterophase undetected) | 0 | 0 | 0 |
| | 4 | 0.169 | 2123 (Heterophase undetected) | 2112 (Heterophase undetected) | 1081 (Heterophase undetected) | 0 | 0 | 0 |
| | 5 | 0.140 | 2146 (Heterophase undetected) | 2135 (Heterophase undetected) | 1096 (Heterophase undetected) | 0 | 0 | 0 |
| Comparative Example | 1 | 0.162 | 2542 (Heterophase undetected) | 2494 (Heterophase undetected) | 1286 (Heterophase undetected) | 0 | 0 | 0 |
| | 2 | 0.339 | 2066 (Heterophase undetected) | 2043 (50) | 766 (397) | 0 | 0.024 | 0.518 |
| | 3 | 0.137 | 2201 (Heterophase undetected) | 2156 (Heterophase undetected) | 1134 (Heterophase undetected) | 0 | 0 | 0 |
| | 4 | 0.160 | 2042 (Heterophase undetected) | 2029 (Heterophase undetected) | 1059 (Heterophase undetected) | 0 | 0 | 0 |

TABLE 11

| Positive-electrode material | | Powder properties of dry powder | | | | | |
|---|---|---|---|---|---|---|---|
| | | Median diameter (μm)*7 | | | | Bulk density (g/cm³) | BET specific surface area (m²/g) |
| | | US 0 min | US 1 min | US 3 min | US 5 min | | |
| Example | 1 | 6.4 | 5.8 | 4.1 | 1.9 | 0.9 | 59.8 |
| | 2 | 6.7 | 6.0 | 4.4 | 0.8 | 0.9 | 60.4 |
| | 3 | 6.3 | 6.1 | 3.8 | 0.5 | 0.9 | 59.2 |
| | 4 | 6.4 | 5.1 | 2.5 | 0.5 | 0.9 | 59.5 |
| | 5 | 6.4 | 5.9 | 4.4 | 2.3 | 0.9 | 58.9 |
| Comparative Example | 1 | 6.2 | 5.5 | 4.2 | 1.9 | 0.8 | 60.0 |
| | 2 | 6.5 | 5.3 | 2.7 | 0.5 | 0.9 | 58.5 |
| | 3 | 7.6 | 5.7 | 2.9 | 1.6 | 0.9 | 59.4 |
| | 4 | 6.5 | 5.3 | 2.8 | 0.9 | 0.9 | 60.1 |

*7 US represents "ultrasonic dispersion" treatment. The numeric value next to US represents treatment time (min).

[Cell Fabrication and Evaluation 1-1]

The powders of the lithium-nickel-manganese-cobalt composite oxides produced in Examples 1 to 5 and Comparative Examples 1 to 5 were used as positive-electrode materials (positive-electrode active materials) to fabricate lithium secondary cells by the following methods.

Rate Test

First, 75% by weight of each of the powders of the lithium-nickel-manganese-cobalt composite oxides produced in Examples 1 to 5 and Comparative Examples 1 to 5, 20% by weight of acetylene black, and 5% by weight of a polytetrafluoroethylene powder were sufficiently mixed in a mortar. The resulting mixture was formed into a thin sheet. The resulting sheet was stamped into a disk with a punch having a diameter of 9 mm. In this case, the sheet was adjusted in such a manner that the weight of the entire disk was about 8 mg. The disk was press-bonded to an expanded aluminum metal to form a positive electrode having a diameter of 9 mm.

A coin cell was fabricated, the cell including the positive electrode having a diameter of 9 mm as a test electrode, a lithium metal sheet as a counter electrode, an electrolytic solution containing 1 mol/L of $LiPF_6$ dissolved in the ethylene carbonate (EC)-ethyl methyl carbonate (EMc) (3:7 by volume) mixed solvent, and a porous polyethylene film having a thickness of 25 μm as a separator.

In initial two cycles, the resulting coin cell was subjected to constant-current constant-voltage charge (the cell was subjected to constant-current charge at a current density of 0.137 mA/cm² (0.1 C) until the cell voltage reached 4.8 V and then constant-voltage charge until the current reached 0.01 C) at an upper-limit charge voltage of 4.8 V. Then the cell was subjected to constant-current discharge (current density: 0.137 mA/cm² (0.1 C)) at a lower-limit discharge voltage of 3.0 V. In the third cycle, the cell was subjected to constant-current constant-voltage charge (the cell was subjected to constant-current charge at a current density of 0.137 mA/cm² (0.1 C) until the cell voltage reached 4.4 V and then constant-voltage charge until the current reached 0.01 C) at a constant current of 0.1 C and an upper-limit charge voltage of 4.4 V. Then the cell was subjected to constant-current discharge at a lower-limit discharge voltage of 3.0 V. In this way, a test of a single cycle of the charge/discharge operation was made. In the fourth to eleventh cycles, the cell was subjected to constant-current constant-voltage charge at 0.2 C (cell was subjected to constant-current charge at 0.2 C until the cell voltage reached 4.4 V and then constant-current charge until the current reached 0.01 C). Then constant-current discharge tests were performed at 0.1 C, 0.2 C, 0.5 C, 1 C, 3 C, 5 C, 7 C, and 9 C. A current corresponding to 1 C was assumed to be 150 mA per gram of the active material. Table 12 shows a discharge capacity (mAh/g) at 0.1 C in the first cycle (initial discharge capacity), a discharge capacity (mAh/g) at 0.1 C in the fourth cycle (discharge capacity in fourth cycle [a]), a discharge capacity (mAh/g) at 1 C in the seventh cycle (discharge capacity in seventh cycle [b]), the percentage (%) of the discharge capacity in seventh cycle [b] to the discharge capacity in fourth cycle [a], and a discharge capacity (mAh/g) at 9 C in the ninth cycle.

Acceptance criteria in Examples were as follows: The initial discharge capacity in the first cycle was 200 mAh/g or more; the discharge capacity at 1 C in the seventh cycle was 150 mAh/g or more; the percentage (%) of the discharge capacity at 1 C to the discharge capacity at 0.1 C was 82% or more; and the discharge capacity at 9 C in the eleventh cycle was 60 mAh/g or more.

tive-electrode active materials) to fabricate lithium secondary cells by the following methods.

Rate Test

First, 75% by weight of each of the powders of the lithium-nickel-manganese-cobalt composite oxides produced in Examples 6 and 7 and Comparative Examples 4 and 6, 20% by weight of acetylene black, and 5% by weight of a polytetrafluoroethylene powder were sufficiently mixed in a mortar. The resulting mixture was formed into a thin sheet. The resulting sheet was stamped into a disk with a punch having a diameter of 9 mm. In this case, the sheet was adjusted in such a manner that the weight of the entire disk was about 8 mg. The disk was press-bonded to an expanded aluminum metal piece to form a positive electrode having a diameter of 9 mm.

A coin cell was fabricated, the cell including the positive electrode having a diameter of 9 mm as a test electrode, a lithium metal sheet as a counter electrode, an electrolytic solution containing 1 mol/L of $LiPF_6$ dissolved in the ethylene carbonate (EC)-dimethyl carbonate (DMC)-ethyl methyl carbonate (EMc) (3:3:4 by volume) mixed solvent, and a porous polyethylene film having a thickness of 25 μm as a separator.

In initial two cycles, the resulting coin cell was subjected to constant-current constant-voltage charge (the cell was subjected to constant-current charge at a current density of 0.137 mA/cm² (0.1 C) until the cell voltage reached 4.4 V and then constant-voltage charge until the current reached 0.01 C) at an upper-limit charge voltage of 4.4 V. In the third to tenth cycles, the cell was subjected to constant-current constant-voltage charge at 0.2 C (cell was subjected to constant-current charge at 0.2 C until the cell voltage reached 4.4 V and then constant-current charge until the current reached 0.01 C). Then constant-current discharge tests were performed at 0.1 C, 0.2 C, 0.5 C, 1 C, 3 C, 5 C, 7 C, and 9 C. A current corresponding to 1 C was assumed to be 150 mA per gram of the active material. Table 13 shows a discharge capacity

TABLE 12

| Positive-electrode material | | Initial discharge capacity (mAh/g)/ 3.0-4.8 V, 0.1 C | Discharge capacity in fourth cycle [a] (mAh/g)/ 3.0-4.4 V, 0.1 C | Discharge capacity in seventh cycle [b] (mAh/g)/ 3.0-4.4 V, 1 C | b/a × 100(%) | Discharge capacity in eleventh cycle [c] (mAh/g)/ 3.0-4.4 V, 9 C | Result |
|---|---|---|---|---|---|---|---|
| Example | 1 | 249 | 207 | 173 | 84 | 84 | Pass |
|  | 2 | 245 | 207 | 171 | 83 | 96 | Pass |
|  | 3 | 235 | 198 | 170 | 86 | 89 | Pass |
|  | 4 | 203 | 178 | 150 | 84 | 66 | Pass |
|  | 5 | 229 | 188 | 159 | 84 | 101 | Pass |
| Comparative Example | 1 | 240 | 198 | 136 | 69 | 13 | Fail |
|  | 2 | 210 | 180 | 138 | 77 | 18 | Fail |
|  | 3 | 207 | 182 | 143 | 79 | 10 | Fail |
|  | 4 | 204 | 174 | 135 | 78 | 10 | Fail |
|  | 5 | 216 | 174 | 141 | 81 | 45 | Fail |

The following are apparent from Table 12.

In each of Comparative Examples 1 to 4, an excessively small amount of mercury intruded resulted in low discharge capacity of the cell at both low and high rates.

In Comparative Example 5, an excessively small amount of mercury intruded and a lithium content z of less than the lower limit resulted in low discharge capacity of the cell at both low and high rates.

[Cell Fabrication and Evaluation 1-2]

The powders of the lithium-nickel-manganese-cobalt composite oxides produced in Examples 6 and 7 and Comparative Example 6 were used as positive-electrode materials (posi- (mAh/g) at 0.1 C in the first cycle (initial discharge capacity), a discharge capacity (mAh/g) at 0.1 C in the third cycle (discharge capacity in third cycle [a]), a discharge capacity (mAh/g) at 1 C in the sixth cycle (discharge capacity in sixth cycle [b]), and a discharge capacity (mAh/g) at 9 C in the tenth cycle (discharge capacity in tenth cycle [c]).

Acceptance criteria in Examples were as follows: The initial discharge capacity in the first cycle was 170 mAh/g or more; the discharge capacity at 0.1 C in the third cycle was 175 mAh/g or more; the discharge capacity at 1 C in the sixth cycle was 155 mAh/g or more, and the discharge capacity at 9 C in tenth cycle was 110 mAh/g or more.

TABLE 13

Powder properties of spray-dried powder

| Positive-electrode material | | US 0 min | US 1 min | US 3 min | US 5 min | Bulk density (g/cm³) | BET specific surface area |
|---|---|---|---|---|---|---|---|
| | | Median diameter (μm) | | | | | |
| Example | 1 | 6.9 | 4.7 | 3.1 | 0.3 | 0.8 | 37.1 |
| | 2 | 6.9 | 4.7 | 3.1 | 0.3 | 0.8 | 37.1 |
| | 3 | 6.5 | 5.0 | 1.9 | 0.4 | 0.8 | 40.0 |
| | 4 | 5.7 | 0.4 | 0.4 | 0.3 | 0.9 | 12.9 |
| | 5 | 5.8 | 4.8 | 1.3 | 0.4 | 0.9 | 52.4 |
| Comparative Example | 1 | 5.8 | 5.8 | 5.8 | 5.2 | 1.1 | 62.0 |
| | 2 | 5.8 | 5.7 | 5.6 | 5.1 | 1.1 | 65.0 |
| | 3 | 5.2 | 5.3 | 5.3 | 5.0 | 1.0 | 74.1 |
| | 4 | 5.2 | 5.3 | 5.3 | 5.0 | 1.0 | 74.1 |
| | 5 | 5.8 | 5.7 | 5.7 | 5.6 | 1.2 | 89.5 |

5) US represents "ultrasonic dispersion" treatment.

The following are apparent from Table 13.

In each of Comparative Examples 4 and 6, since the amount of mercury intruded was too small, the discharge capacity of the cell was low at both low and high rates, compared with those of the samples (Examples 7 and 6) each having a Co molar ratio (y) substantially equal to those in Comparative Examples 4 and 6.

These results demonstrate that the powder of the lithium transition-metal compound having a specific amount of mercury intruded according to the present invention provides the positive-electrode material, for a lithium secondary battery, having a well-balanced characteristics, e.g., the suppressed degradation in cycle characteristics at high voltages, high capacity, excellent load characteristics Table 14 shows powder properties (median diameter, bulk density, and specific surface area) of the spray-dried products (firing precursors) in Examples 1 to 5 and Comparative Examples 1 to 5.

TABLE 14

Powder properties of spray-dried powder

| Positive-electrode material | | US 0 min | US 1 min | US 3 min | US 5 min | Bulk density (g/cm³) | BET specific surface area (m²/g) |
|---|---|---|---|---|---|---|---|
| | | Median diameter (μm) | | | | | |
| Example | 1 | 6.9 | 4.7 | 3.1 | 0.3 | 0.8 | 37.1 |
| | 2 | 6.9 | 4.7 | 3.1 | 0.3 | 0.8 | 37.1 |
| | 3 | 6.5 | 5.0 | 1.9 | 0.4 | 0.8 | 40.0 |
| | 4 | 5.7 | 0.4 | 0.4 | 0.3 | 0.9 | 12.9 |
| | 5 | 5.8 | 4.8 | 1.3 | 0.4 | 0.9 | 52.4 |
| | 6 | 6.2 | 5.5 | 4.2 | 1.9 | 0.8 | 60.0 |
| | 7 | 5.8 | 5.0 | 3.9 | 2.4 | 0.8 | 50.1 |
| Comparative Example | 1 | 5.8 | 5.8 | 5.8 | 5.2 | 1.1 | 62.0 |
| | 2 | 5.8 | 5.7 | 5.6 | 5.1 | 1.1 | 65.0 |
| | 3 | 5.2 | 5.3 | 5.3 | 5.0 | 1.0 | 74.1 |
| | 4 | 5.2 | 5.3 | 5.3 | 5.0 | 1.0 | 74.1 |
| | 5 | 5.8 | 5.7 | 5.7 | 5.6 | 1.2 | 89.5 |
| | 6 | 11.9 | 11.7 | 11.1 | 10.4 | 1.3 | 31.5 |

5) US represents "ultrasonic dispersion" treatment.

The following are apparent from Table 14. In Examples 1 to 5, the median diameters after ultrasonic dispersion (five minutes) were in the range of 0.1 μm to 1 μm, and the BET specific surface areas were in the range of 10 to 60 m²/g. In contrast, in Comparative Examples 1 to 5, the median diameters were more than 1 μm (all median diameters were more than 5 μm), and the BET specific surface areas were more than 60 m²/g.

[Cell Fabrication and Evaluation 2]

The powders of the lithium-nickel-manganese-cobalt composite oxides and the powder of the lithium-nickel-manganese composite oxide produced in Examples 8 to 11 and Comparative Example 7 to 9 were used as positive-electrode materials (positive-electrode active materials) to fabricate lithium secondary cells.

The production and the rate test of each of the lithium secondary cells were performed as in "[Cell Fabrication and Evaluation 1-2]".

Acceptance criteria in Examples were as follows: The initial discharge capacity in the first cycle was 175 mAh/g or more; the discharge capacity at 0.1 C in the third cycle was 175 mAh/g or more; the discharge capacity at 1 C in the sixth cycle was 160 mAh/g or more, and the discharge capacity at 9 C in tenth cycle was 116 mAh/g or more.

Table 15 shows the results.

TABLE 15

| Positive-electrode material | | Initial discharge capacity (mAh/g)/ 3.0-4.4 V, 0.1 C | Discharge capacity in third cycle [a] (mAh/g)/ 3.0-4.4 V, 0.1 C | Discharge capacity in sixth cycle [b] (mAh/g)/ 3.0-4.4 V, 1 C | Discharge capacity in tenth cycle [c] (mAh/g)/ 3.0-4.4 V, 9 C | Result |
|---|---|---|---|---|---|---|
| Example | 1 | 180 | 180 | 164 | 125 | Pass |
| | 2 | 178 | 178 | 164 | 130 | Pass |
| | 3 | 178 | 178 | 160 | 116 | Pass |
| | 4 | 175 | 176 | 161 | 116 | Pass |
| Comparative Example | 1 | 169 | 169 | 154 | 120 | Fail |
| | 2 | 175 | 177 | 161 | 115 | Fail |
| | 3 | 173 | 175 | 158 | 114 | Fail |

Table 15 demonstrates that the powder of the lithium-nickel-manganese-cobalt composite oxide for a positive-electrode material in a lithium secondary battery according to the present invention provides a lithium secondary battery having excellent load characteristics.

[Cell Fabrication and Evaluation 3]
(1) Rate Test

The powders of the lithium-nickel-manganese-cobalt composite oxides and the powder of the lithium-nickel-manganese composite oxide produced in Examples 12 to 16 and Comparative Example 10 to 13 were used as positive-electrode materials (positive-electrode active materials) to fabricate lithium secondary cells.

The production and the rate test were performed as in "[Cell Fabrication and Evaluation 1-2]".

Acceptance criteria in Examples were as follows: The initial discharge capacity in the first cycle was 176 mAh/g or more; the discharge capacity at 0.1 C in the third cycle was 176 mAh/g or more; the discharge capacity at 1 C in the sixth cycle was 160 mAh/g or more, and the discharge capacity at 9 C in tenth cycle was 116 mAh/g or more.

Table 16 shows the results.

(2) Low-Temperature Load Characteristics Test:

First, 75% by weight of each of the powders of the lithium-nickel-manganese-cobalt composite oxides produced in Examples 12 and 16 and Comparative Examples 10 and 13, 20% by weight of acetylene black, and 5% by weight of a polytetrafluoroethylene powder were sufficiently mixed in a mortar. The resulting mixture was formed into a thin sheet. The resulting sheet was stamped into disks with punches having a diameter of 9 mm and 12 mm. In this case, the sheet was adjusted in such a manner that the weight of the entire disk having a diameter of 9 mm was about 8 mg and the weight of the entire disk having a diameter of 12 mm was about 18 mg. These disks were press-bonded to expanded aluminum metal pieces to form positive electrodes having a diameter of 9 mm and 12 mm. The positive electrodes having a diameter of 9 mm is referred to as a "positive electrode A". The positive electrodes having a diameter of 12 mm is referred to as a "positive electrode B".

A coin cell was fabricated, the cell including the positive electrode A having a diameter of 9 mm as a test electrode, a lithium metal sheet as a counter electrode, an electrolytic solution containing 1 mol/L of $LiPF_6$ dissolved in the ethylene carbonate (EC)-dimethyl carbonate (DMC)-ethyl methyl carbonate (EMc) (3:3:4 by volume) mixed solvent, and a porous polyethylene film having a thickness of 25 μm as a separator.

The coin cell was subjected to constant-current constant-voltage charge at 0.2 mA/cm$^2$, in other words, the reaction in which lithium ions were released from the positive electrode was conducted to an upper limit of 4.2 V and then 0.2 mA/cm$^2$. The initial charge capacity per unit weight of the positive-electrode active material is expressed as Qs (C) [mAh/g]. The initial discharge capacity per unit weight of the positive-electrode active material is expressed as Qs (D) [mAh/g].

A graphite powder having an average particle diameter of 8 to 10 μm ($d_{002}$=3.35 Å) was used as a negative-electrode active material. Polyvinylidene fluoride was used as a binder. These were mixed in a ratio of 92.5:7.5 by weight in N-methylpyrrolidone solution to prepare a negative-electrode mix slurry. The resulting slurry was applied to one side of copper foil having a thickness of 20 μm and dried to vaporize the solvent. The coated foil was stumped into a disk having a diameter of 12 mm. The disk was pressed at 0.5 ton/cm$^2$ (49 MPa) to afford a negative electrode B. In this case, the application was performed in such a manner that the amount of the negative-electrode active material on the electrode was about 5 to about 12 mg.

A cell was fabricated, the cell including the negative electrode B as a test electrode and a counter electrode composed of lithium metal. The resulting cell was subjected to a test in which lithium ions were intercalated in the negative electrode by the constant current constant-voltage method at a current of 0.2 mA/cm$^2$, a voltage of 3 mV (cut current, 0.05 mA), and a lower limit of 0 V. The initial intercalation capacity per unit weight of the negative-electrode active material was expressed as Qf [mAh/g].

The positive electrode B and negative electrode B were used in combination together with a coin cell case to fabricate a test battery, and battery performances thereof were evaluated. The positive electrode B was placed on the positive-electrode can of the coin cell case. A porous polyethylene film having a thickness of 25 μm was placed thereon as a separator. These components were pressed with a gasket made of polypropylene. An electrolytic solution containing 1 mol/L of $LiPF_6$ dissolved in the ethylene carbonate (EC)-dimethyl carbonate (DMC)-ethyl methyl carbonate (EMc) (3:3:4 by volume) mixed solvent was used as a nonaqueous electrolytic solution. The solution was fed into the can to sufficiently infiltrate the solution into the separator. The negative electrode B was then placed and a negative-electrode can was further placed thereon. The resultant assembly was sealed to produce a coin type lithium secondary battery. In this case, a balance between the weight of the positive-electrode active material and the weight of the negative electrode active material was set so as to substantially satisfy the following expression.

Weight o positive-electrode active material [g]/weight of negative-electrode active material [g]=(Qf [mAh/g]/1.2)Qs (C) [mAh/g]

In order to examine the low-temperature load characteristics of the resulting cell, the following test was conducted, provided that the one-hour rate current value for the battery, i.e., 1 C, was defined below.

1C[mA]=Qs(D)×weight of positive-electrode active material [g]/h

First, two cycles of charge/discharge at a constant current of 0.2 C and one cycle of charge/discharge at a constant current of 1 C were conducted at room temperature. In these cycles, the upper-limit charge voltage and the lower-limit voltage were set at 4.1 V and 3.0 V, respectively. Subsequently, the coin cell which had been regulated so as to have a charge depth of 40% by ⅓ C constant current charge/discharge was held in a −30° C. low-temperature atmosphere for 1 hour or more and then discharged at a constant current of 0.5 C [mA] for 10 seconds. The voltage of the cell as measured after the 10-second discharge was defined as V [mV]. The voltage of the cell as measured before the discharge was defined as V0 [mV]. The value of resistance R [Ω] was calculated using the equation:

$R[\Omega]=\Delta V[mV]/0.5C[mA]$ where ΔV=V−V0.

Table 16 shows the resistance values of cells including the lithium-nickel-manganese-cobalt composite oxides produced in Examples 12 to 16 and Comparative Examples 10 to as the positive-electrode active materials. Lower resistance values represent better low-temperature load characteristics. An acceptance criterion in Examples was that the resistance value was 480Ω or less.

TABLE 16

| Positive-electrode material | | Initial discharge capacity (mAh/g)/ 3.0-4.4 V, 0.1 C | Discharge capacity in third cycle [a] (mAh/g)/ 3.0-4.4 V, 0.1 C | Discharge capacity in sixth cycle [b] (mAh/g)/ 3.0-4.4 V, 1 C | Discharge capacity in tenth cycle [c] (mAh/g)/ 3.0-4.4 V, 9 C | Low-temperature resistance (Ω) | Result |
|---|---|---|---|---|---|---|---|
| Example | 1 | 177 | 177 | 165 | 133 | 406 | Pass |
| | 2 | 176 | 176 | 165 | 131 | 346 | Pass |

TABLE 16-continued

| Positive-electrode material | | Initial discharge capacity (mAh/g)/ 3.0–4.4 V, 0.1 C | Discharge capacity in third cycle [a] (mAh/g)/ 3.0–4.4 V, 0.1 C | Discharge capacity in sixth cycle [b] (mAh/g)/ 3.0–4.4 V, 1 C | Discharge capacity in tenth cycle [c] (mAh/g)/ 3.0–4.4 V, 9 C | Low-temperature resistance (Ω) | Result |
|---|---|---|---|---|---|---|---|
| | 3 | 177 | 178 | 162 | 127 | 420 | Pass |
| | 4 | 178 | 178 | 164 | 126 | 413 | Pass |
| | 5 | 177 | 177 | 164 | 125 | 480 | Pass |
| Comparative Example | 1 | 180 | 180 | 164 | 125 | 539 | Fail |
| | 2 | 171 | 171 | 159 | 130 | 325 | Fail |
| | 3 | 175 | 176 | 154 | 109 | 639 | Fail |
| | 4 | 177 | 178 | 162 | 122 | 496 | Fail |

Table 16 demonstrates that the powder of the lithium-nickel-manganese-cobalt composite oxide for a positive-electrode material in a lithium secondary battery according to the present invention provides a lithium secondary battery having excellent load characteristics.

While the present invention has been described in detail with reference to the specific embodiments, it will be understood by the skilled person that various changes and modifications can be made without departing from the spirit and scope of the invention.

The present invention contains subject matter related to Japanese Patent Application (JP 2006-106288) filed in the Japanese Patent Office on Apr. 7, 2006, Japanese Patent Application (JP 2006-266580) filed in the Japanese Patent Office on Sep. 29, 2006, Japanese Patent Application (JP 2006-257260) filed in the Japanese Patent Office on Sep. 22, 2006, and Japanese Patent Application (JP 2006-305015) filed in the Japanese Patent Office on Nov. 10, 2006, the entire contents of which are incorporated herein by reference.

Industrial Applicability

Applications of the lithium secondary battery of the invention are not particularly limited and the cell is usable in known various applications. Examples thereof include notebook type personal computers, pen-input personal computers, mobile personal computers, electronic book players, portable telephones, portable facsimile telegraphs, portable copiers, portable printers, headphone stereos, video movies, liquid-crystal televisions, handy cleaners, portable CDs, mini disks, transceivers, electronic pocketbooks, pocket calculators, memory cards, portable tape recorders, radios, backup power sources, motors, illuminators, toys, game appliances, clocks, stroboscopes, cameras, electric tools, and power sources for motor vehicles.

The invention claimed is:

1. A powder of a lithium transition-metal compound for a positive-electrode material in a lithium secondary battery, comprising:
a lithium transition-metal compound, as a main component, capable of intercalating and deintercalating lithium ions;
wherein the powder is prepared by (a) incorporating at least one additive, that inhibits grain growth and sintering during firing in the main component, in an amount greater than or equal to 0.01 mol % and less than 2 mol % with respect to the total molar amount of the transition-metal elements in the main component, and then (b) performing firing;
wherein the atomic ratio of the total amount of the additive element to the total amount of metal elements except Li and the additive element on surfaces of primary particles of the lithium transition-metal compound is 5 to 150 times the atomic ratio of the total amount of the additive element to the total amount of the metal elements except Li and the additive element in the entire particles of the lithium transition-metal compound; and
wherein the lithium transition-metal compound is a lithium-nickel-manganese-cobalt composite oxide that has a crystal structure which has a layered structure and is represented by formula (I″):

$$LiMO_2 \qquad (I'')$$

where the ratio of Li to M is in the range of 0.001 to 0.2 and M is represented by formula (II″):

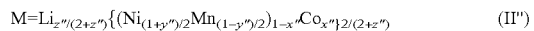

$$M = Li_{z''/(2+z'')}\{(Ni_{(1+y'')/2}Mn_{(1-y'')/2})_{1-x''}Co_{x''}\}_{2/(2+z'')} \qquad (II'')$$

where $0 \leq x'' \leq 0.1$, $-0.1 \leq y'' \leq 0.1$, and $(1-x'')(0.051-0.98y'') \leq z'' \leq (1-x'')(0.20-0.88y'')$.

2. The powder of the lithium transition-metal compound for a positive-electrode material in a lithium secondary battery according to claim 1, wherein the additive is an oxide that contains at least one element selected from the group consisting of Mo, W, Nb, Ta, and Re.

3. The powder of the lithium transition-metal compound for a positive-electrode material in a lithium secondary battery according to claim 1, wherein the median diameter of the powder of the lithium transition-metal compound is in the range from 0.1 μm to 3 μm and is determined from volume-based particle diameters measured with a laser diffraction/scattering particle size distribution analyzer using the refractive index set at 1.24, and the measurement is made after a five-minute ultrasonic dispersion.

4. The powder of the lithium transition-metal compound for a positive-electrode material in a lithium secondary battery according to claim 1, wherein the primary particles have an average diameter of 0.1 μm to 0.9 μm.

5. The powder of the lithium transition-metal compound for a positive-electrode material in a lithium secondary battery according to claim 1, wherein the BET specific surface area of the powder of the lithium transition-metal compound is in the range of 1.5 m²/g to 5 m²/g.

6. The powder of the lithium transition-metal compound for a positive-electrode material in a lithium secondary battery according to claim 1, wherein in a mercury intrusion curve obtained by mercury intrusion porosimetry of the powder of the lithium transition-metal compound, the amount of mercury intruded is in the range of 0.7 cm³/g to 1.5 cm³/g when the pressure is increased from 3.86 kPa to 413 MPa.

7. The powder of the lithium transition-metal compound for a positive-electrode material in a lithium secondary battery according to claim 1, wherein a pore-size distribution curve obtained by mercury intrusion porosimetry of the powder of the lithium transition-metal compound has at least one main peak with a peak top that is present at a pore radius of 300 nm to 1,000 nm and does not have a sub-peak with a peak top that is present at a pore radius greater than or equal to 80 nm and less than 300 nm.

8. The powder of the lithium transition-metal compound for a positive-electrode material in a lithium secondary battery according to claim 1, wherein in a pore-size distribution curve obtained by mercury intrusion porosimetry of the powder of the lithium transition-metal compound, a peak with a peak top that is present at a pore radius of 300 nm to 1,000 nm has a pore volume of 0.4 cm³/g to 1 cm³/g.

9. The powder of the lithium transition-metal compound for a positive-electrode material in a lithium secondary battery according to claim 1, wherein the bulk density of the powder of the lithium transition-metal compound is in the range of 0.5 g/cm³ to 1.7 g/cm³.

10. The powder of the lithium transition-metal compound for a positive-electrode material in a lithium secondary battery according to claim 1, wherein the volume resistivity of the powder of the lithium transition-metal compound that is compacted at a pressure of 40 MPa is in the range of $1 \times 10^3$ Ω·cm to $1 \times 10^6$ Ω·cm.

11. The powder of the lithium transition-metal compound for a positive-electrode material in a lithium secondary battery according to claim 1, wherein the powder is prepared by firing at 970° C. or higher in an oxygen-containing gas atmosphere.

12. The powder of the lithium transition-metal compound for a positive-electrode material in a lithium secondary battery according to claim 1, wherein the carbon content C of the powder of the lithium transition-metal compound is in the range of 0.005% by weight to 0.05% by weight.

13. The powder of the lithium transition-metal compound for a positive-electrode material in a lithium secondary battery according to claim 1, wherein in powder X-ray diffraction measurement using CuKα radiation, $0.01 \leq$ FWHM $(110) \leq 0.2$, where FWHM (110) represents the half-width of the (110) diffraction peak observed at a diffraction angle 2θ of about 64.5°.

14. The powder of the lithium transition-metal compound for a positive-electrode material in a lithium secondary battery according to claim 1, wherein in powder X-ray diffraction measurement using CuKα radiation, no diffraction peak from a heterophase is observed on the higher-angle side of the peak top of each of the (018) diffraction peak at a diffraction angle 2θ of about 64°, the (110) diffraction peak at a diffraction angle 2θ of about 64.5°, and the (113) diffraction peak at a diffraction angle 2θ of about 68°, or in the case where a diffraction peak from a heterophase is observed, the ratio of the integrated intensity of the diffraction peak from the heterophase to the integrated intensity of a corresponding one of the diffraction peaks from a target crystal phase is within ranges described below:

$$0 \leq I_{018*}/I_{018} \leq 0.20,$$

$$0 \leq I_{110*}/I_{110} \leq 0.25, \text{ and}$$

$$0 \leq I_{113*}/I_{113} \leq 0.30,$$

where $I_{018}$ represents the integrated intensity of the (018) diffraction peak, $I_{110}$ represents the integrated intensity of the (110) diffraction peak, $I_{113}$ represents the integrated intensity of the (113) diffraction peak, $I_{018}*$ represents the integrated intensity of the diffraction peak from the heterophase observed on the higher-angle side of the peak top of the (018) diffraction peak, $I_{110*}$ represents the integrated intensity of the diffraction peak from the heterophase observed on the higher-angle side of the peak top of the (110) diffraction peak, and $I_{113*}$ represents the integrated intensity of the diffraction peak from the heterophase observed on the higher-angle side of the peak top of the (113) diffraction peak.

* * * * *